United States Patent
Bergan et al.

(10) Patent No.: US 6,322,366 B1
(45) Date of Patent: Nov. 27, 2001

(54) INSTRUCTIONAL MANAGEMENT SYSTEM

(75) Inventors: John Richard Bergan; John Robert Bergan; Kerrie L. Cole, all of Tucson, AZ (US)

(73) Assignee: Assessment Technology Inc., Tucson, AZ (US)

( * ) Notice: Subject to any disclaimer, the term of this patent is extended or adjusted under 35 U.S.C. 154(b) by 0 days.

(21) Appl. No.: 09/338,440

(22) Filed: Jun. 23, 1999

Related U.S. Application Data

(60) Provisional application No. 60/091,288, filed on Jun. 30, 1998.

(51) Int. Cl.$^7$ .................................................. G09B 19/00
(52) U.S. Cl. ......................... 434/118; 322/323; 322/350
(58) Field of Search ..................................... 434/322, 323, 434/350, 118

(56) References Cited

U.S. PATENT DOCUMENTS

| | | | |
|---|---|---|---|
| 5,059,127 | * 10/1991 | Lewis et al. ...................... | 434/353 X |
| 5,122,952 | * 6/1992 | Minkus ............................. | 705/26 X |
| 5,173,051 | 12/1992 | May et al. . | |
| 5,261,823 | * 11/1993 | Kurokawa ........................ | 434/323 X |
| 5,267,865 | 12/1993 | Lee et al. . | |
| 5,295,836 | * 3/1994 | Ryu et al. ........................ | 434/335 X |
| 5,310,349 | 5/1994 | Daniels et al. . | |
| 5,743,746 | * 4/1998 | Ho et al. ......................... | 434/332 X |
| 5,829,983 | * 11/1998 | Koyama .......................... | 434/118 X |
| 5,904,485 | * 5/1999 | Siefert ............................. | 434/322 X |
| 5,967,793 | * 10/1999 | Ho et al. ......................... | 434/362 X |
| 6,024,577 | * 2/2000 | Wadahama et al. ............. | 434/322 X |
| 6,029,043 | * 2/2000 | Ho et al. .......................... | 434/350 X |
| 6,077,085 | * 6/2000 | Parry et al. ...................... | 434/322 X |
| 6,091,930 | * 7/2000 | Mortimer et al. ............... | 434/362 X |
| 6,139,330 | * 10/2000 | Ho et al. .......................... | 434/322 X |

OTHER PUBLICATIONS

Thissen et al., "Item Response Theory for Scores on Tests including Polychotomous Items with Ordered Responses", The L.L. Thurstone Psychometric Laboratory, University of North Carolina, Research Report No. 94–2, May 1994.

* cited by examiner

*Primary Examiner*—Joe H. Cheng
*Assistant Examiner*—Chanda Harris
(74) *Attorney, Agent, or Firm*—Donald W. Marks

(57) ABSTRACT

An education management system designed primarily for preschool and beginning elementary grade levels employs learning capabilities which have assigned difficulty and discrimination factors. The learning capabilities for each developmental or grade level are classified into developmental areas which are further broken down into knowledge areas. Those learning capabilities which are indicated as learned for each child are used to assess child educational development, child developmental scores and to indicate readiness level for learning higher difficulty learning capabilities. In the absence of direct observation, work sample, or parent information regarding achievement of individual learning capabilities, an estimation of general overall capability can be used to compute indications of learned capabilities in each developmental area. The system additionally includes lesson plan tools having activities with specific goals or learning capabilities along with indications of class readiness and/or achievement for the specific goals.

34 Claims, 142 Drawing Sheets

FIG. 5

KNOWLEDGE AREA TABLE
- 234 — GLOBAL ID
- 254 — KNOWLEDGE AREA 1
- 256 — DEVELOPMENTAL AREA 1
- 252
- GLOBAL ID
- KNOWLEDGE AREA g
- DEVELOPMENTAL AREA 1
- GLOBAL ID
- KNOWLEDGE AREA n
- DEVELOPMENTAL AREA m

FIG. 6

GOAL TABLE
- 234 — GLOBAL ID
- 262 — CAPABILITY 1
- 264 — DEVELOPMENTAL AREA
- 266 — KNOWLEDGE AREA
- 268 — CLASS 1
- 270 — DIFFICULTY (b)
- 272 — DISCRIMINATION (a)
- 274 — ORDER
- 260
- GLOBAL ID
- CAPABILITY n
- DEVELOPMENTAL AREA
- KNOWLEDGE AREA
- CLASS i
- DIFFICULTY (b)
- DISCRIMINATION (a)
- ORDER

FIG. 7

CHILD TABLE
- 276
- 234 — GLOBAL ID
- 278 — CHILD i
- 280 — CLASS
- 282 — OTHER SCHOOL INFORMATION
- 284 — OTHER PERSONAL AND FAMILY INFO

| CHILD SCORES TABLE | |
|---|---|
| | 288 |
| 234 | GLOBAL ID |
| 290 | CHILD i |
| 292 | DEVELOPMENTAL AREA |
| 294 | LEARNED 1-n |
| 296 | PLANS 1-n |
| 298 | START DATE |
| 300 | END DATE |
| 302 | DEV. LEVEL |
| 304 | RISK OF DELAY |
| 306 | SUMMED SCORE |
| 308 | PERCENTILE |
| 310 | NCE |
| 312 | zSCORE |
| 314 | OBSERVATION DATE |
| 316 | SCREENER |
| 318 | SPEECH |
| 320 | MEMO |

FIG. 8

| CLASS SCORE TABLE | |
|---|---|
| | 324 |
| 234 | GLOBAL ID |
| 326 | CLASS i |
| 328 | DEVELOPMENTAL AREA |
| 330 | CAPABILITY |
| 332 | LEARNED |
| 334 | READY NOW |
| 336 | READY SOON |
| 338 | READY LATER |
| 340 | OBSERVATION DATE |

FIG. 9

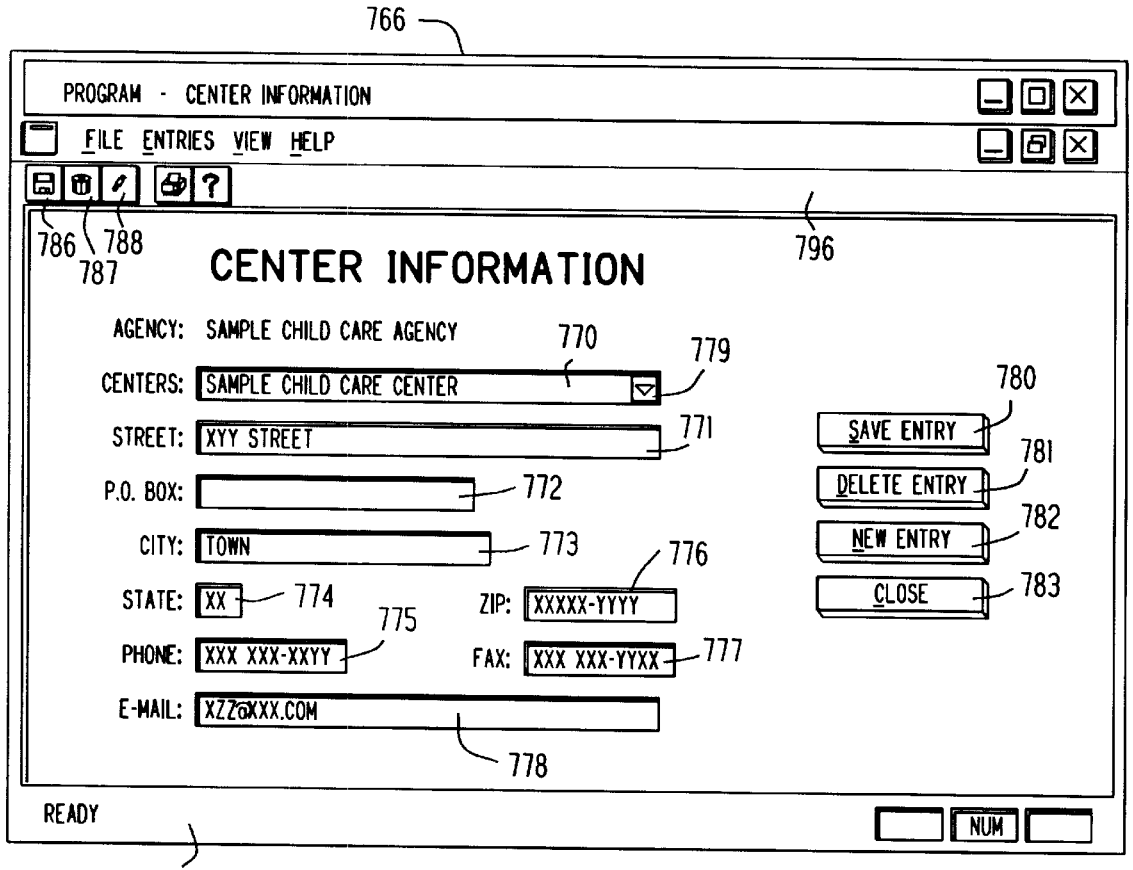
FIG. 34
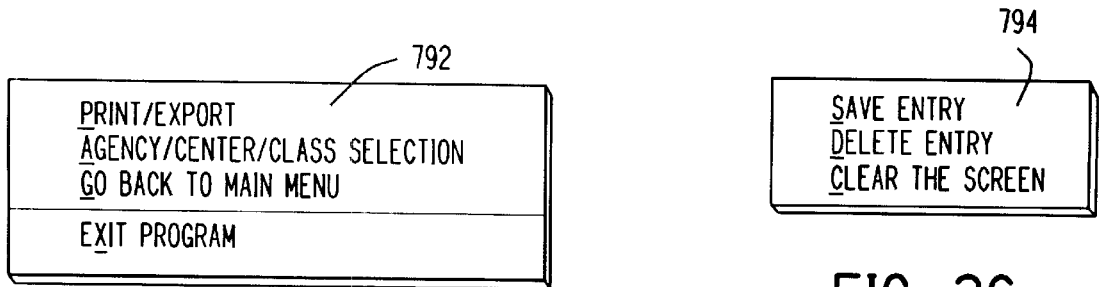
FIG. 35
FIG. 36

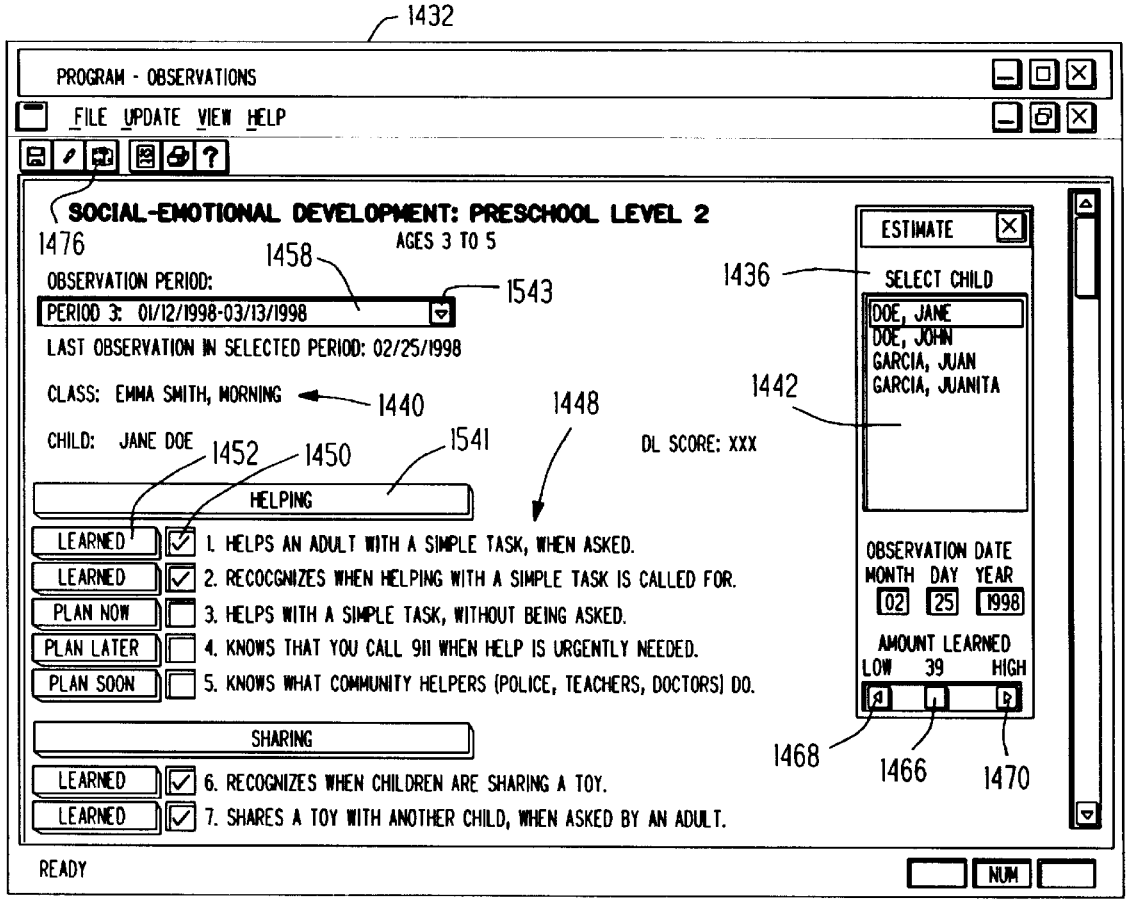
FIG. 58
FIG. 59
FIG. 60

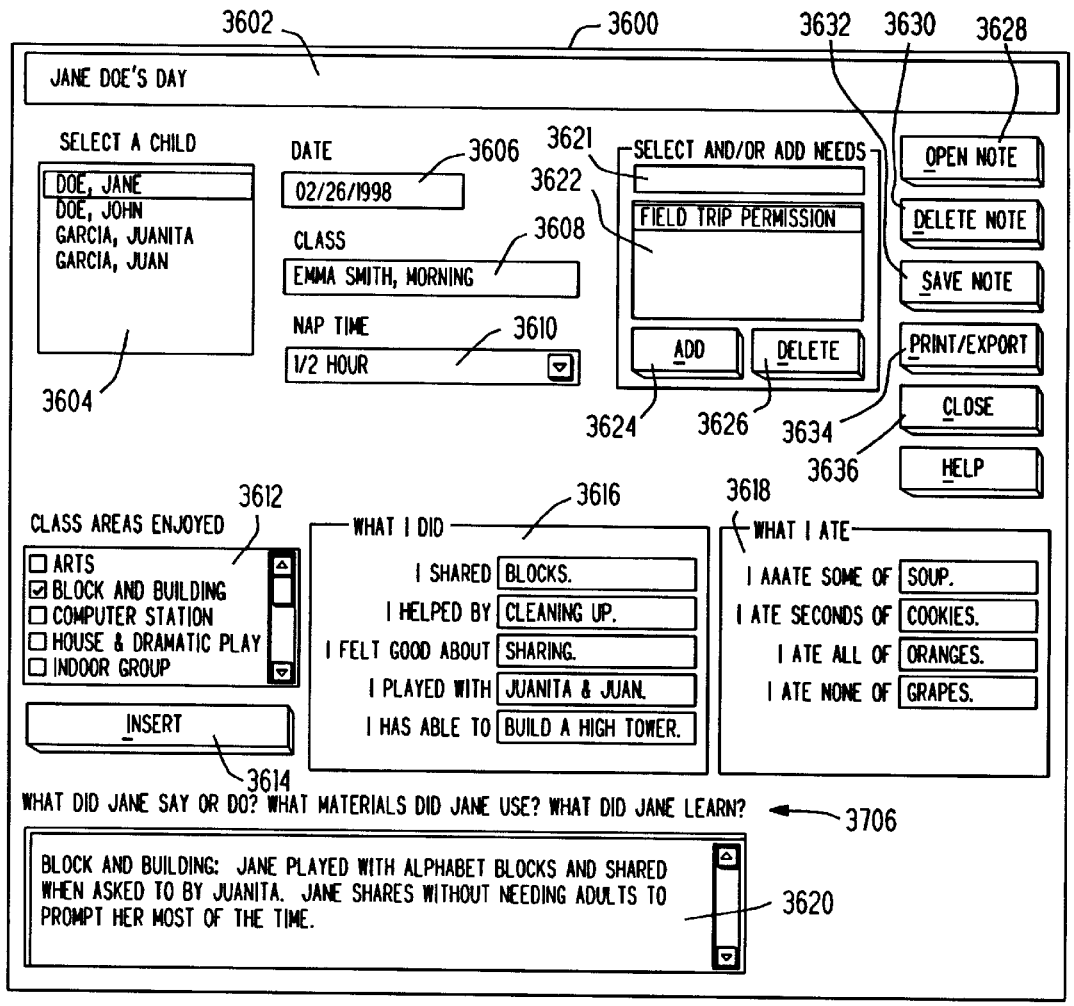
FIG. 135
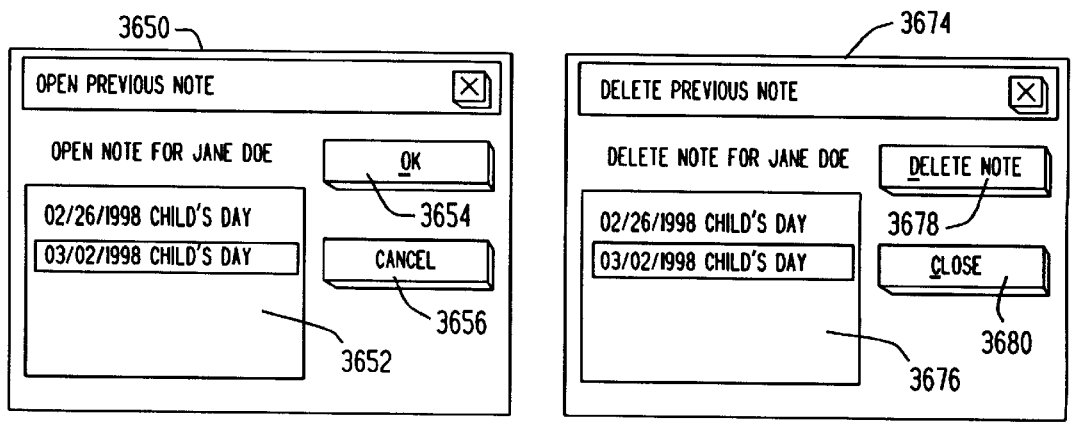
FIG. 136
FIG. 137

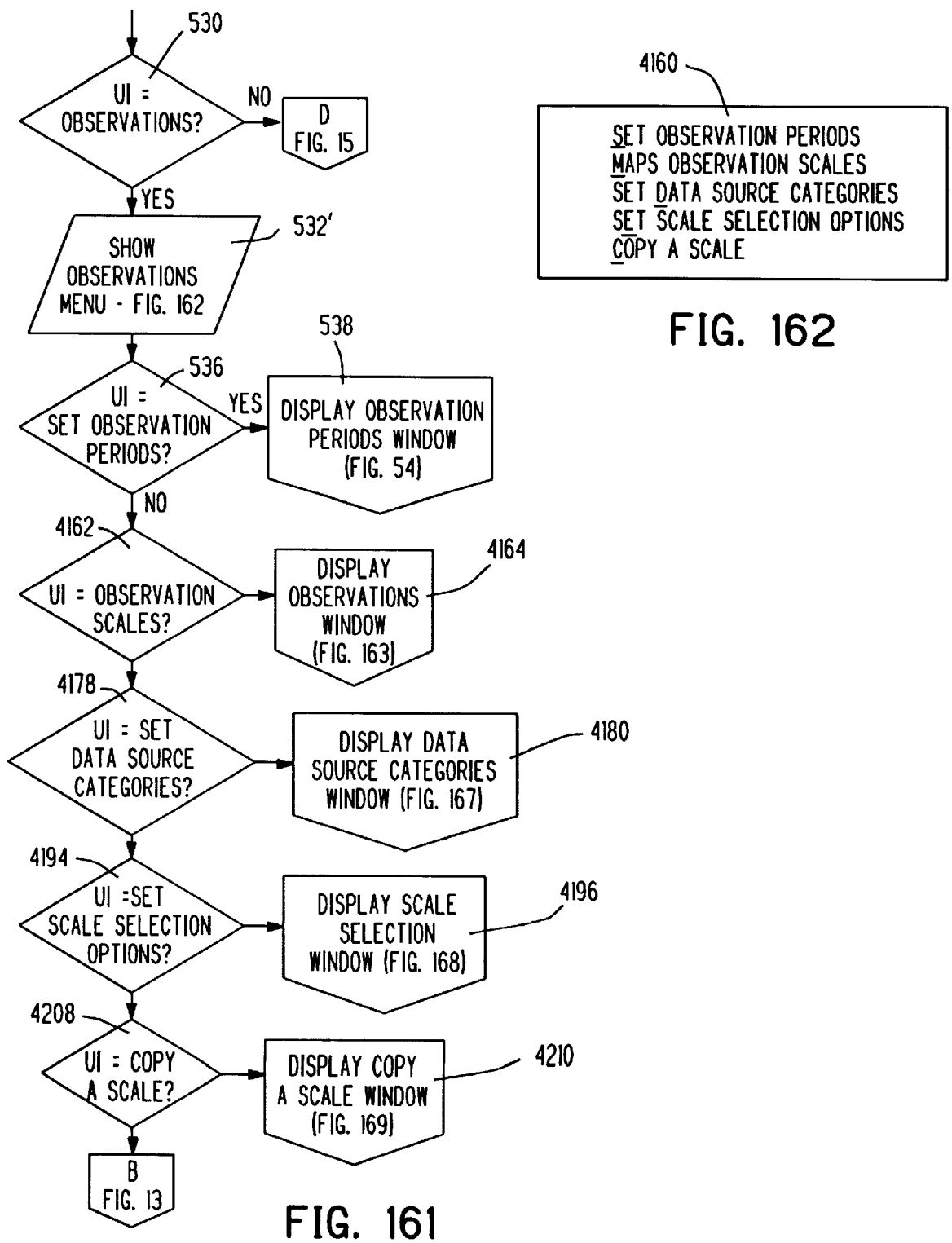

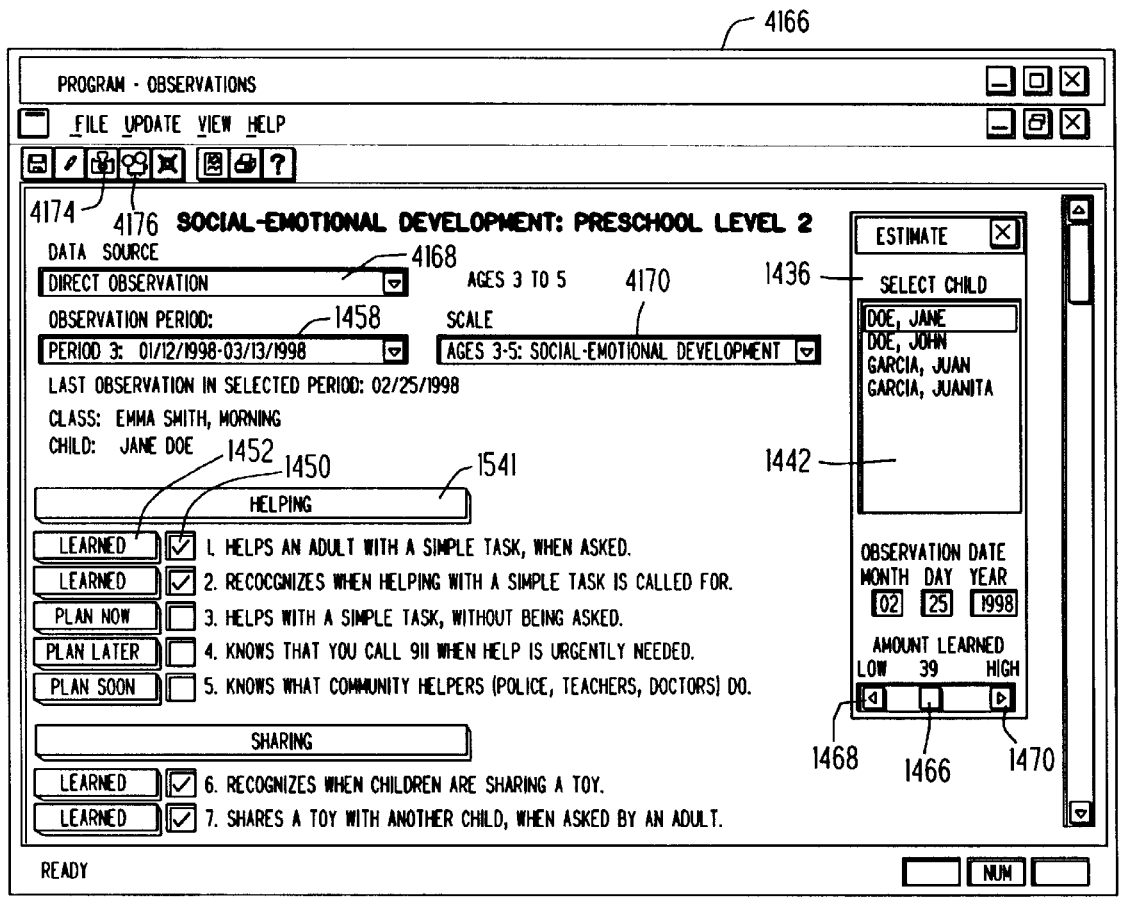
FIG. 163
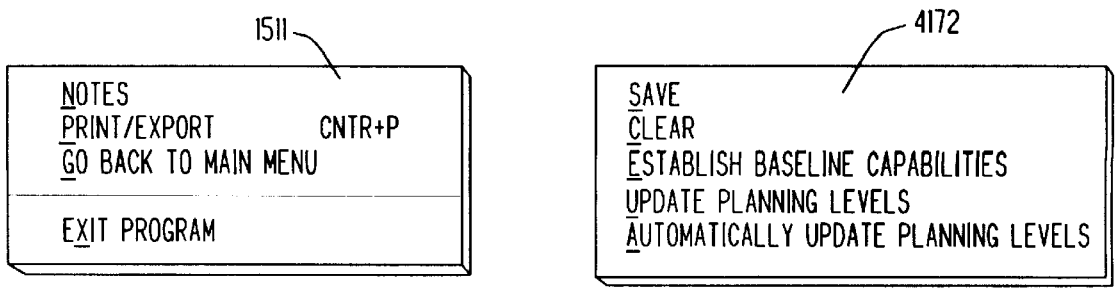
FIG. 164
FIG. 165

AGENCY DEVELOPMENT PROFILE FOR SAMPLE AGENCY

SCALE: Early Math, Preschool level 2; ages 3-5
OBSERVATION PERIOD: 03/16/1998 - 05/15/1998

NUMBER OF CHILDREN AT READINESS LEVELS

| Learned | Ready Now | Ready Soon | Ready Later | CAPABILITIES |
|---|---|---|---|---|
| | | | | COUNTING |
| 11 | 0 | 0 | 0 | Counts to find how many are in a group < 6. |
| 9 | 0 | 2 | 0 | Counts to find how many are in a group < 11. |
| 11 | 0 | 0 | 0 | Counts forward from a number > 1 to find how many there are in a group. |
| 0 | 0 | 2 | 9 | Counts backward to find how many are left. |
| | | | | ADDITION |
| 11 | 0 | 0 | 0 | Indicates that a small group has more after some have been added. |
| 0 | 0 | 0 | 0 | Adds one to a small group. |
| 2 | 2 | 5 | 2 | Adds two small groups by combining the groups and counting all the objects. |
| | | | | SUBTRACTION |
| 10 | 0 | 1 | 0 | Indicates that a group has less after taking some away. |
| 10 | 0 | 1 | 0 | Indicates that one was taken away from a small group. |
| 7 | 0 | 4 | 0 | Indicates how many are left after taking one from a small group. |
| | | | | FRACTIONS |
| 2 | 0 | 5 | 4 | Exchanges two halves for a whole. |
| 2 | 0 | 7 | 2 | Shows where to divide a whole object to make two halves. |
| 2 | 0 | 2 | 7 | Divides a group of objects in half. |
| | | | | SERIATION |
| 11 | 0 | 0 | 0 | Identifies the shorter or taller of two persons or things. |
| 11 | 0 | 0 | 0 | Identifies the shortes or tallest in a group. |
| 4 | 3 | 4 | 0 | Places an object in its proper position in a group ordered by size. |
| 8 | 0 | 3 | 0 | Arranges objects in order by size. |
| | | | | GEOMETRIC SHAPES |
| 11 | 0 | 0 | 0 | Refers to familiar shapes (e.g., circle, square, triangle) by name. |
| 11 | 0 | 0 | 0 | Makes a circle. |
| 5 | 2 | 4 | 0 | Makes a square. |
| 2 | 0 | 0 | 1 | Makes a triangle. |

Date: xx/xx/xxxx

INDIVIDUAL DEVELOPMENT PROFILE FOR John Doe

SCALE: Early Math, Preschool level 2; ages 3-5
OBSERVATION PERIOD: 03/16/1998 - 05/15/1998
CLASS: First Teacher, afternoon
CENTER: Sample Child Care Center
AGENCY: Sample Agency

| READINESS | CAPABILITIES |
|---|---|
| | COUNTING |
| Learned | Counts to find how many are in a group < 6. |
| Learned | Counts to find how many are in a group < 11. |
| Learned | Counts forward from a number > 1 to find how many there are in a group. |
| Ready Later | Counts backward to find how many are left. |
| | ADDITION |
| Learned | Indicates that a small group has more after some have been added. |
| Learned | Adds one to a small group. |
| Ready Soon | Adds two small groups by combining the groups and counting all the objects. |
| | SUBTRACTION |
| Learned | Indicates that a group has less after taking some away. |
| Learned | Indicates that one was taken away from a small group. |
| Learned | Indicates how many are left after taking one from a small group. |
| | FRACTIONS |
| Ready Soon | Exchanges two halves for a whole. |
| Ready Soon | Shows where to divide a whole object to make two halves. |
| Ready Later | Divides a group of objects in half. |
| | SERIATION |
| Learned | Identifies the shorter or taller of two persons or things. |
| Learned | Identifies the shortes or tallest in a group. |
| Ready Now | Places an object in its proper position in a group ordered by size. |
| Learned | Arranges objects in order by size. |
| | GEOMETRIC SHAPES |
| Learned | Refers to familiar shapes (e.g., circle, square, triangle) by name. |
| Learned | Makes a circle. |
| Learned | Makes a square. |
| Ready Soon | Makes a triangle. |
| | TIME IN DAILY LIVING |
| Learned | Identifies a morning, afternoon, or evening activity |
| Ready Soon | Identifies an activity that takes about a minute to do. |
| Ready Later | Identifies an activity that takes about an hour to do. |
| | MATH COMMUNICATIONS |
| Ready Later | Writes numerals to indicate 6 or less objects. |
| Ready Later | Writes numerals to indicate 10 or less objects. |
| Ready Later | Writes numerals to indicate between 11 and 20 objects. |

Date: xx/xx/xxxx

| AGENCY DEVELOPMENT SUMMARY FOR SAMPLE AGENCY |
|---|

OBSERVATION PERIOD: 03/16/1998 - 05/15/1998

| SCALE | DEVELOPMENTAL LEVEL SCORE | NORMAL CURVE EQUIVALENT | PERCENTILE | STANDARD SCORE |
|---|---|---|---|---|
| Early Math, Preschool Level 2 (3-5) | 532 | 64.82 | 72% | 0.70 |

| INDIVIDUAL DEVELOPMENT SUMMARY |
|---|

OBSERVATION PERIOD: 03/16/1998 - 05/15/1998
CENTER: Sample Child Care Center
AGENCY: Sample Agency
CLASS: Sam Bergan, afternoon

| CHILD AND SCALE | DEVELOPMENTAL LEVEL SCORE | NORMAL CURVE EQUIVALENT | PERCENTILE | STANDARD SCORE |
|---|---|---|---|---|
| Rachel Deere Early Math, Preschool Level 2 (3-5) | 529 | 63.48 | 73% | 0.64 |
| Sean Doe Early Math, Preschool Level 2 (3-5) | 535 | 66.22 | 77% | 0.77 |

INDIVIDUAL SCREENING REPORT & IDP FOR Sean Doe

SCREENER: A. Screener  Screening Date: 3/23/1998
CLASS: Sam Bergan, afternoon
PROGRAM: Sample Child Care Center, Sample Agency SREENING RESULTS
Developmental level:      423       RISK OF DEVELOPMENT DELAY: Mildly at risk
Percentile:               14%       PRIMARY LANGUAGE:          English
Normal Curve Equivalent:  27.04     ARTICULATION:              Easy to understand
Normalized Standard Score: -1.09

INDIVIDUAL EDUCATION PLAN
Planning Goals  Objectives
    COGNITIVE DEVELOPMENT
Plan Later    Distinguishess plants from animals.
Learned       Sorts objects by a distinctive characteristic (e.g., size, texture, weight, color)
Plan Later    Predicts that night will come when the sun goes down.
Plan Later    Follows a simple direction in a one-to-one interaction with an adult.
Learned       Follows a small set of step-by-step directions without assistance.
Learned       Predicts that a rolling object will move faster than a sliding object.
Learned       Refers to familiar shapes (e.g., circle, square, triangle) by name.
Learned       Predicts which way a scale will tip when a weight is added to one side.
Learned       Identifies a morning, afternoon, or evening activity.
Plan Later    Gives part of a group when requested to give some.
Plan Later    Counts to find how many are in a group < 6.
Plan Later    Indicates that a small group has more after some have been added.
Plan Later    Indicates that one was taken away from a small group.
Plan Later    Counts to find how many are in a group < 11.
    LANGUAGE DEVELOPMENT
Plan Later    Uses positional words (e.g., top, bottom, on, in, under).
Learned       Initiates converstion with a familiar child or an adult.
Plan Later    Refers to body parts (e.g., eyes, ears, nose, mouth) by name.
Plan Later    Recites a familiar poem or story from memory while looking at the printed text.
Plan Later    Gives first and last name when asked.
Learned       Tells about a personal experience including some spoken dialoque.
Plan Later    Retells a familiar story.
    PERCEPTUAL-MOTOR DEVELOPMENT
Plan Later    Jumps forward one foot from a standing position.
Plan Later    Stands on either foot for five seconds with arms out to sides.
Plan Later    Walks forward heel-to-toe on a line with arms out to sides.
Plan Later    Walks backward heel-to-toe for six feet with arms out to sides.
Plan Later    Copies a circle from a sample.
Learned       Copies a square from a sample.

INDIVIDUAL LEARNING PLAN for Sean Doe

PLANNING PERIOD: 03/16/1998 - 05/15/1998
CLASS: Sam Bergan, afternoon
PROGRAM: Sample Child Care Center, Sample Agency
PARENT SIGNATURE:                                     DATE:

<u>Planning Goal</u>   <u>Objectives</u>

EARLY MATH, PRESCHOOL LEVEL 2: AGES 3-5
        ADDITION
Plan Now    Adds two small groups by combining the groups and counting all the objects.
        FRACTIONS
Plan Soon   Exchanges two halves for a whole.
Plan Soon   Shows where to divide a whole object to make two halves.
Plan Soon   Divides a group of objects in half.

LANGUAGE AND LITERACY, PRESCHOOL LEVEL 2: AGES 3-5
        LISTENING TO STORIES
Plan Soon   Tells how a story begins or ends, when asked.
        REASONING ABOUT STORIES
Plan Soon   Identifies the cause of damage or injury in an accident described in a story.
Plan Soon   Predicts that a character will be thankful after receiving a favor.
        STORY TELLING
Plan Now    Tells a chronological story from beginning, to middle, to end, with assistance.
        EXPRESSIVE LANGUAGE
Plan Soon   Uses compound sentences.

INDIVIDUAL OBSERVATION RECORD for Rachel Deere

SCALE: Nature and Science, Preschool Level 2: Ages 3-5
CLASS: Sam Bergan, afternoon
CENTER: Sample Child Care Center
AGENCY: Sample Agency Notes    Use the boxes to check those capabilities that the child has learned.

OBSERVING PLANTS AND ANIMALS
- ☑ Tells what an animal is doing.
- ☐ Describes typical behavior of a familiar animal.
- ☐ Observes the type of shelter used by familiar animals.
- ☐ Makes a drawing showing changes in plants over time.

OBSERVING PHYSICAL PHENOMENA
- ☐ Draws pictures that include the sun and sky.
- ☐ Describes weather conditions (e.g., cloudy, sunny, windy).
- ☐ Tells about the moon and stars or draws a picture including the moon and stars.
- ☐ Makes a record of how many days it rains or is sunny over an extended period.
- ☐ Uses a familiar measuring device (e.g., ruler, scale).
- ☐ Uses an obserational aid (e.g., magnifying glass, binoculars).

CLASSIFYING PLANTS AND ANIMALS
- ☑ Distinguishes plants from animals.
- ☐ Distinguishes between land animals and aquatic animals.
- ☐ Distinguishes domestic animals from wild animals.
- ☐ Distinguishes dinosaurs from present-day animals.
- ☐ Classifies animals into groups based on the way they move (e.g., flying, swimming).

CLASSIFYING PHYSICAL PHENOMENA
- ☐ Sorts objects by a distinctive characteristic (e.g., size, texture, weight, color).
- ☐ Sorts objects into those found in nature and those made by people.
- ☐ Sorts objects into living and non-living categories.
- ☐ Sorts objects by physical composition (e.g., metal, rock, soil).
- ☐ Sorts objects into those that use electricity and those that don't.
- ☐ Sorts objects into those that can be picked up by a magnet and those that can't.

PREDICTING PLANT PROCESSES AND ANIMAL BEHAVIOR
- ☐ Predicts that a bird or small animal will move away if one moves toward it.
- ☐ Predicts that an animal will take food that is left for it.
- ☐ Predicts that an animal will seek shelter in bad weather.
- ☐ Predicts that a plant will die if it does not receive water.
- ☐ Predicts that a plant will die if it does not receive light.
- ☐ Predicts that plants may be destroyed when the animal population increases.
- ☐ Predicts that damage to an animal habitat may threaten the survival of the animal.

PREDICTING PHYSICAL PHENOMENA
- ☐ Predicts that it will rain when dark clouds come.
- ☐ Predicts that a rolling object will move faster than a sliding object.
- ☐ Predicts which way a ball will go after it strikes a wall.
- ☐ Predicts which way a scale will tip when a weight is added to one side.

Holiday Time Lesson Plan for Sam Bergen, afternoon                                12/8/97 - 12/12/97

Goals

Counts to find how many are in a group < 11.
Counts forward from a number > 1 to find how many there are in a group.
Uses compound sentences.
Tells a chronological story from beginning, to middle, to end, with assistance.
Tells how a story begins or ends, when asked.
While playing, says what s/he wants to accomplish.
Feels good about his/her ethnicity.
Says why s/he likes something s/he has done.
Allows another child to speak without interruption, when prompted.
Knows that different children celebrate different holidays, and something about what those celebrations involve.

Activities

| Class Area | Monday | Tuesday | Wednesday | Thursday | Friday |
|---|---|---|---|---|---|
| Indoor Group | Rows of Toes | Button Brigade | Rows of Toes | Button Brigade | Numbers Tune |
| | Story: Winter Holidays Around the World | Story: Clare's Christmas | Story: Kameelah's Kwanza | Story: Two Holidays in One | Story: Jason's Hanukkah |
| Outdoors | Basketball Shoot | Button Brigade | Basketball Shoot | Button Brigade | Basketball Shoot |
| Block and Building | Tower Power | Tower Power | Tower Power | Tower Power | Tower Power |
| | | Magic Imaginings | | Magic Imaginings | |
| Arts | Likes and Dislikes | Colorful Families | Artsy Aardvark | Keeper of the Crayons | Free Choice |
| Music & Movement | Bells | Bells | Bells | Bells | Bells |
| Library - Listening | Holiday Happenings | Story Turns | Fanciful Fiction | Scenic Stories | Telling Tales |
| House & Dramatic Play | It's Green and Growing | Rainbow Hints | Sweet Potato Desert Kwanza | Candy Canes | Latkes - Hanukkah |

Notes

Individualization: Sean will get some extra attention in sharing and initiating conversations.
Volunteers: Volunteers are needed for a field trip in January to the zoo.

Sean's day for 03/23/1998

Interest Centers I Enjoyed Today
Arts, Block and Building

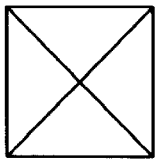

What I ate
I ate some of carrots.
I ate seconds of apple slices.
I ate all of cookie.
I didn't eat any of cauliflower.

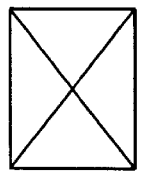

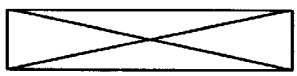

How long I slept
1/2 hour

What I did
I shared blocks.
I helped by cleaning up.
I seemed to feel good about building a tall tower.
I played with Juan and David.
I was able to share nicely.

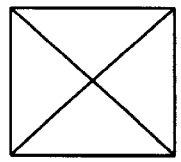

I need   field trip permission

Comments
Block and Building: Sean seemed to enjoy playing with the blocks a lot. He cooperated with two of the other children in building a tall tower, without needing to be prompted to share.

Sam Bergan, afternoon

INSTRUCTIONAL MANAGEMENT SYSTEM

CROSS-REFERENCE TO RELATED APPLICATIONS

This application is a continuation-in-part application of provisional application No. 60/091,288 filed Jun. 30, 1998, and which is hereby incorporated herein in its entirety by reference.

BACKGROUND OF THE INVENTION

1. Technical Field

The present invention relates to a computer system for managing and assisting in instruction or education particularly of younger students.

2. Background Art

The prior art contains a number of computer systems for managing and assisting in the instruction students. A typical system includes a network wherein administrators can monitor student progress, course curriculum and teacher performance. Teachers can individualize instruction for students based upon their recorded progress. Listed instructional materials can be categorized by grade level or objective to assist in lesson planning. Generally these prior art systems are designed to administer tests and homework to students and record the scores. Such systems generally have one or more deficiencies such as being unsuitable for managing instruction of younger students of preschool age and the first few years of school.

SUMMARY OF INVENTION

An instructional management software application for management of instruction in multilevel instructional settings in accordance with the present invention includes components providing supervision, assessment, planning, communication, and continuing education.

The supervision of instruction in early childhood education programs is generally carried out by an educational specialist or other administrator who reviews lesson plans, communications to parents about children's progress, classroom assessment practices, and other teaching activities. In the instructional management software application these reviews can be carried out electronically. The administrator can view any teacher's lesson plans as stored in a database, e-mail comments about the plan or make changes to a plan. Also the administrator can examine a teacher's anecdotal notes documenting children's development, or teacher communications to parents. Asynchronous communications provided by e-mail enable the administrator to communicate with the teacher without disrupting the teaching process.

Further the enablement of electronic review and other supervisory functions provides improved supervision effectiveness and efficiency. In many cases supervisors must travel long distances to carry out their supervisory functions. For example, in some Head Start programs some of the centers where teaching occurs may be more than 100 miles from administrative offices. The ability to carry out electronic supervision reduces travel costs, saves administrator time, and makes it possible to obtain the kind of information necessary for effective supervision on a continuing basis.

Another feature involves the relationship between the assessment and the planning of instructional activities to promote learning. The assumption that instruction should be based on assessment results indicating the kinds of capabilities that an individual is ready to learn is fundamental to sound educational practice. By providing an electronic link between assessment and planning through mathematical algorithms using measurement theory with constructs related to instructional planning, improvement is made in the efficiency of assessment and the quality of informed decisions about what a child will be ready to learn as development progresses.

A unique tool makes it possible to generate estimates of a child's development greatly reducing the time demands typically associated with the assessment process. When a student initially enrolls in a class, the teacher uses input from parents or other teachers, or from a small sample of observations to make a judgment about the child's development score in a particular developmental area. When the judgment is entered such as by sliding a scroll bar to a point reflecting the estimated ability or entering a number or other indication of estimated ability, a mathematical model is used to estimate the child's ability to perform each of the capabilities in the developmental area of interest within a developmental scale or level to which the child is assigned. Subsequently, the suitability status of a child's capabilities are updated by a teacher indicating that a particular capability has or has not been achieved. The teacher makes these updates based upon work samples, direct observation, performance on software, performance on a standardized test, or in other ways. Thus students of long standing will already have a record of their ability to perform various learning capabilities entered in the system. The mathematical algorithm used to estimate an ability score for the student is based upon item response theory, which is widely used in the field of educational measurement. The use of item response theory enables the estimation of a probability that an examinee or student will perform a test item or capability correctly using the estimated or previously recorded ability score of the examinee and certain recorded parameters of the learning capabilities. This is an improvement over the prior art technique using only standardized tests to determine what a child knows.

Item response theory holds that straight number scores of correct answers in a test may not accurately reflect the learning development of the examinee since some of the questions in the test may more closely reflect the ability than others. For example suppose one student correctly answers the fifteen questions on an exam that best reflect the ability while another student correctly answers the fifteen least reflective questions on the exam. Item response theory holds that the first student has a higher learning development score than the second student even though both students had the same number of correct answers. Thus item response theory can assign different discrimination parameters for the questions on the exam and these parameters thus weight the correct answers to produce a score, herein called "ability score" or "DL score" (developmental level score), reflecting each student's learning development.

A student's ability score is computed using item response theory based upon the learning capabilities which have been accomplished, or based upon the estimate of the learning ability of the student. There are a variety of well know methods for computing a score based upon item response theory. A publication, David Thissen et al., "Item Response Theory for Scores on Tests including Polychotomous Items with Ordered Responses", *The L.L. Thurstone Psychometric Laboratory University of North Carolina, Research Report Number* 94-2, May 1994, describes several methods of computing item response theory scores and mentions various other publications describing such methods. One particular suitable method described in Thissen et al. employs a table developed by an averaging or other computational estimation technique for each possible score. According to Thissen et al., the standard deviation of actual item response theory scores from the average item response score for a given summed score has been found to be acceptably small. Thus an estimated input of a student's ability can be in the form of a summed score or converted into a summed score which is then looked up in the average table to determine an estimated item response theory or ability score for the student. When the actual achievements of a student for all learning capabilities are recorded, the item response theory ability score for the student can be computed by use of the average table or by actual weighted summation of achieved capabilities. This item response theory ability score is shown in the screens and reports as a developmental level (DL) score. Other types scores can also be computed by conventional algorithms or tables, such as percentile ranking, normal curve equivalent (NCE) score, standard score, etc.

Initially there is compiled for each developmental level a list of items or learning capabilities with corresponding parameters including a difficulty factor and a discrimination factor for each learning capability. Developmental level generally refers to a grouping of students such as by age, grade or other broad classification. The list of learning capabilities for each level can be further classified into a plurality of developmental areas suitable for that particular level. Each learning capability has associated difficulty and discrimination factors. Difficulty factors are numbers representing the relative difficulty or ease which students of the corresponding level perform or accomplish the corresponding learning capability and can be determined by actual testing of a large number of students of the corresponding level. Discrimination factors are numbers representing the degree to which the corresponding learning capability relates to its particular developmental area and are determined by estimating the relationship between each item and the overall ability being measured. In one example, the difficulty and discrimination factors for a standard list of learning capabilities for preschool level 2 in developmental areas of math, language and literacy were taken from a standardized sample produced from testing approximately three thousand children.

An algorithm computes the probability that a student will be able to preform each learning capability within the corresponding developmental area. One suitable algorithm calculates probabilities $P_i$ using the equation $$P_{i=1}|^\theta = \frac{1}{1+e^{-a_i(\theta-b_i)}}$$

wherein e is the natural or Naperian logarithm base, $a_i$ is the discrimination factor of the learning capability i, $b_i$ is the difficulty factor of the learning capability i and $\theta$ is the ability score of the student. These probabilities are then converted into indications of present suitability for each of the learning capabilities. For example indications of suitability are (1) "learned" for capabilities with high probabilities, (2) "plan now" for capabilities with probabilities somewhat less than the high probabilities, (3) "plan soon" for capabilities with probabilities further below the high probabilities, and (4) "plan later" for the capabilities with extremely low probabilities. In one example, capabilities with probabilities equal to and above 0.5 are assigned a learned indication, capabilities with probabilities from 0.25 to 0.5 are assigned a plan now indication, capabilities with probabilities from 0.15 to 0.25 are assigned a plan soon indication, and capabilities with probabilities below 0.15 are assigned a plan later indication.

The planning of learning opportunities based on assessment is a particularly challenging task at the beginning of a program year or when a child is newly introduced to the classroom setting. Under these circumstances, the teacher is typically faced with the task of carrying out extensive pretesting or observational assessment before it is possible to base instruction planning on the development score of the child. In the meantime, the teacher must plan learning opportunities without the benefit of assessment information. The application of the above algorithms allows the teacher to gain initial information about development much faster than would otherwise be possible.

Assessment in education is not limited to test performance. For example, teachers are encouraged to keep anecdotal records of children's development as a way of increasing their understanding of each child in their charge. Keeping useful anecdotal records is a labor intensive activity, which requires substantial observation skill. The process of taking anecdotal notes is simplified by providing built in tips. Notes are recorded within an assessment window capable of displaying a variety of developmental scales (developmental areas) and capable of indicating any given child's performance in those areas. When a teacher wishes to record a note, an edit control is opened, which automatically indicates the name of the currently selected child and the date of the recorded observation. To indicate that a child has learned a particular capability, the teacher simply clicks a check box indicating that the capability is learned. The text describing the capability is then automatically inserted into the note. The edit control includes tips suggesting that the teacher may wish to note how the capability was demonstrated, how others reacted to it, and possible planning suggestions. The note can then be permanently saved, e-mailed, printed, and/or incorporated into a variety of reports and parent communications.

The use of assessment to document children's progress is a continuing concern in education. Documenting progress requires multiple assessments over an extended time span. Unique features make it possible to document progress within the context of the continuous observation approach described in the preceding paragraphs. Records of development are automatically updated into observation periods. Any number of observation periods can be established. When a period has been established, updates falling within that period are grouped together. When a new period is entered, updates from the preceding period are automatically carried forward. Thus, access to earlier developmental accomplishments is made available as new observations are entered to document continued growth. The end result is a continuous record of development that can be flexibly segmented into discrete periods for the purpose of documenting progress. This approach has a number of practical benefits. For example, the problem of having to disrupt classroom activities to administer tests on pre-specified dates is completely avoided with this procedure. Moreover, the task of linking observations to a particular period is automated, which reduces errors.

A unique feature of the software program is that it makes it possible to estimate ability based on the demonstration of capabilities in a variety of ways and to document the way that capability mastery is demonstrated. For example, a student might demonstrate mastery of one capability be performing the capability on software. Mastery of another capability might be demonstrated through performance on a standardized test. Mastery of a third capability might be demonstrated in a written assignment. The program includes a feature called data source that allows the user to document the ways in which capability mastery is demonstrated at the same time that student learning is recorded. The ability to document multiple demonstrations of mastery determining student ability is an important tool in linking assessment to instruction. One of the frequent complaints of teachers regarding standardized testing is that the tests do not reflect the knowledge that students display in the natural learning environment and that they are questionable measures of what is actually being taught. The data source feature treats standardized testing as one of many ways in which student learning can be demonstrated. Data source documentation makes it possible to relate standardized testing to other approaches to the assessment of student competency.

Instructional planning requires not only a determination of what to teach based on assessment information, but also the selection of activities that are appropriate for the child. Instructional activities are linked to assessment information. For example, when a teacher is recording development in a particular developmental area, the teacher may preview activities that could be used to promote development in that area. Instructional activities are linked to knowledge areas within a developmental area and specific capabilities. For example, to view activities providing learning opportunities related to counting, the teacher can simply click on a knowledge area button labeled counting. This would bring up an activity related to counting. Activities are hyperlinked. Thus, the teacher could browse through other activities related to counting. The search could be broadened to other math activities, or the table of contents of libraries classifying activities in terms of a broad range of developmental areas, knowledge areas and age levels.

Lesson planning is also related to assessment in unique ways. Electronic lesson planning allows teachers to select goals (learning capabilities) for each lesson plan. Goal selection is informed by the inclusion of data indicating the readiness levels of children with respect to each goal. For example, suppose that a teacher selected a goal related to helping and sharing. The display would indicate the number of children in the class who had already learned the skill related to the goal, the number ready now, ready soon, and ready later (same as plan now, plan soon and plan later). The direct link between goal selection and information on readiness provides an important tool for reducing the likelihood that teachers will set goals that are inappropriate with respect to the child's current developmental level. The linking of goal selection to developmental level is a well-recognized and long-standing challenge in education. Electronic lesson planning also links goal selection to activity selection. When a teacher selects a goal, activities related to that goal can be previewed.

Additional features of the present invention save time and open communication possibilities that have not heretofore been possible. For example, a previous lesson plan can be imported into a new plan and then appropriately modified. Likewise, teachers may engage in joint lesson planning and share elements of each other's plans. In addition, a series of lesson plans can be used by any teacher. The ability to produce a lesson plan series composed of prototypic lesson plans provides model lesson plans that can be used as a training tool by supervisors. Lesson plans can be e-mailed as well as printed. This is useful in may ways. For example, a lesson plan can be e-mailed from a remote center to an administrative office for review by a substitute teacher.

A number of reports can be used to communicate children's development to relevant audiences. For example, the class development profile provides information on the readiness levels of an entire class with respect to a particular developmental area. Program progress reports give a graphic description of development, which are easy to understand and interpret. Reports can be aggregated in various ways, which makes them particularly useful to policy makers.

BRIEF DESCRIPTION OF DRAWINGS

FIG. 5 is a diagrammatic illustration of a knowledge area table stored and employed in the network of FIG. 1 for defining knowledge areas appropriate for each of the developmental areas.

FIG. 6 is a diagrammatic illustration of a goal table stored and employed in the network of FIG. 1 for defining goals or learning capabilities for each developmental area.

FIG. 7 is a diagrammatic illustration of a child table stored and employed in the network of FIG. 1 and listing each child or student with relevant information.

FIG. 8 is a diagrammatic illustration of a child's score table stored and employed in the network of FIG. 1 for containing records of the development of each child.

FIG. 9 is a diagrammatic illustration of a class score table stored and employed in the network of FIG. 1 for containing records of class progress and development.

FIG. 34 is an illustration of a window displayed during the open center information procedure.

FIG. 35 is an illustration of a file pop-up menu displayed in the open center information window.

FIG. 36 is an illustration of an entries pop-up menu displayed in the open center information window.

FIG. 58 is an illustration of a window displayed during the open observations procedure.

FIG. 59 is an illustration of a files pop-up menu displayed in the open observations window.

FIG. 60 is an illustration of an update pop-up menu displayed in the open observations window.

FIG. 120 is an illustration of a window displayed during the open print procedure.

FIG. 121 is a flow diagram of an open add areas procedure in the instructional management system program.

FIG. 122 is an illustration of a window displayed during the open add areas procedure.

FIG. 123 is a flow diagram of an open import plans procedure in the instructional management system program.

FIG. 124 is an illustration of a window displayed during the open import plans procedure.

FIG. 125 is a flow diagram of an open lesson plan series procedure in the instructional management system program.

FIG. 126 is an illustration of a window displayed during the open lesson plan series procedure.

FIG. 127 is a flow diagram of an open planning group procedure in the instructional management system program FIG. 128 is an illustration of a window displayed during the open planning group procedure.

FIG. 129 is a flow diagram of an open daily schedule procedure in the instructional management system program.

FIG. 130 is an illustration of a window displayed during the open daily schedule procedure.

FIG. 131 is a flow diagram of an open general anecdotal notes procedure in the instructional management system program.

FIG. 132 is an illustration of a window displayed during the open general anecdotal notes procedure.

Figure 133:
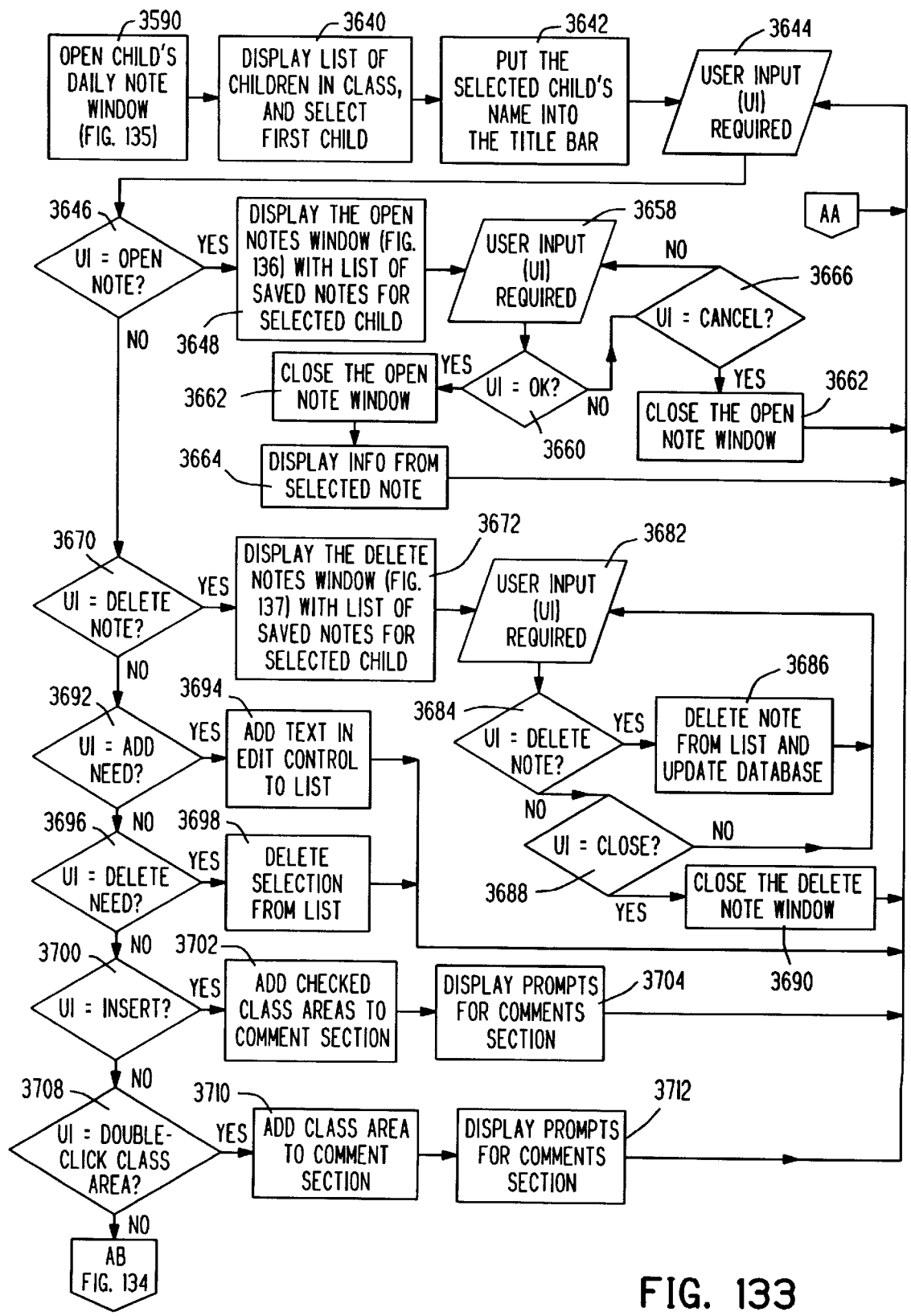

FIG. 133 is a flow diagram of a first portion of an open child's daily note procedure in the instructional management system program.

Figure 134:
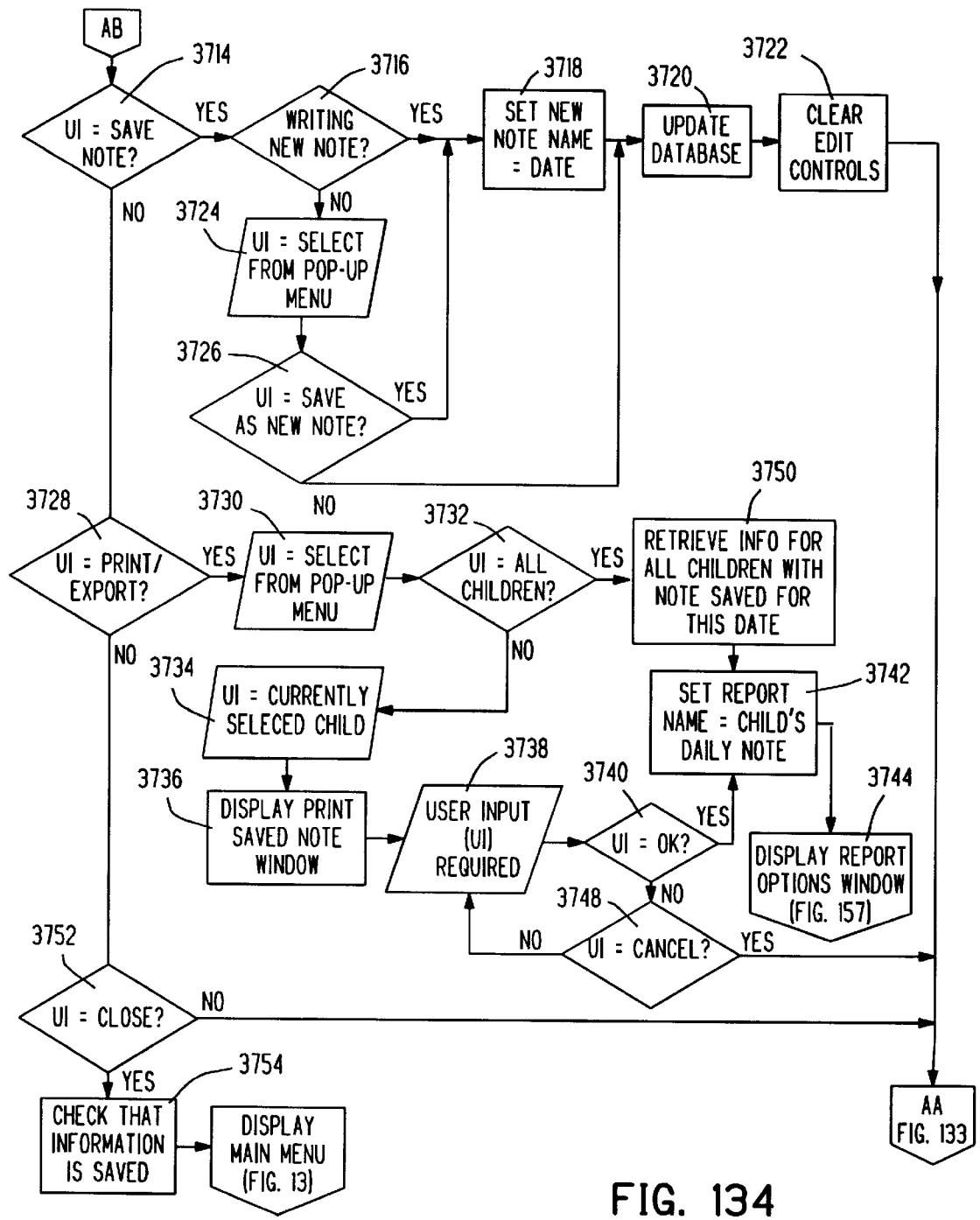

FIG. 134 is a flow diagram of a second portion of the open child's daily note procedure.

FIG. 135 is an illustration of a window displayed during the open child's daily note procedure.

FIG. 136 is an illustration of an open previous note pop-up window displayed in the child's daily note window.

FIG. 137 is an illustration of a delete note pop-up window displayed in the child's daily note window.

Figure 138:
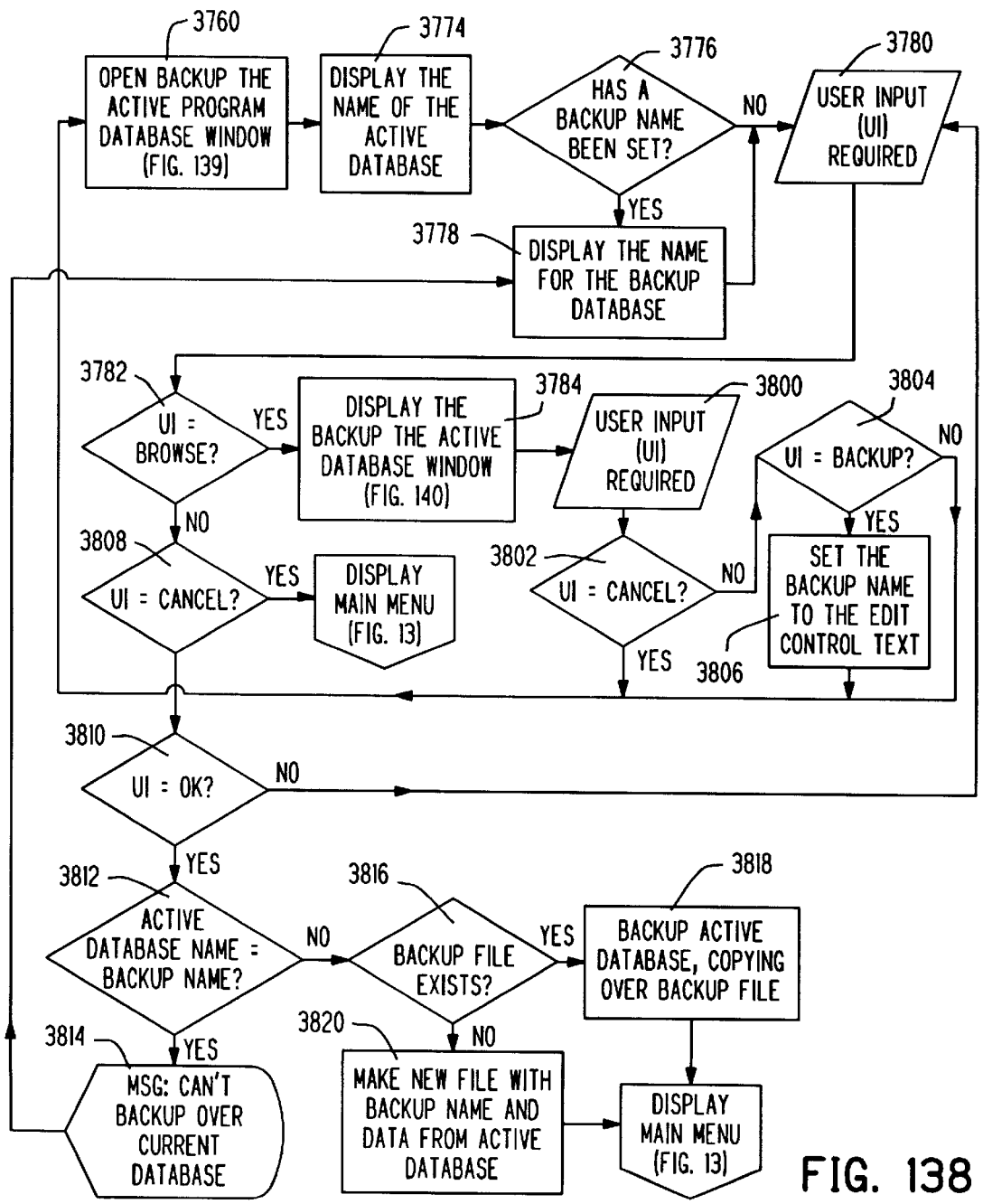

FIG. 138 is a flow diagram of a backup active database procedure in the instructional management system program.

Figure 139:
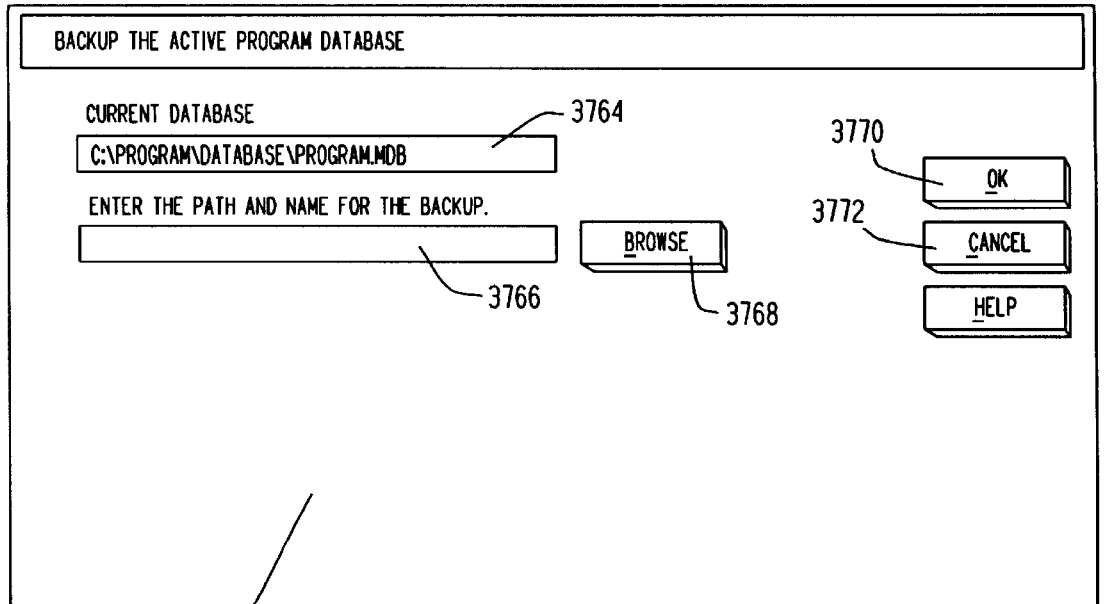

FIG. 139 is an illustration of a window displayed during the backup active database procedure.

Figure 140:
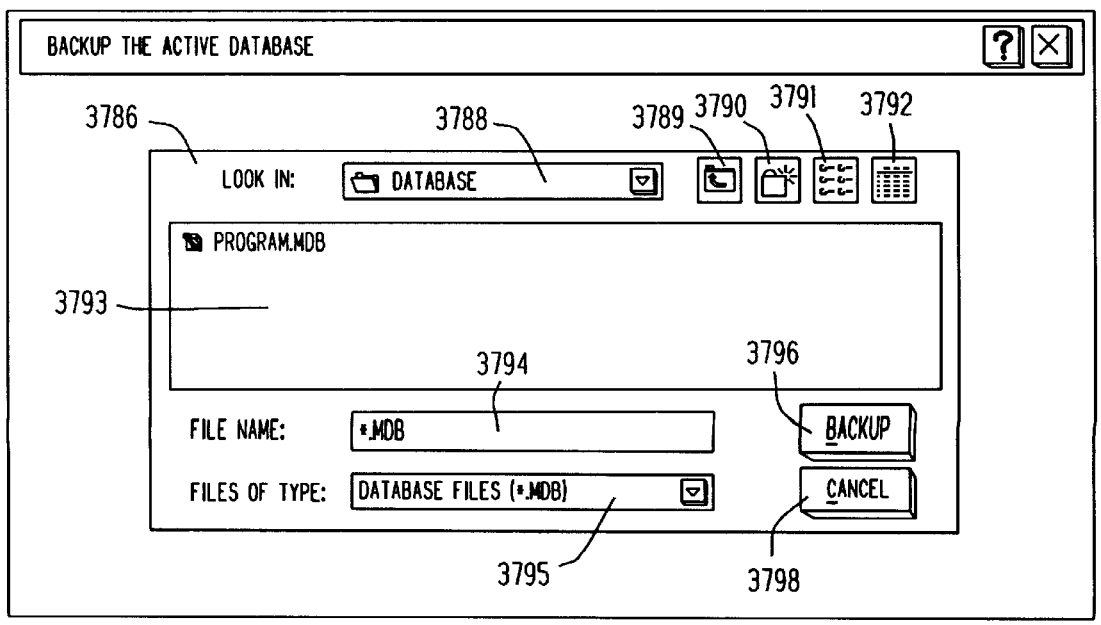

FIG. 140 is an illustration of the backup active database window with a superimposed database selection window.

Figure 141:
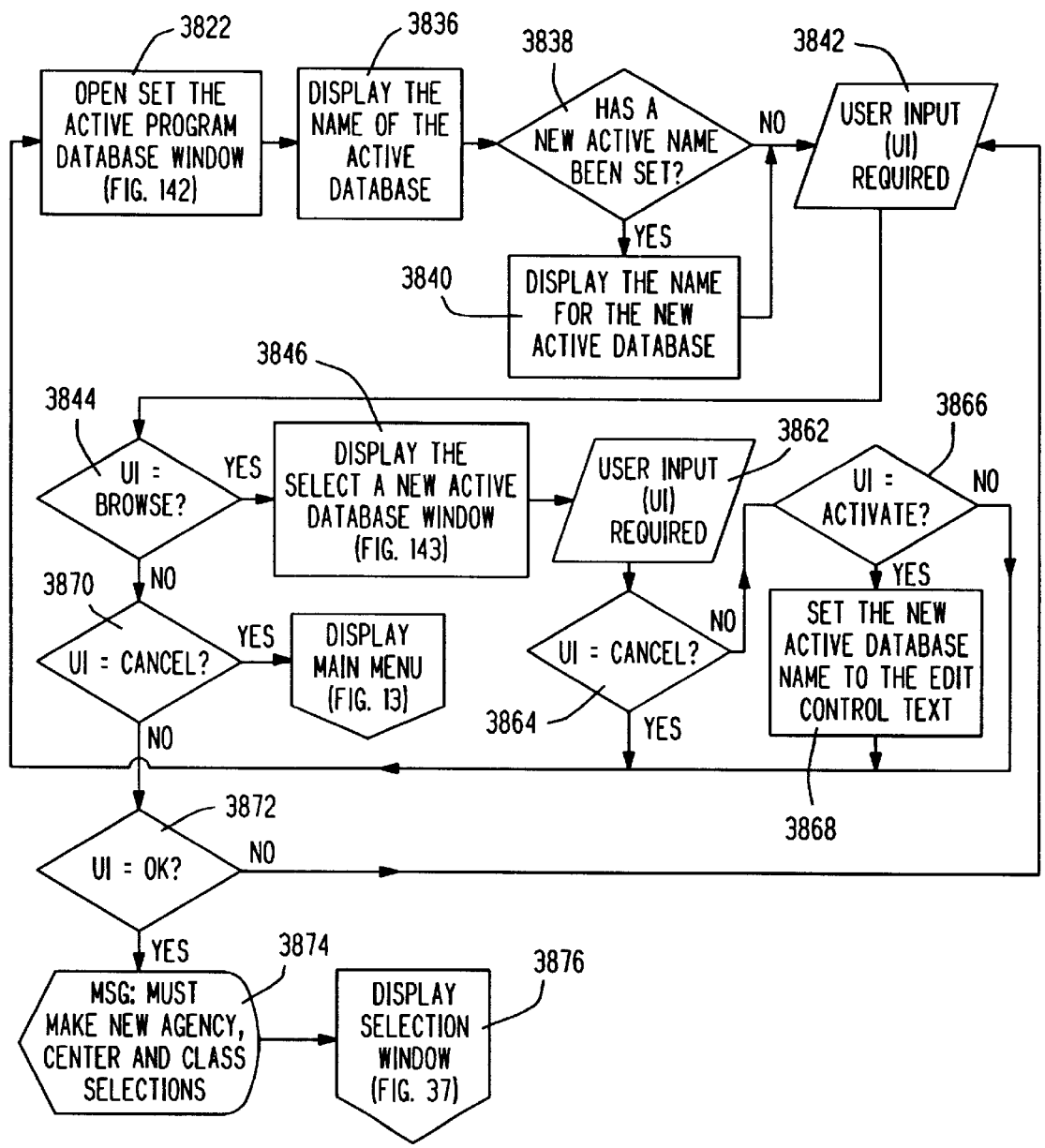

FIG. 141 is a flow diagram of a set the active database for backup procedure in the instructional management system program.

Figure 142:
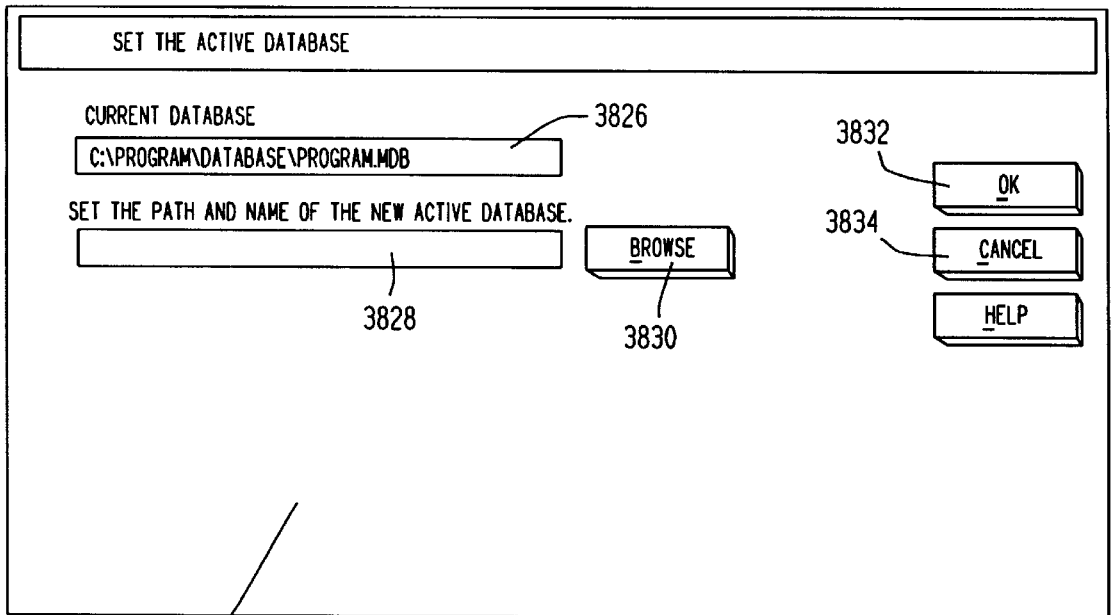

FIG. 142 is an illustration of a window displayed during the set the active database procedure.

Figure 143:
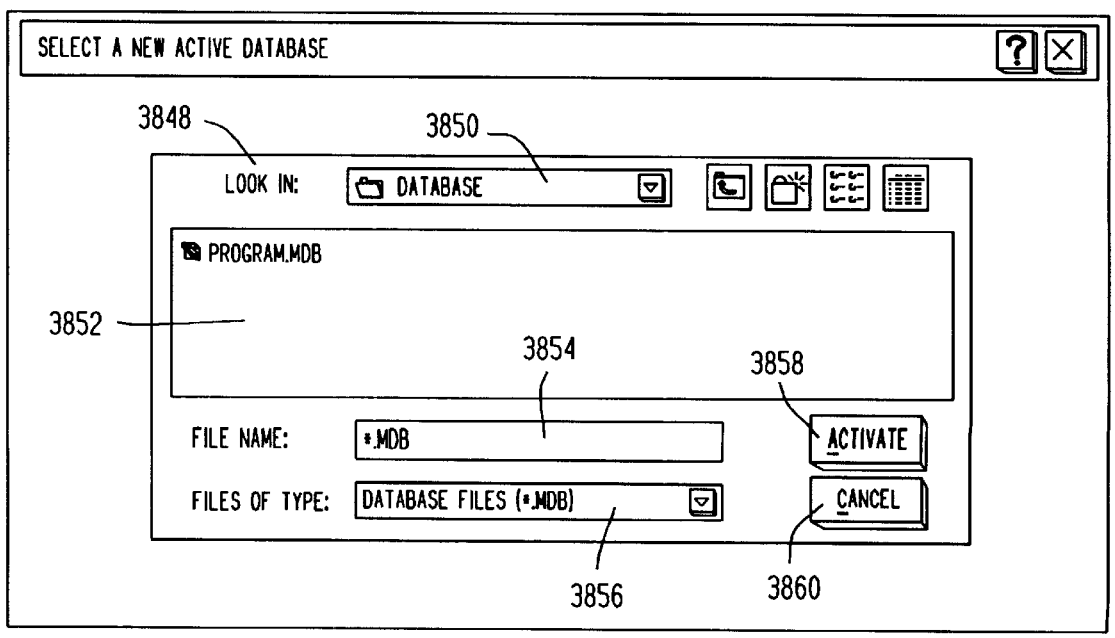

FIG. 143 is an illustration of the set the active database window with a superimposed database selection window.

Figure 144:
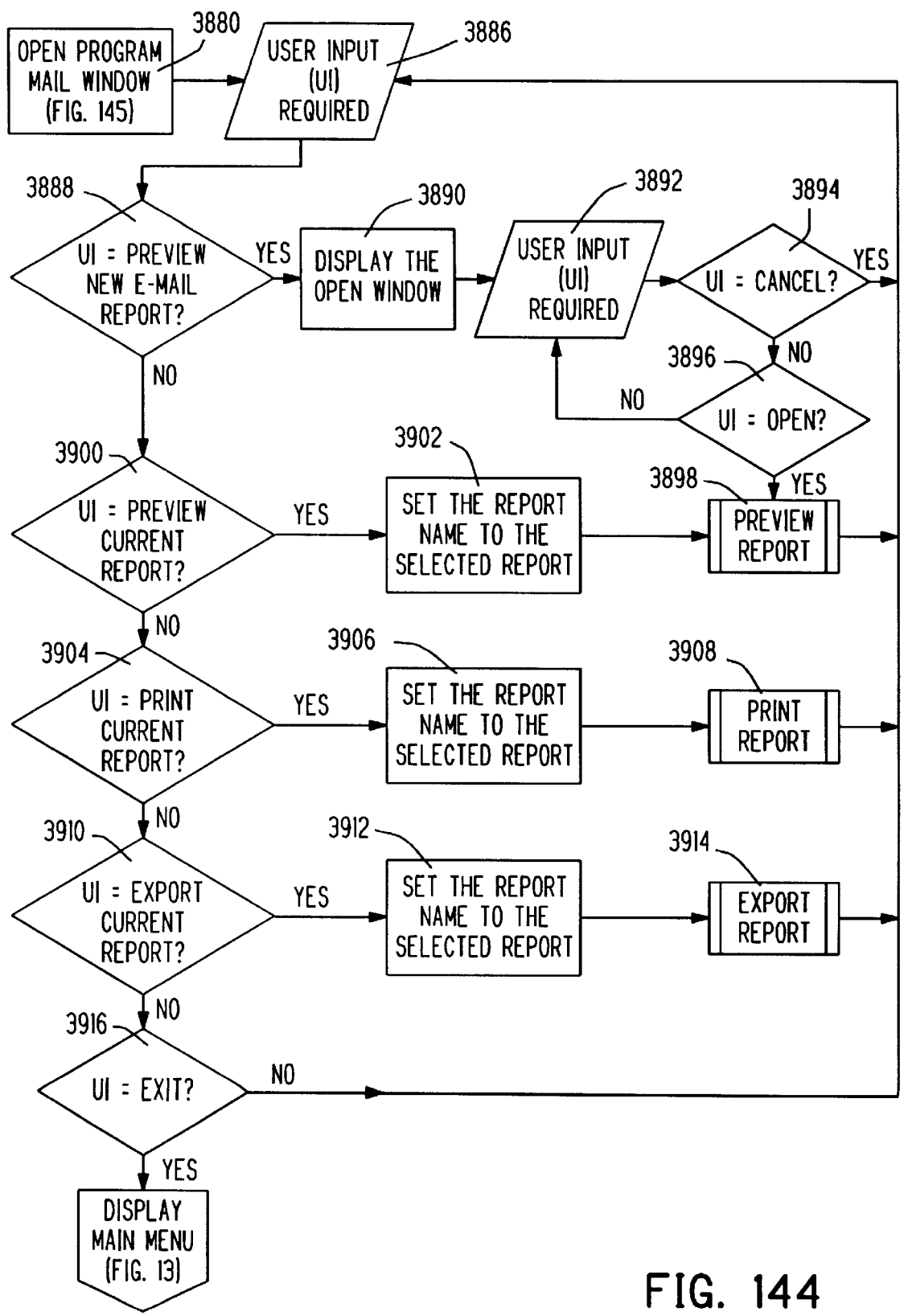

FIG. 144 is a flow diagram of an open program mail procedure in the instructional management system program.

Figure 145:
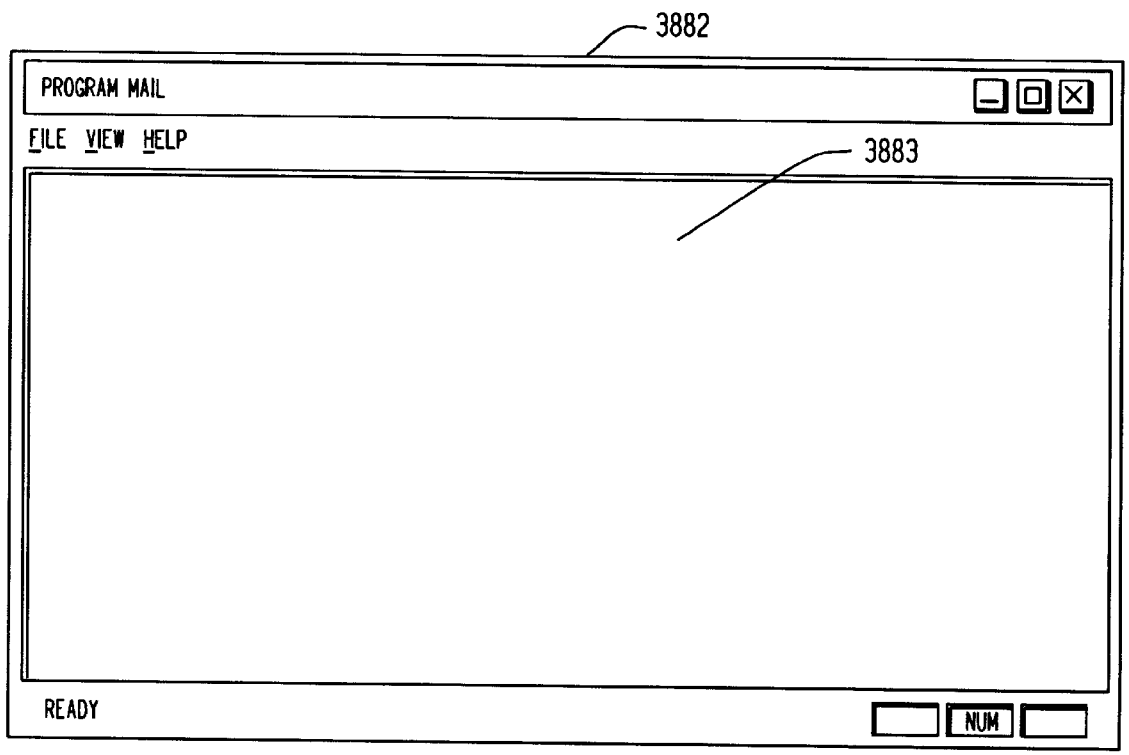

FIG. 145 is an illustration of a window displayed during the open program mail procedure.

Figure 146:

FIG. 146 is an illustration of a pop-up file menu in the program mail window.

Figure 147:
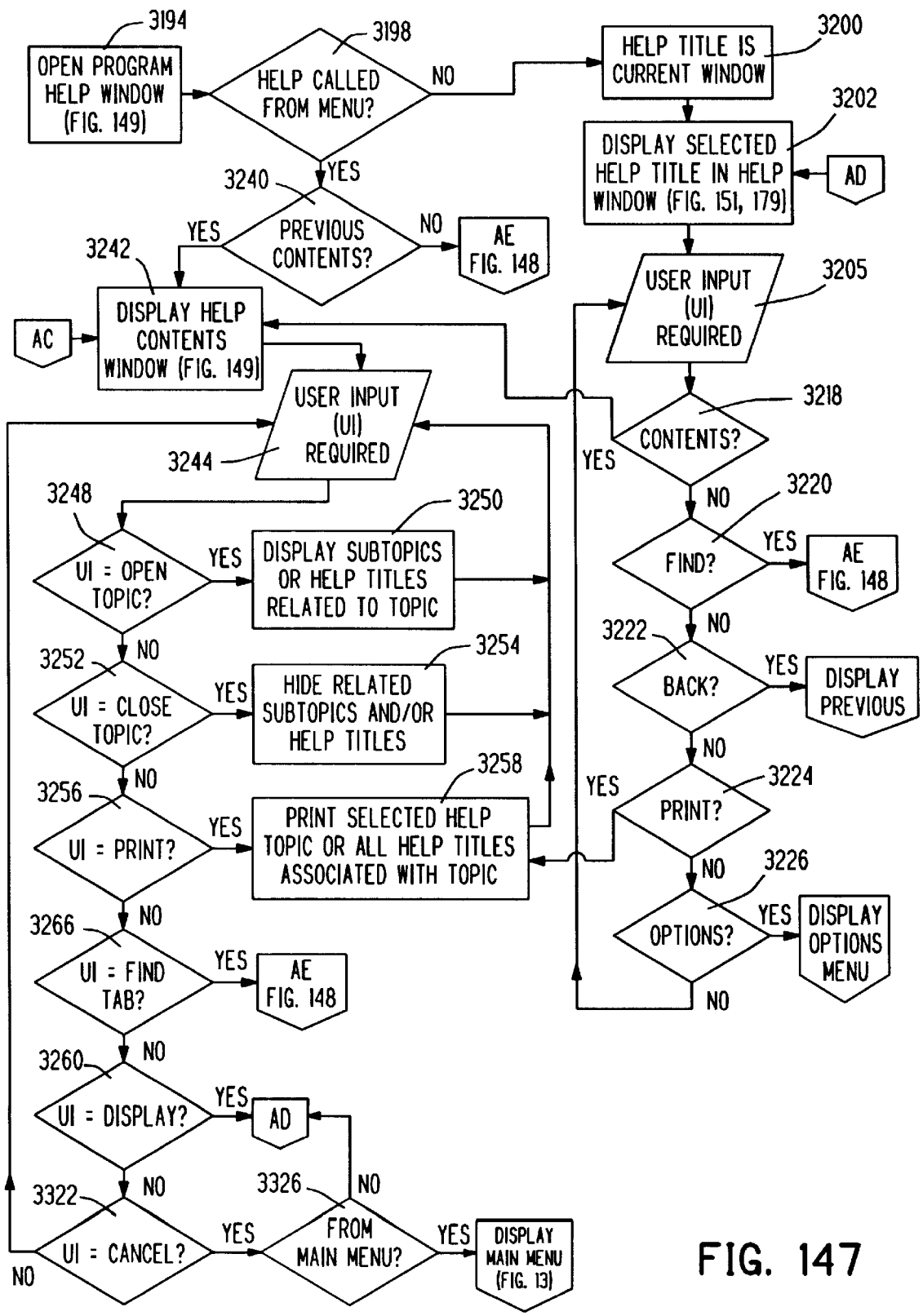

FIG. 147 is a flow diagram of a first portion of a help procedure in the instructional management system program.

Figure 148:
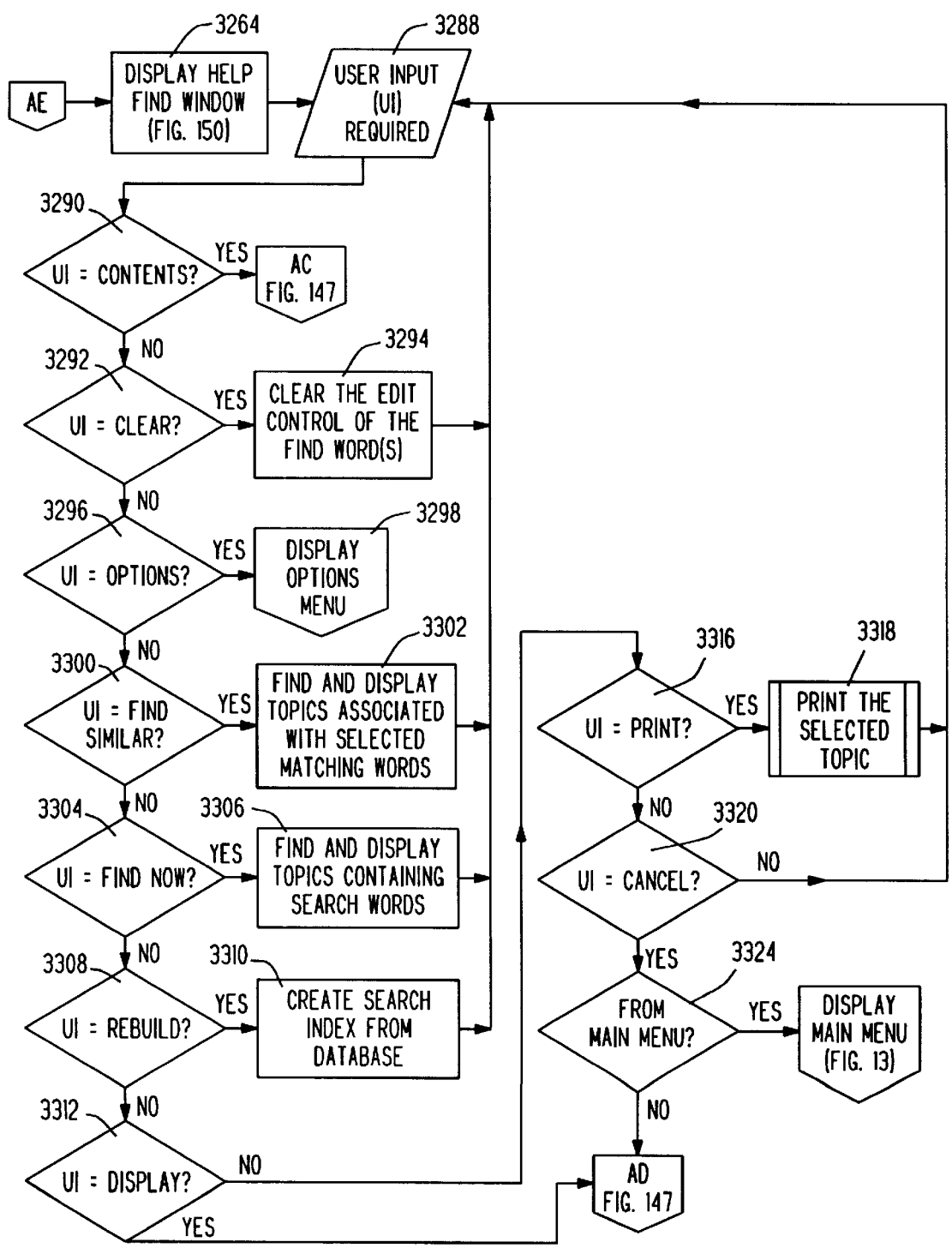

FIG. 148 is a flow diagram of a second portion of the help procedure.

Figure 149:
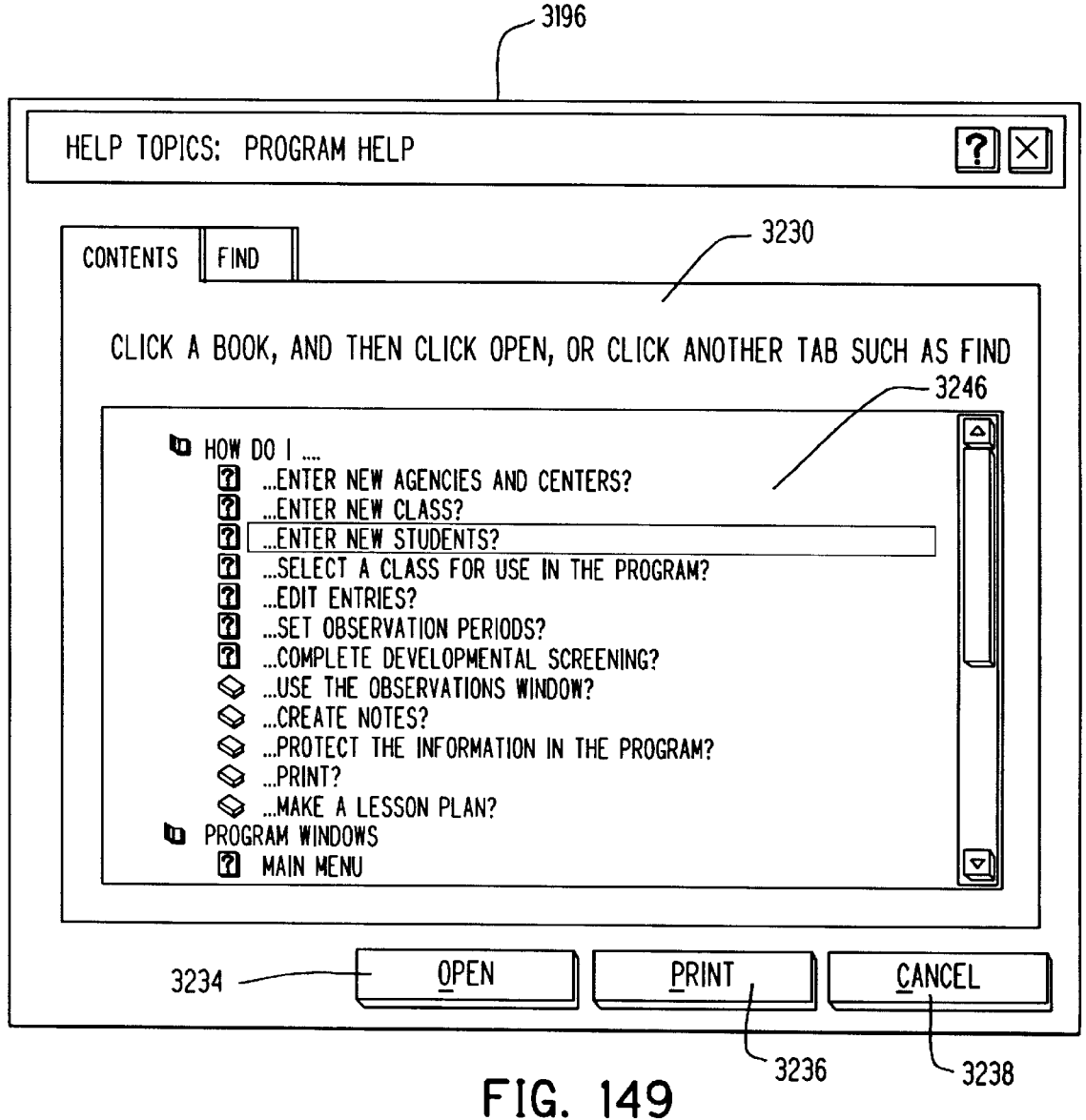

FIG. 149 is an illustration of a window with a contents page or window displayed during the help procedure.

Figure 150:
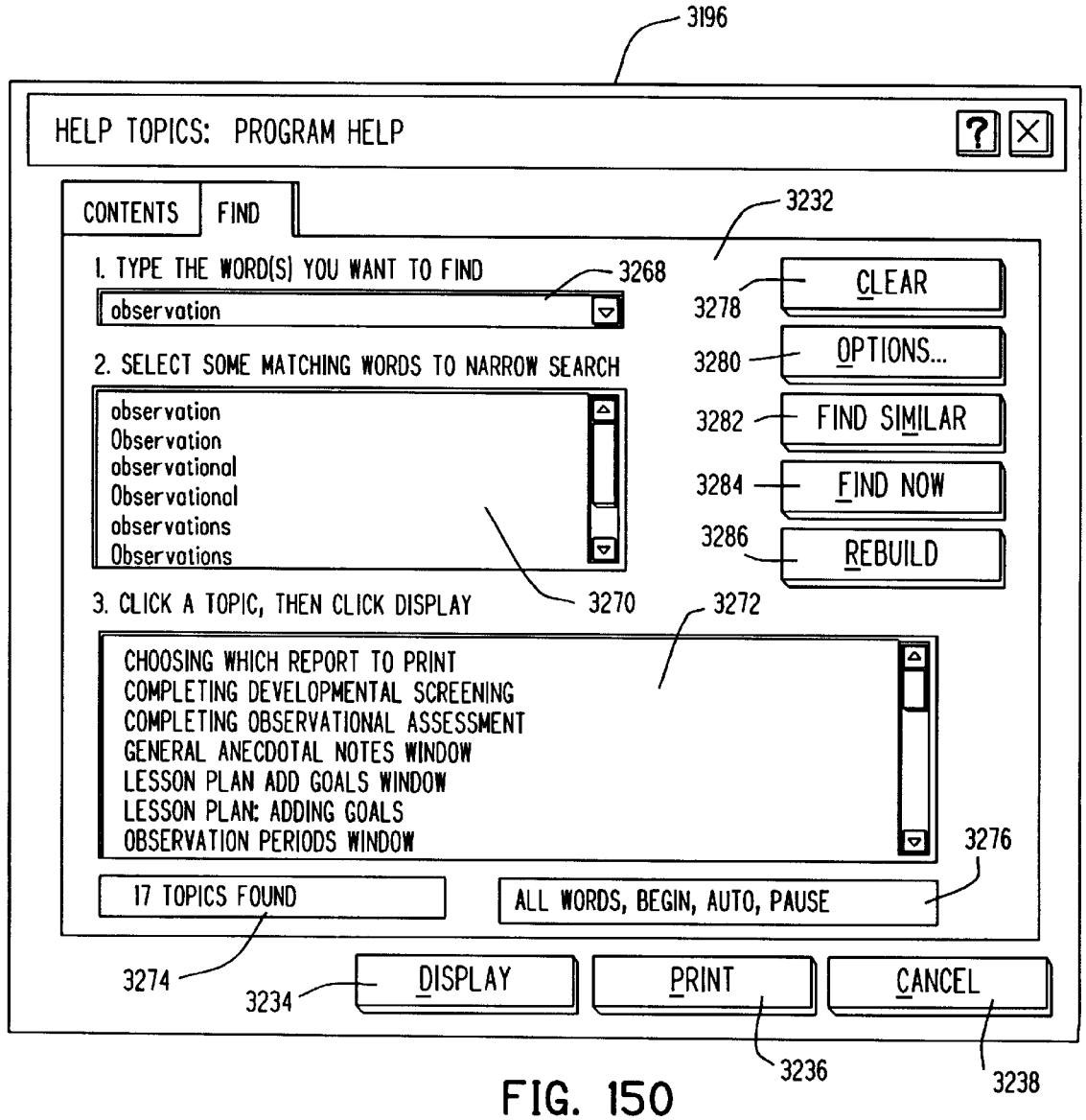

FIG. 150 is an illustration of the help window with a displayed find page or window.

Figure 151:
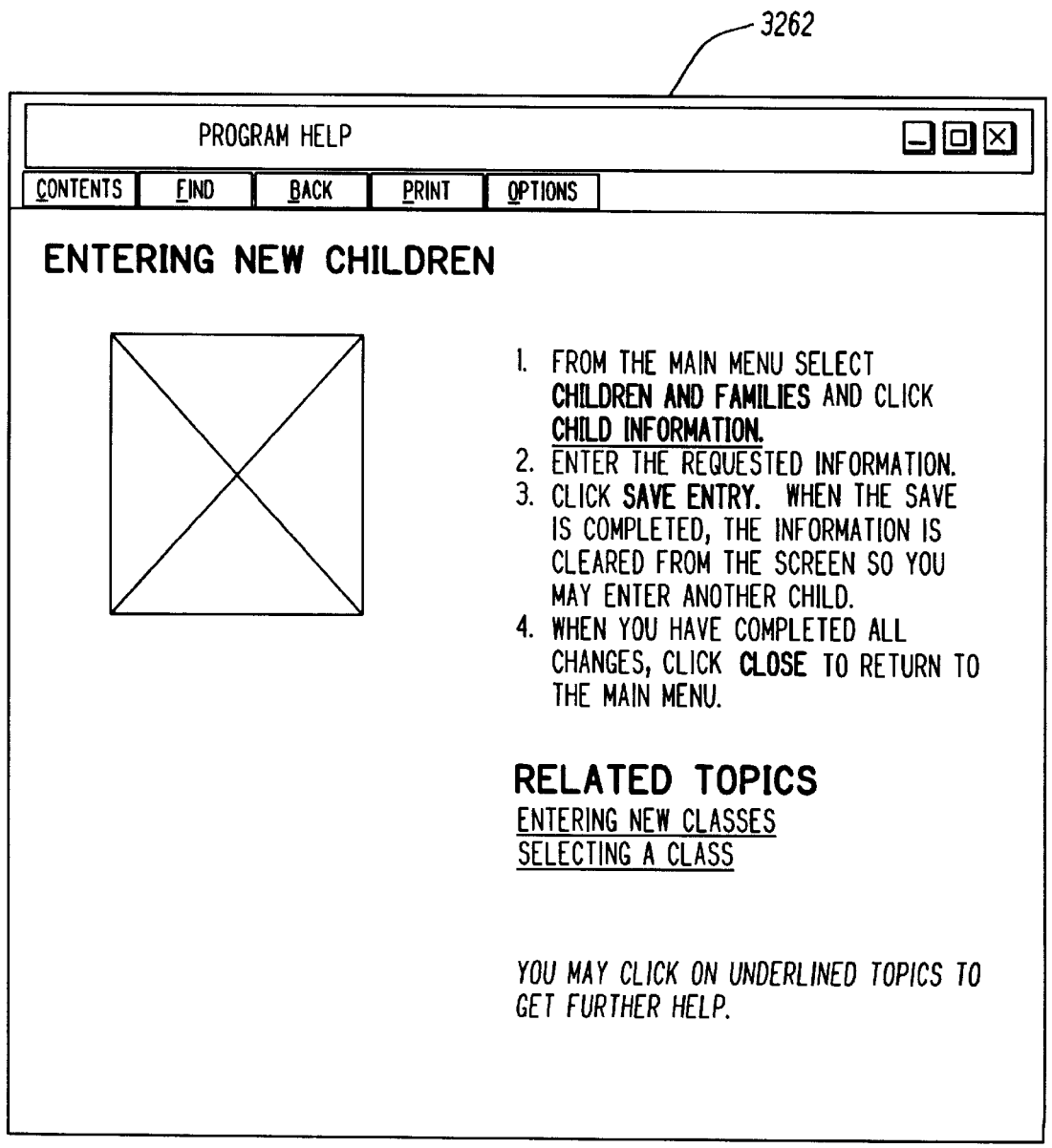

FIG. 151 is an illustration of the help window with a display topic.

Figure 152:
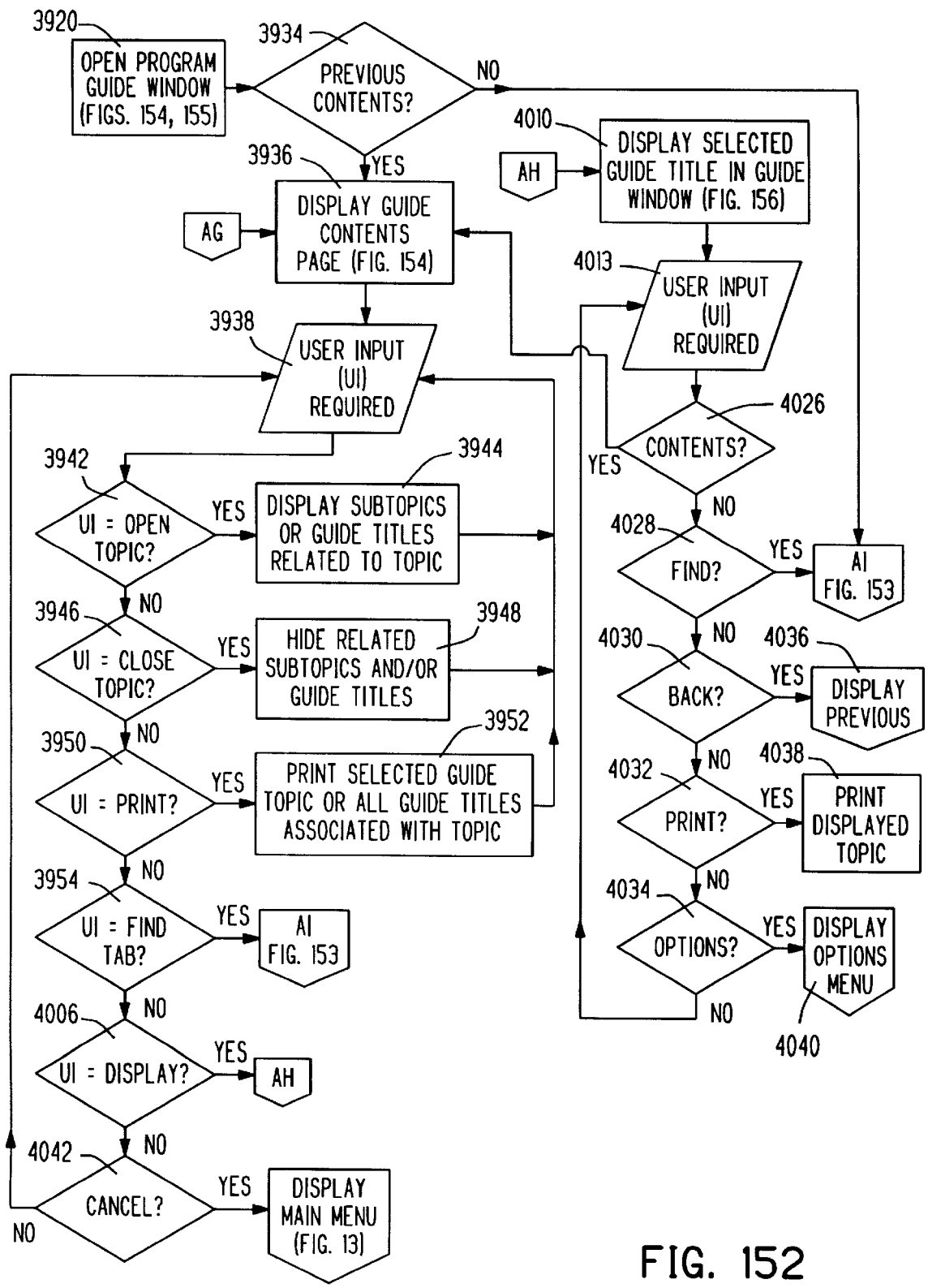

FIG. 152 is a flow diagram of a first portion of a guide procedure in the instructional management system program.

Figure 153:
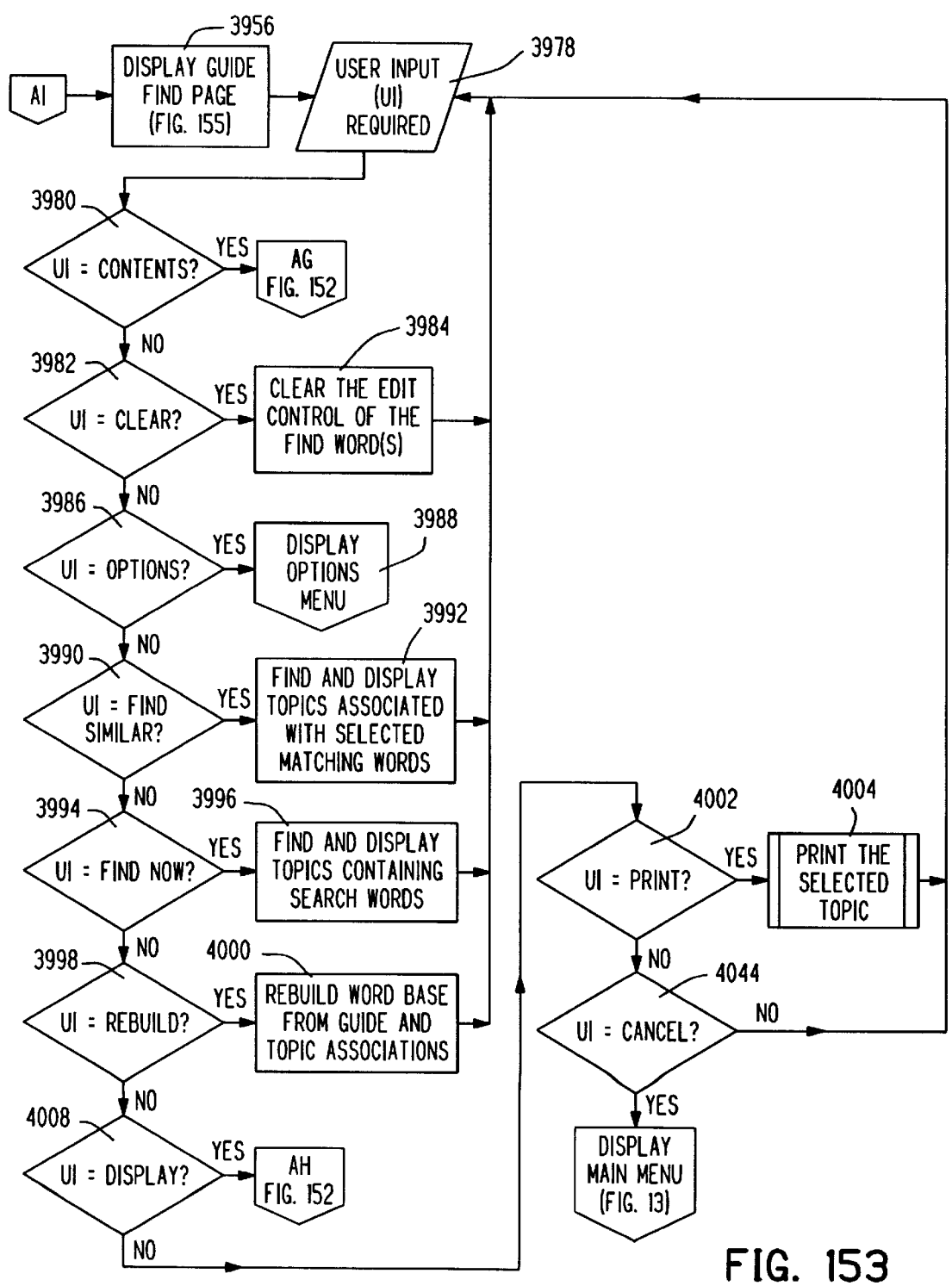

FIG. 153 is a flow diagram of a second portion of the guide procedure.

Figure 154:
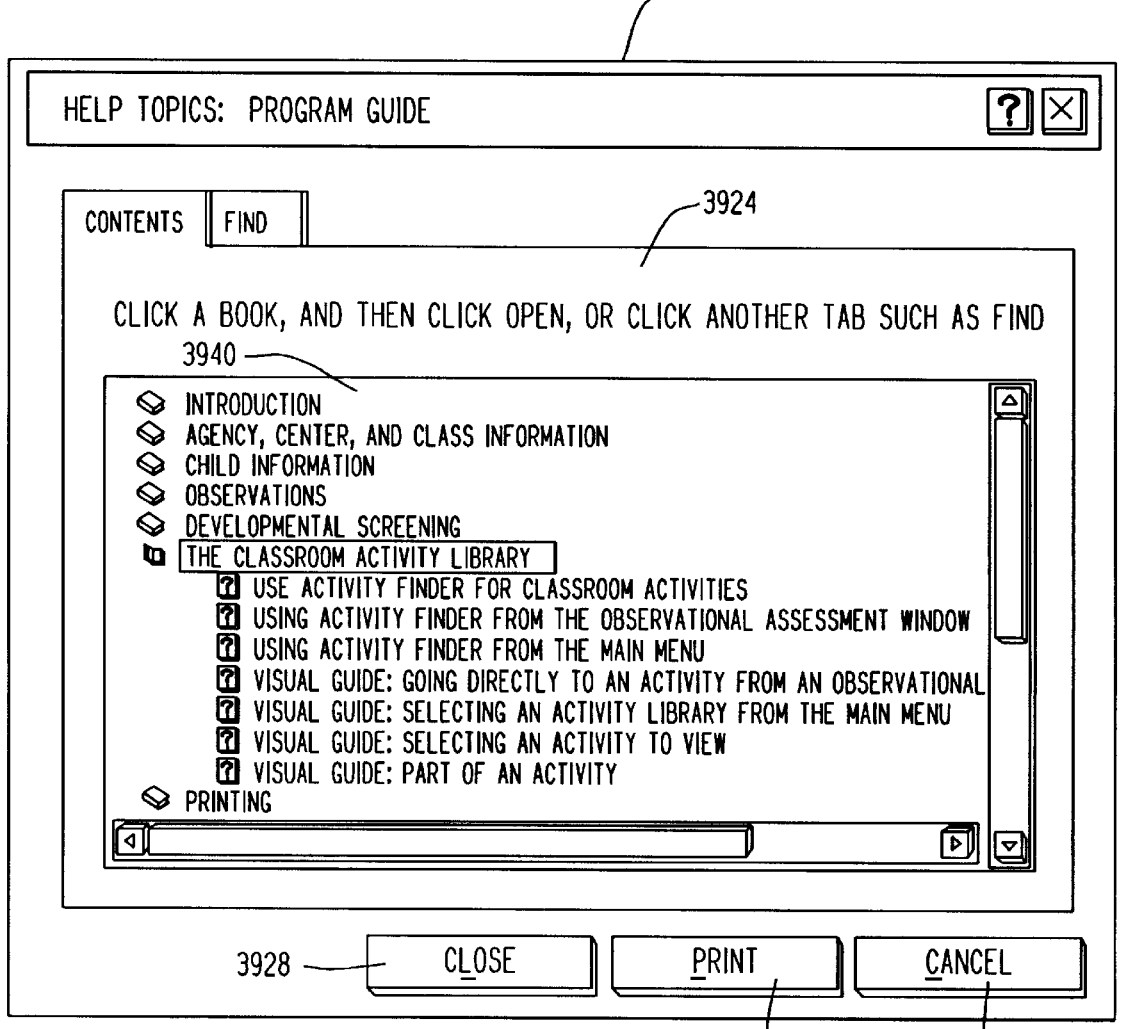

FIG. 154 is an illustration of a window with a contents page or window displayed during the guide procedure.

Figure 155:
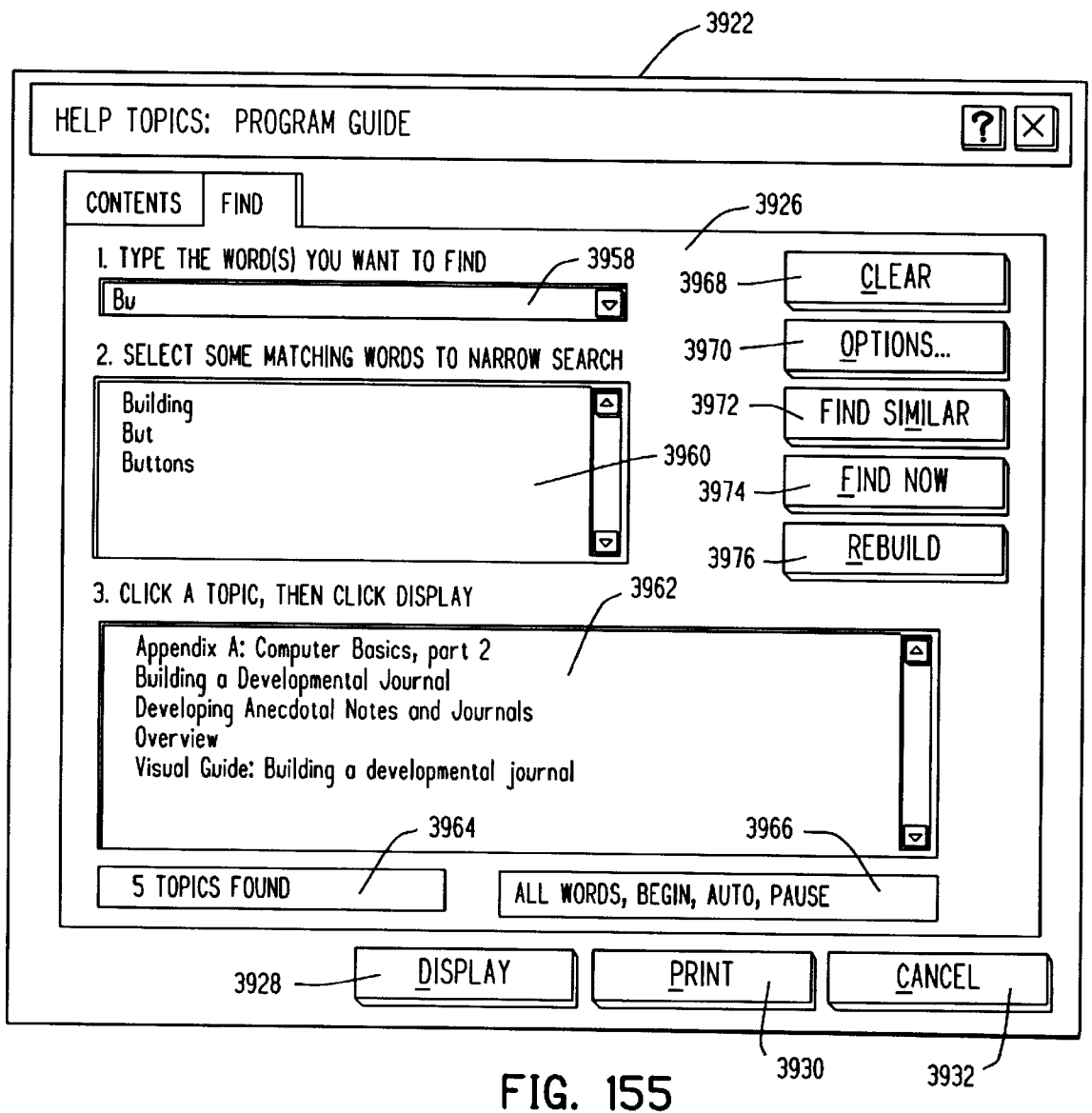

FIG. 155 is an illustration of the guide window with a displayed find page or window.

Figure 156:
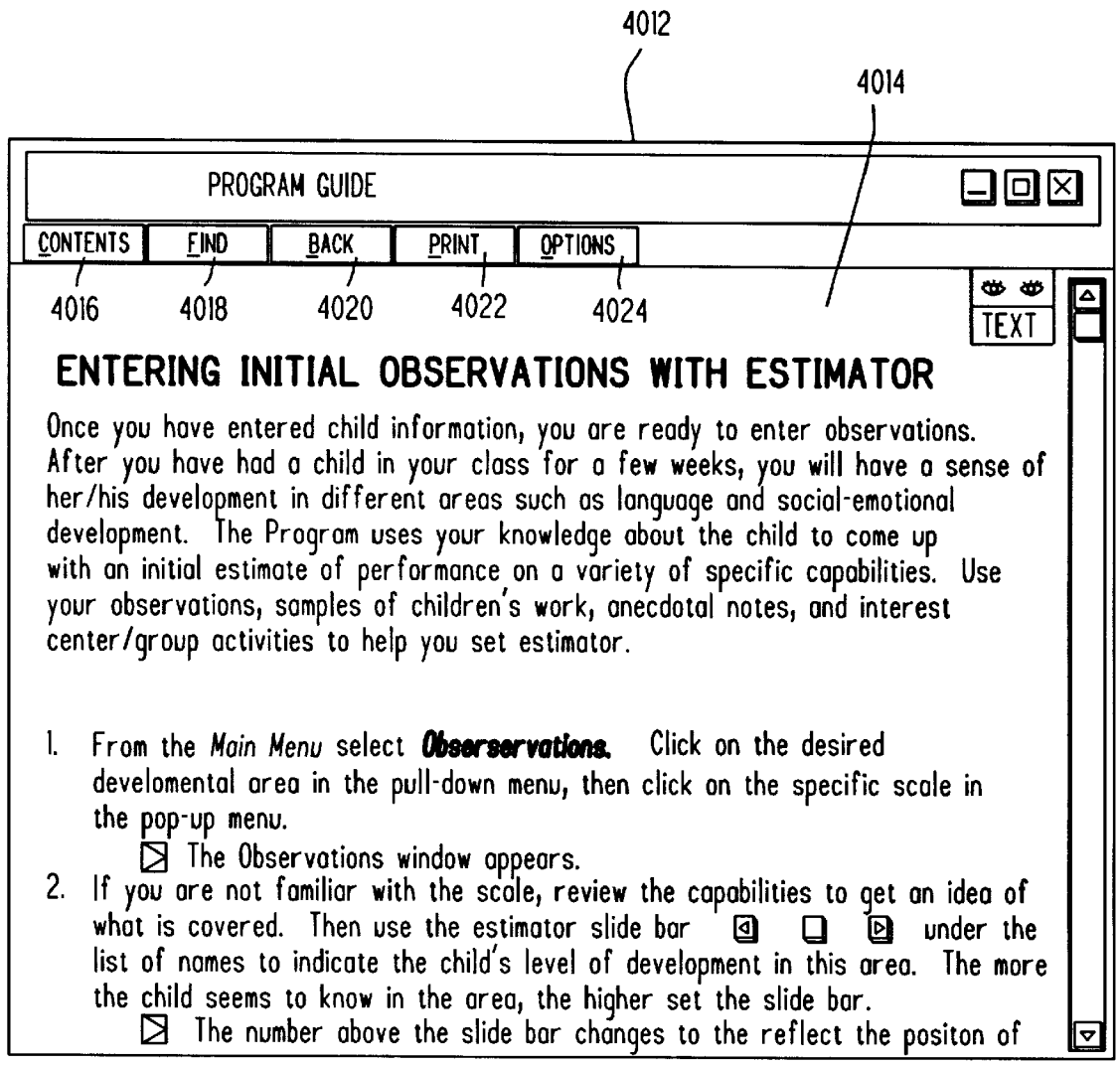

FIG. 156 is an illustration of the guide window with a display topic.

Figure 157:
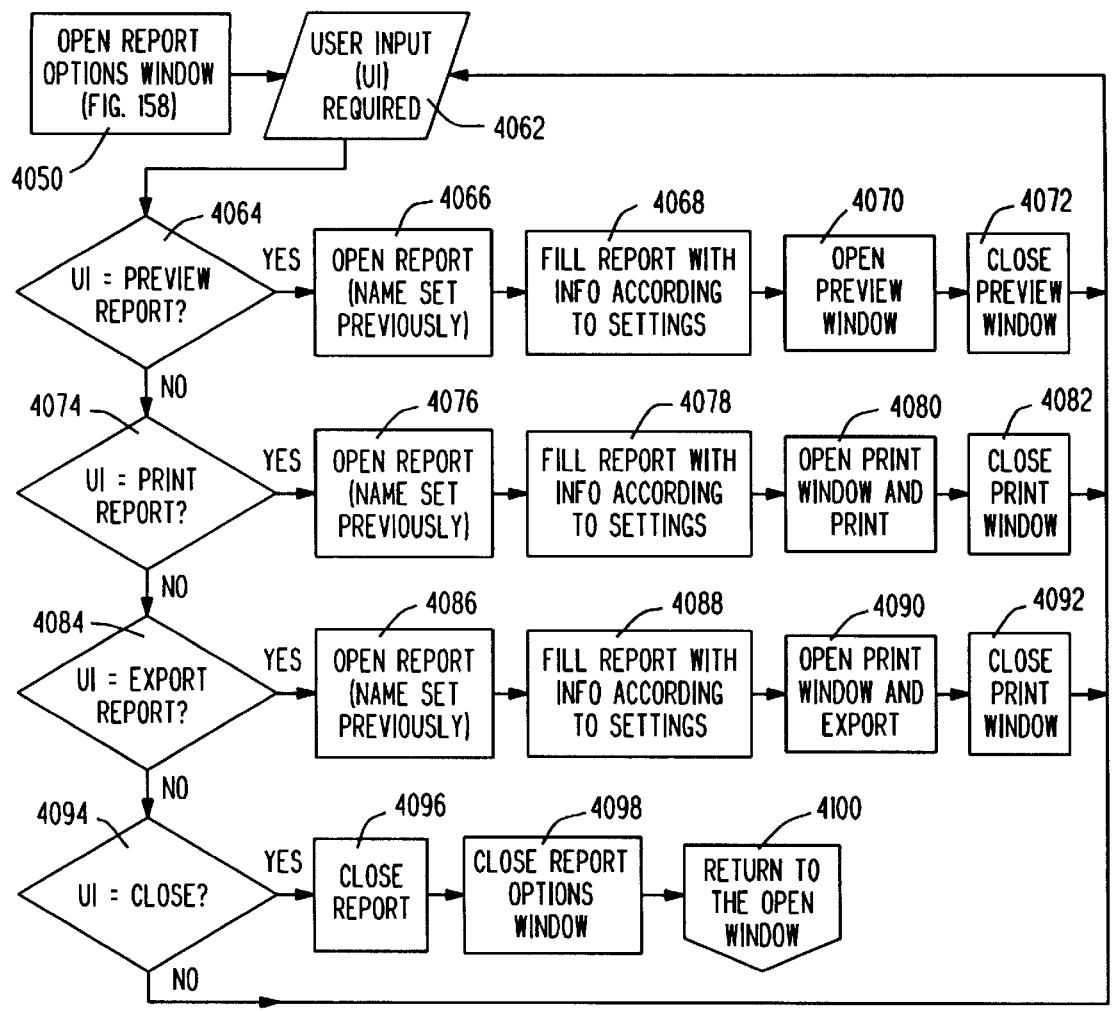

FIG. 157 is a flow diagram of a reports option procedure in the instructional management system program.

Figure 158:
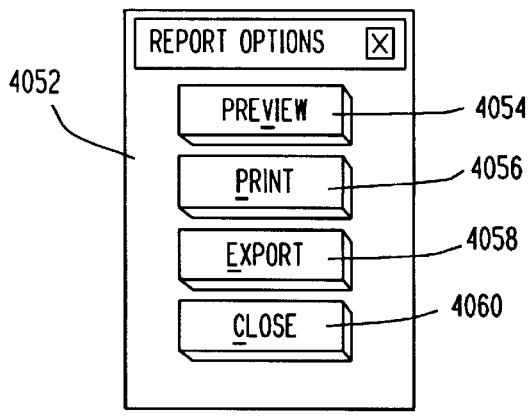

FIG. 158 is an illustration of a pop-up reports option window display during the reports option procedure.

Figure 159:
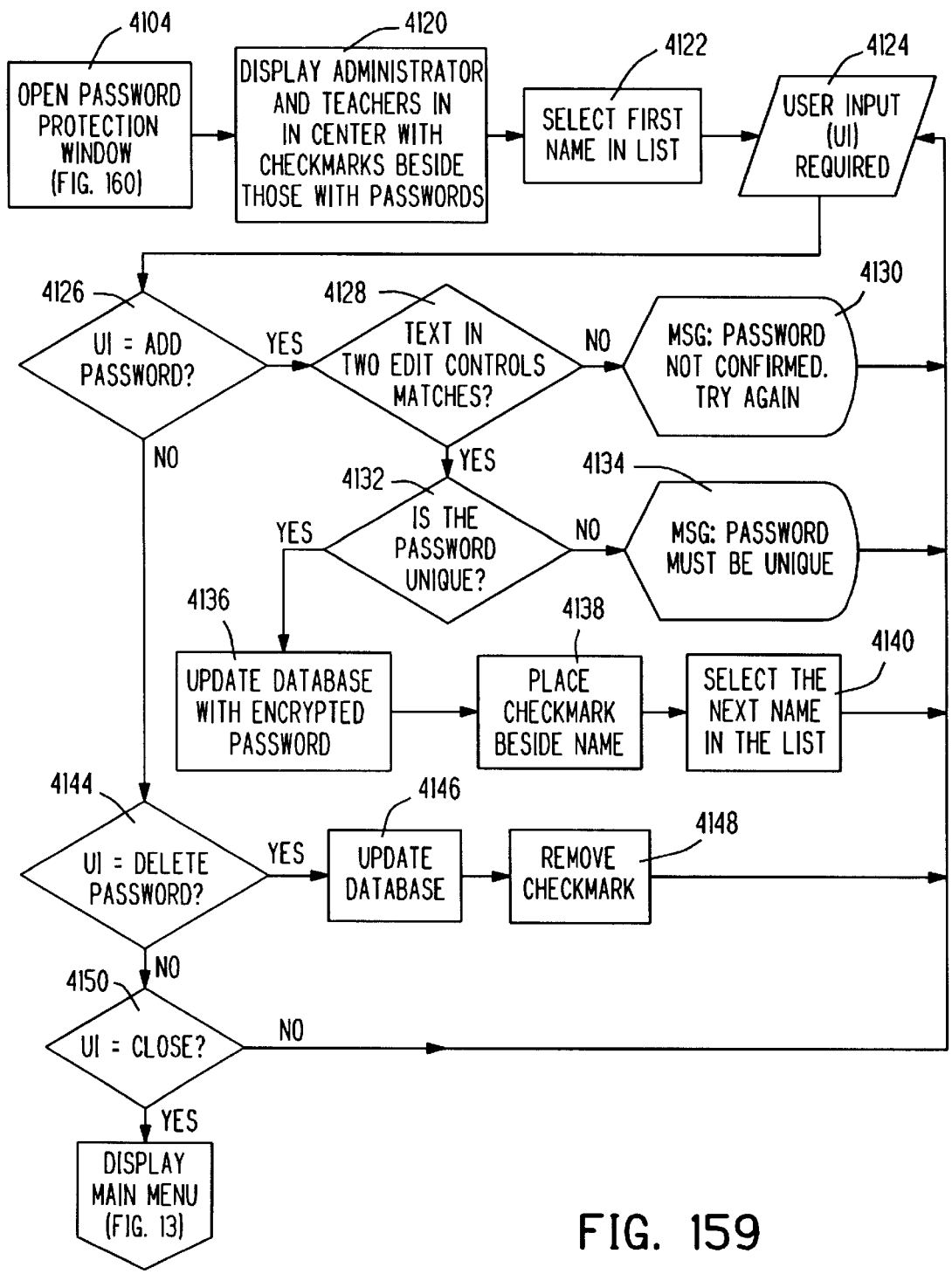

FIG. 159 is a flow diagram of a password protection procedure in the instructional management system program.

Figure 160:
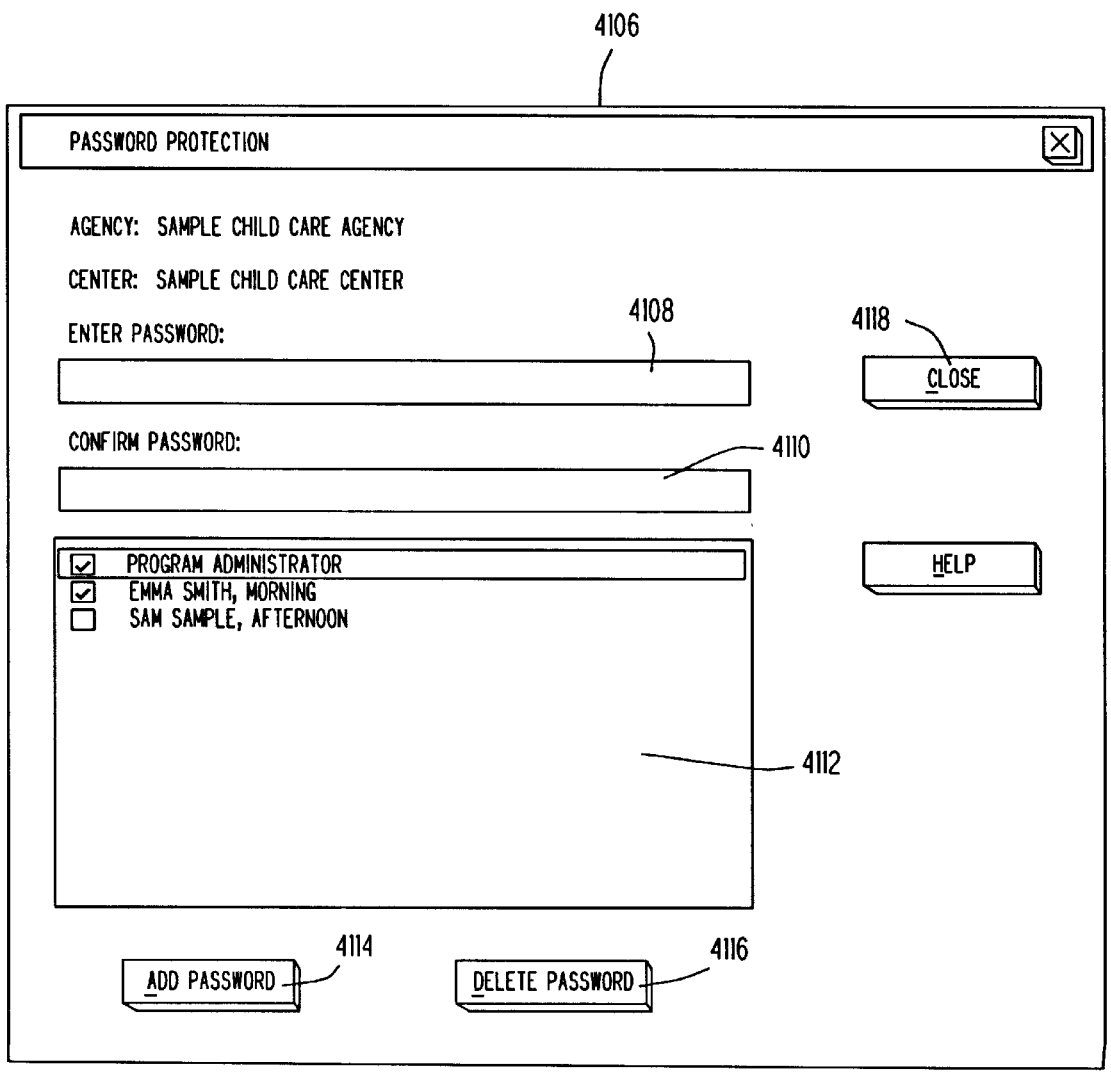

FIG. 160 is an illustration of a window displayed during the password protection procedure.

FIG. 161 is a flow diagram of a modified observations procedure that can be employed in the instructional management system program.

FIG. 162 is an illustration of a pop-up observations menu displayed during the modified observations procedure of FIG. 161.

FIG. 163 is an illustration of a window displayed during the modified observations procedure.

FIG. 164 is an illustration of a pop-up file menu displayed in the modified observations window.

FIG. 165 is an illustration of a pop-up update menu displayed in the modified observations window.

Figure 166:
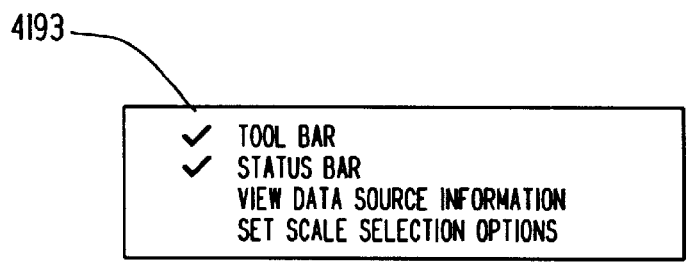

FIG. 166 is an illustration of a pop-up view menu displayed in the modified observations window.

Figure 167:
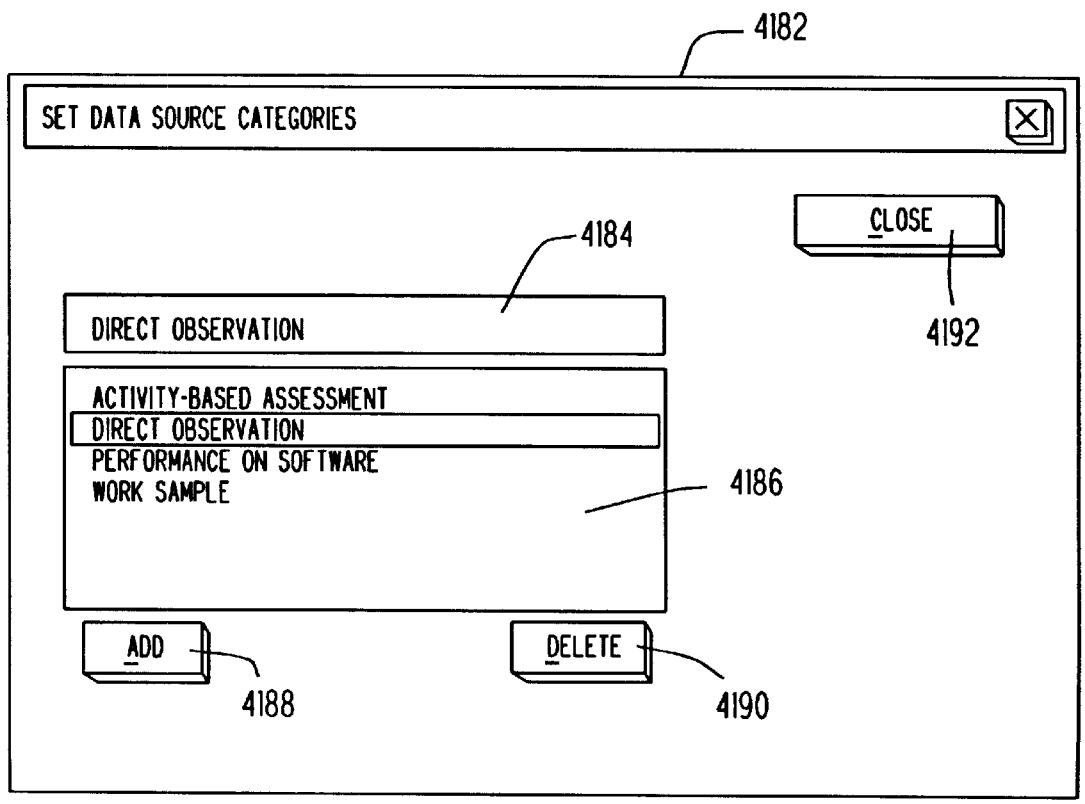

FIG. 167 is an illustration of a set data source window displayed in modified observations procedure.

Figure 168:
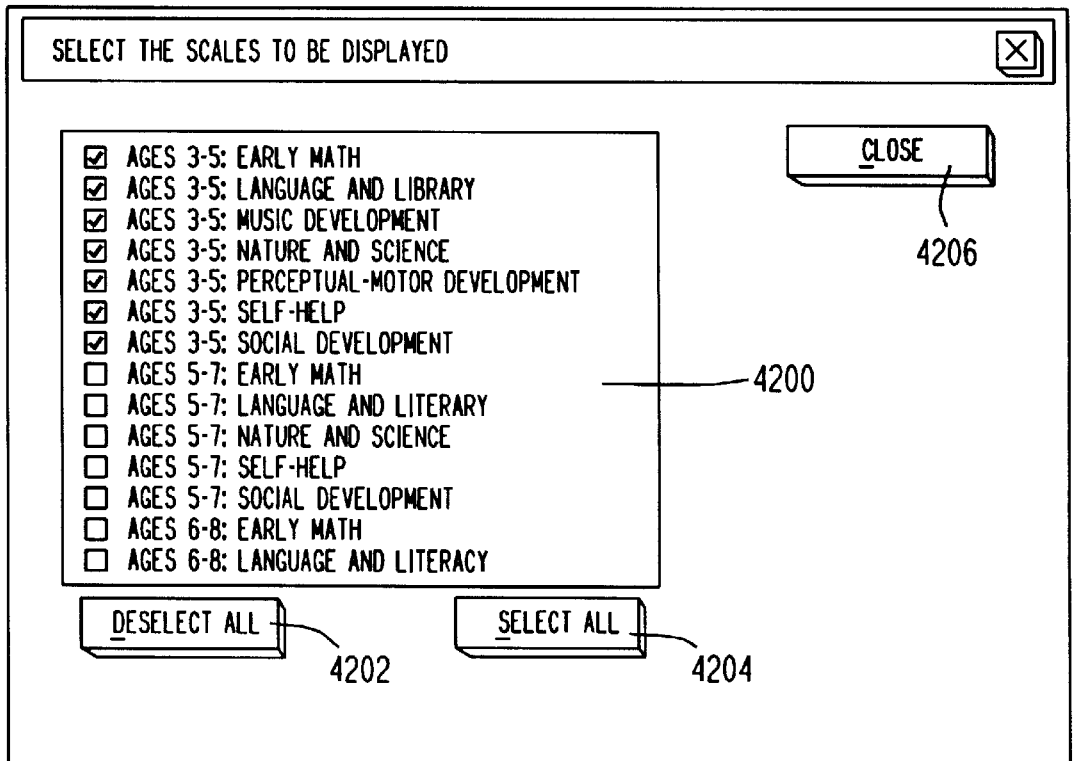

FIG. 168 is an illustration of a select scales to be displayed window displayed in the modified observations procedure.

Figure 169:
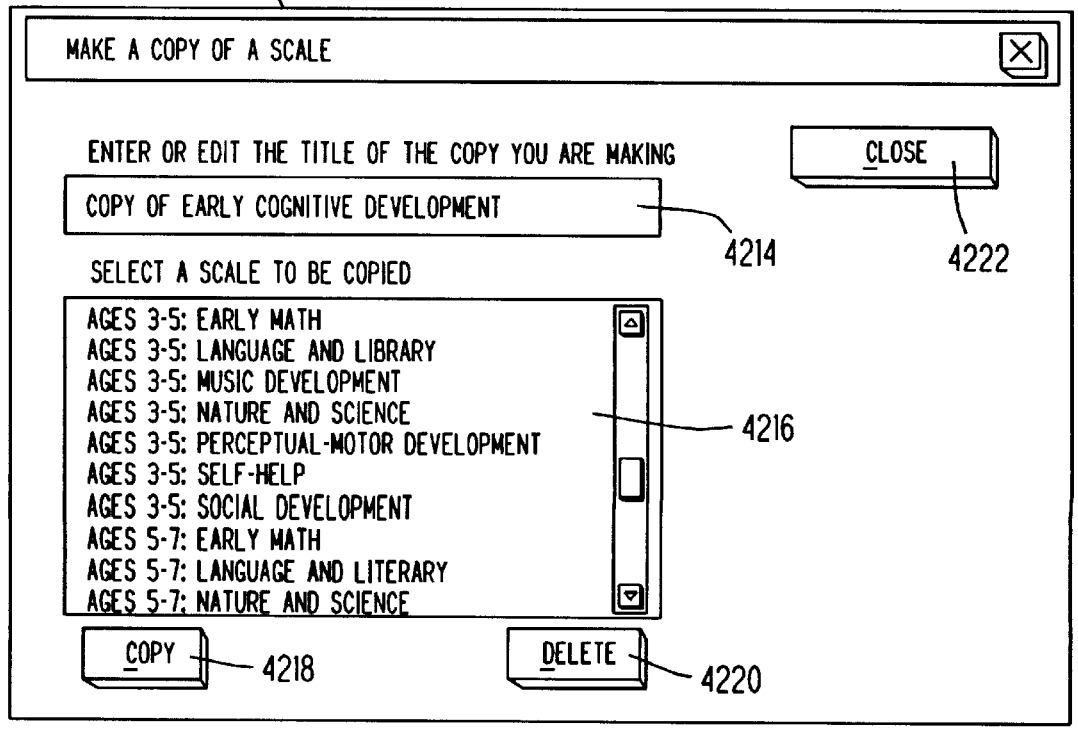

FIG. 169 is an illustration of a make copy of a scale window displayed in the modified observations procedure.

FIG. 170 is an illustration of an agency development profile report.

FIG. 171 is an illustration of an individual development profile report.

FIG. 172 is an illustration of an agency development summary report.

FIG. 173 is an illustration of an individual development summary report.

Figure 174:
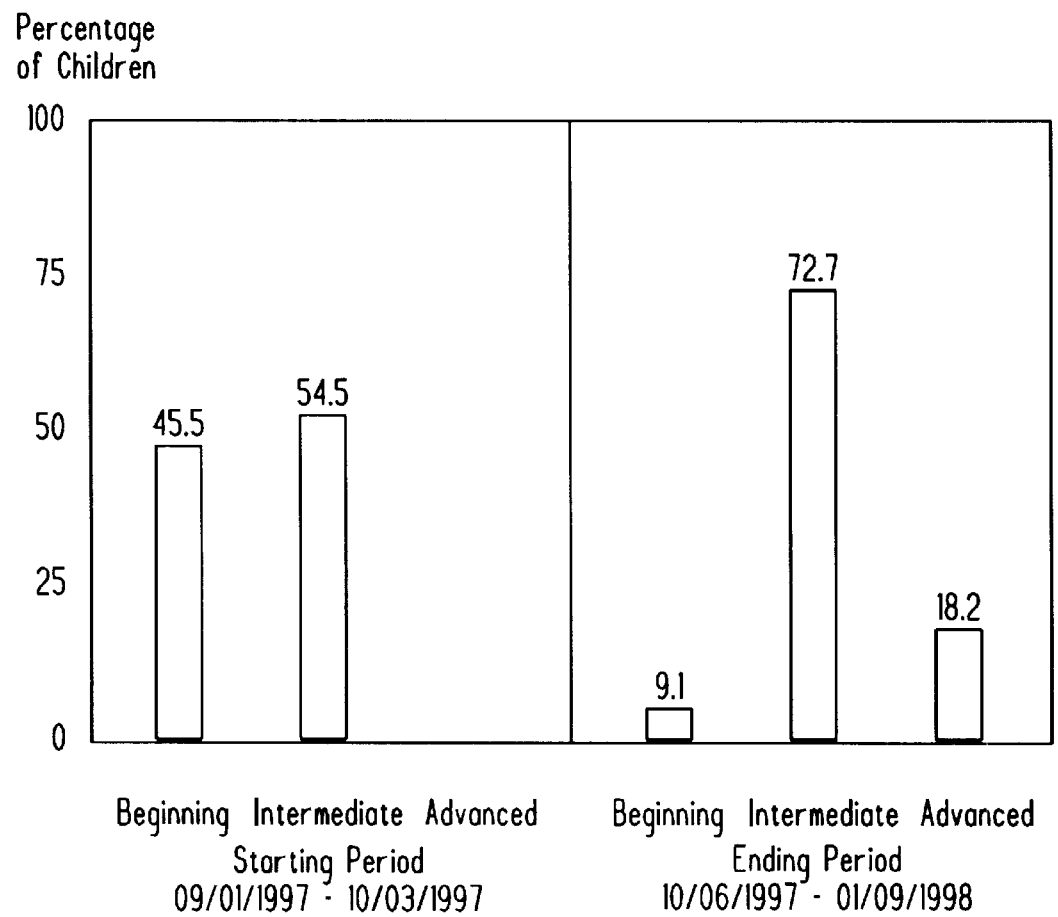

FIG. 174 is an illustration of an agency progress report.

FIG. 175 is an illustration of an individual screening report.

FIG. 176 is an illustration of an individual learning plan.

FIG. 177 is an illustration of an individual observation record report.

FIG. 178 is an illustration of a printed lesson plan.

Figure 179:
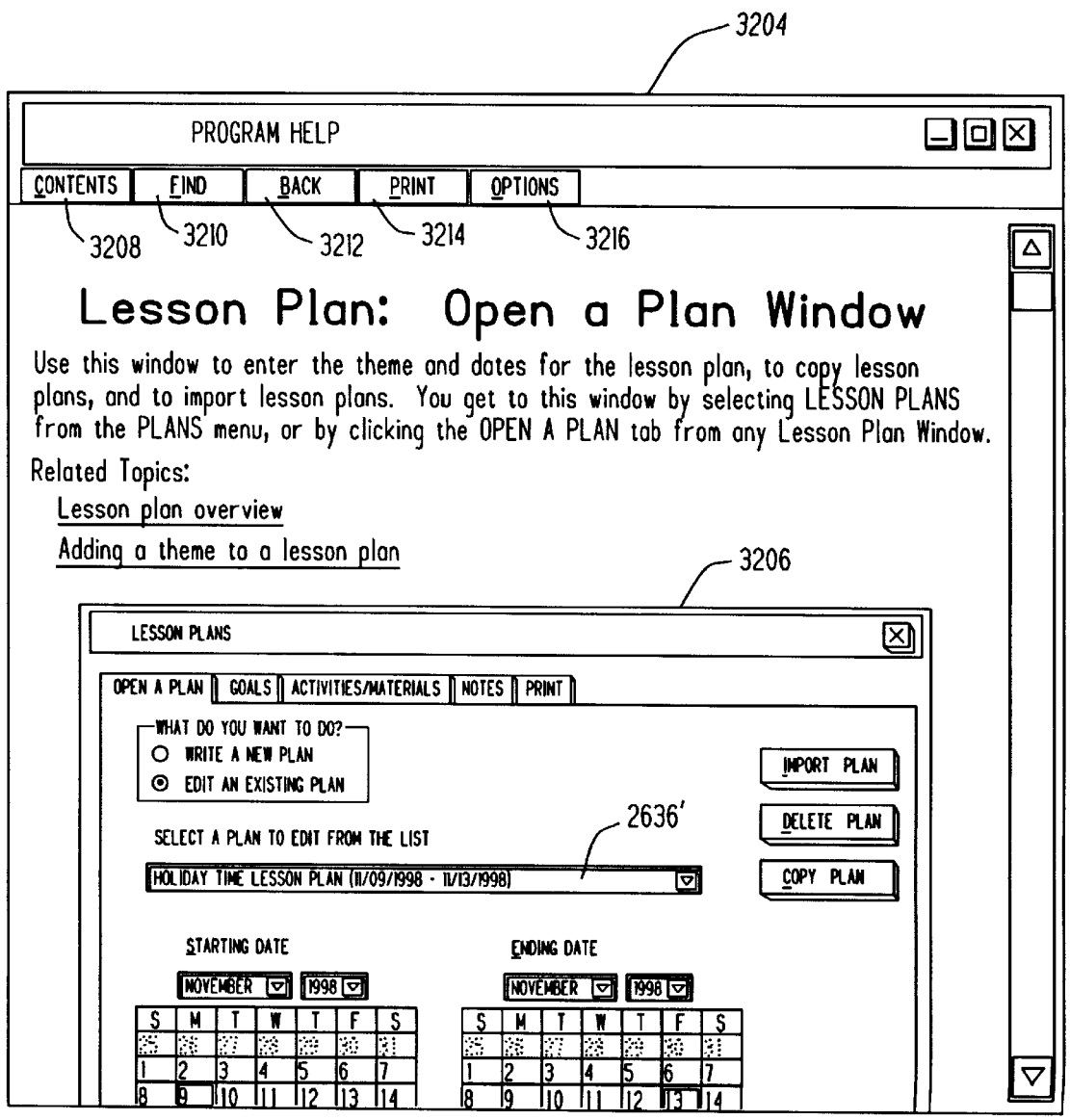

FIG. 179 is an illustration of a window displayed during a help procedure.

FIG. 180 is an illustration of a printed child's daily note.

Figure 181:
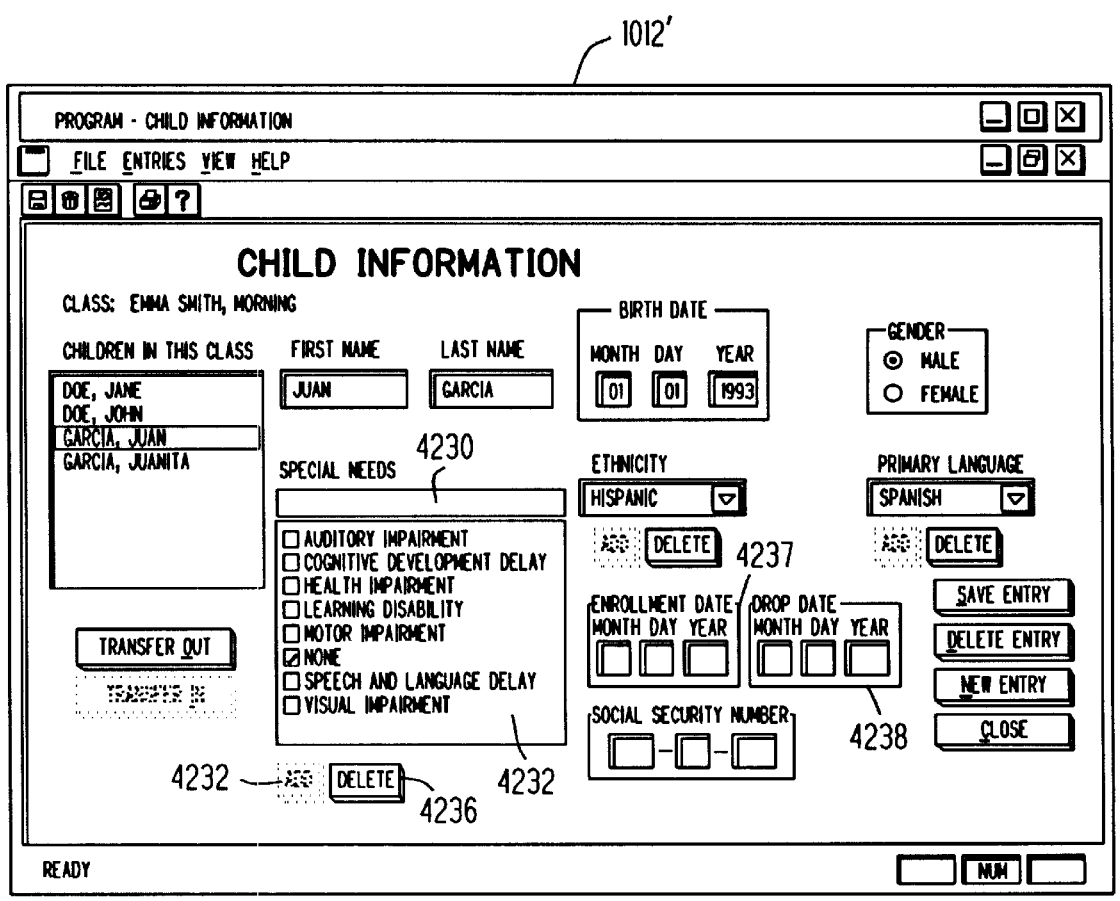

FIG. 181 is an illustration of a modified window displayed during the open child information procedure.

Figure 182:
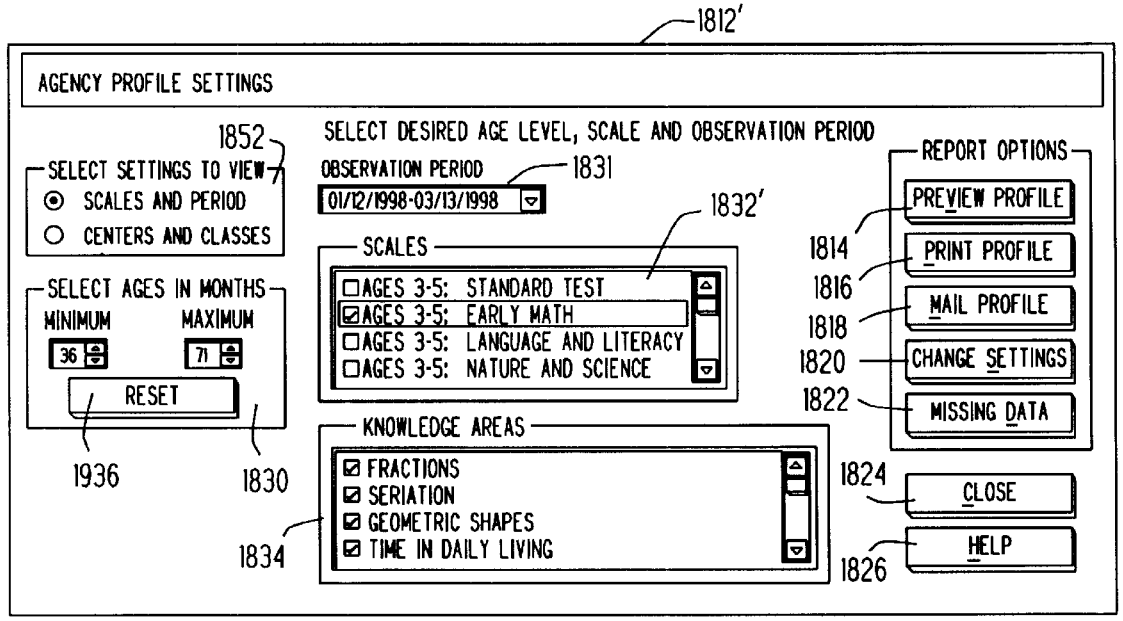

FIG. 182 is an illustration of a modified scales and periods window displayed during an agency profile settings procedure.

Figure 183:
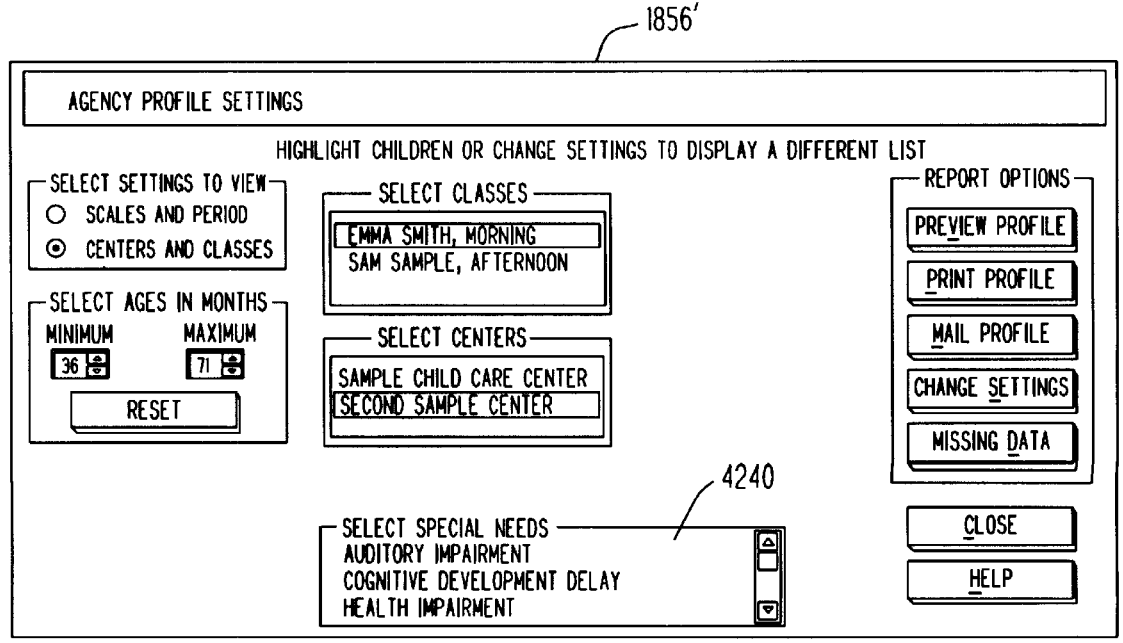

FIG. 183 is an illustration of a modified centers and classes window displayed during an agency profile settings procedure.

Figure 184:
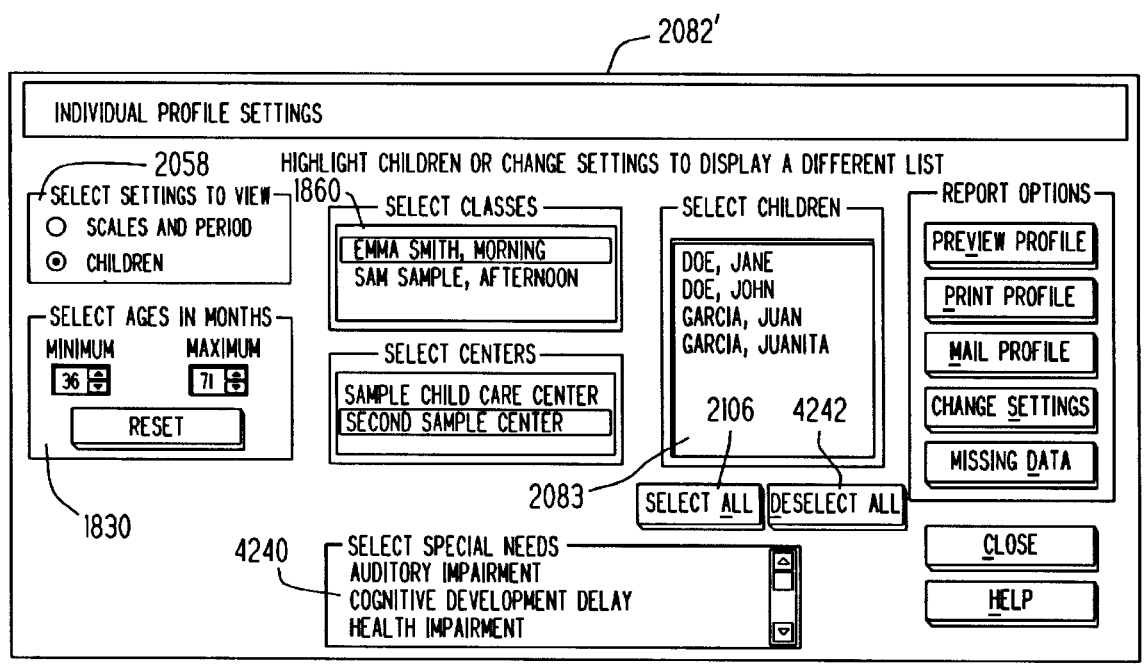

FIG. 184 is an illustration of a modified children window displayed during an individual profile settings procedure.

Figure 185:
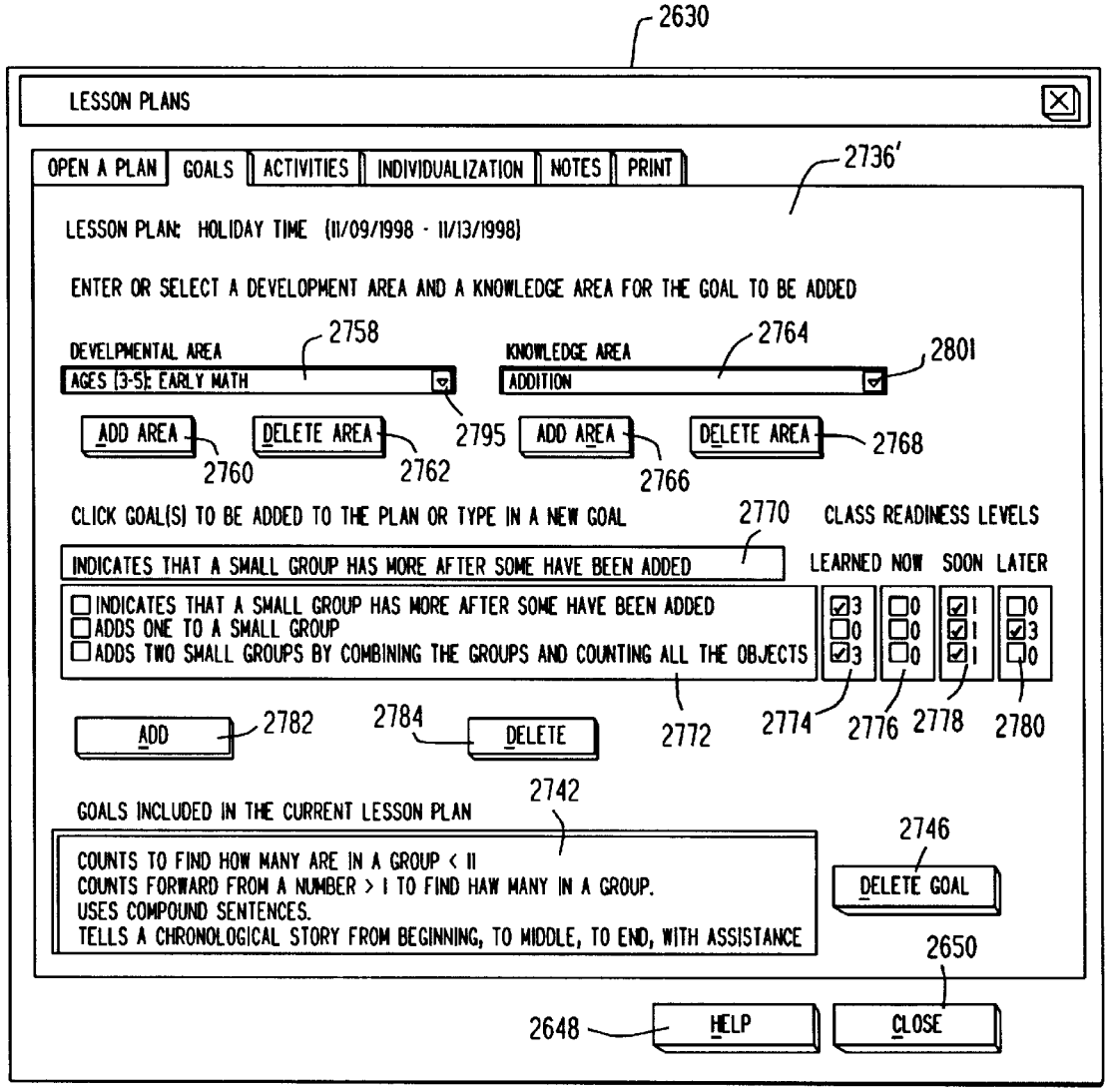

FIG. 185 is an illustration of a modified goals page in a lesson plans window displayed during a lessons plans procedure.

Figure 186:
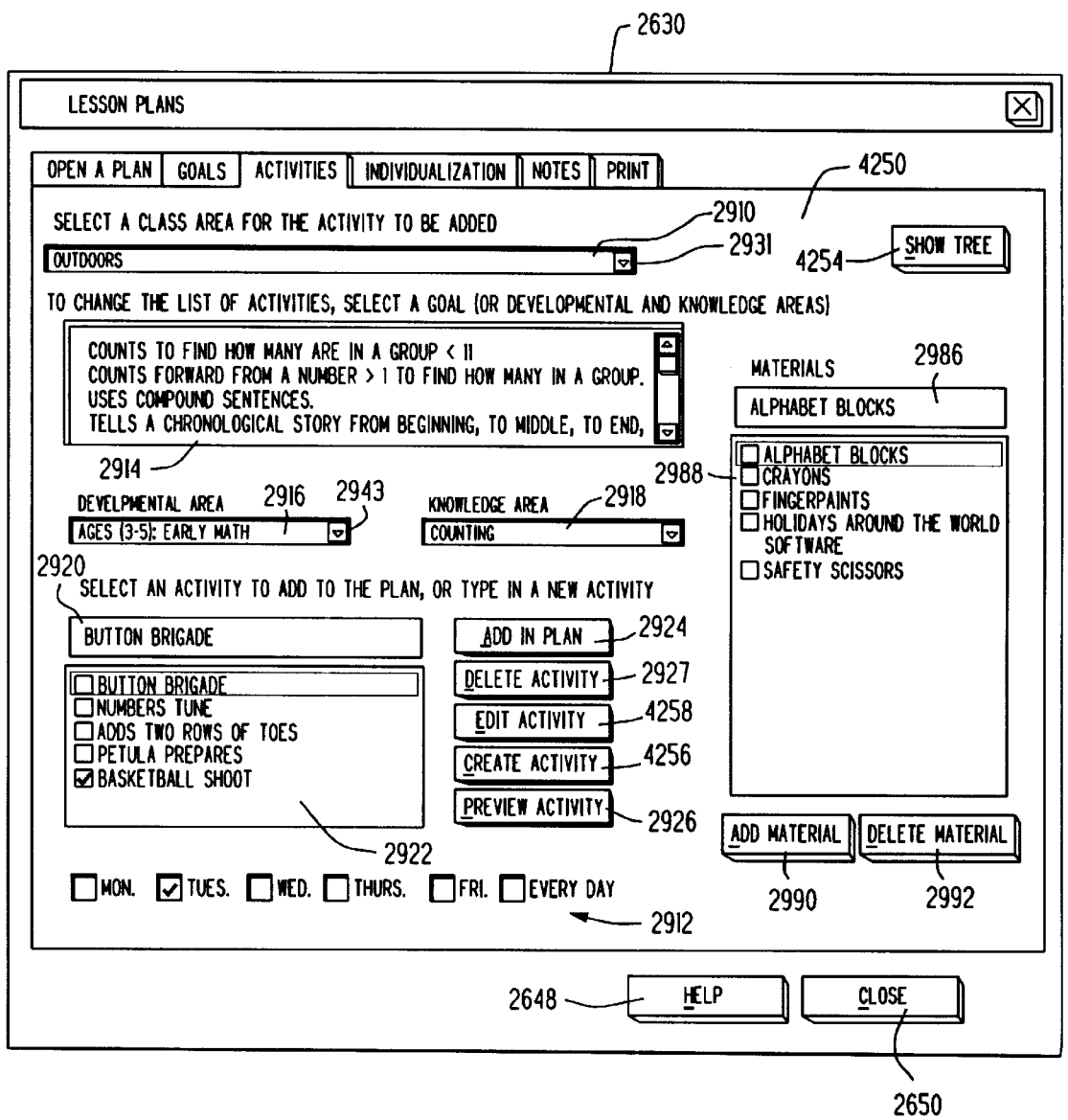

FIG. 186 is an illustration of a modified activities page in a lesson plans window displayed during a lessons plans procedure.

Figure 187:
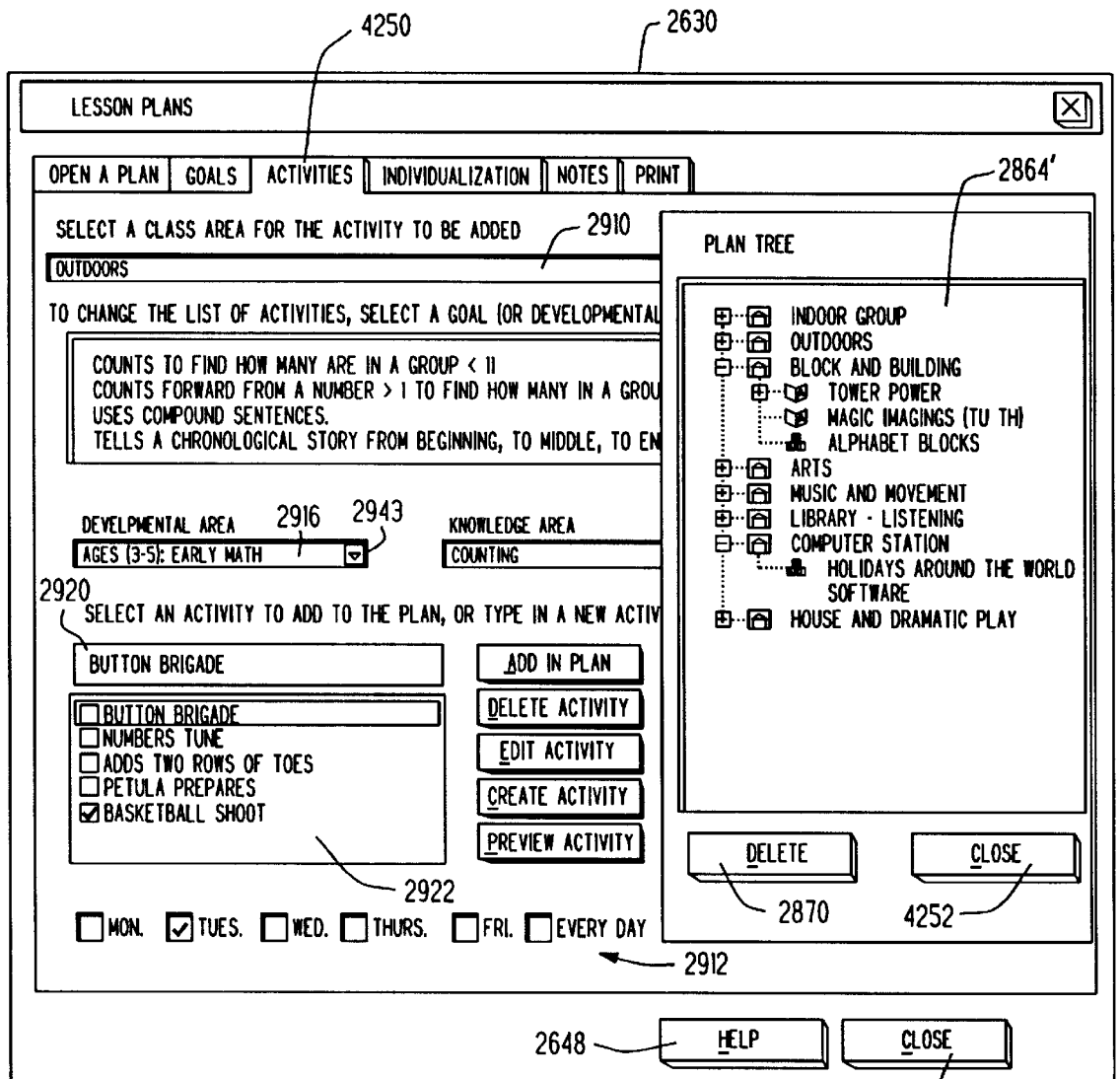

FIG. 187 is an illustration of the page of FIG. 186 with a plan tree overlay.

Figure 188:
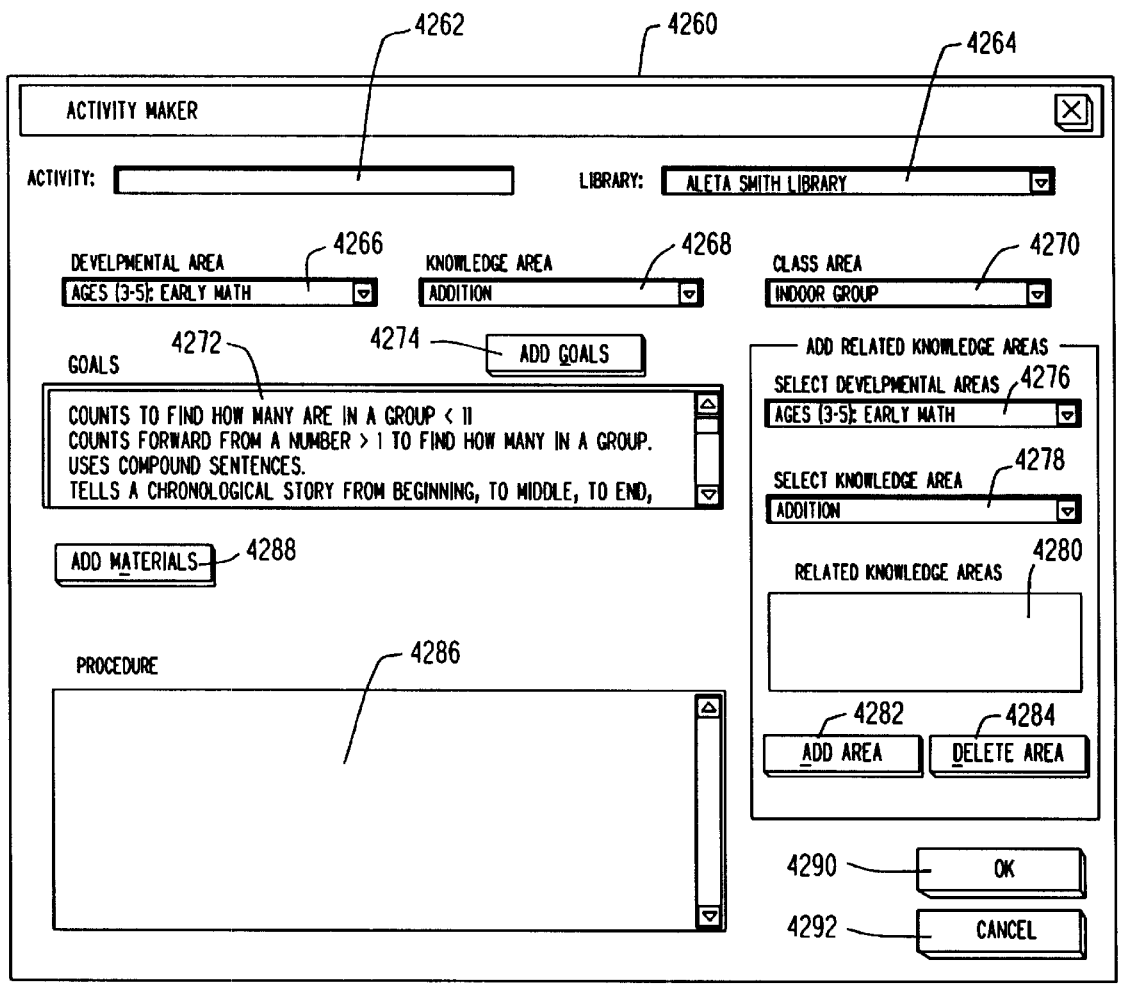

FIG. 188 is an illustration of an activity window used to edit or create an activity from a lesson plan window of FIG. 186.

Figure 189:
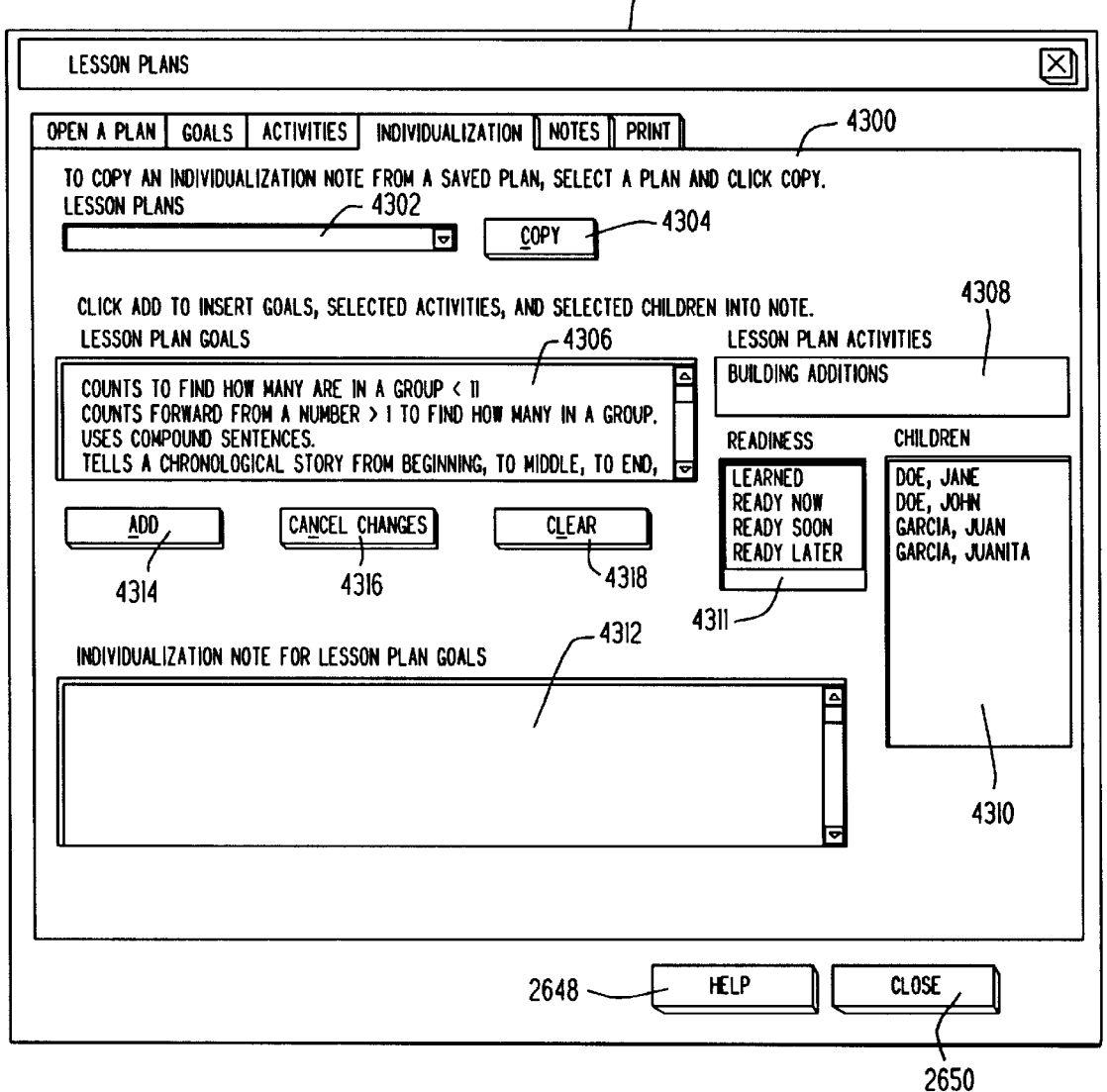

FIG. 189 is an illustration of an individualization page in a lesson plans window displayed during a lessons plans procedure.

Figure 56:
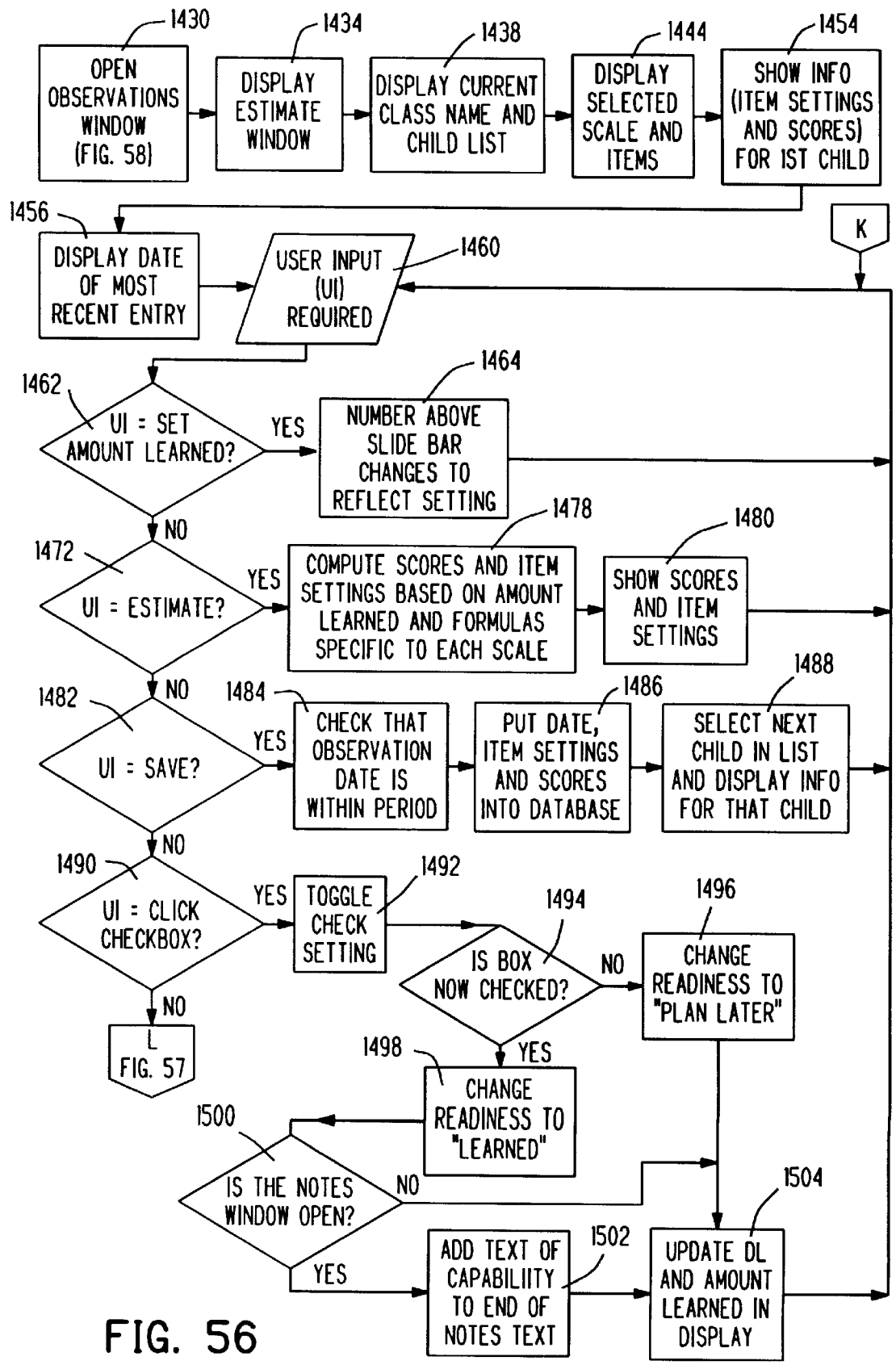
FIG. 56 is a flow diagram of a first portion of an open observations procedure in the instructional management system program.
Figure 57:
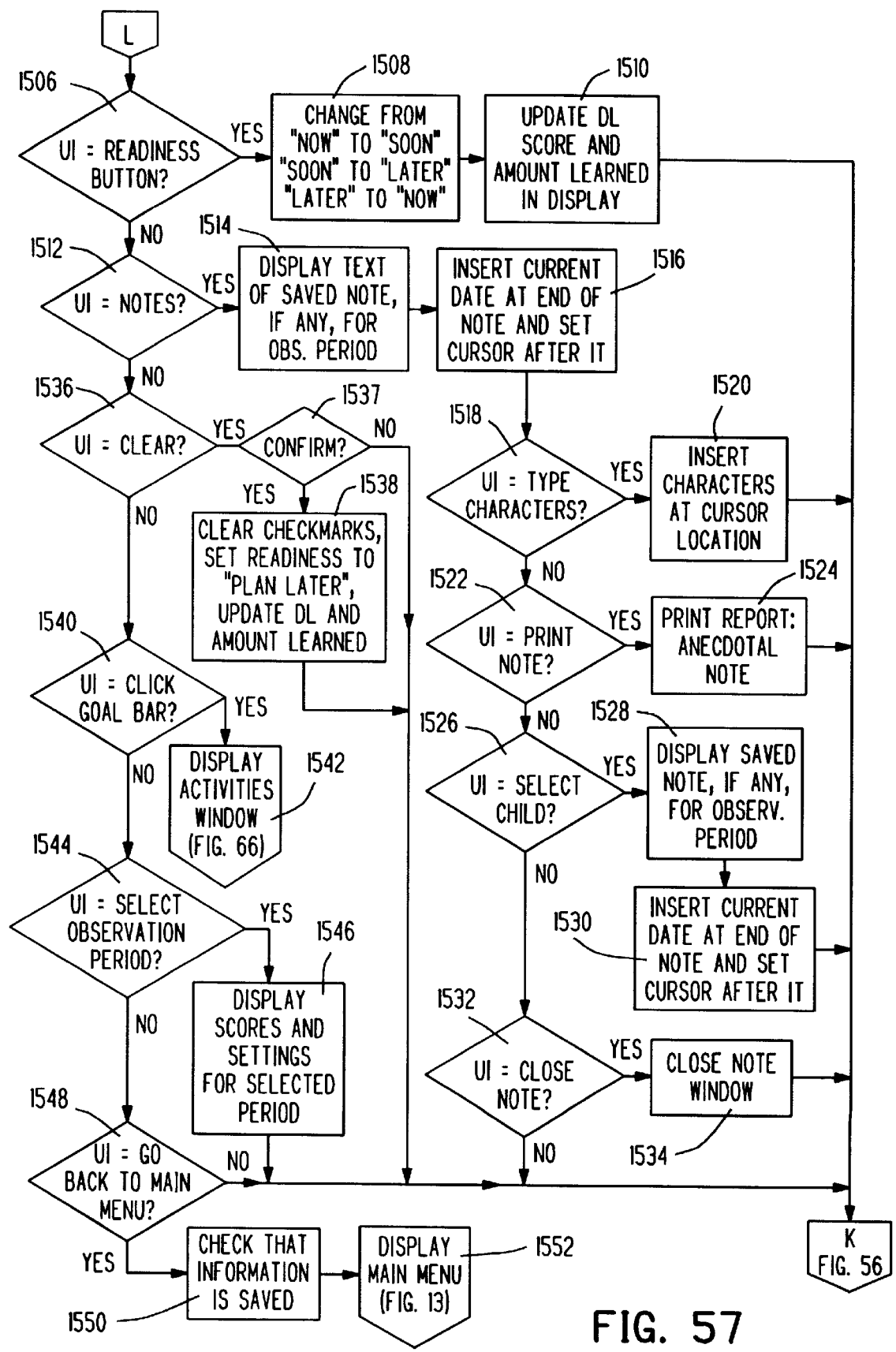
FIG. 57 is a flow diagram of a second portion of the open observations procedure.
Figure 190:
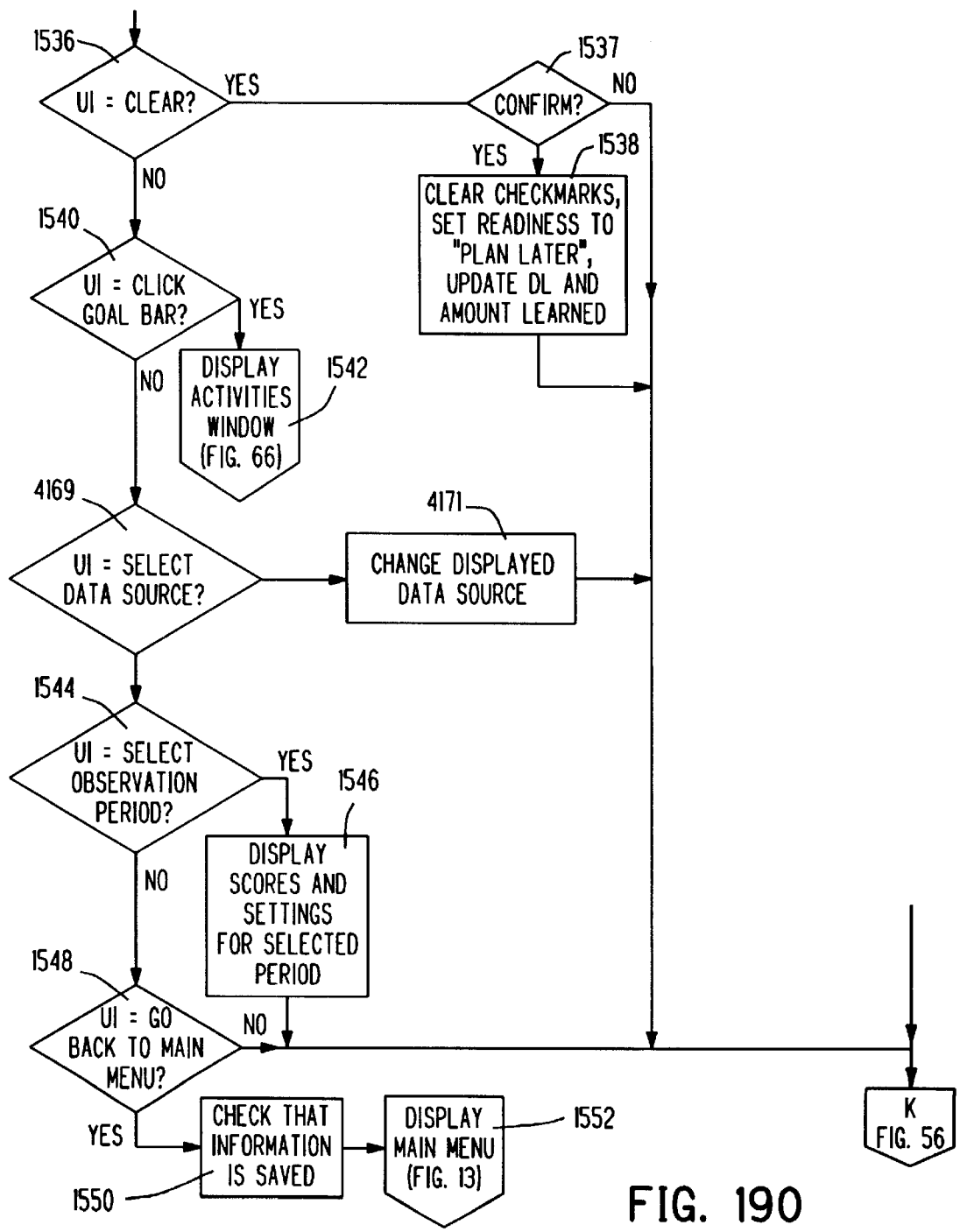

FIG. 190 is a flow diagram of a modification made in the observations procedure of FIGS. 56 and 57.

Figure 191:
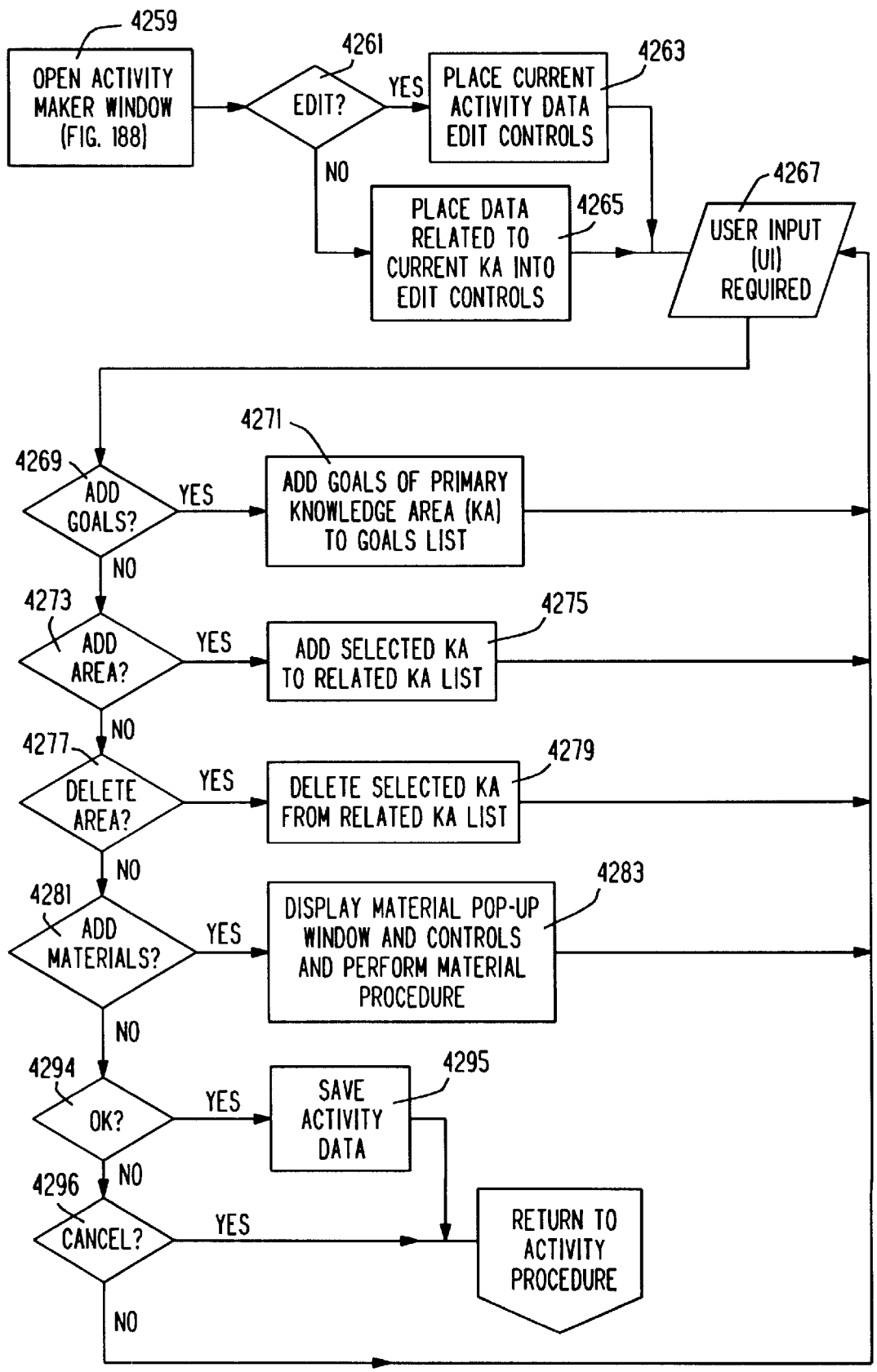

FIG. 191 is a flow diagram of a procedure for creating and editing instructional activities in the lesson plan procedure.

Figure 192:
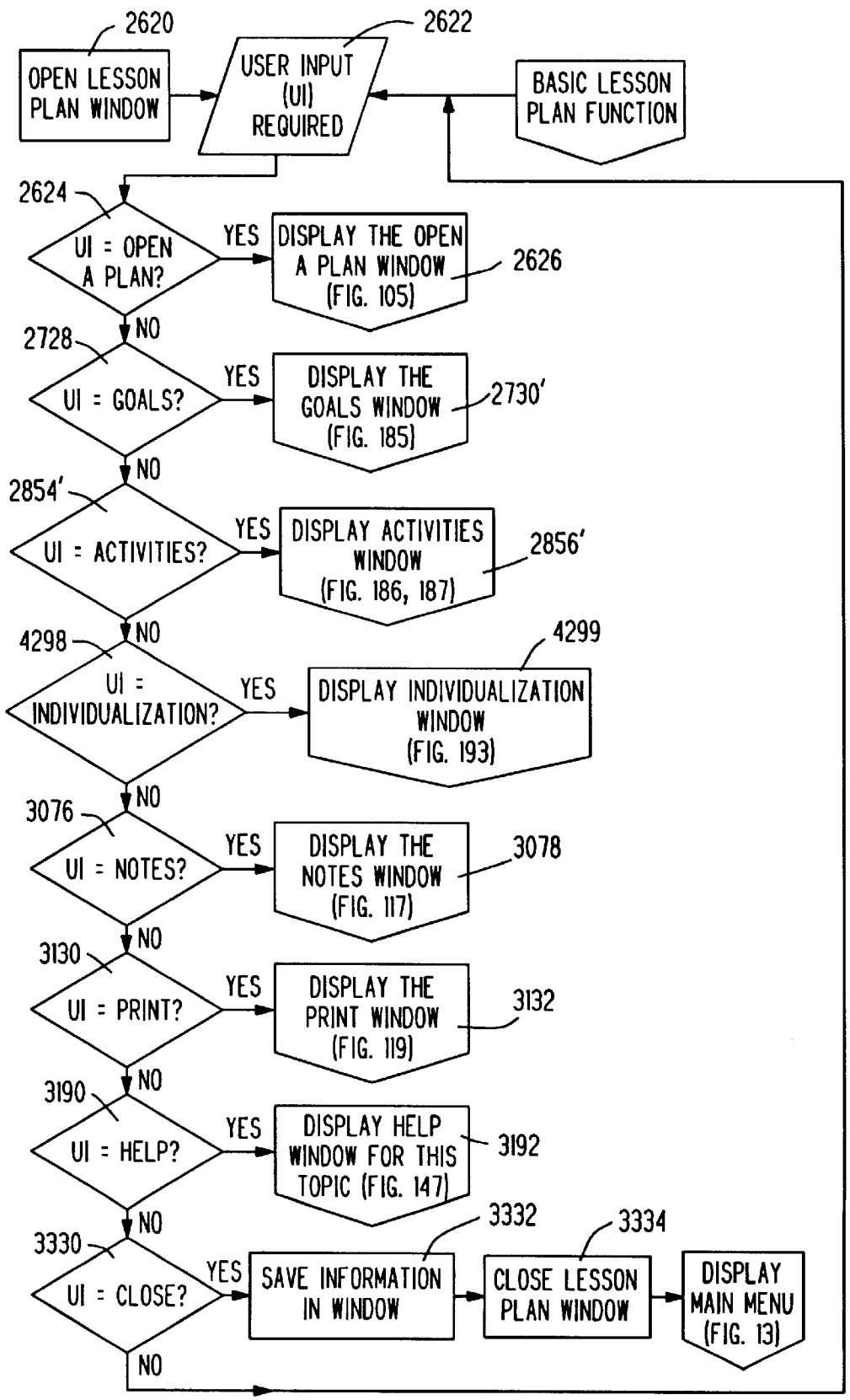

FIG. 192 is a flow diagram of modified open lesson plan procedure in the instructional management system.

Figure 193:
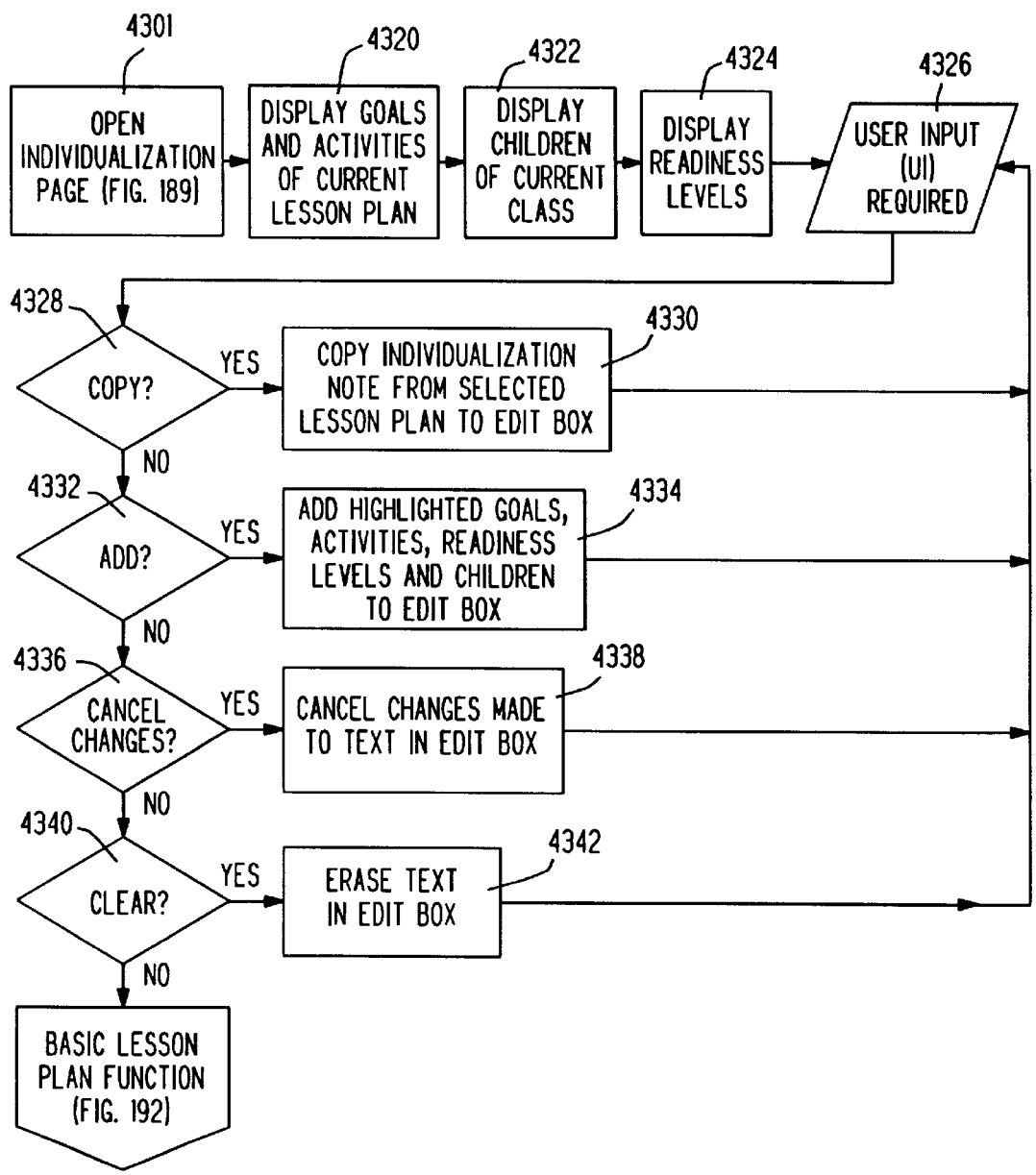

FIG. 193 is a flow diagram of an individualization procedure in the modified lesson plan procedure of FIG. 192.

DESCRIPTION OF THE PREFERRED EMBODIMENTS

General System

Figure 1:
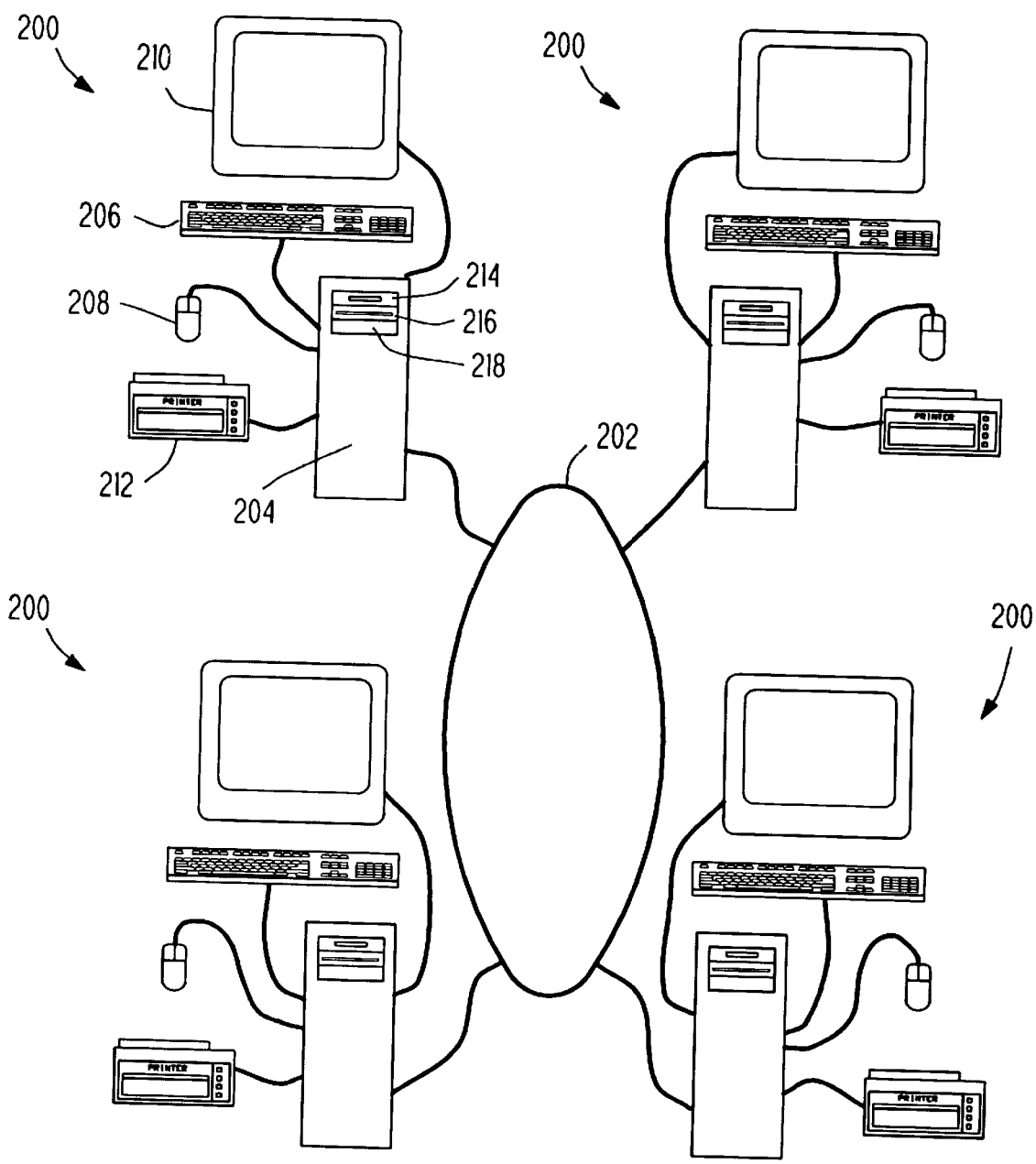
FIG. 1 is a diagram of one possible network of computers employed in an instructional management system in accordance with one embodiment of the invention.

As shown in FIG. 1, one instructional management system in accordance with the invention includes a plurality of computer stations 200 which are interconnected by a network 202. Each computer station 200 typically includes a central unit 204 which is connected to a keyboard 206, mouse 208, display 210 and printer 212. The central unit 204 typically includes a read/write removable media device such as floppy disk drive 214, a read only removable media device such as a CD-ROM or DVD reader 216 and a mass storage device such as a hard drive 218. The instructional management system can be operated on a single one of the computer stations 200 without any interconnection with other computer stations, but usefulness is enhanced by operating a system with a plurality of stations.

The network 202 is one of a variety of possible network configurations. Where the instructional management system is employed in a single school or closely distanced schools, the network 202 can be a hardwired internal network or connected through dedicated lines. In the typical internal network system, one of the stations 200 is a server with the other stations accessing the server for data storage, programs and communications such as e-mail. Where the instructional management system is employed in more distant class rooms, the network can be formed by dial up telephone lines, the internet, or some other digital communication system for data transfer and communications.

Figure 2:
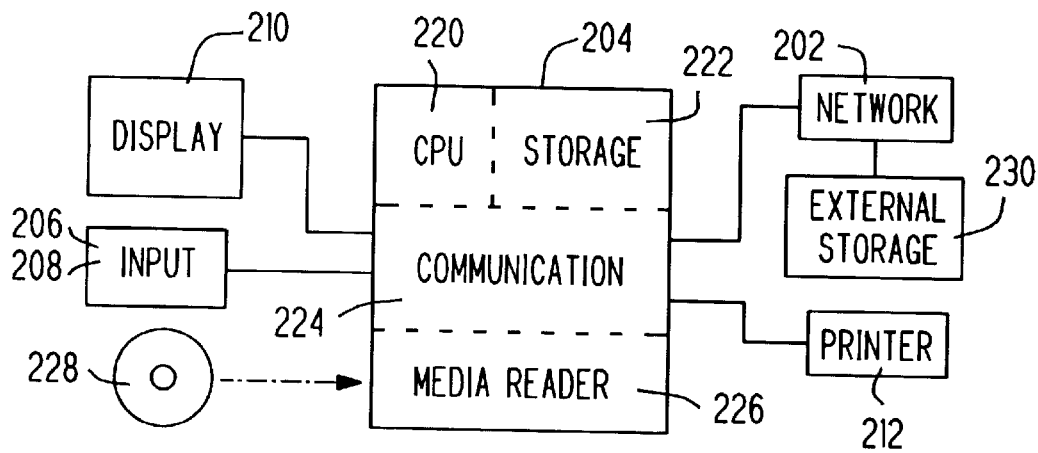
FIG. 2 is a block diagram of a typical computer station employed in the network illustrated in FIG. 1.
Figure 3:
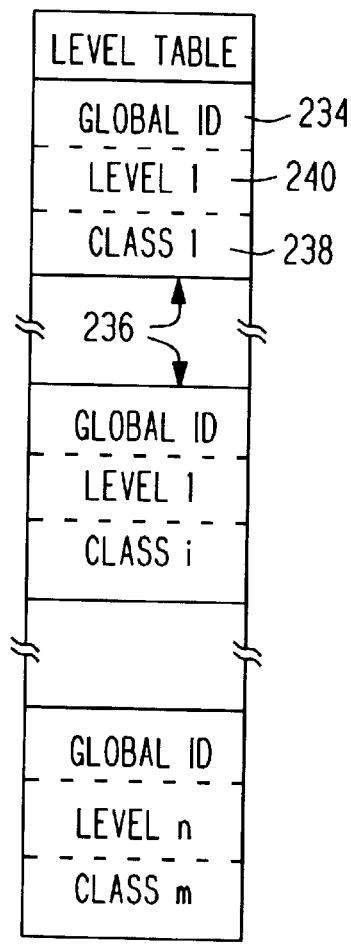
FIG. 3 is diagrammatic illustration of a level table stored and employed in the network of FIG. 1 for storing readiness levels that a teacher has selected for reporting purposes.

As shown in FIG. 2, the typical unit 204 includes a central processor (CPU) 220, one or more internal storage control units 222, communication control units 224, and media reader 226. The CPU 220 is operated by instructions contained in various computer programs including operating systems and applications and generally controls the operation of all systems and units in the unit 204. The storage control unit or units 222 control the hard drive 218 and removable media devices which can be used for storage. The communication unit or units 224 handle various inputs and outputs such as inputs from the keyboard 206, mouse 208, network 202 and outputs to the display 210, the network 202 and the printer 212. The media reader 226 reads various media such as a CD-ROM disk 228. External storage 230 is accessed through the network 202.

Storage such as one or more of the hard drive 218, external storage 230 and/or removable media 228 contain a computer program and a database for operating the CPU in accordance with the instructional management system. Several files or portions of the database are shown in FIGS. 3–11. Each record in the database includes a unique global ID 234 which for example can be a variable of the type GUID generated by an algorithm that ensures no duplication. The use of a GUID (for example, a 39 byte string or value) to uniquely identify each record ensures that records can be moved from database to database at different locations without concern about duplicate IDs corrupting data. The table shown in FIG. 3 contains a plurality of records (rows) with each record including the name or a GUID ID of a class 238 and one or more readiness levels 240 for which a teacher wishes to have reports. This table can be used similar to that described below in connection with a readiness levels box in FIG. 92.

Figure 4:
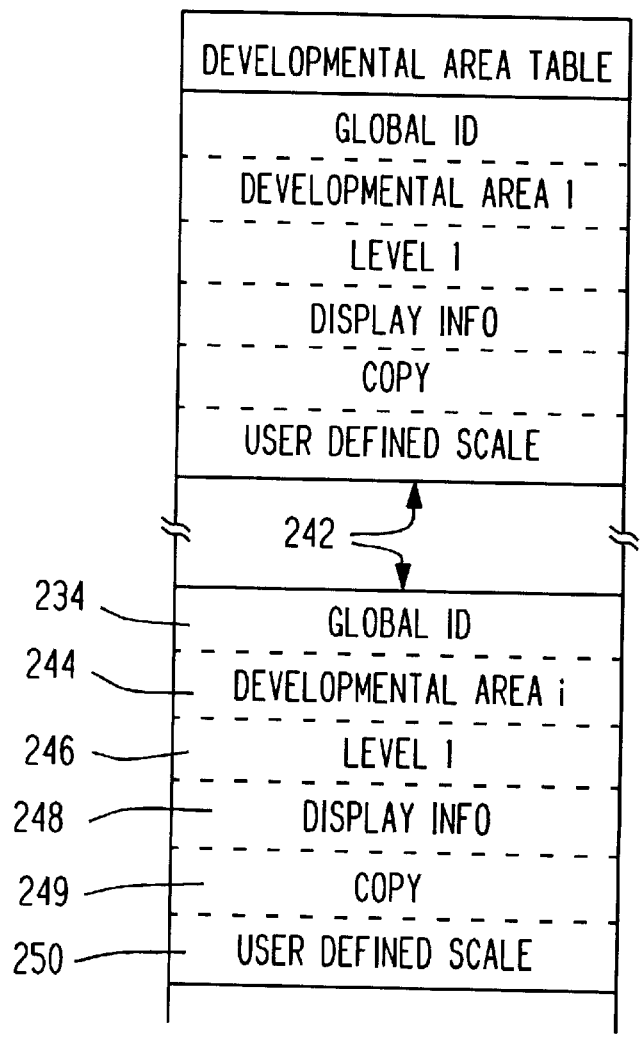
FIG. 4 is a diagrammatic illustration of a developmental area table stored and employed in the network of FIG. 1 for setting forth different developmental areas in each of the levels identified in FIG. 3.

FIG. 4 shows a developmental area table (also known as ScaleList table). Each developmental level is a broad classification of students by age, ability and the like; for example, one such classification of levels includes (1) infant-toddler, ages 0–2; (2) preschool level 1, ages 2–4; (3) preschool level 2, ages 3–5; (4) preschool advanced arts and technology, ages 3–5; (5) kindergarten, ages 5–7; (6) grade 1, ages 6–8; (7) grade 2, ages 7–9; and (8) grade 3, ages 8–10. In the instruction of students each of the broad developmental levels is further broken down into different developmental areas or scales which are listed in records 242 (also called Scale field) in the developmental area table of FIG. 4. Each of the records 242 includes the name 244 of the developmental area, the developmental level 246 to which the name 244 belongs, display information 248 for controlling the arrangement and selection buttons of information on the display 210, a copy field 249 identifying scales (developmental areas) copied from an existing scale and permitting user modification, and user defined scale field 250 identifying scales (developmental areas) written by the user. For example the preschool level 1 capabilities can be classified into the developmental areas (1) early math, (2) language and literacy, (3) nature and science, (4) perceptual motor development, (5) self-help, and (6) social-emotional development.

In FIG. 5, there is shown a knowledge area table (also known as LessonPlan-KnowledgeAreaList table) containing records 252 each containing the name of a knowledge area (KA) 254 and the name of the developmental area 256 to which the knowledge area is assigned. As an example, the capabilities in the developmental area "early math" of preschool level 1 can be further broken down into the knowledge areas (a) counting, (b) addition, (c) subtraction, (d) fractions, (e) seriation, (f) geometric shapes, (g) time in daily living and (h) math communication. As an alternative or supplement to the developmental area, each record 256 can contain a ScaleID field (not shown) which contains a GUID identifying the scale or developmental area to which the knowledge area belongs.

A goal table (also known as LessonPlanGoalList table) is shown in FIG. 6 and includes records 260 for all the learning capabilities (goals) for each developmental area. Each of the records 260 includes the name of the goal or learning capability 262, the developmental area 264 (optional—may be eliminated) and knowledge area 266 to which the learning capability belongs, an identification of a class 268, a difficulty factor (b) 270, a discrimination factor (a) 272, and an order number 274. As an alternative or supplement to the knowledge area field, each record 260 can include a KnowledgeAreaGlobalID field (not shown) which is a GUID identifying the knowledge area to which the goal or learning capability belongs. The difficulty factor 270 and the discrimination factor 272 are used in computations involving item response theory scores, probabilities of a student achieving a particular goal or learning capability from an estimated ability score, and learning suitability of a student for particular goals. The capabilities within a developmental area can be ordered by their difficulty and this order number can be used as an alternative method of determining those capabilities which have been learned from a estimated ability score. As a further alternative or supplement, the goals or learning capabilities in the goal table can be ordered in according to their difficulty and this order can be used to evaluate the likelihood that a child is prepared to learn given skills based on the teacher's overall estimate of skills the child has mastered.

Information about each child or student is contained in a child table illustrated in FIG. 7. Each record 276 includes the name of the child 278, the class 280 to which the child is assigned, other school information 282, and other personal and family information 284.

In the child scores table (also known as the Scores table) of FIG. 8, records 288 of the development of each child are recorded. Records are kept for each time period and for each developmental area of each child. Each record 288 includes an identification of the child 290, the developmental area 292, a learned string 294 encoding the learned status (learned or not learned) of the child in all the learning capabilities within the developmental area, a plans string 296 encoding the learning suitability (learned, plan now, plan soon, plan later) for all the learning capabilities within the developmental area, the start date 298 of the period for which the record covers, the end date 300 of the period for which the record covers, a developmental level score (item response theory score or ability score) 302, a risk of delay indication 304, a summed score 306 which is the number of learned capabilities within the developmental area, a percentile score 308, a NCE score 310, a z-score (standard score) 312, the last observation date 314, an identification of the last screener 316 to modify or add the record, the speech or articulation status 318, and a memo 320 wherein the anecdotal notes pertaining to the child's progress within the developmental area are stored. As alternatives or supplements to the developmental area field 264 and knowledge area field 266, each record 260 can include a ScaleID field (not shown), which contains a GUID identifying the developmental area to which the record pertains, and a Knowledge-AreaGlobalID field (not shown), which contains a GUID identifying the knowledge area to which the record pertains. When a new record 288 is created by an observation in a new period, the data in the previous record except for the dates and screener name (screener name may be limited to use only in standard test scale or developmental area) are copied to the new record. With a record kept for each period in each developmental area, the progress of the student over a school year can be easily determined.

A class score table (also known as Readiness table) as shown in FIG. 9 is also maintained in the database. Records 324 include the class identification, the developmental area 328, the learning capability 330, the number of students 332 in the class who have learned the capability, the number of students 334 in the class who are ready now (plan now), the number students 336 in the class who are ready soon (plan soon), the number of students 338 who are ready later (plan later), and the observation date of the record. As an alternative or supplement to the developmental area field 328, each record 324 can include a ScaleID field (not shown) which is a GUID identifying score or developmental area to which the record pertains. Records for each capability and for each class are created periodically so that progress in each class can be monitored. The latest record for each capability (goal) can also be recalled to enable the planning of lessons or activities based upon the current progress of the class.

Figure 10:
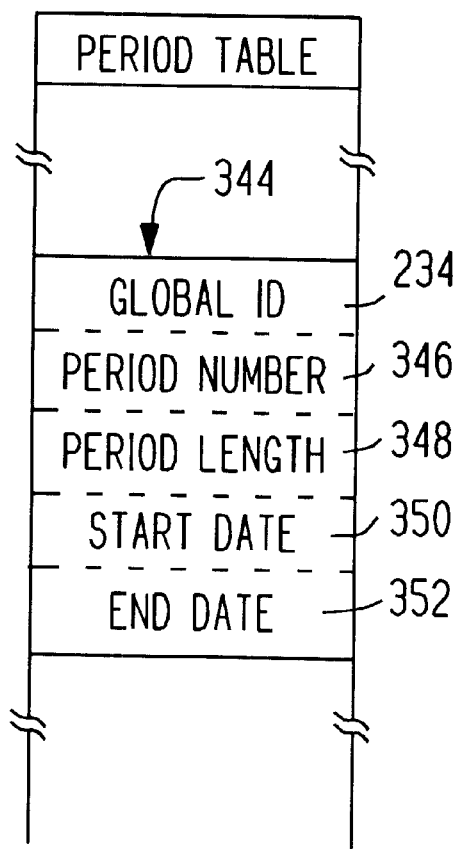
FIG. 10 is a diagrammatic illustration of a period table stored and employed in the network of FIG. 1 for defining different time periods to which the child and class records pertain.

The periods over which observations are maintained can be set up and stored in the period table of FIG. 10. Each period record 344 includes a period number, the period length 348 in days, the start date 350 of the period, and the end date 352 of the period.

Figure 11:
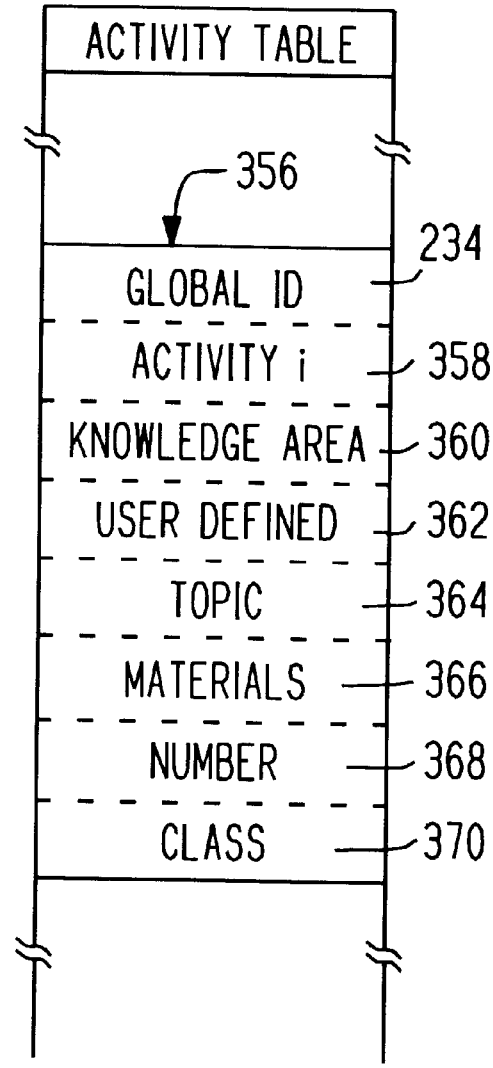
FIG. 11 is a diagrammatic illustration of an activity table stored and employed in the network of FIG. 1 listing various learning activities which can be employed to teach the students.

Various libraries or files of activities for assisting the teachers can be created and maintained in the database. One such activity table is shown in FIG. 11 (also known as LessonPlanActivity list) wherein each record 356 includes the name 358 of the activity, the knowledge area 360 to which the activity relates, an indication 362 whether the record is a system record or one created by a teacher, a topic 364 of the activity, a list of material 366 used in the activity, a number 368 identifying the activity, and a class identification 370 if the activity was created for a particular class. Each record 356 can include a KnowledgeAreaGlobalID (not shown) identifying the knowledge area to which the activity relates.

The database can include many other tables in addition to those illustrated in FIGS. 1–11 to record information about an agency name, centers in the agency, address, phone numbers and other standard information. Additionally each of the tables of FIGS. 1–11 can include various ID numbers for identification and cross identification of records, dates of modification, and other standard information suitable for the particular table. Additional fields that can be included in each record of the database are conventional Generation, HighGeneration and Available to Transfer fields which are useful to ensure accurate data aggregation. Combining data from various classes, centers, agencies and databases is useful for analysis of class, center, agency and regional instructional achievement and problems.

System Program

Figure 12:
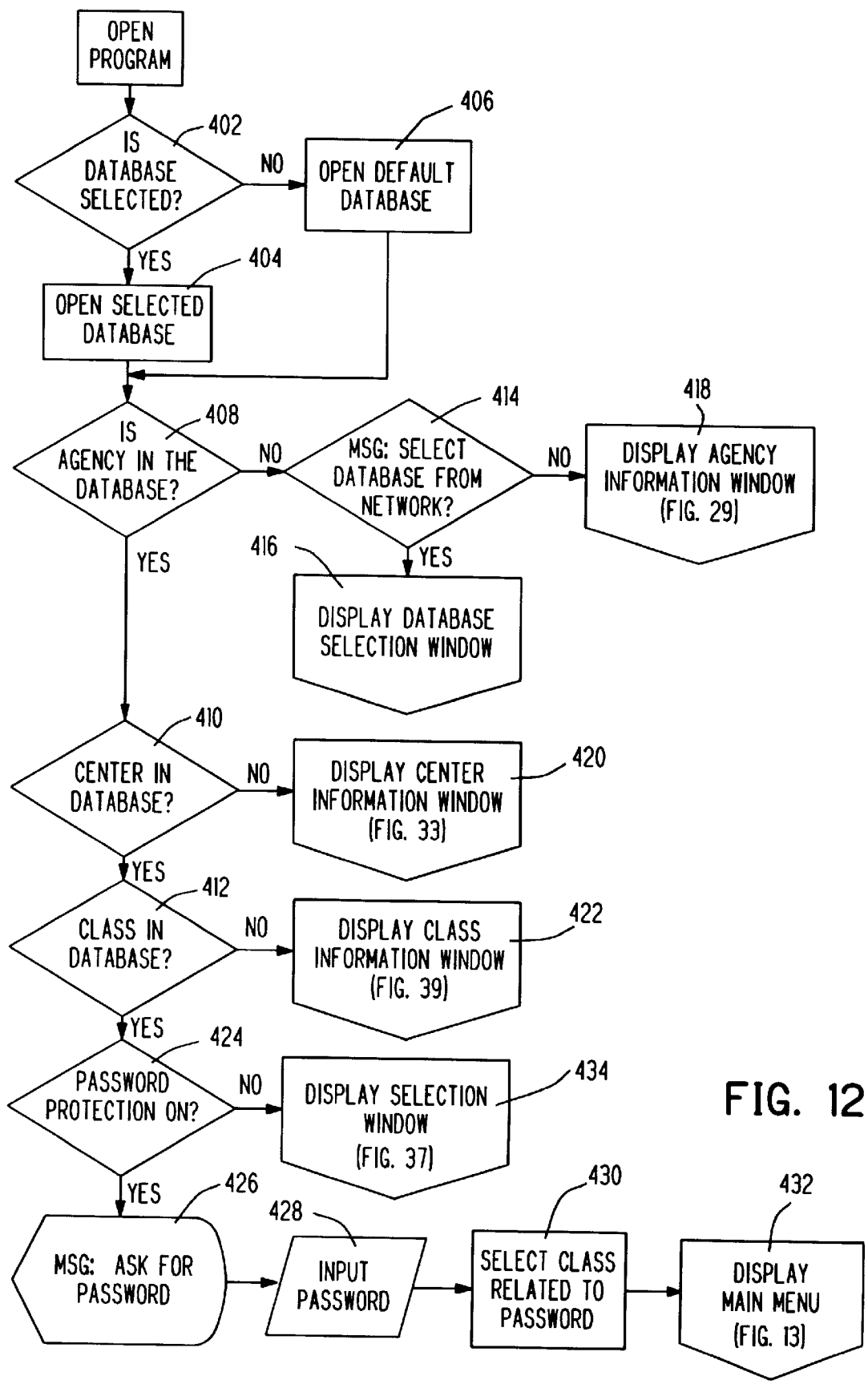
FIG. 12 is a flow diagram of an initial startup procedure in the program controlling each computer station in the network of FIG. 1.

The instructional management system is controlled by a program which is illustrated by the procedures and associated windows of FIGS. 12 through 160. One embodiment of the program was designed for use with computers employing WINDOWS95, WINDOWS98 or WINDOWSNT and the following description and associated drawings are directed to that embodiment, but the program can be readily modified or adapted to run on a variety of different computer systems.

Figure 39:
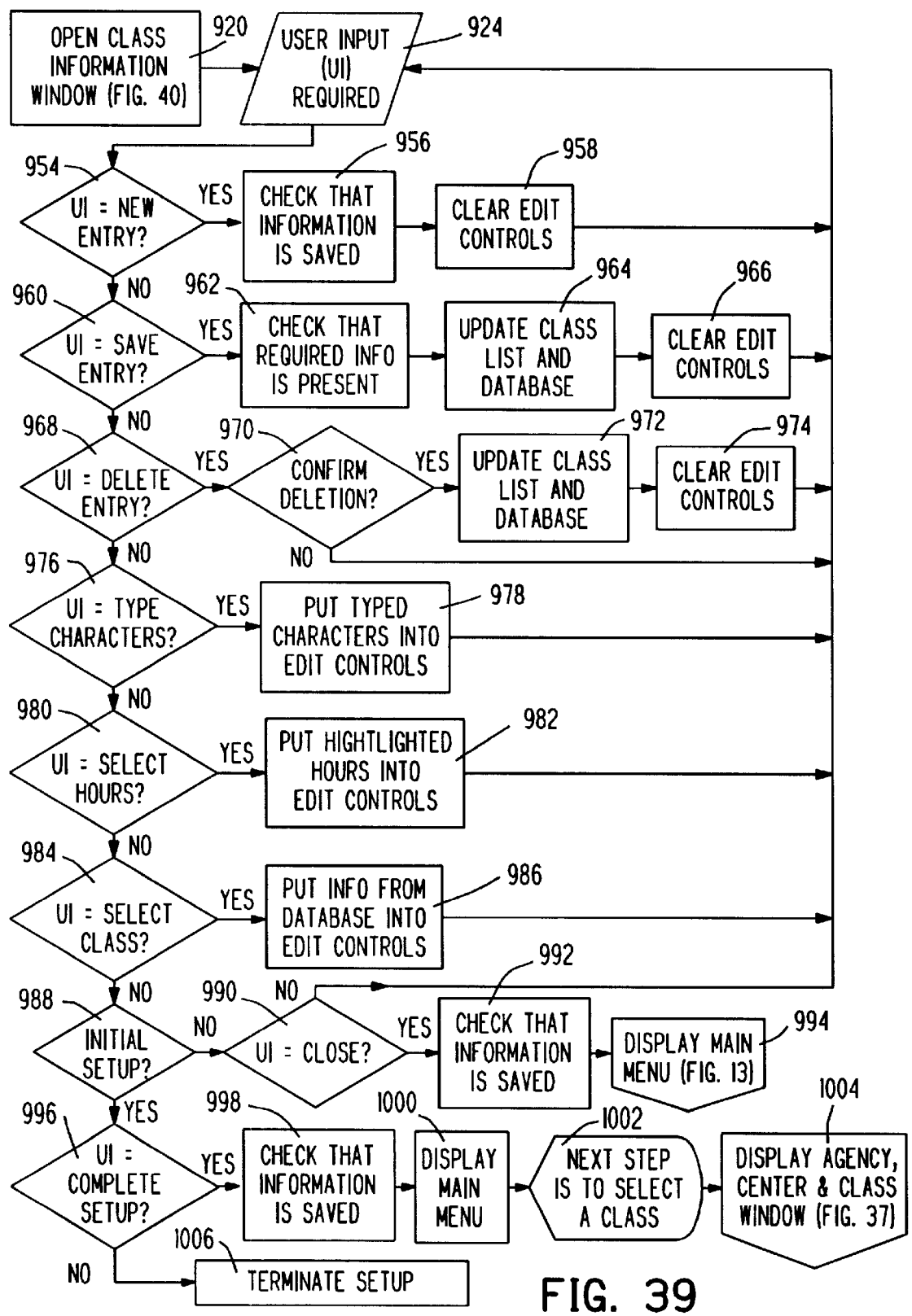
FIG. 39 is a flow diagram of an open class information procedure in the instructional management system program.

The initial startup procedure in FIG. 12 begins by determining if a database has been selected in step 402. If true the selected database is opened in step 404, and if not, a default database is opened in step 406. After a database has been opened, the procedure determines if the database contains data on an agency (step 408), a center (step 410) and a class (412). The database must contain information on all three. If agency information is missing, the operator indicates if the database is on the network in step 414, and if true, a database stored in a network resource is selected in step 416 by a conventional procedure (not shown herein). If step 414 is false, the procedure calls the agency information procedure (step 418) of FIG. 29 where agency information is entered by the operator. Similarly if the database does not contain center information or class information, the respective center information procedure (step 420) of FIG. 33 and class information procedure (step 422) of FIG. 39 are called for the operator to enter center information and class information. After initial setup of agency, center and class information, the steps 408, 410 and 412 are normally true and the program proceeds directly to step 424 where it is determined if the program has password protection turned on to prevent unauthorized personnel from accessing the system. If so, then in step 426 the password is requested and the password is entered in step 428. After password approval, the corresponding class is selected in step 430, when the password corresponds only to one class, and the program proceeds to the main procedure in FIG. 13. Various password levels, such as center, agency and system, can be assigned to allow varying scope of access. For example a system administrator with a system level password can access all files on the system whereas agency and center level passwords allow access only to agency files and center files, respectively. When password protection is off, the procedure branches to step 434 which calls the selection procedure of FIG. 37.

Figure 13:
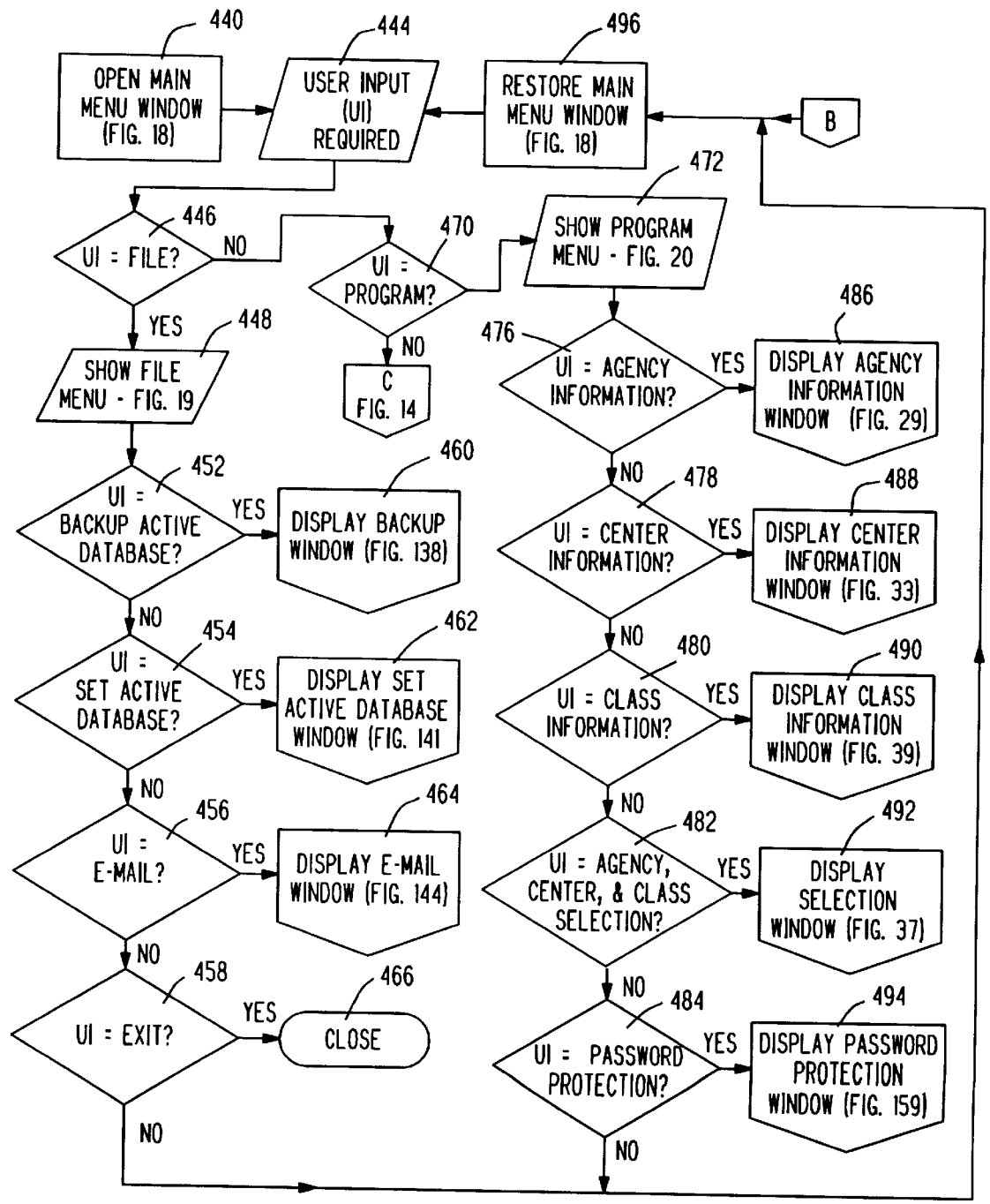
FIG. 13 is a flow diagram of a first portion of a main procedure in the program controlling the computer stations in the instructional management system.
Figure 18:
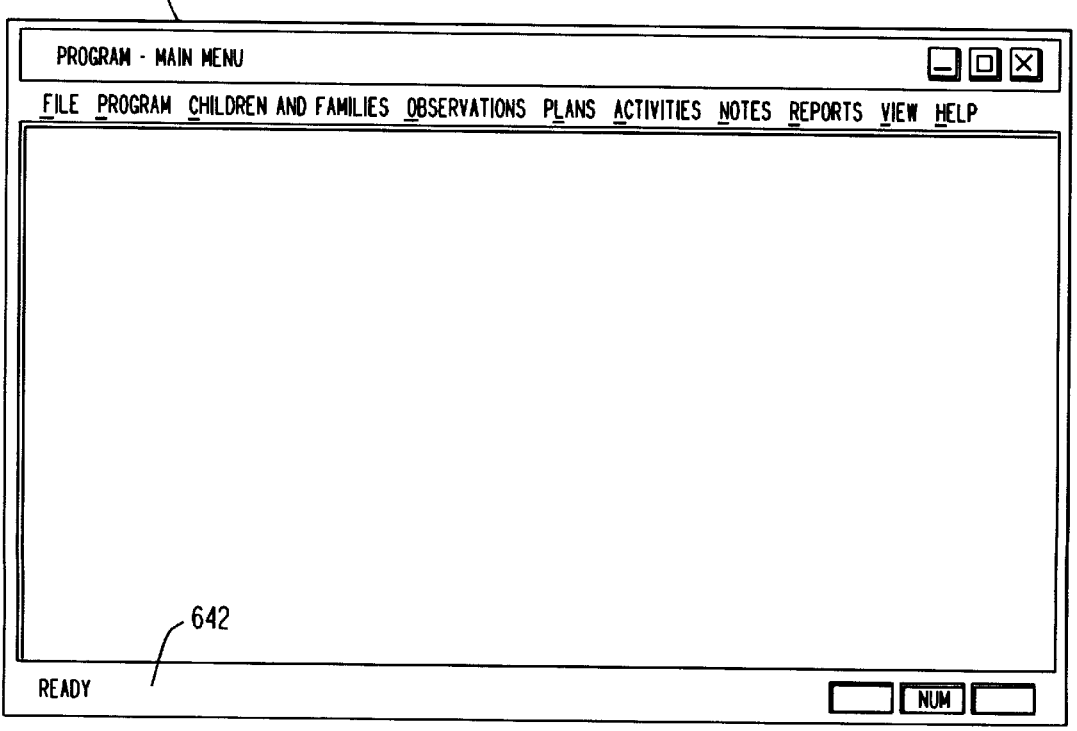
FIG. 18 is an illustration of a window displayed on a computer monitor during operation of the main procedure of FIGS. 13–17.

In the main menu procedure beginning at step 440 of FIG. 13, the main menu window 442 shown in FIG. 18 is displayed on the monitor and set up for user input in step 444. This window contains a menu bar with the items "file", "program", "children and families", "observations", "plans", "activities", "notes", "reports", "view" and "help" any one of which can be selected by being clicked with a mouse arrow or by pressing the key corresponding to the underlined character of the item while the "Alt" key is depressed. It is noted that hereinafter the verb "select" is often used in one of its various forms to describe user input to call or request a desired function or to select a particular item or person. Such selection can often be made by any one of a variety of methods including clicking (moving a mouse arrow onto a displayed name, button, icon, or other item and pressing the mouse key), keyboard entry (pressing a key corresponding to an underlined letter in a name or title while an "Alt" or "Ctrl" key is depressed, pressing a function key designated for the function or item, or some other combination of keys), pressing the enter key to select a highlighted or otherwise emphasized item or function, or any other conventional manner. Often for brevity only one selection method, such as clicking, is described, but it is understood that selection of a particular item or procedure can often be made by any one of a plurality of methods and that description of selection by one method is meant to include selection by any other conventional selection method.

Figure 19:
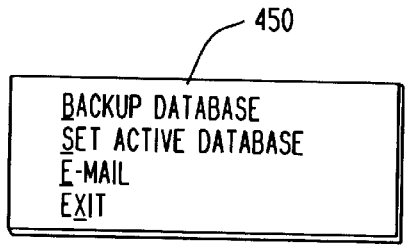
FIG. 19 is an illustration of a file pop-up menu displayed in the main procedure window.
Figure 20:
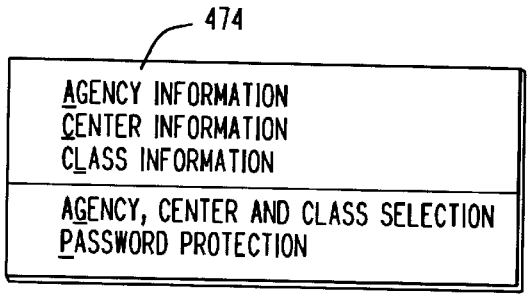
FIG. 20 is an illustration of a program pop-up menu displayed in the main procedure window.

If the file menu is found selected in step 446, the show file menu step 448 causes the file pop-up menu 450, FIG. 19, to be displayed. Any one of the items listed in the file menu 450 can be selected by clicking the mouse arrow or by pressing the corresponding underlined key while the alt key is depressed for rendering the corresponding step 452 (backup database), 454 (set active database), 456 (e-mail) or 458 (exit) true to call the respective procedure 460 (display backup window—FIG. 138), 462 (display active database window—FIG. 141), 464 (display e-mail window—FIG. 144) or 466 (close). The close procedure appropriately closes any open files, terminates operation of the instructional management system program and returns display to a previous window such as the WINDOWS desktop. If step 470 determines that "program" has been selected in the main menu window 442, then step 472 displays the program menu 474, FIG. 20. Selection of one of the program menu items "agency information", "center information", "class information", "agency, center and class selection" and "password protection" is detected in the corresponding step 476, 478, 480, 482 or 484 to call the respective procedure 486 (display agency information—FIG. 29), 488 (display center information—FIG. 33), 490 (display class information—FIG. 39), 492 (display selection window—FIG. 37) or 494 (display password protection window—FIG. 159).

Figure 14:
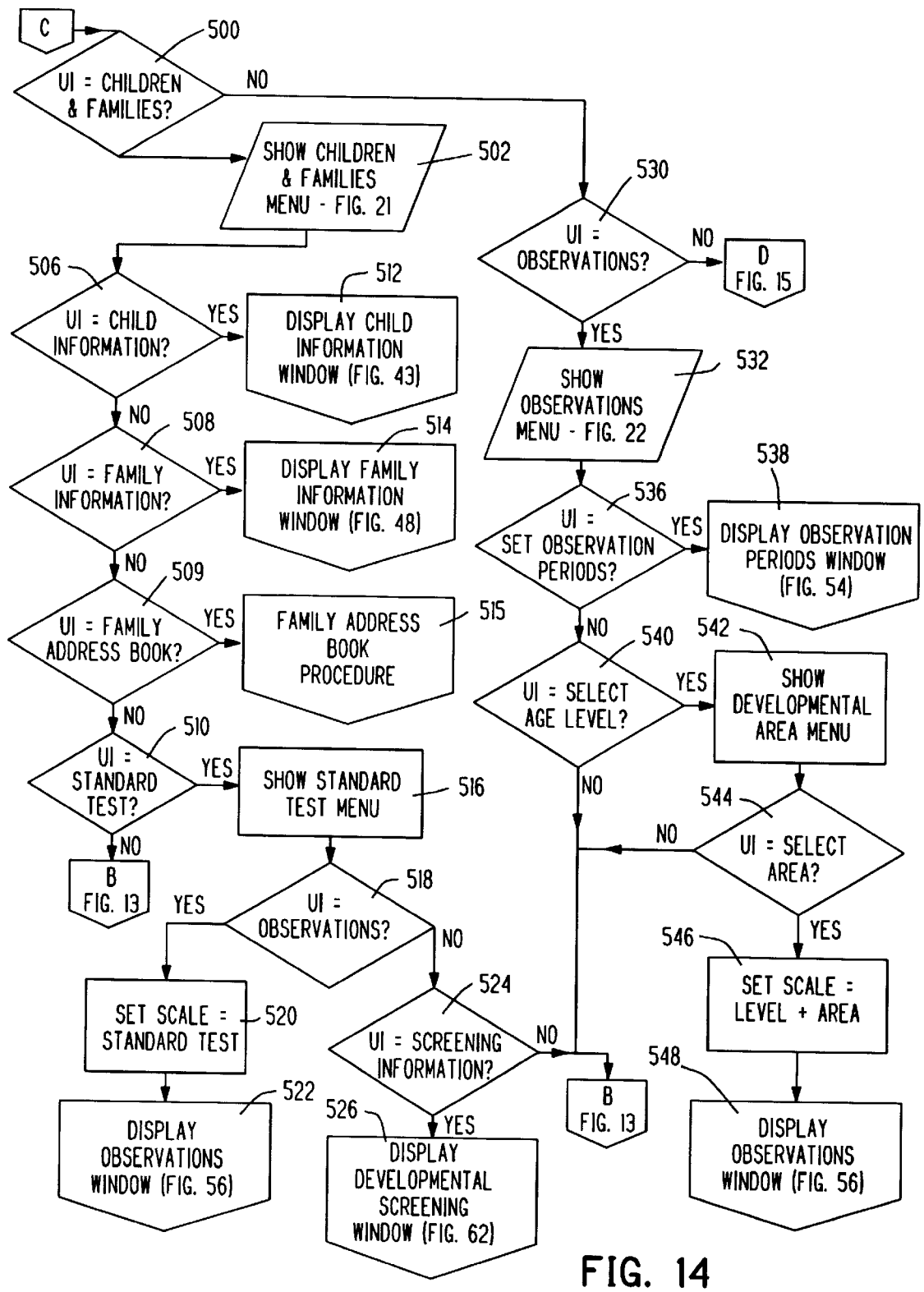
FIG. 14 is a flow diagram of a second portion of the main procedure in the program controlling the computer stations.
Figure 21:
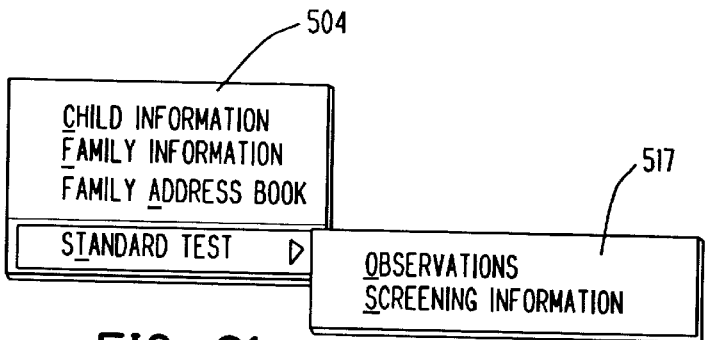
FIG. 21 is an illustration of a children and family pop-up menu displayed in the main procedure window.

When the program menu item "children & families" is selected, the procedure at step 500 in FIG. 14 branches to step 502 to display the children and families menu 504, FIG. 21, which contains the items "child information", "family information", "family address book" and "standard test". Selection of one of these items is detected in the corresponding steps 506, 508, 509 and 510 to branch to the respective procedure 512 (display child information—FIG. 43), 514 (display family information—FIG. 48), 515 (address book procedure—not shown) or 516 (show standard test submenu 517—FIG. 21). The address book procedure is a conventional procedure for entering, editing and printing addresses and phone numbers of selected family members in the list created by the display family information procedure of FIG. 48 including printing address labels. The standard test submenu 517 contains the items "observations" and "screening information". When selection of observations is found in step 518, the observations scale is set to standard test in step 520 and the procedure 522 (display observations window—FIG. 56) is called. When screen information is selected in step 524, the procedure 524 (display developmental screening—FIG. 62) is called.

Figure 22:
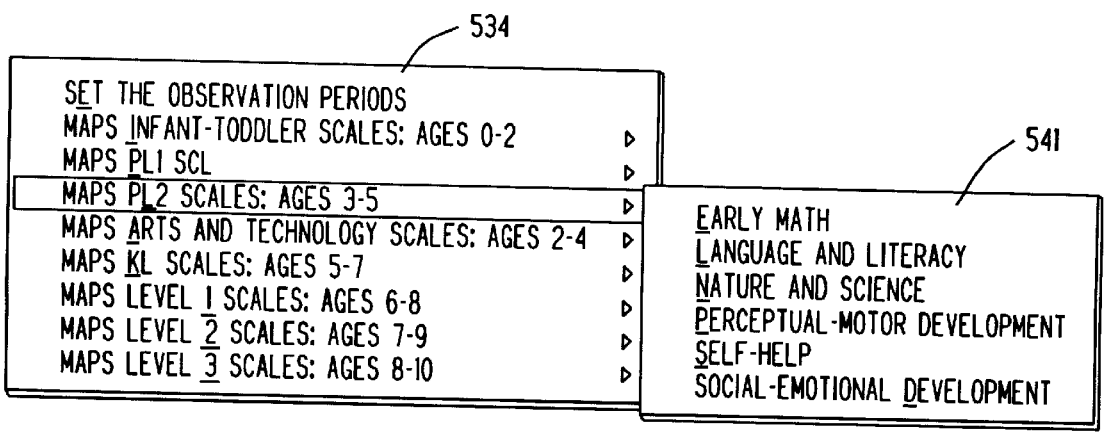
FIG. 22 is an illustration of an observations pop-up menu displayed in the main procedure window.

Selection of observations in step 530 results in step 532 displaying the observations menu 534 of FIG. 22 which contains the item "set observations periods" along with a listing of available developmental (age) levels. Selection of the set observations periods item at step 536 results in step 538 calling the display observation periods window procedure of FIG. 54 while selection at step 540 of one of the age levels in the menu 534 causes display of a list 541, FIG. 22, of the developmental areas for the selected age level at step 540. Upon selection of the desired developmental area in step 544, the scale is set to the selected level and area in step 546 and the display observations procedure of FIG. 56 is called in step 548.

Figure 15:
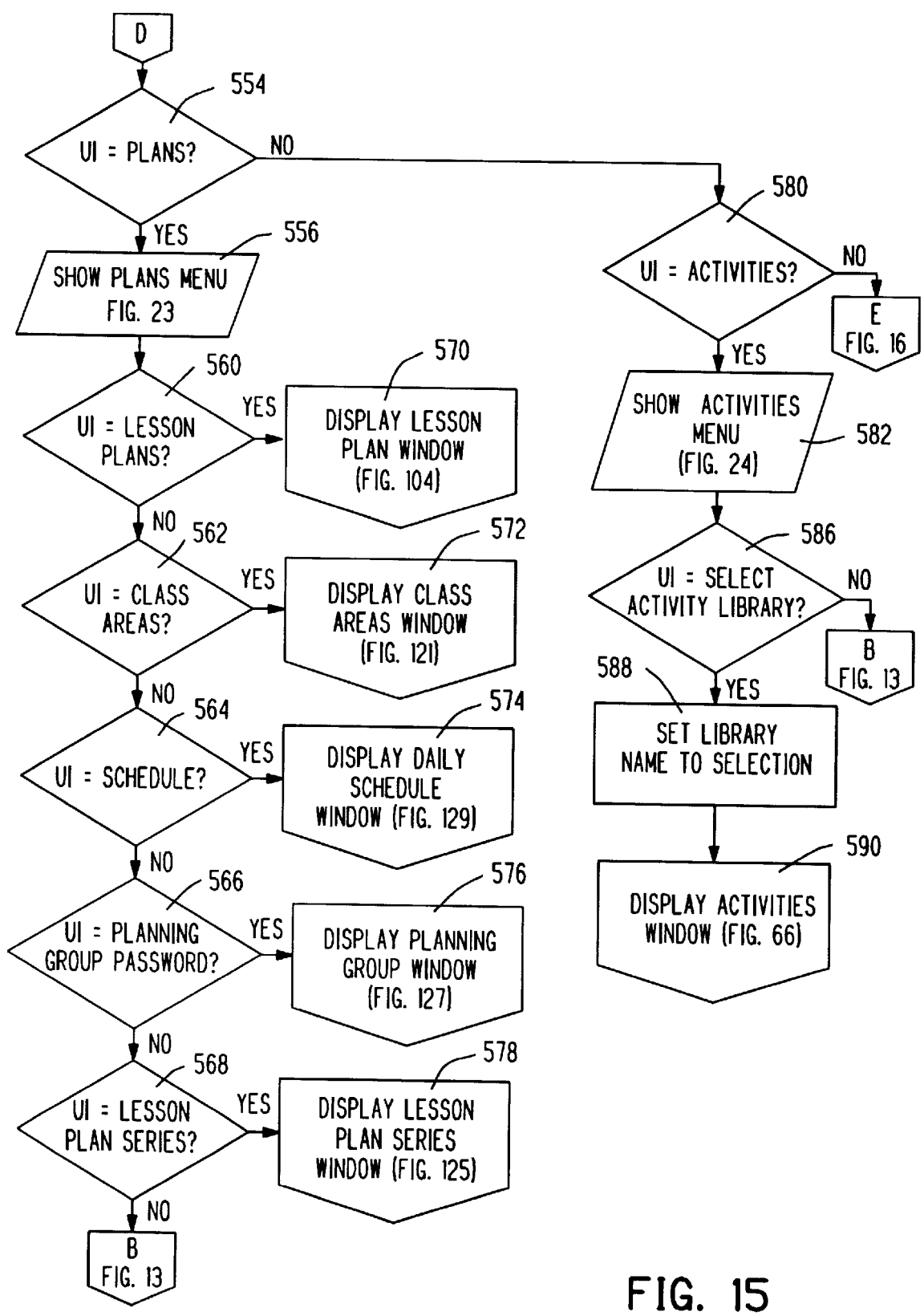
FIG. 15 is a flow diagram of a third portion of the main procedure in the program controlling the computer stations.
Figure 23:
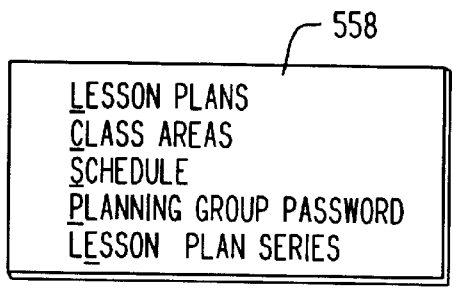
FIG. 23 is an illustration of a plans pop-up menu displayed in the main procedure window.
Figure 24:
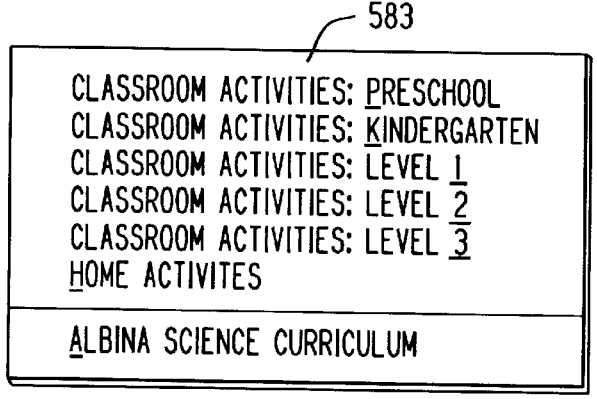
FIG. 24 is an illustration of an activities pop-up menu displayed in the main procedure window.
Figure 66:
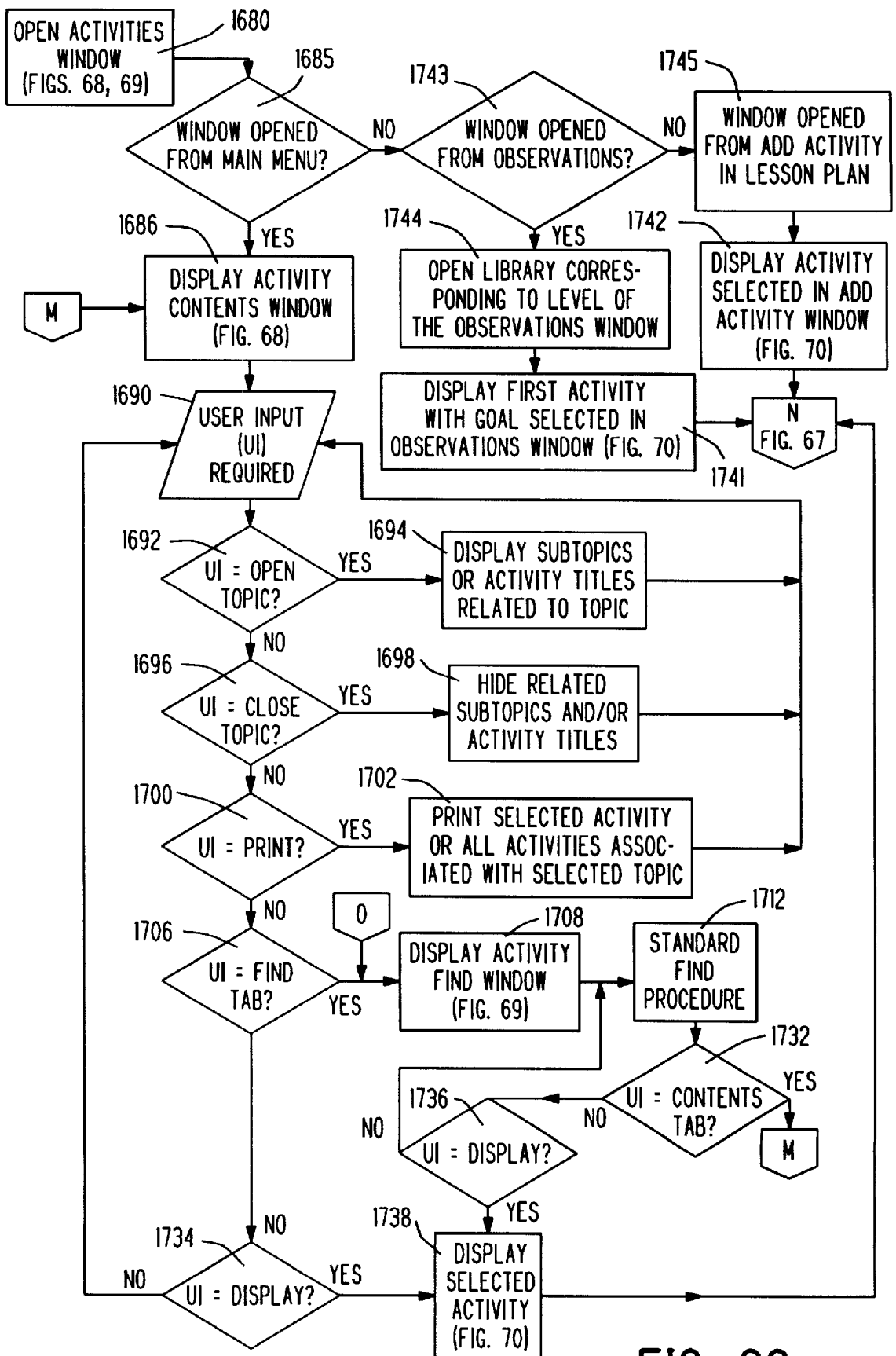
FIG. 66 is a flow diagram of a first portion of an open activities procedure in the instructional management system program.

In FIG. 15, selection of plans in step 554 results in step 556 displaying the plans menu 558 of FIG. 23 which contains the items "lesson plans", "class areas", "schedule", "planning group password" and "lesson plan series". Selection of one of these items in the corresponding steps 560, 562, 564, 566 and 568 calls the respective procedure 570 (display plan window—FIG. 104), 572 (display class areas window—FIG. 121), 574 (display daily schedule—FIG. 129), 576 (display planning group window—FIG. 127) or 578 (display lesson plan series window—FIG. 125). At step 580, selection of activities results in step 582 displaying a list of activities or activities menu 584 of FIG. 24. Then upon selection of one of the activity library items in step 586, the selected item is set as the library name in step 588 and the display activities window procedure of FIG. 66 is called in step 590.

Figure 16:
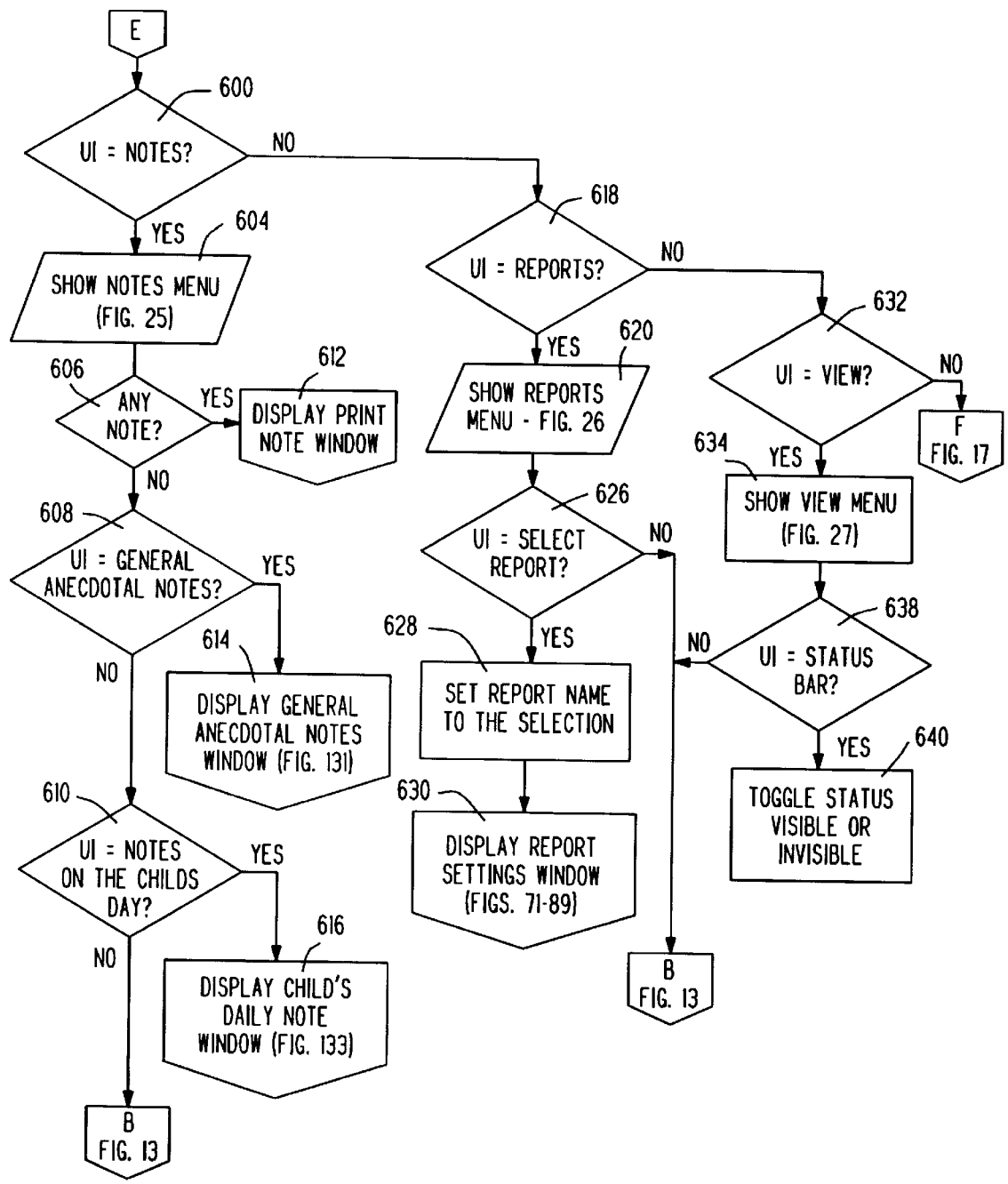
FIG. 16 is a flow diagram of a fourth portion of the main procedure in the program controlling the computer stations.
Figure 25:
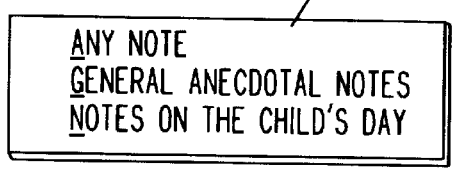
FIG. 25 is an illustration of a notes pop-up menu displayed in the main procedure window.

Selection of "notes" in the main menu of FIG. 18 renders step 600, FIG. 16, true and causes display of the notes menu 602, FIG. 25, in step 604. The notes menu contains the items "any note", "general anecdotal notes" and "notes on the child's day". When one of these items is selected, the corresponding step 606, 608 or 610 calls the respective procedure 612 (display any note window—not shown), 614 (display general anecdotal notes window—FIG. 131) or 616 (display child's daily not window—FIG. 133). The any note procedure is a conventional note writing procedure with appropriate windows for addressing and prepare notes to send to parents, school personnel, or other people. When "reports" is selected in the main menu, step 618 branches to step 620 to display the reports menu 622 of FIG. 26 which contains a list of type reports, such as "development profiles", "development summaries", "progress reports", "screen report and IDP", "individual learning plan" and "individual observation record". Each of the "development profiles", "development summaries" and "progress reports" are further broken down in a corresponding submenu such as submenu 624 dividing the profiles into "agency profile", "center profile", "class profile" and "individual profile". When one of the items in menu 622 or submenu 624 is selected, the program in step 626 branches to step 628 where the corresponding report name is set and the display report settings window step 630 calls the display report settings procedure of FIG. 71 along with the corresponding report name procedure of FIGS. 72–89. Selection of "view" in the main menu at step 632 results in step 634 displaying the pop-up status menu 636, FIG. 27. Clicking on "status bar" in the menu 636 result in step 638 proceeding to step 640 where the checkmark is toggled on and off to indicates whether the status bar 642, FIG. 18, in the main menu 442 is displayed or not displayed.

Figure 17:
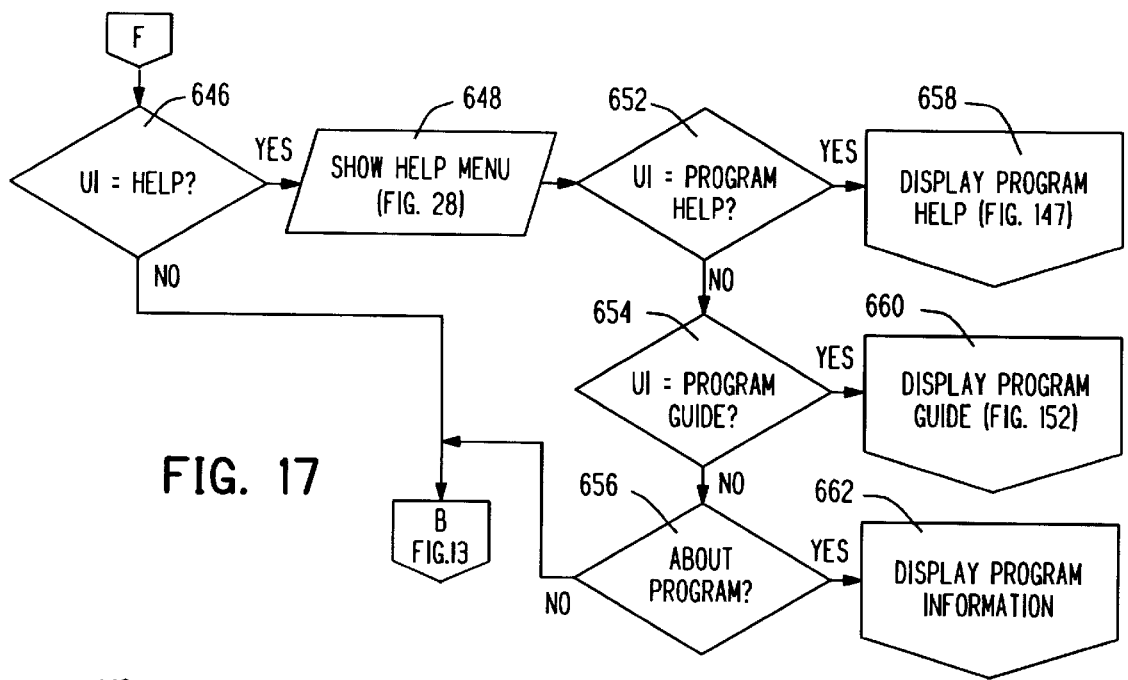
FIG. 17 is a flow diagram of a fifth portion of the main procedure in the program controlling the computer stations.
Figure 28:
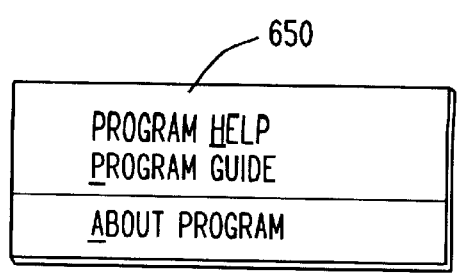
FIG. 28 is an illustration of a help pop-up menu displayed in the main procedure window.

In FIG. 17, the step 646 is true when "help" is selected in the main menu. Then in step 648 the pop-up help menu 650, FIG. 28, is displayed. This pop-up menu 650 contains items "program help", "program guide" and "about program".

Selection of one of these items results in the corresponding step 652, 654 and 656 calling the respective procedure 658 (display program help—FIG. 147), 660 (display program guide—FIG. 152) or 662 (display program information—not shown). The program information displayed by the procedure 662 is the program version, copyright notice, and other general information.

Figure 29:
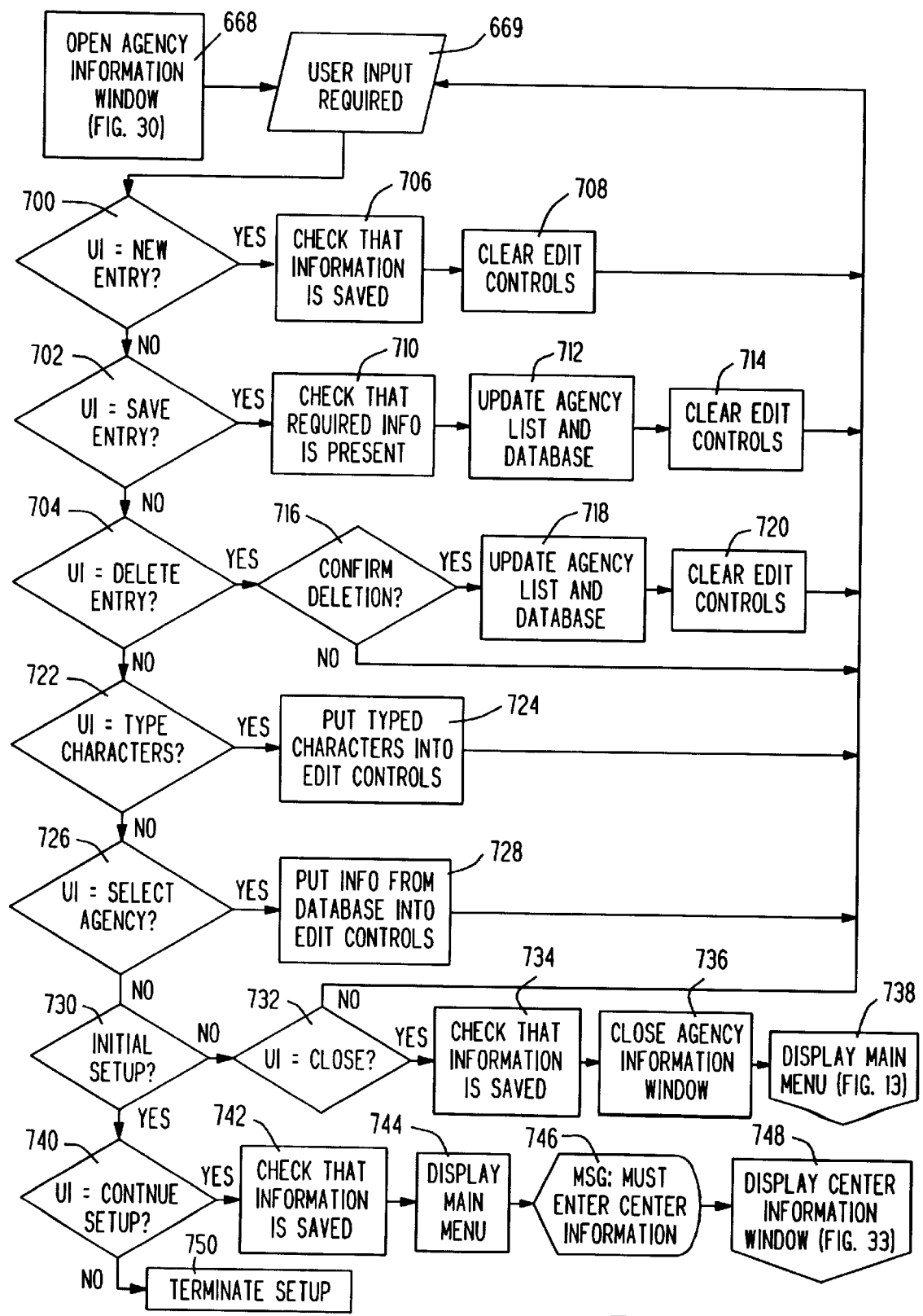
FIG. 29 is a flow diagram of an open agency information procedure in the instructional management system program.
Figure 30:
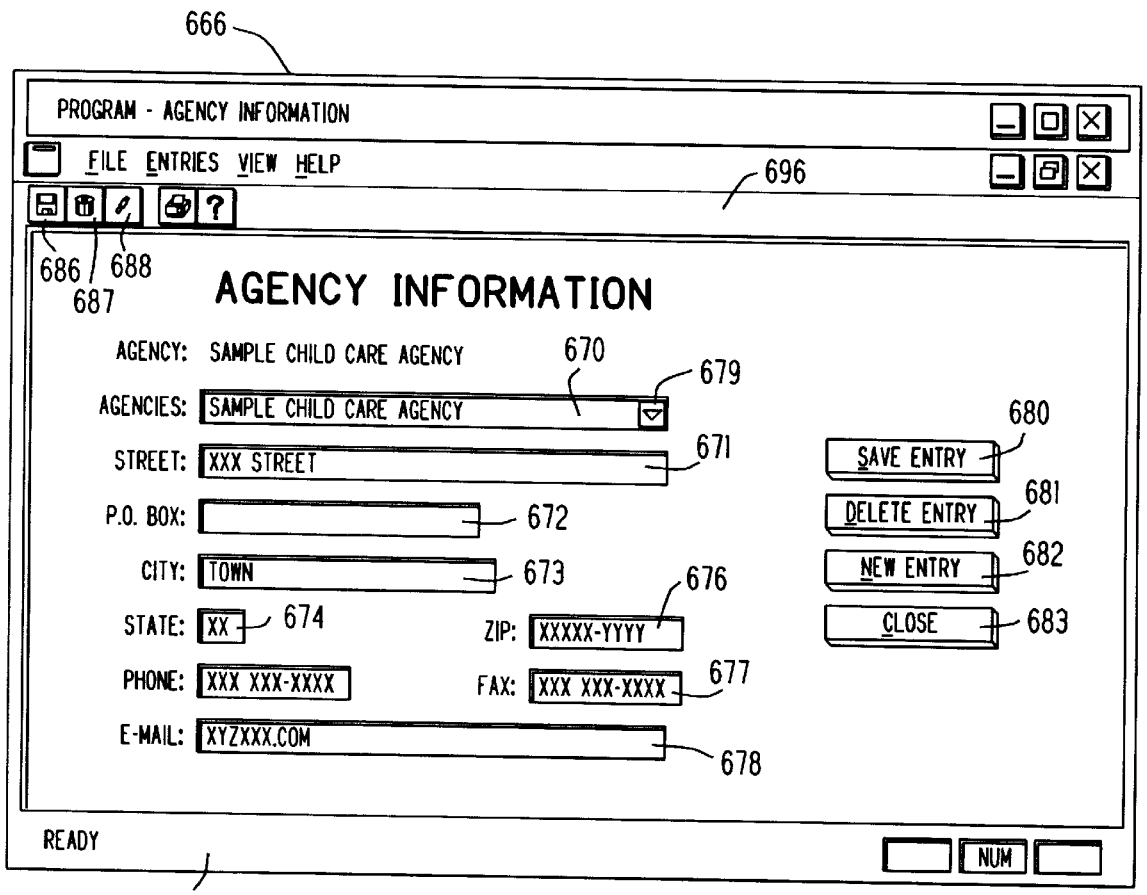
FIG. 30 is an illustration of a window displayed during the open agency information procedure.
Figure 31:
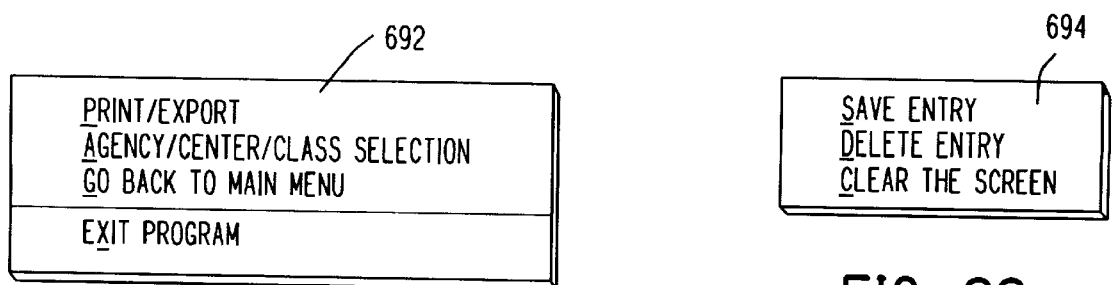
FIG. 31 is an illustration of a file pop-up menu displayed in the open agency information window.
Figure 32:
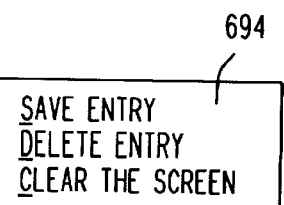
FIG. 32 is an illustration of an entries pop-up menu displayed in the open agency information window.
Figure 37:
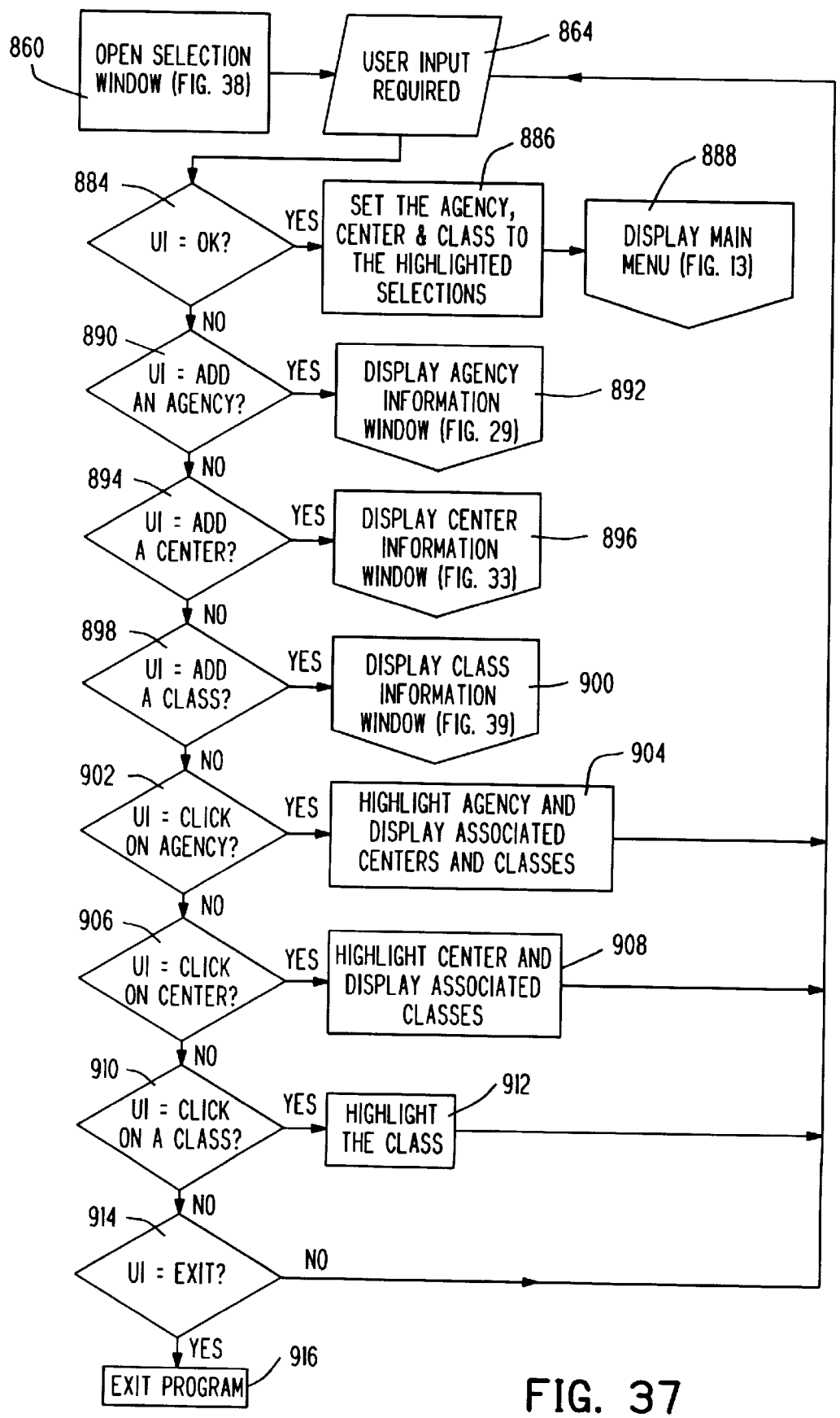
FIG. 37 is a flow diagram of a selection procedure in the education management system program.

The open agency information window procedure of FIG. 29 which is called by step 418 in the startup procedure of FIG. 12, by step 892 in FIG. 37 or by step 486 in the main procedure of FIG. 13 first displays the agency window 666 of FIG. 30 in step 668 and then passes control to user input in step 669. The window 666 includes a number of edit control boxes 670–678 for entering the name, address, phone numbers, and other information of an agency. The edit control 670 for entry of the agency name includes a function button 679 for calling a pop-up list of agency names in the database so the user can select one agency from the list and edit its information which is automatically placed in the edit controls. The user can select one of the buttons 680, 681, 682 or 683 to save the entry, delete the entry, clear (new) the entry or close the window, respectively. Icon buttons 686, 687 and 688 call the same functions as buttons 680, 681 and 682. Additionally the menu bar of the window contains the items "file", "entries", "view" and "help" which can be selected to call corresponding pop-up menus. The file pop-up menu is shown at 692 in FIG. 31 and contains items "print/export", "agency/center/class selection", "go back to main menu" and "exit program". The entries pop-up menu 694 in FIG. 32 has items "same entry", "delete entry" and "clear entry" calling the same functions as the buttons 680, 681 and 682. The view pop-up menu is not shown but contains items to toggle display of the status bar 647 and the tool bar 696. When "new entry", "save entry" or "delete entry" is selected by clicking on the corresponding button or menu item, the respective step 700, 702 or 704 in FIG. 29 is true. Upon new entry, step 706 checks that the information in the edit controls has been saved and then step 708 clears the edit controls so that the user can enter information about a new agency. Upon save entry, step 710 checks that the required information has been entered, step 712 updates the agency list and database, and step 714 clears the edit controls. Upon delete entry, step 716 requires confirmation that the user wishes to delete the agency information, step 718 updates the agency list and database, and step 720 clears the edit controls. Steps 722 and 724 indicate that user input includes characters which are typed into the edit controls. Step 726 is true when the user selects an agency listed in the pop-up list called by the button 679 and step 728 places the database information corresponding to the selected agency into the appropriate edit controls. When the agency information procedure is not called by the initial setup procedure, step 730 is false and the program proceeds to step 732 where the selection of close is determined. Selecting close results in step 734 checking that the information has been saved, step 736 closing the agency window of FIG. 30 and step 738 returning to the display main menu procedure of FIG. 13. When step 730 finds that the agency information procedure was called by the setup procedure, the user is given the opportunity to continue setup in step 740 which results in saving of information, if not previously saved, in step 742, displaying the main menu window in step 744 with a message produced by step 746, and then by step 748 proceeding to the display center information window procedure of FIG. 33. If the user declines to continue setup in step 740, the program terminates the setup procedure to return to the WINDOWS desk top in step 750. Selecting print/export in the file menu 692 calls a conventional program for print out, or saving to another file, agency information in the database. Selecting agency/center/class selection in the file menu 692 calls the open selection window procedure of FIG. 37.

Figure 33:
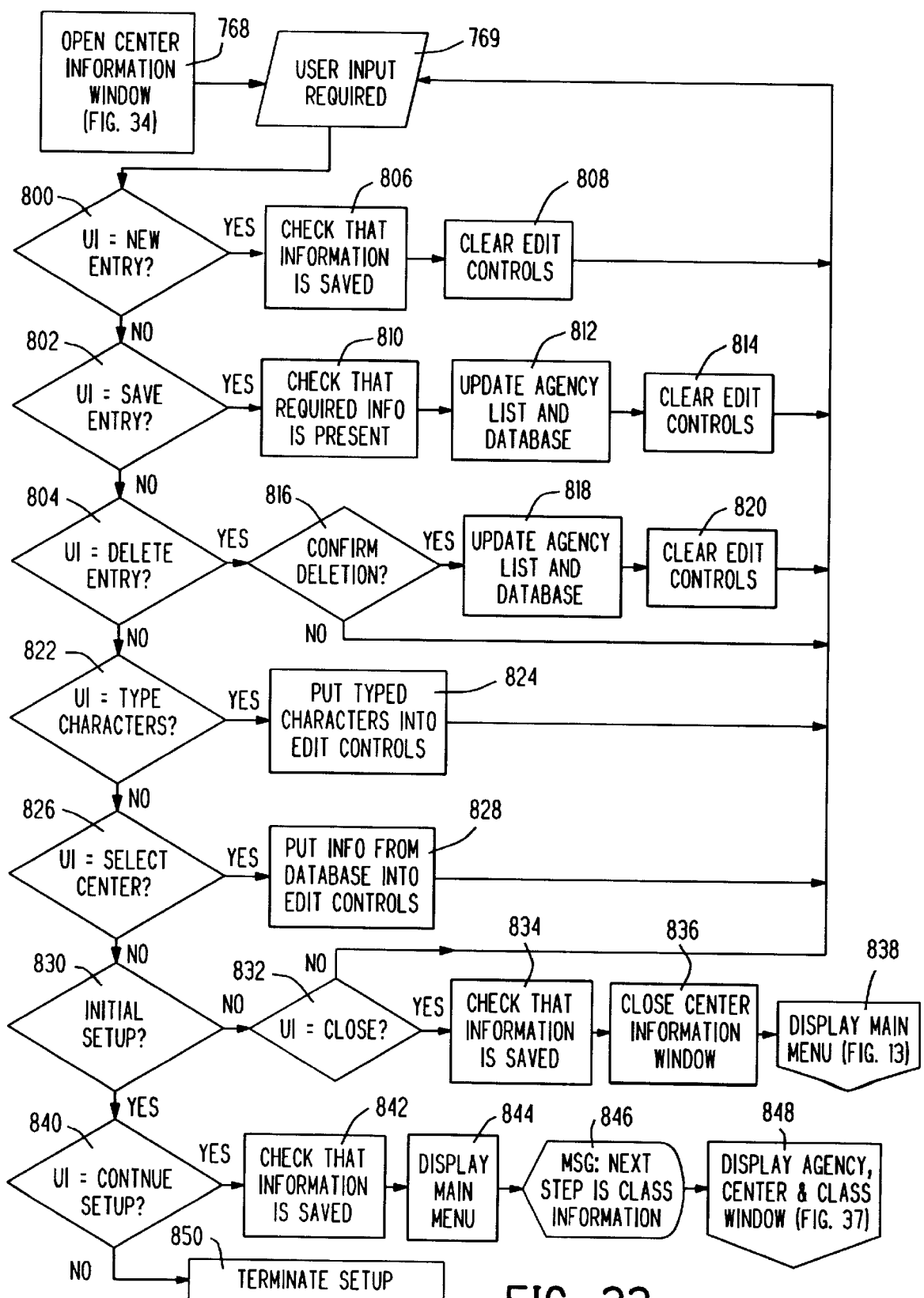
FIG. 33 is a flow diagram of an open center information procedure in the instructional management system program.

The open center information window procedure of FIG. 33 which is called by step 420 in the startup procedure of FIG. 12, by step 896 in the selection procedure of FIG. 37 or by step 488 in the main procedure of FIG. 13 first displays the center information window 766 of FIG. 34 in step 768 and then passes control to user input in step 769. The window 766 includes an number of edit control boxes 770–778 for entering the name, address, phone numbers, and other information of an center. The edit control 770 for entry of the center name includes a function button 779 for calling a pop-up list of center names in the database so the user can select one center from the list and edit its information which is automatically placed in the edit controls. The user can select one of the buttons 780, 781, 782 or 783 to save the entry, delete the entry, clear (new) the entry or close the window, respectively. Icon buttons 786, 787 and 788 call the same functions as buttons 780, 781 and 782. Additionally the menu bar of the window contains the items "file", "entries", "view" and "help" which can be selected to call corresponding pop-up menus. The file pop-up menu is shown at 792 in FIG. 35 and contains items "print/export", "agency/center/class selection", "go back to main menu" and "exit program". The entries pop-up menu 794 in FIG. 36 has items "same entry", "delete entry" and "clear entry" calling the same functions as the buttons 780, 781 and 782. The view pop-up menu is not shown but contains items to toggle display of the status bar 642 and the tool bar 796. When "new entry", "save entry" or "delete entry" is selected by clicking on the corresponding button or menu item, the respective step 800, 802 or 804 in FIG. 33 is true. Upon new entry, step 806 checks that the information in the edit controls has been saved and then step 808 clears the edit controls so that the user can enter information about a new center. Upon save entry, step 810 checks that the required information has been entered, step 812 updates the center list and database, and step 814 clears the edit controls. Upon delete entry, step 816 requires confirmation that the user wishes to delete the center information, step 818 updates the agency list and database, and step 820 clears the edit controls. Steps 822 and 824 indicate that user input includes characters which are typed into the edit controls. Step 726 is true when the user selects center listed in the pop-up list called by the button 779 and step 828 places the database information corresponding to the selected center into the appropriate edit controls. When the center information procedure is not called by the initial setup procedure, step 830 is false and the program proceeds to step 832 where the selection of close is determined. Selecting close results in step 834 checking that the information has been saved, step 836 closing the center window of FIG. 34 and step 838 returning to the display main menu procedure of FIG. 13. When step 830 finds that the center information procedure was called by the setup procedure, the user is given the opportunity to continue setup in step 840 which results in saving of information, if not previously saved, in step 842, displaying the main menu window in step 844 with a message produced by step 846, and then by step 848 proceeding to the display agency/center/class selection window procedure of FIG. 37. If the user declines to continue setup in step 840, the program terminates the setup procedure to return to the WINDOWS desk top in step 850. Selecting print/export in the file menu 792 calls a conventional program for print out, or saving to another file, center information in the database. Selecting agency/center/class selection in the file menu 792 calls the open selection window procedure of FIG. 37.

Figure 38:
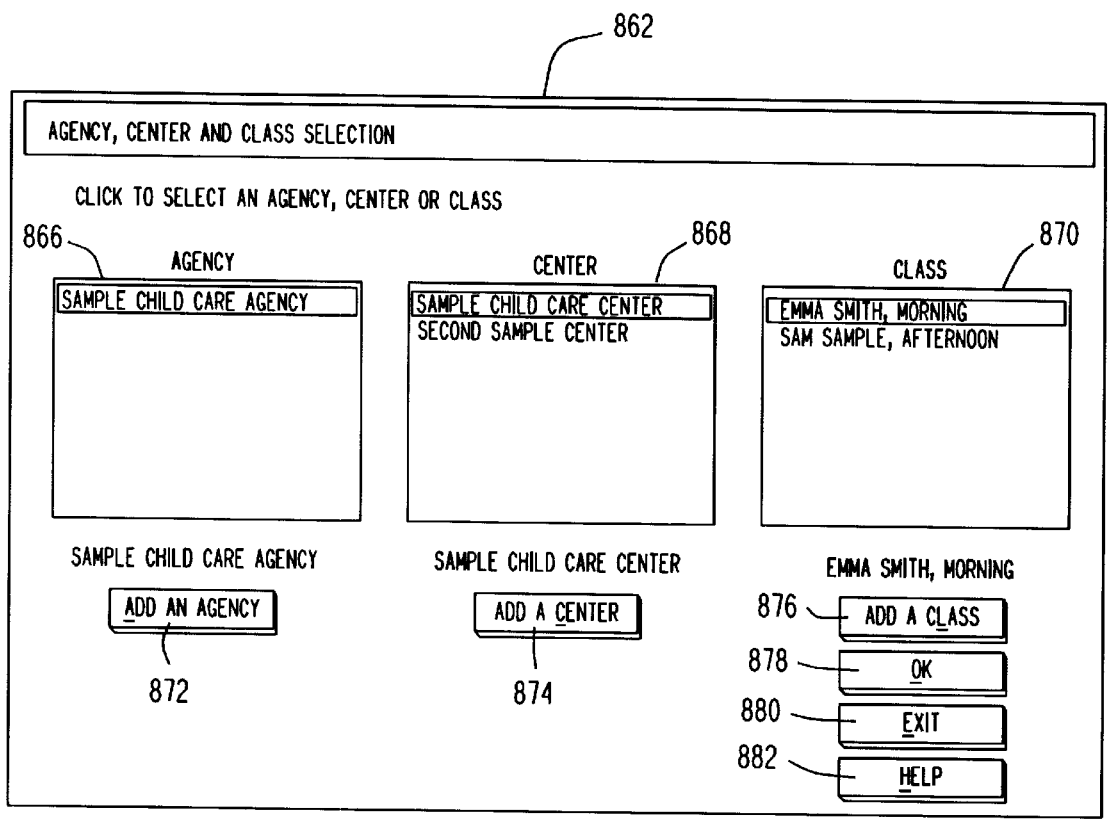
FIG. 38 is an illustration of a window displayed during the selection procedure.

In the agency/center/class selection procedure of FIG. 37, step 860 displays the agency, center and class selection window 862 of FIG. 38 and then allows user input in step 864. The window 862 contains an agency list box 866, center list box 868 and class list box 870. A list of the agencies in the database is automatically placed in the agency box 866 with the last selected agency highlighted. A list of the centers in the database corresponding to the highlighted agency is automatically placed in the center box 868 with the last selected center highlighted. A list of the classes in the highlighted center is automatically placed in the class box 870 with the last class selected by the user being highlighted. The highlighted agency, center or class can be changed by clicking on another agency, center or class in the corresponding list. The window 862 also contains an add an agency button 872, an add a center button 874, an add a class button 876, and an OK button 878, an exit button 880 and a help button 882. Selecting the OK button 878 renders step 884 true whereupon step 886 sets the highlighted agency, center and class as the selected items, and step 888 proceeds to the display main menu procedure of FIG. 13. When the add an agency button 874 is selected, step 890 is true resulting in the display agency information window procedure of FIG. 29 being called in step 892. Similarly the selection of the add a center button 874 causes step 894 to branch to step 896 where the display center information window procedure of FIG. 33 is called. Selection of the add a class button 876 renders step 898 true to call the display class information window procedure of FIG. 39 in step 900. When one of the agencies in the agency list box 866 is clicked, the step 902 proceeds to step 904 where the clicked agency is highlighted, the list of centers in the center list box 868 is changed to the database list corresponding to the newly selected agency with a first center name highlighted, and the list of classes in the class list box 870 is changed to the list of classes in the database corresponding to the highlighted center. Clicking on a center name in the class list box 868 is detected by step 906 to proceed to step 908 where the selected center is highlighted and the list of classes in the class list box 870 is changed to the database class list corresponding to the selected center. In step 910 when the user clicks on a class in class list box 870, the selected class is highlighted in step 912. Selection of the exit button 880 results in step 914 branching to step 916 and exit or termination of the program. The help button 882 calls the help procedure of FIG. 147.

Figure 40:
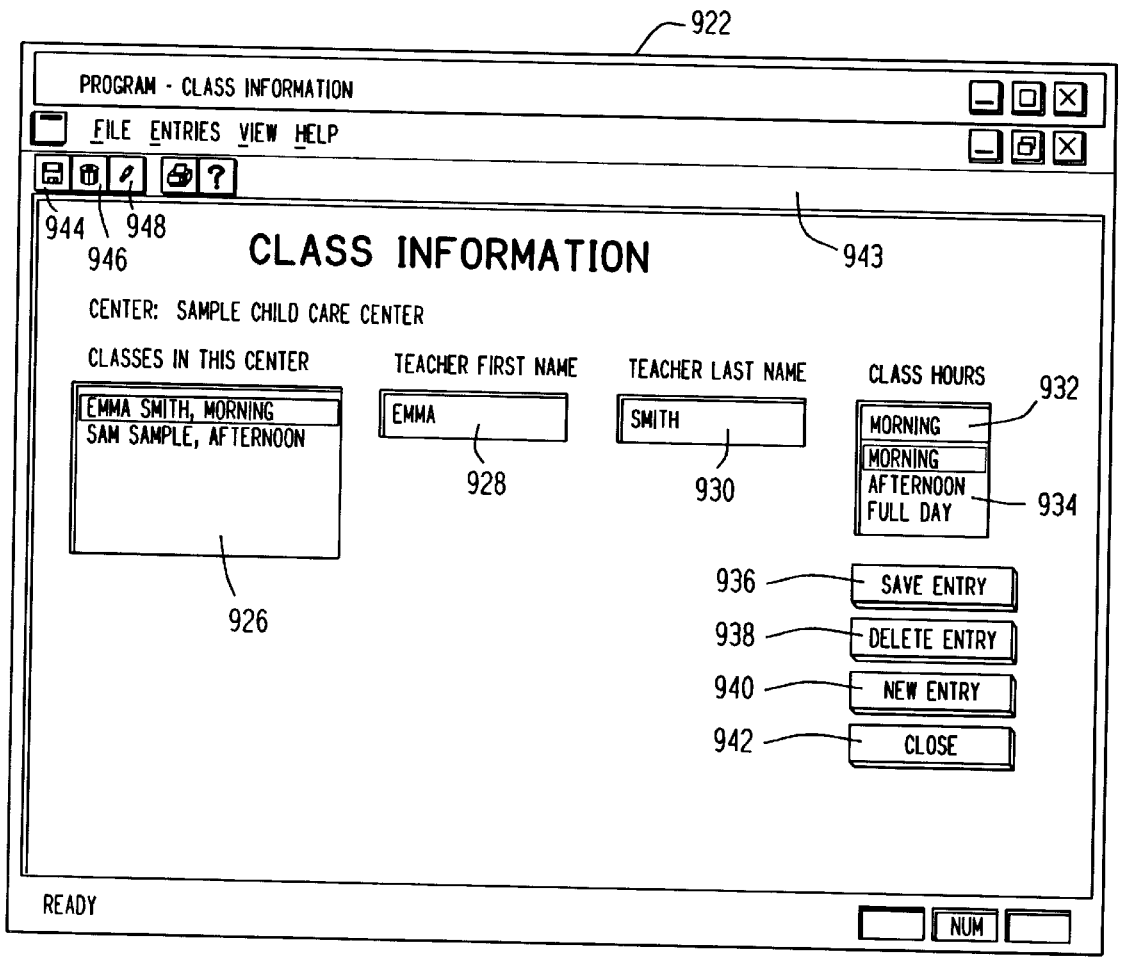
FIG. 40 is an illustration of a window displayed during the open class information procedure.
Figure 41:
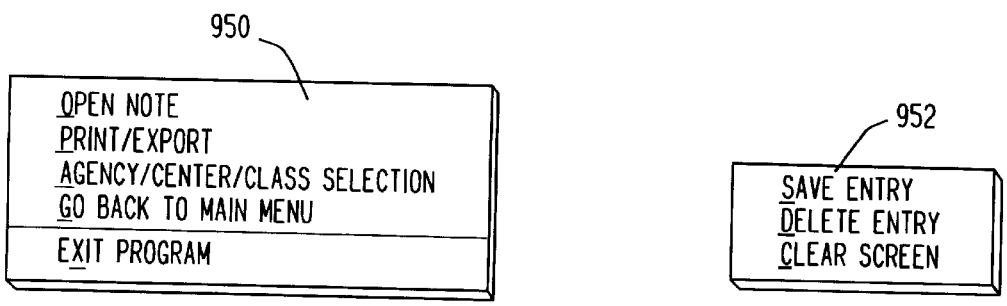
FIG. 41 is an illustration of a file pop-up menu displayed in the open class information window.
Figure 42:
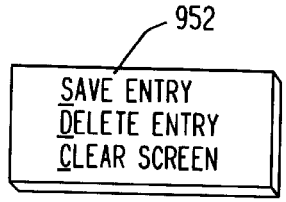
FIG. 42 is an illustration of an entries pop-up menu displayed in the open class information window.

The open class information window procedure of FIG. 39 begins with step 920 where the class information window 922 of FIG. 40 is opened for user input in step 924. The window 922 contains a class list box 926 which contains a list of classes in the previously selected agency and center. Edit control boxes 928 and 93 are provided for editing or typing in the first and last names, respectively, of the teacher of the selected class. A upper class hours box portion 932 receives the selection made of the list of available hour selections in the lower box portion 934, namely, "morning", "afternoon" or "full day". The window also contains a save entry button 936, a delete button 938, a new entry button 940 and a close button 942. Within the tool bar 943, there are provided icon buttons 944, 946 and 948 corresponding to the respective buttons 936, 938 and 940. Also menu items "file", "entries", "view" and "help" are in the menu bar. The file menu 950 is illustrated in FIG. 41 and contains the items "open note" "print/export", "agency/center/class selection", "go back to main menu" and "exit program". The entries menu 952 in FIG. 42 contains items "save entry", "delete entry" and "clear screen" which are the same functions called by the respective buttons 936, 938 and 940. Back in the procedure of FIG. 39, selecting a new entry in step 954 results in the program proceeding to step 956 where a saving of the information is checked and then to step 958 where the edit control boxes 928 and 930 for teacher first and last name are cleared and the highlighting in the class list box 926 is removed. When save entry is selected in step 960, step 962 checks that the required information of teacher names and class hours is present, step 964 updates the class list in box 926 and updates the database with the class information, and step 966 clears the edit control boxes 928 and 930. Clicking on a deletion button or menu item renders step 968 true and branching to step 970 where the user must confirm the deletion. In step 972 the highlighted class in the class list box 926 and corresponding database entries are deleted. Step 974 again clears the edit controls. Steps 976 and 978 indicate that the user is free to enter and edit the first and last names in the boxes 928 and 930. When clicking on a class name in the class list box 926 is sensed in step 984, step 986 puts the information from the database corresponding to the selected class name into the edit control boxes 928, 930 and 932. In step 988 it is determined if the present procedure was called by step 422 of the setup procedure in FIG. 12. If no, then step 990 can detect selection of a close button to proceed to step 992 where a saving of information is insured and to step 994 which calls or returns to the display main menu procedure of FIG. 13. If the program is in an initial setup mode, step 988 branches to step 996 where the user is given the option to complete the setup. If true, step 998 checks that all information is saved in the database, step 1000 displays the main menu of FIG. 18, step 10002 displays a message in the main menu window that the next step is to select a class, and step 1004 proceeds to the display agency, center and class window procedure of FIG. 37. If the user does not wish to continue setup, step 1006 is called to terminate the setup and return to the WINDOWS desktop. Selection of print/export in menu 950 calls a conventional procedure for printing the class information in the window 922.

Figure 43:
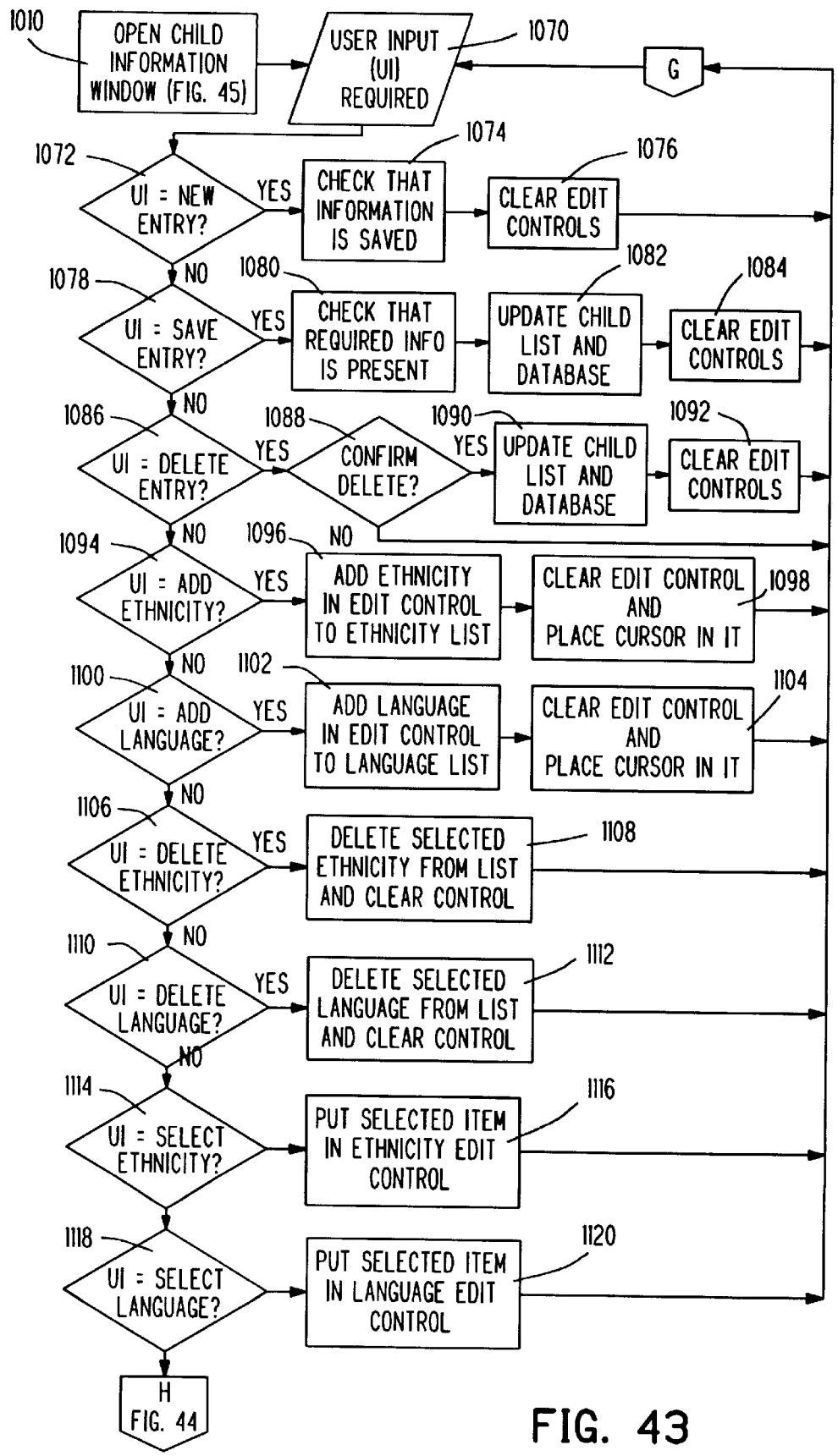
FIG. 43 is a flow diagram of a first portion of an open child information procedure in the instructional management system program.
Figure 44:
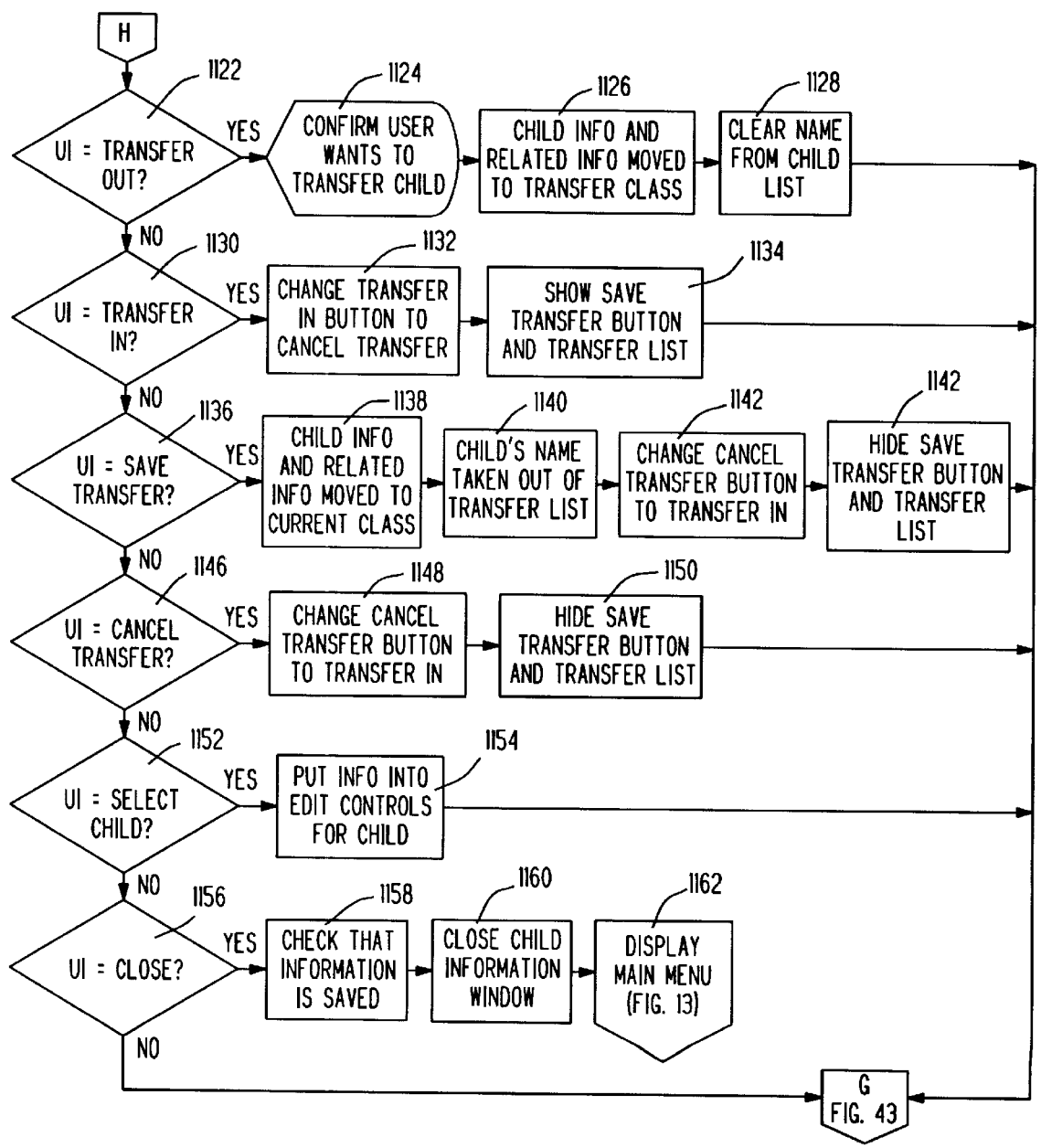
FIG. 44 is a flow diagram of a second portion of the open child information procedure.
Figure 45:
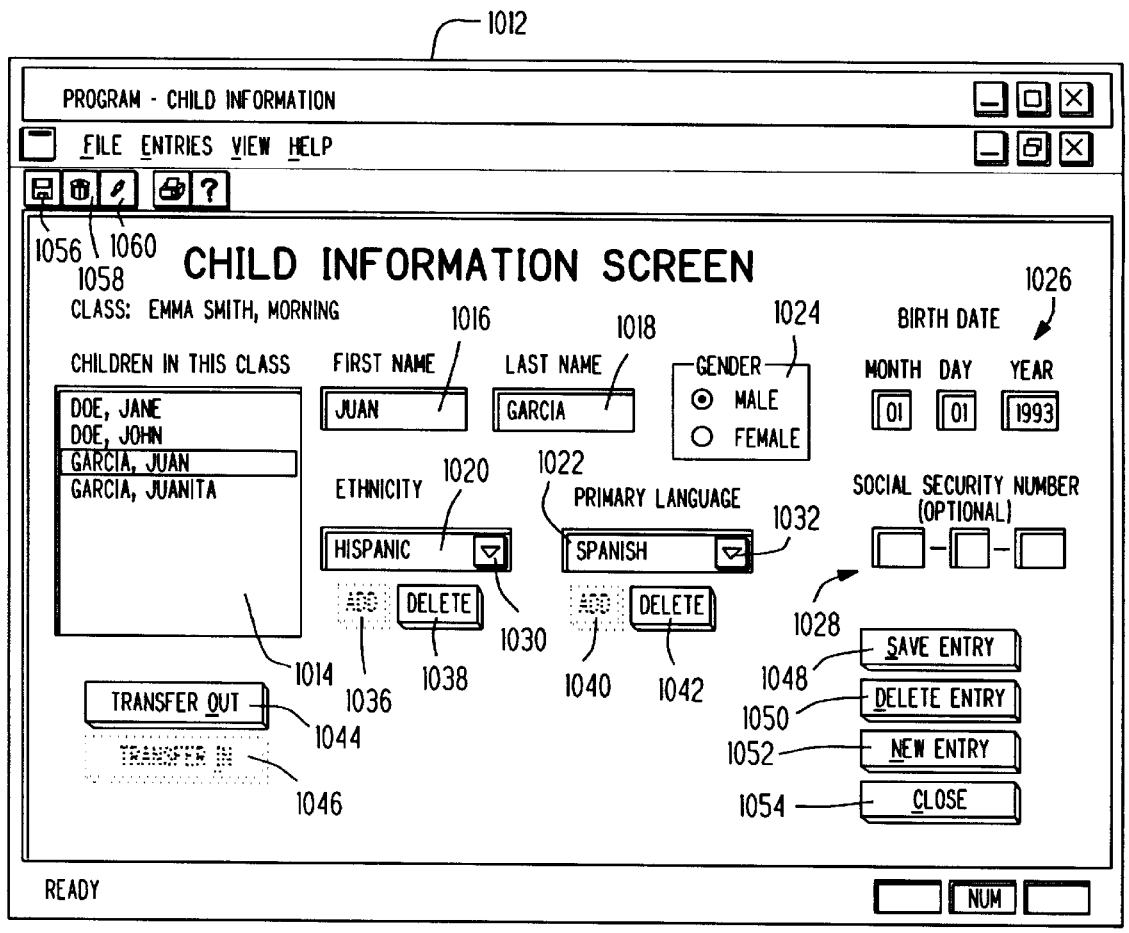
FIG. 45 is an illustration of a window displayed during the open child information procedure.
Figure 46:
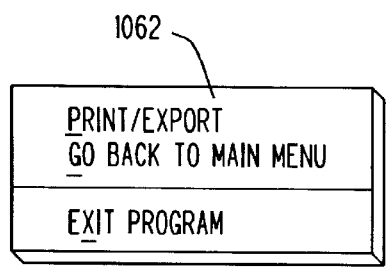
FIG. 46 is an illustration of a file pop-up menu displayed in the open child information window.
Figure 47:
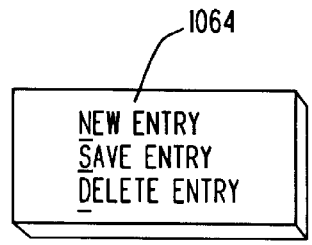
FIG. 47 is an illustration of an entries pop-up menu displayed in the open child information window.

In the open child information window procedure of FIGS. 43 and 44, step 1010 opens display of the child information window 1012 of FIG. 45. This window contains a children list box 1014, a first name edit control box 1016, a last name edit control box 1018, an ethnicity edit control box 1020, a primary language edit control box 1022, birth date edit control boxes 1026, and social security number edit control boxes 1028. Boxes 1016, 1018, 1026 and 1028 are designed for typing in the relevant information. Box 1024 has alternate dot selections for gender. Boxes 1020 and 1022 include respective buttons 1030 and 1032 for calling pop-up lists from which selections can be made. Additionally, add buttons 1036 and 1040 and delete buttons 1038 and 1042 are associated with the respective boxes 1020 and 1022. Transfer out button 1044 and transfer in button 1046 are associated with the children list box 1014. The window includes a save entry button 1048, a delete button 1050, a new entry button 1052 and a close button 1054 while icon buttons 1056, 1058 and 1060 corresponding to the buttons 1048, 1050, and 1052 are included in a icon bar. Selectable menu items are "file", "entries", "view" and "help" for calling pop-menus only two of which are shown, the file menu 1062 in FIG. 46 and the entries menu 1064 in FIG. 47. The items in these menus function in a manner similar to menus in previously described windows.

Referring back to FIG. 43, step 1070 enables user input. Step 1072 responds to selection of a new or clear entry button or menu item to proceed to step 1074 where saving of any entered information is checked and then to step 1076 where edit controls 1016, 1018 and 1026 are cleared to allow entry of new data. When a save entry button or menu item is selected, step 1078 branches to step 1080 to check that the required information for a new entry has been entered into the edit controls. Then the child's name is added to the child list in the box 1014 as well as to the database which is also updated with the other entered information. Step 1086 responds to selection of a delete entry button or menu item to require confirmation in step 1088 of the user's desire to delete the selected (highlighted) child's information, to delete the child's name and other information from list box 1014 and the database in step 1090 and to clear the edit controls in step 1092. The cursor can be placed in the box 1020 and a new item typed in or an existing item edited. Then when the add button 1036 is selected, step 1094 is true, step 1096 adds the new or modified ethnicity item to the list of items which can be called up by button 1030, and step 1098 clears the edit control box 1020 and places the cursor in it. Similarly, steps 1100, 1102 and 1104 function the same as steps 1094, 1096 and 1098 to add new entries in the edit control box 1022 to the primary language list. Steps 1106 and 1108 are called by clicking on button 1038 to delete an ethnicity item displayed in the box 1020 from the list to ethnicity items while steps 1110 and 1112 respond to clicking of the delete button 1042 to delete a primary language item in the box 1022 from the list of primary language items. When the pop-up list of ethnicity items is display by button 1030, one of the displayed items can be clicked to select and highlight that item in step 1114 whereupon the selected item is placed in the edit control box 1020 in step 1116. Similarly steps 1118 and 1120 place a selected primary language item into the box 1022 from the pop-up list produced by button 1032.

When the transfer out button 1044 is selected, step 1122 in FIG. 44 is true, step 1124 requires the user to confirm that the highlighted child in the children list box 1014 is removed from that class, step 1126 transfers the child info to a transfer list, and step 1128 clears the transferred child's name and information from the box 1014 and other edit controls. Step 1130 responds to selection of the transfer in button 1046 to change the transfer in button to a cancel transfer button in step 1132 and to show a save transfer button (not shown) along with a pop-up list (not shown) of children in the transfer list in step 1134. Then when the save transfer button is clicked, step 1136 branches to step 1138 to move the highlighted child and her/his related information into the children list box 1014 and database files of the current class. Step 1140 removes the child's name from the transfer list, step 1142 changes the cancel transfer button back to the transfer in button, and step 1144 hides the save transfer button and pop-up transfer list. If the cancel transfer button is clicked while displayed, step 1146 is true and steps 1148 and 1150 change the cancel transfer button back to the transfer in button, hide save transfer button and transfer list. When a child's name in the children list box 1014 is clicked, the name is highlighted in step 1152 and the related database information of the selected child is placed in the appropriate edit controls in step 1154. When a close button or menu item is selected in step 1156, step 1158 insures that the displayed information is saved, step 1160 closes the child information window 1012, and step 1162 proceeds to the display main menu procedure of FIG. 13.

Figure 48:
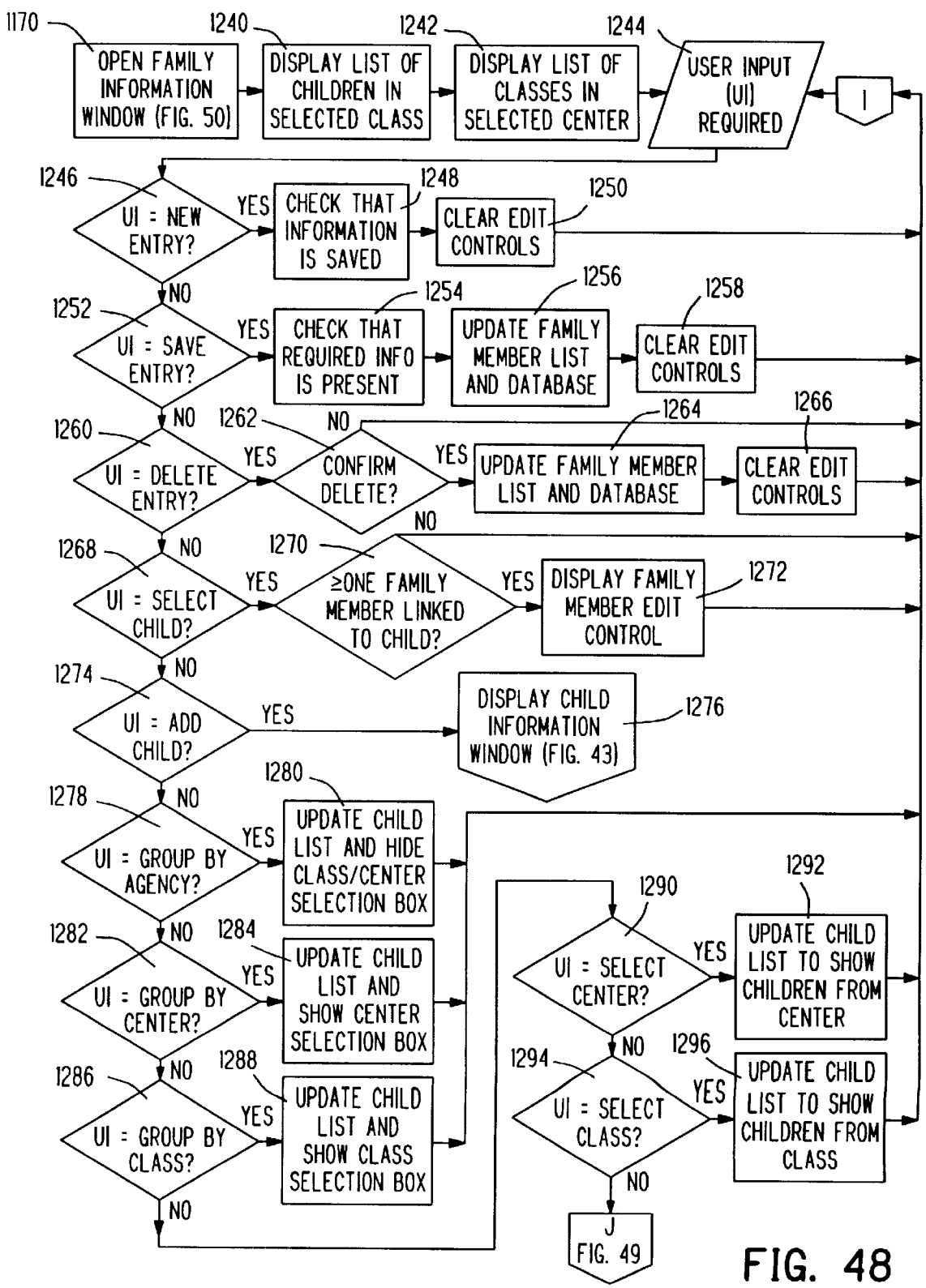
FIG. 48 is a flow diagram of a first portion of an open family information procedure in the instructional management system program.
Figure 49:
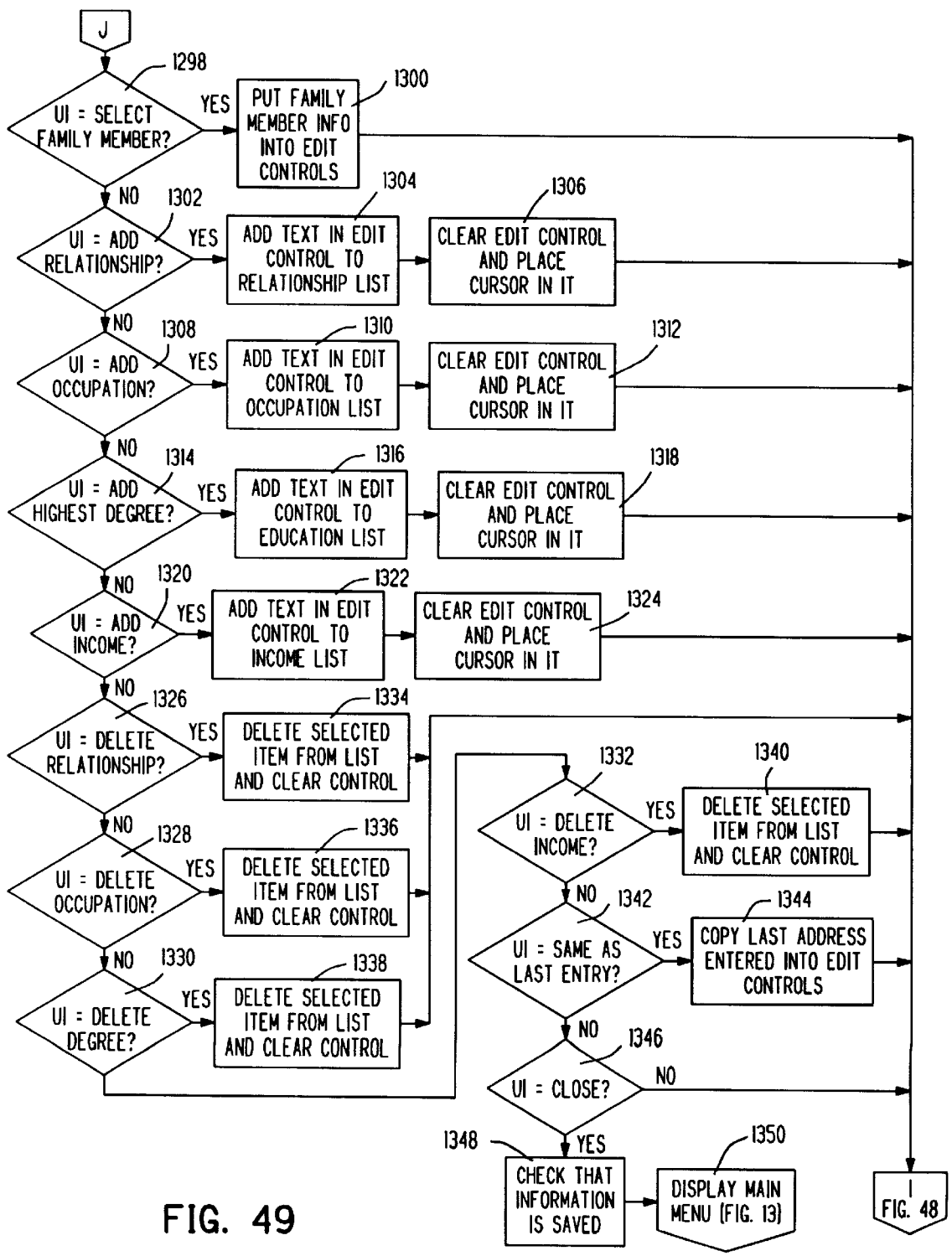
FIG. 49 is a flow diagram of a second portion of the open family information procedure.
Figure 50:
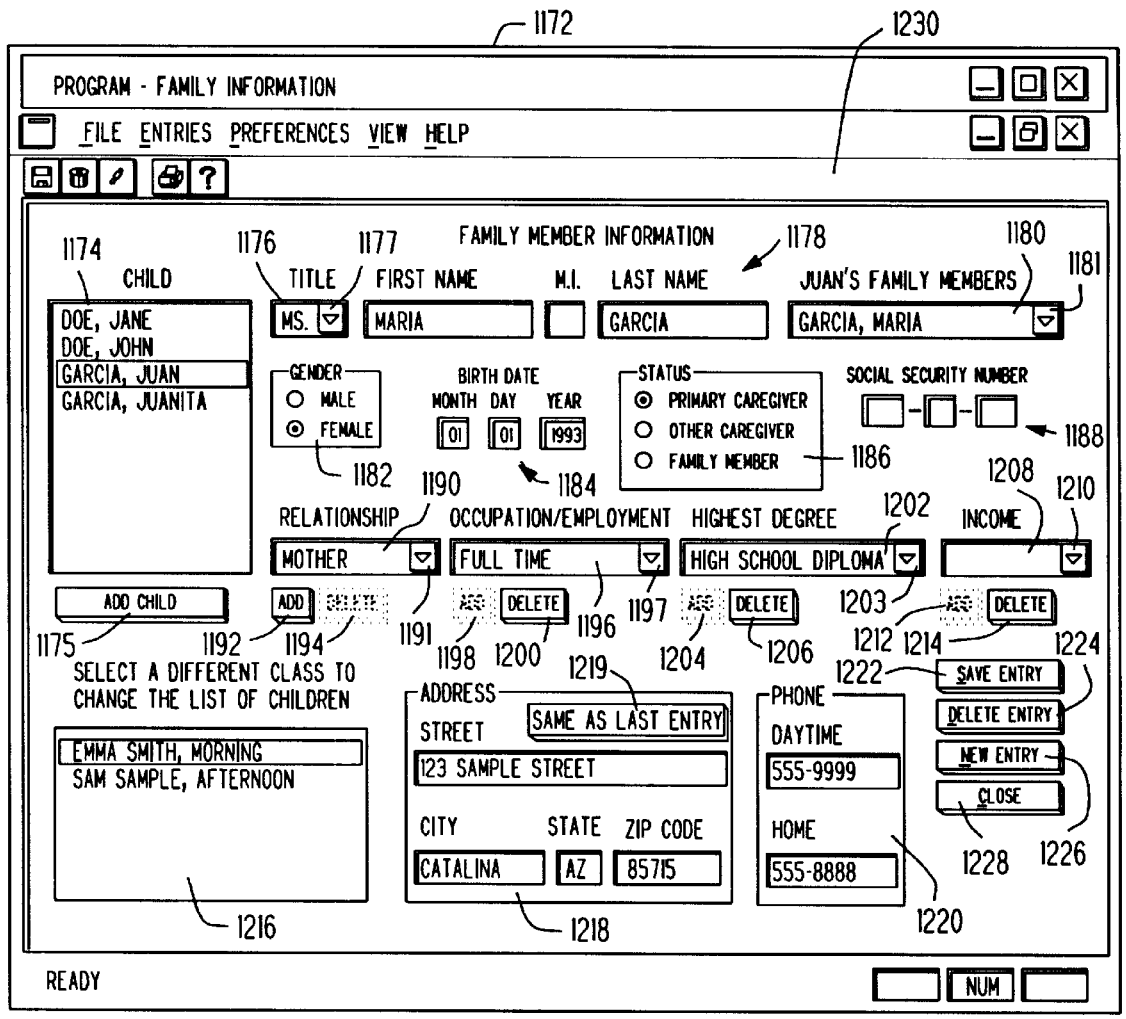
FIG. 50 is an illustration of a window displayed during the open family information procedure.
Figure 51:
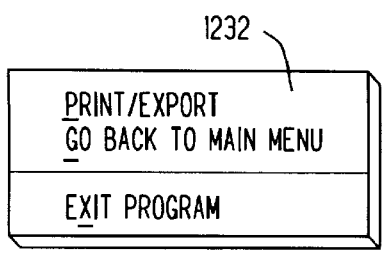
FIG. 51 is an illustration of a file pop-up menu displayed in the open family information window.
Figure 52:
FIG. 52 is an illustration of an entries pop-up menu displayed in the open family information window.
Figure 53:
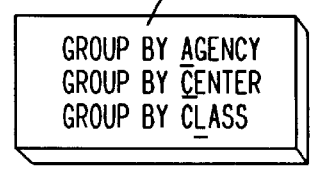
FIG. 53 is an illustration of a preferences pop-up menu displayed in the open family information window.

The display family information window procedure of FIGS. 48 and 49 begins at step 1170 where the family information window 1172 of FIG. 50 is displayed. This window 1172 contains a child list box 1174, a title edit control box 1176 with associated pop-up list button 1177 for displaying a list such as "Mr.", "Mrs." and "Ms.", name edit control boxes 1178 such as first name, middle initial and last name boxes, a family member box 1180 with a pop-up button 1181 for displaying a pop-up list of all family members listed in the database as being associated with the selected child, a relationship edit control box 1190 with associated pop-up list button 1191, add button 1192 and delete button 1194, occupation/employment edit control box 1196 with associated pop-up list button 1197, add button 1198 and delete button 1200, highest degree edit control box 1202 with associated pop-up list button 1203, add button 1204 and delete button 1206, income edit control 1208 with associated pop-up button 1210, add button 1212 and delete button 1214, center/class selection box 1216, address edit control box 1218 including a same as last entry button 1219, phone number edit control box 1220, save entry button 1222, delete entry button 1224, new entry button 1226 and close button 1228. Additionally the window 1172 contains a tool bar 1230 with icon buttons similar to the previously described windows and a menu bar with menu items "file", "entries", "preferences", "view" and "help". The latter two menu items call pop-up menus similar to those described in previous windows while the pop-up file menu 1232 is shown in FIG. 51, the pop-up entries menu 1234 is shown in FIG. 52 and the pop-up preferences menu 1236 is shown in FIG. 53.

Following the opening of the family information window at step 1170 in FIG. 48, step 1240 displays in the children list box 1174 a list of children in the currently selected class and step 1242 displays in the center/class list box 1216 a list of class in the currently selected center. Step 1244 passes control to user input. If a new entry button or menu item is selected in step 1246, step 1248 checks that all information in the edit controls is saved and step 1250 clears the edit controls for entry of information of a new family member. Selection of a save entry button or menu item results in step 1252 branching to step 1254 where it is ensured that all required information relating to a family member is entered in the edit controls, step 1256 where the family member pop-up list and database is updated with the entered data, and step 1258 where the edit controls are cleared. When a delete button or menu item is clicked or otherwise selected, step 1260 is true and proceeds to step 1262 to require the user to confirm that the currently selected family member is to be deleted from the family member list and database in the following step 1264 with clearing of the edit controls in step 1266. When a child's name in the children list box 1174 is clicked, step 1268 highlights the selected child and branches to step 1270 where it is determined if the database contains at least one family member associated with the selected child. If so, then the family member, or the first family member in a list of two or more family members, is displayed by step 1272 in the edit control box 1180. Selecting the add child button 1175 results in step 1274 branching to step 1276 where the display child information window procedure of FIG. 43 is called with an option such as button (not shown) to return to the family information window. Step 1278 senses when the item "group by agency" in the preference menu 1236 of FIG. 53 is selected and proceeds to step 1280 where the child list in the children list box is changed to the children enrolled in the agency. Additionally the center/class selection box 1216 is hidden. Step 1282 senses the item "group by center" in the preference menu 1236 and in step 1284 the child list is changed to the children in the center while the selection box lists the centers in the agency. When "group by class" in menu 1236 is selected in step 1286, the program proceeds to step 1288 where the child list is updated to the children in a selected class and the list in the selection box is changed to list the classes in the currently selected agency. Clicking one of the centers listed in the selection box 1216 when the box lists the centers in the current agency renders step 1290 true to highlight the selected center and to branch to step 1292 where the list of children in the children list box is changed to the children listed in the database as enrolled in the selected center. Step 1294 responds to clicking on a class in the selection box 1216 when the box contains a list of classes in the current center and leads to step 1296 updating the child list in children list box 1174 to the children listed in the database as being enrolled in the selected class.

Referring now to FIG. 49, the button 1181 shown in FIG. 50 causes display of a pop-up list of family members associated with a selected child when that list contains more than one member. When there is only one such member for display in the window 1180 or the pop-list is displayed with several members, clicking on a family member results in step 1298 branching to step 1300 where the database information associated with the selected member is placed in the appropriate edit controls. Step 1302 responds to clicking on the add button 1192 to add in step 1304 a modified or newly typed relationship from the edit control box 1190 to the pop-up list of relationships and to clear the edit control box 1190 in step 1306. Similarly, step 1308 responds to add button 1198 to advance to step 1310 and add a new occupation or employment status from the edit control 1196 to the corresponding pop-up list and then to step 1312 where the edit control box 1196 is cleared, step 1314 responds to add button 1204 to advance to step 1316 and add a new degree from the edit control box 1202 to the corresponding pop-up list and then to step 1318 where the edit control box 1202 is cleared, and step 1320 responds to add button 1212 to advance to step 1322 and add a new income category from the edit control box 1208 to the corresponding pop-up list and then to step 1324 where the edit control box 1208 is cleared. Clicking on one of the delete buttons 1194, 1200, 1206 or 1214 is sensed in the corresponding step 1326, 1328, 1330 or 1332 to branch to the respective step 1334, 1336, 1338 or 1340 where the item displayed in the corresponding edit control box 1190, 1196, 1202 or 1206 is deleted from the respective pop-up list and the respective edit control box is cleared. The same as last entry button 1219 in the address box 1218 can be clicked to cause step 1342 to branch to step 1344 where the address information for the last entered family member is placed in the address control boxes for the current family member. When close is selected such as by button 1228 or go back to main menu item in file menu 1232, step 1346 proceeds to step 1348 where a check insures that the information currently in the edit control boxes is saved and then to step 1350 where the display main menu procedure of FIG. 13 is called. Print/export in the file menu calls a conventional procedure (not shown) for printing or exporting to a file family member information from the database.

Figure 54:
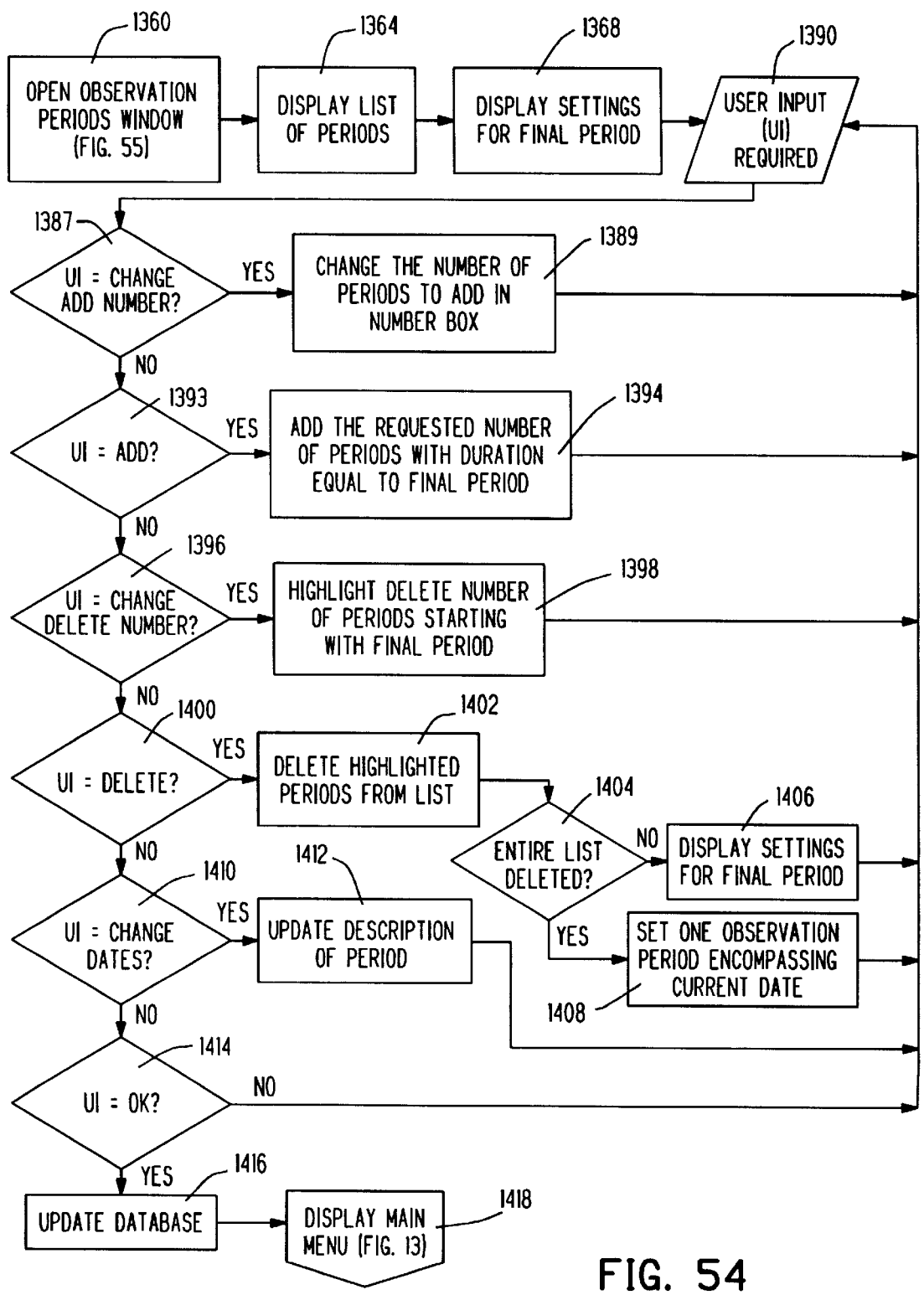
FIG. 54 is a flow diagram of an open observation periods procedure in the instructional management system program.
Figure 55:
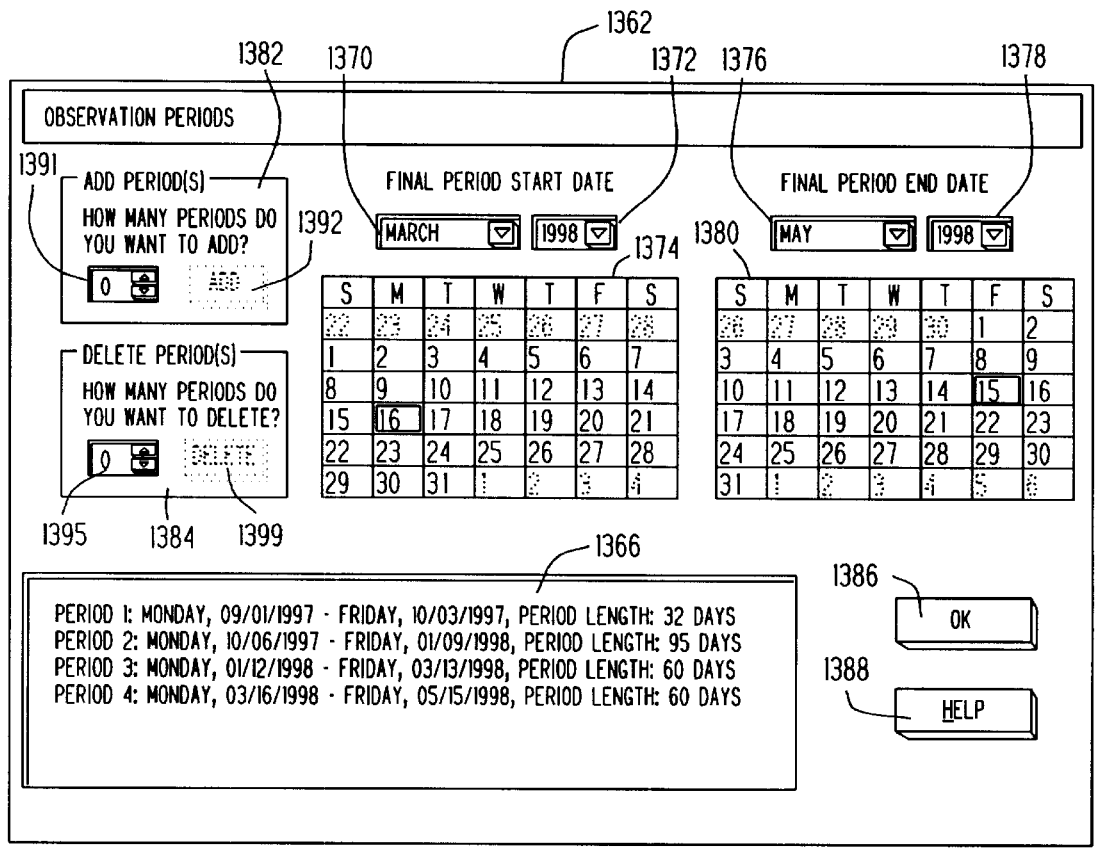
FIG. 55 is an illustration of a window displayed during the open observation periods procedure.

In the open observations period window procedure of FIG. 54, step 1360 displays the observations period window 1362 of FIG. 55. Then in step 1364, a periods list box 1366 is displayed in the window and contains a list of observation periods for the current agency. In step 1368 final period settings are placed in start month edit control box 1370, start year edit control box 1372, start day calendar 1374, end month edit control box 1374, end year edit control box 1378 and end day calendar 1380. The window also includes an add period(s) box 1382, a delete period(s) box 1384, an OK button 1386 and a help button 1388. User input is enabled in step 1390. The add period(s) box 1382 contains an edit control 1391 for the user in step 1387 indicating a number of periods to be added in step 1389 to the period list box 1366. Operation of an add button 1392 is sensed in step 1393 to branch to step 1394 where the requested number of periods are added to the period list in the box 1366. Each of the added periods has its duration equal to the previous last period with the start and end dates correspondingly set. The delete period(s) box 1384 contains an edit control box 1395 in which the user can set the number of periods to be deleted. Step 1396 senses a change in the deletion number in control 1395 and step 1398 highlights the periods to be deleted, starting with the last period, in the period list box 1366. Then when clicking on a delete button 1399 in the delete periods box 1384 is sensed in step 1400, step 1402 deletes the highlighted periods from the list in the periods list box 1366. In step 1404 it is determined if the entire list has been deleted. If false, step 1406 displays the settings for the new final period in the start date and end date edit controls, and if true, step 1408 sets a default observation period encompassing the current date which is inserted into the periods list box along with placement of corresponding date information in the start and end date control boxes. When the start date or end date in edit control boxes 1370, 1372, 1374, 1376, 1378 and 1380 is changed by the operator, step 1410 branches to step 1412 where corresponding changes are made to the description of the last observation period in the box 1366. Selection of the OK button 1386 in step 1414 results in step 1416 updating the database information and return to the display main menu procedure of FIG. 13 in step 1418.

In the open observations procedure of FIGS. 56 and 57, step 1430 opens the observations window 1432 of FIG. 58. Next, step 1434 inserts a pop-up estimate window 1436 in the window 1432 and step 1438 displays the current class name at 1440 in the window 1432 along with children list box 1442 which is placed in the estimate window. The following step 1444 displays the selected scale (developmental area+developmental level) as the title along with a list of capabilities (learning items or goals) indicated generally at 1448 corresponding to the selected scale. The capabilities are classified into different groups (knowledge areas) each with a descriptive title such as "helping", "sharing", etc. Each of the capabilities includes a check box 1450 for indicating whether the capability or goal has been accomplished (learned) and a readiness button 1452 which indicates a readiness level such as "plan later", "plan soon", "plan now" and "learned". In step 1454 information on the first child, or other highlighted child, in the list 1442 such as that stored in the children score table of FIG. 8 is inserted in the window 1432. These include the name of the child along with the checkmarks in boxes 1450 for those items learned as recorded in a field 294 of record 288 for the selected child and observation period in the table of FIG. 8, the plan status in all buttons 1450 as recorded in the field 296, and a developmental level score DL recorded in field 302. Next in step 1456 the date of the most recent observation entry is displayed along with the observation period with an edit control box 1458. Then is step 1460 the user is permitted to edit the observation information for the selected child.

The goals table of FIG. 6 contains a comprehensive lists of capabilities for students in the different developmental levels and which have been generated based upon cumulative teaching experience. These capabilities are used as goals as well for assessment of achievement. These capabilities for each developmental level (age group) are further classified into various developmental areas suitable for the developmental level. The capabilities 1448 displayed in the window 1432 are the capabilities corresponding to the previously selected developmental level (age group) in menu 534, FIG. 22, and developmental area in submenu 541. The particular score or achievement (learned or not learned) in each capability for the selected child is illustrated by the presence or absence of a checkmark in the corresponding box 1450.

Steps 1462 and 1464 represent one method for initially estimating a score for a child in the capabilities of the displayed developmental area. A slider or button 1466 at the bottom of the estimate window 1436 can be moved by the user dragging the mouse arrow or clicking on the direction buttons 1468 and 1470 to provide an indication of the relative development, or amount learned, of the child in the subject developmental area. A number above the slider 1466 indicates the corresponding number of capabilities or items in the displayed developmental area that the student has learned. This estimate can be based upon a brief observation of the child, upon discussion with the parents of the child or some other source. Then in step 1472 selection of "estimate" in pop-up update menu 1474 or corresponding icon button 1476 is sensed to proceed to step 1478 where estimated achievement and readiness levels are computed for each of the capabilities in the displayed developmental area. An algorithm can be used to compute the probability that the child will be able to preform each learning capability within the corresponding developmental area. One suitable algorithm calculates probabilities $P_i$ using the equation $$P_{i=1}|^{\theta} = \frac{1}{1 + e^{-a_i(\theta - b_i)}}$$

wherein e is the natural or Napierian logarithm base, $a_i$ is the discrimination factor of the learning capability i, $b_i$ is the difficulty factor of the learned capability i and $\theta$ is the ability score of the student. Where $\theta$ is a function of the number of learned capabilities or items in the developmental area, the difficulty factor b for each item can be its difficulty ranking in the list of items in the current developmental area, and the discrimination factor a can be a number calculated to adjust the probability to a value relative to probabilities of the other items as determined by a base of observed scores and/or informed opinion. For each capability with a computed probability equal to or greater than 0.5 the indication in the corresponding learned indication in the field 294 in the record 288 of the child's current score table is set at learned and for each capability with a computed probability less than 0.5 the corresponding learned indication is set at not learned. Further the plans field 296 is changed so that capabilities with probabilities equal to or above 0.5 are assigned a learned indication, capabilities with probabilities from 0.25 to 0.5 are assigned a plan now indication, capabilities with probabilities from 0.15 to 0.25 are assigned a plan soon indication, and capabilities with probabilities below 0.15 are assigned a plan later indication. Additionally the various scores in the child's current score record 288 for the subject developmental area and observation period are computed. Then in step 1480 the computed learned indications are shown by insertion and absence of the checkmarks in the boxes 1450 and the computed planning indications are inserted in the corresponding buttons 1452. The displayed DL score is also updated.

As an alternative, an algorithm can be employed to calculate the estimated learned items by simply selecting the items to be marked as learned beginning with those of the item of the lowest difficulty factor and ending when the correct number of learned items, as indicated by the number above the slider 1466, is reached.

Figure 61:
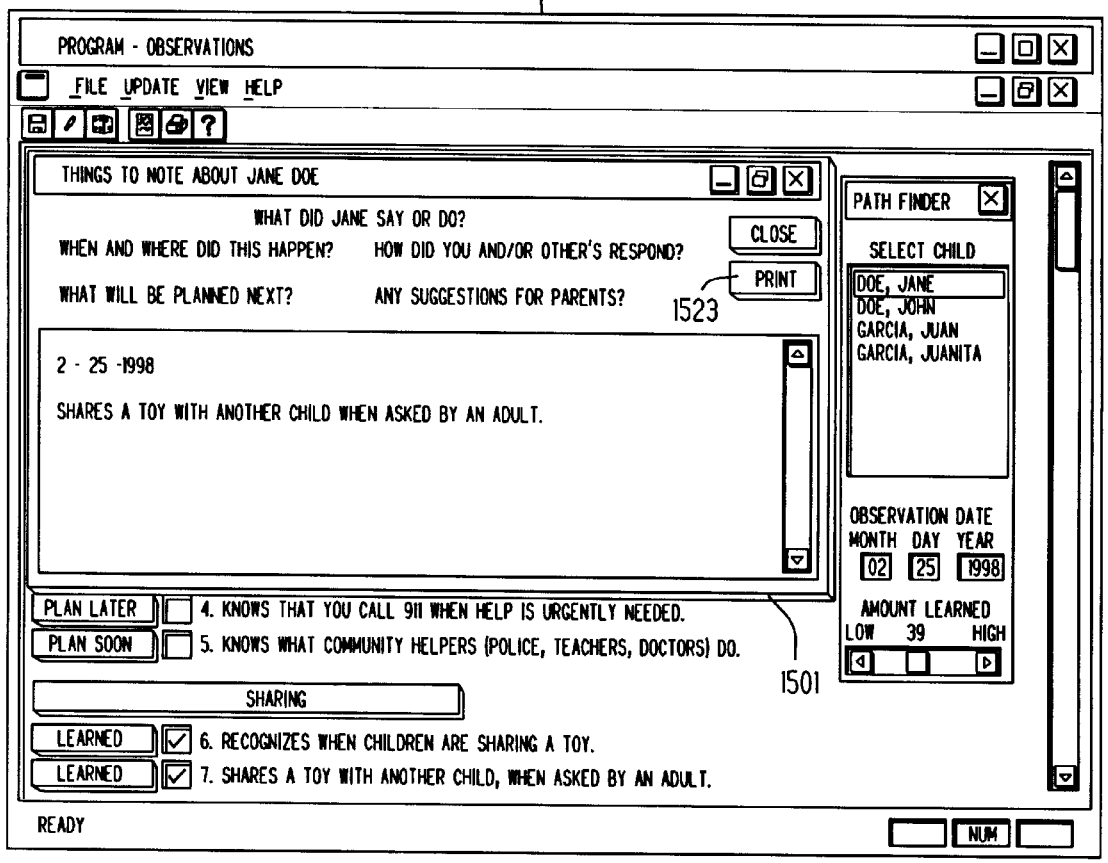
FIG. 61 is an illustration of the open observations window of FIG. 58 with a notes window opened therein.

While the use of the estimate procedure quickly inserts an estimated developmental score for each child, normally observations are entered manually by clicking on the appropriate checkmark boxes 1450 which is sensed in step 1490. After completing an activity or series of activities, the teacher can readily make an assessment of whether each student has learned the associated goals or capabilities. In step 1492, the check mark in the clicked box is toggled on or off and in step 1494 it is determined if the box is now checked. If not, the corresponding readiness button 1452 is changed to "plan later" in step 1496, and if true, the readiness button is changed to "learned" in step 1498. From step 1498, the program proceeds to step 1500 where it is determined if the notes window 1501, see FIG. 61, is open. If true, step 1502 adds the text of the capability to the notes window 1501. From any of steps 1496, 1500 (when false) or 1502, the program in step 1504 updates the score table in the database, the displayed score(s) and the amounted learned which is shown by the position of the slider 1466 and the number above the slider.

Clicking on one of the readiness buttons 1452 is detected in step 1506 of FIG. 57 to call step 1508 where the readiness indication in the clicked box is changed to a next readiness indication. For example, one order of changing readiness indications is to change a readiness indication of "now" to "soon", to change a readiness indication of "soon" to "later" and to change a readiness indication of "later" to "now". Any other order of change can be used, and other or additional readiness indications can be employed. Next in step 1510, the scores in the child's score table and as displayed in the window is updated along with updating of the amount learned number.

When a notes menu item (see file pop-up menu 1511 in FIG. 59) or a corresponding icon button is clicked, step 1512 is true and the procedure goes to step 1514 where the note window 1501 of FIG. 61 is opened and the text of any saved note, such as pointed to by a record 320 in the child scores table, is displayed in the note window. Step 1516 inserts the current date below the prior note and positions the cursor for writing additional text after the inserted date by steps 1518 and 1520. The user can click on any item or character position in the text box 1501 and add, delete or change characters. Step 1522 senses when a print button 1523 in the note window is checked to call a conventional report printing procedure in step 1524. Clicking on another child in the child list box 1442 results in saving the current note and displaying in step 1528 of a new note box with any previously saved note for the newly selected child. Step 1530 inserts the current date below any prior note and sets the cursor to begin typing after the new date. Selection of close in step 1532 results in the note window 1501 being closed.

If a clear menu item or icon button is selected, step 1536 branches to step 1537 where confirmation of deletion of previous observations (readiness and learning status) is required and then to step 1538 where the checkmarks in all boxes 1450 are cleared and the readiness indications in the readiness buttons 1452 are all changed to plan later. Additionally the DL score and the amount learned are set to base and zero values, respectively. Clicking on a goal bar 1541 (title bars for capability items) is sensed in step 1540 to cause the program in step 1542 to call the display activities window procedure, FIG. 66, corresponding to the clicked subject. This is only effective for those knowledge areas that have activities designating the knowledge area or goal. A list display button 1543 in the edit control 1458 can be clicked to call a pop-up list of observation periods for the current agency. One of the observations periods can be selected in step 1544 to proceed to step 1546 where the information in the window 1432 is changed to the stored information of the newly selected observation period. Step 1548 responds to the user clicking on close or go back to main menu to check that all information is saved in step 1550 and to return in step 1552 to the display menu procedure of FIG. 13.

Figure 62:
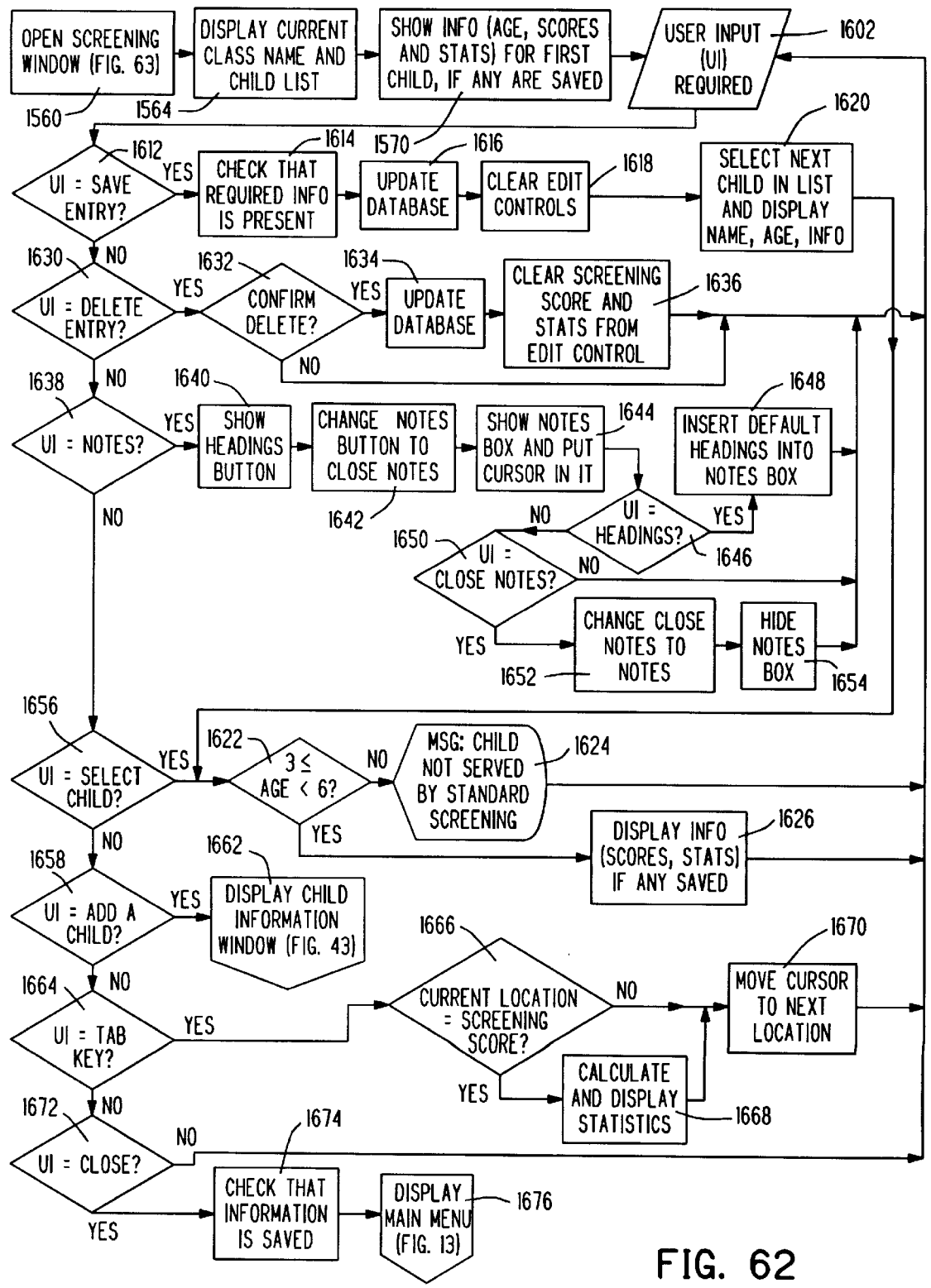
FIG. 62 is a flow diagram of an open screening procedure in the instructional management system program.
Figure 63:
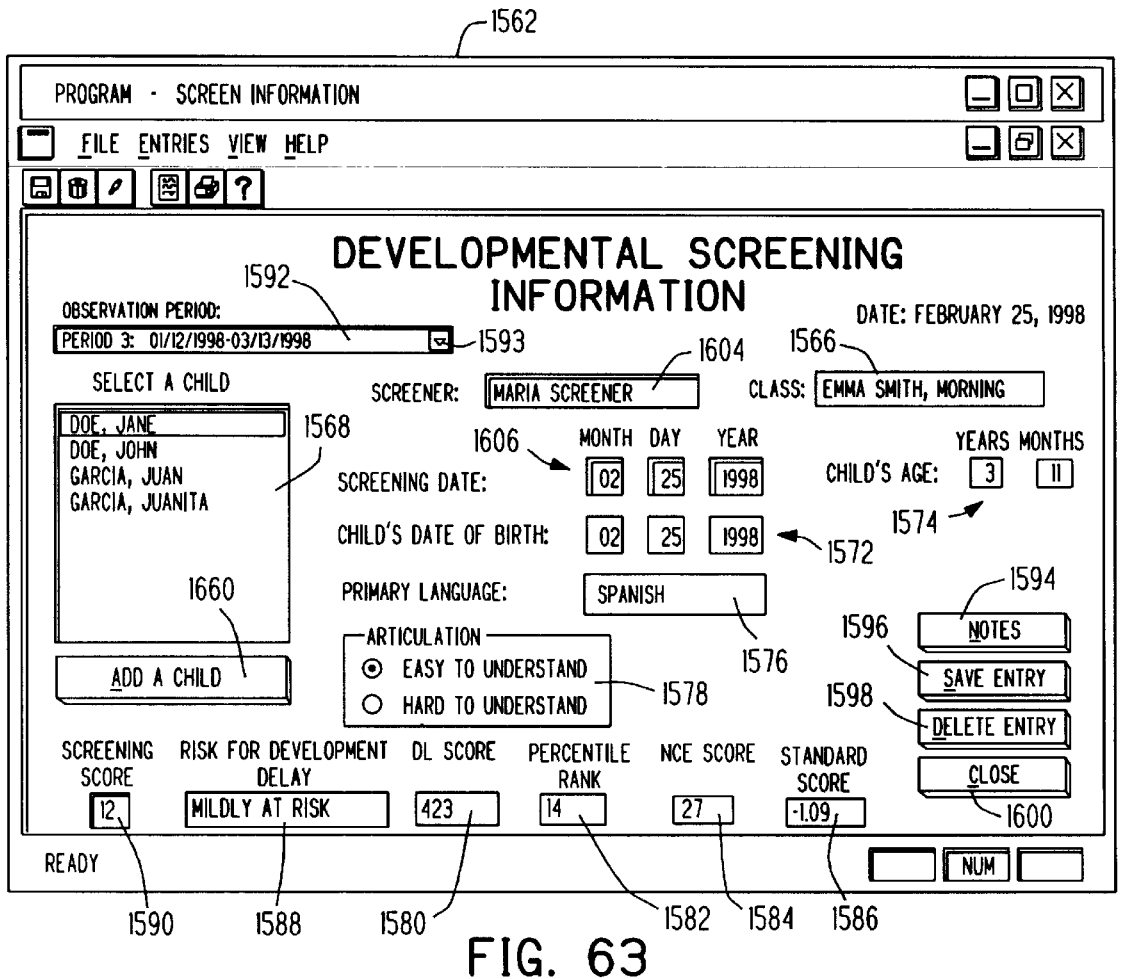
FIG. 63 is an illustration of a window displayed during the open screening procedure.
Figure 64:
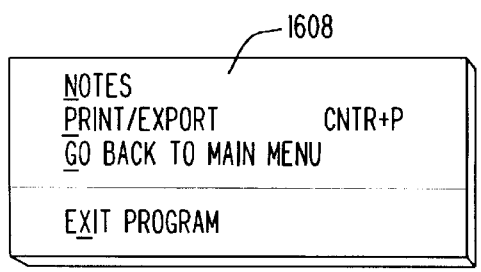
FIG. 64 is an illustration of a file pop-up menu displayed in the open screening window.
Figure 65:
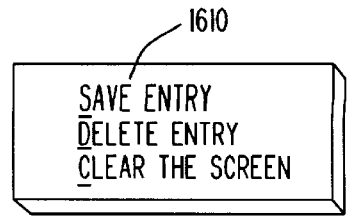
FIG. 65 is an illustration of an entries pop-up menu displayed in the open screening window.

The screening procedure of FIG. 62 enables a user to make an assessment based upon a standard test designed to readily provide reliable information about preschool development at the individual, class, center and agency levels. In step 1560 the developmental screen information window 1562 of FIG. 63 is opened and then in step 1564 the currently selected class is displayed in class box 1566 and the names of the children in the selected class are display in a children list box 1568. Next in step 1570 information about the first child in the list of children is display so far as that information is contained the database. This information includes the child's date of birth placed in display box 1572 and from which is calculated and displayed the child's age 1574, the primary language 1576 of the child, an indication 1578 of the child's articulation, the DL score 1580 (developmental level score produced by this program), other scores including percentile rank 1582, NCE 1584 and standard score 1586 computed from the DL score, and an indication of a degree of developmental risk 1588. Additionally there is a box 1590 for displaying the screening score produced by the current standard test. All the scores are for the observation period displayed in the edit control box 1592 which includes a button 1593 for calling up a list of observation periods from which the used can select. Additionally the window includes a notes button 1594, a save entry button 1596, a delete entry button 1598 and a close button 1600. User input in step 1602 enables the person conducting the screening to enter her/his name in the edit control box 1604 and the date in the date control boxes 1606. The menu bar includes menu names "file", "entries", "view" and "help" for displaying file pop-up menu 1608, FIG. 64, entries pop-up menu 1610, FIG. 65, and other corresponding menus similar to corresponding previous described menus.

Step 1612 responds to selection of save entry from button 1596, menu 1610 or the tool bar and proceeds to step 1614 where it is determined if the required information is present for a screen test. Then in step 1614 the information is saved in the database and in step 1618 the edit controls are cleared. The next child on the list is selected in step 1620 and the name and age of the child is displayed. In step 1622 it is determined if the newly selected child is at least three years old and less than six years old. If not, a message is displayed in step 1624 that the present standard screening test is not suitable for a child of the present age. Otherwise, the scores and other stored information on the child is displayed in step 1626. Selection of delete entry is detected in step 1630 to proceed to step 1632 where confirmation by the user to delete the currently displayed scores is required. If confirmed, the database is updated with the deletions in step 1634 and any displayed screening score and other statistics are cleared from the screen in step 1636. Step 1638 responds to selection of the notes button 1594, menu item in menu 1608 or icon in the tool bar to show a headings button (not shown) in step 1640, change the notes button 1594 to a close notes button in step 1642, and to show a notes box (not shown but similar to other illustrated note boxes) superimposed on the window 1562. The cursor is placed in the note box to enable the user to type in notes relative to the standard screening test for the subject child. At step 1646 it is determined if the newly displayed headings button is clicked, and if true, default headings are inserted into the notes box to assist the screener in writing a note. Suitable headings include "current emotional health", "current physical health" and "growth and nutrition". Step 1650 senses selection of close notes and proceeds to step 1652 where the close notes button is changed back to the notes button and to step 1654 where the notes box is hidden.

If a new child is selected by clicking on a name in the child list box 1568, step 1656 selects the new child and proceeds to step 1622 where the suitability of the newly selected child for the standard preschool screening test is determined. Step 1658 detects selection of a add child button 1660 to call, step 1662, the display child information window procedure of FIG. 43. Sensing of operation of the tab key is performed by step 1664 to advance to step 1666 where it is determined of the current cursor location is in the screening score box 1590. If true, the scores are newly calculated and displayed in step 1668. Otherwise, the cursor is moved to a next edit control box location. When close is selected in step 1672, the program in step 1674 checks that all information is saved in the database and in step 1676 proceeds back to the display main menu procedure of FIG. 13.

Figure 67:
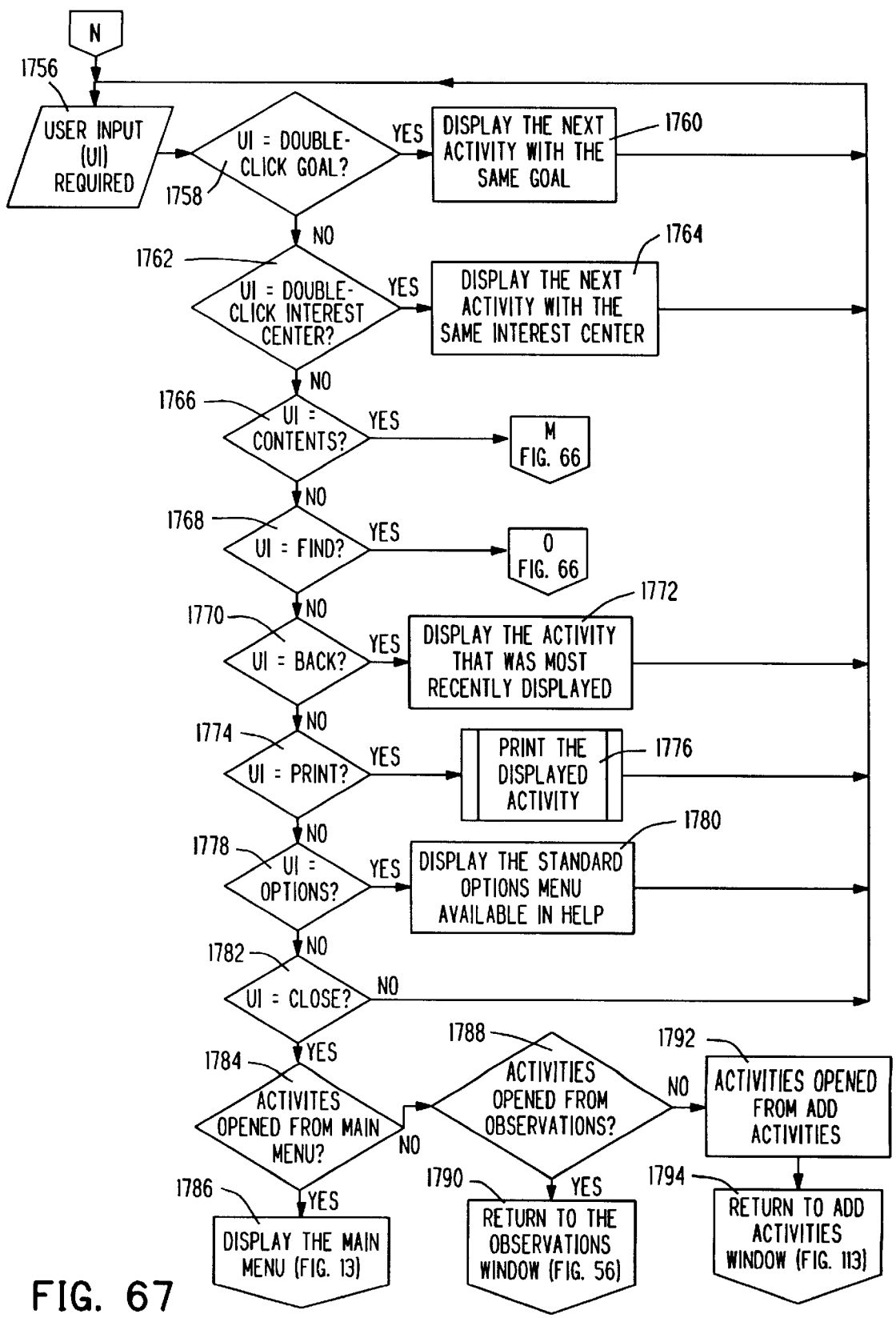
FIG. 67 is a flow diagram of a second portion of the open activities procedure.
Figure 68:
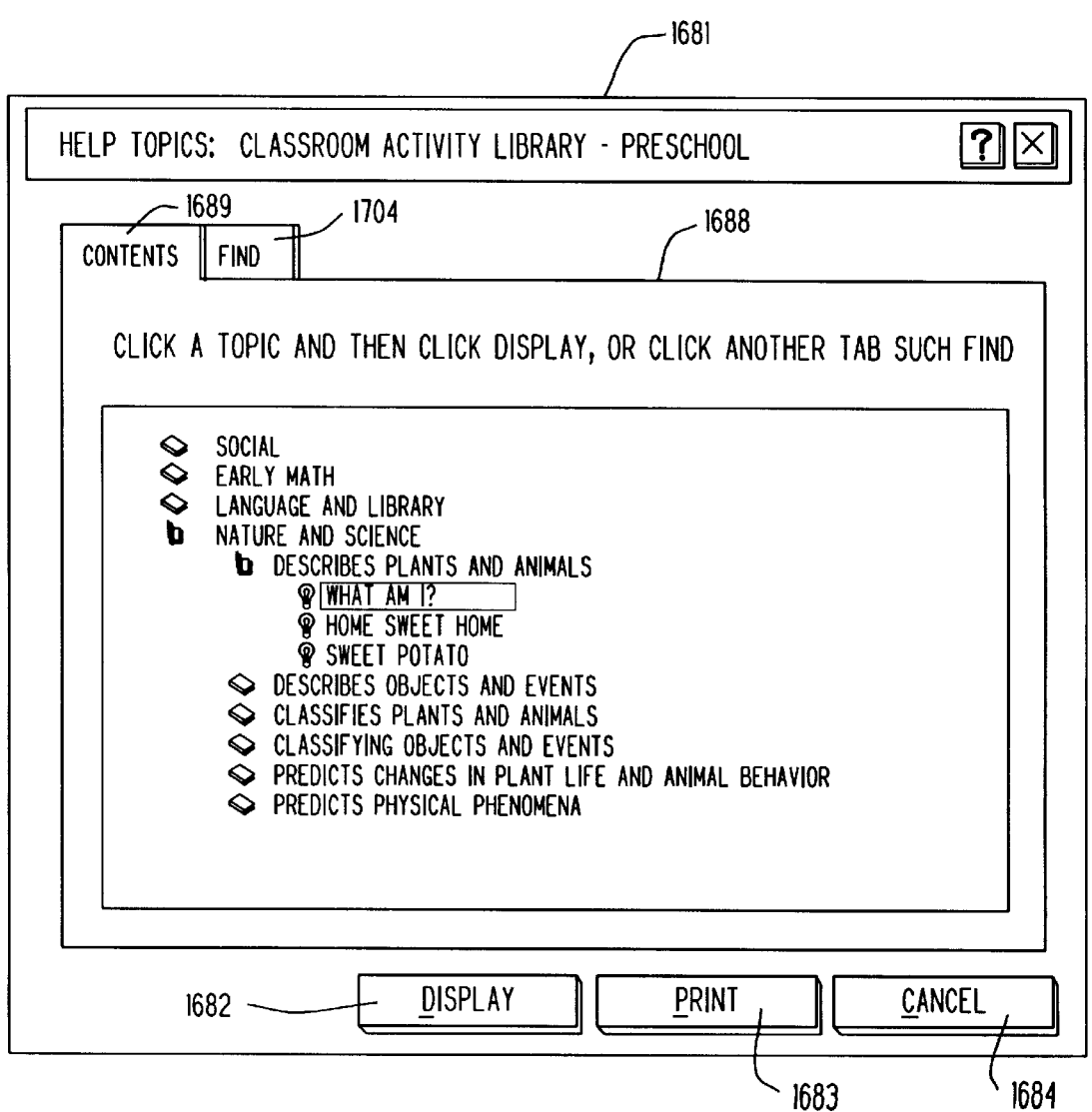
FIG. 68 is an illustration of a window containing a superimposed contents page or window displayed during the open activities procedure.
Figure 69:
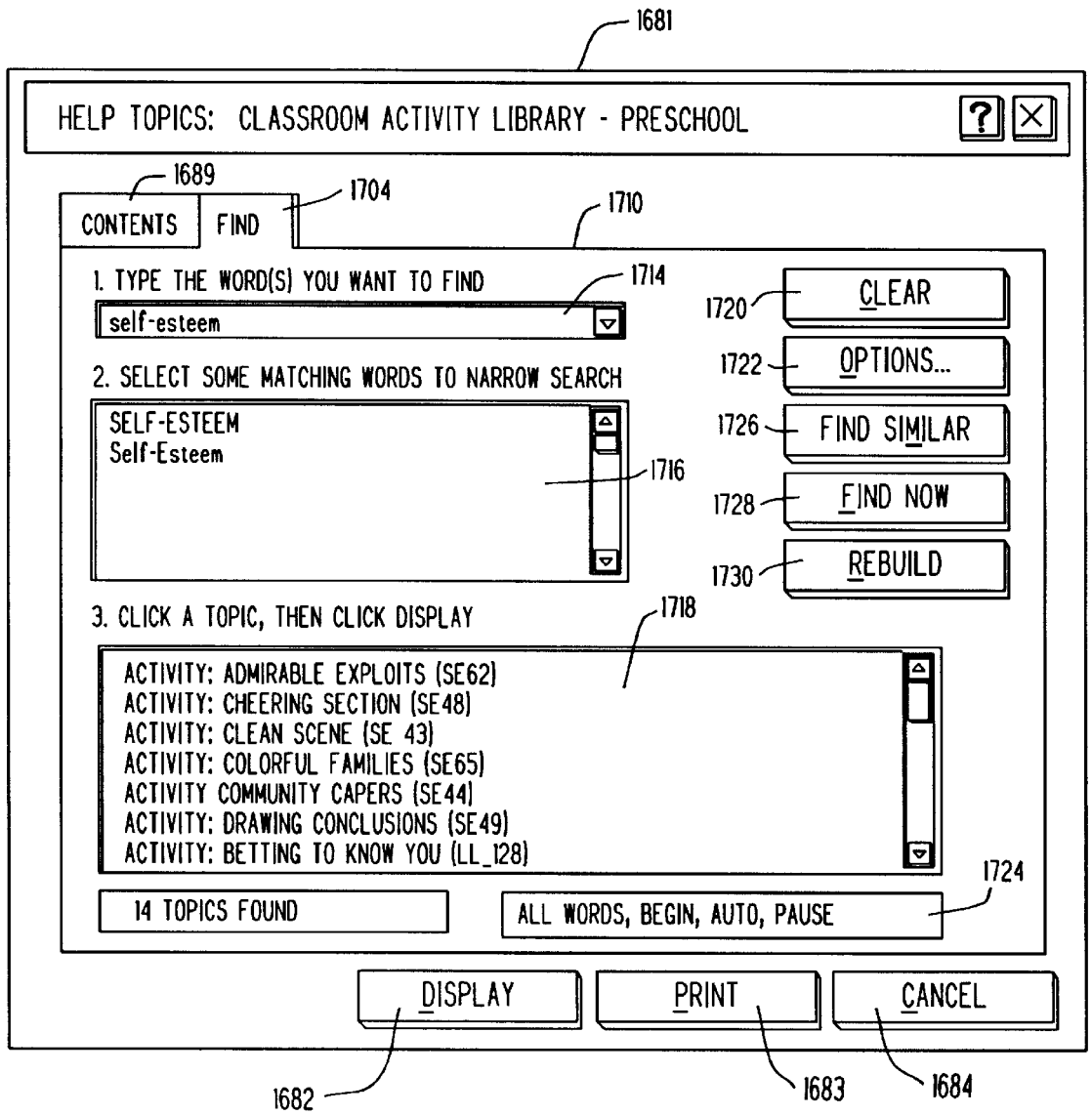
FIG. 69 is an illustration of the open activities window containing a superimposed find page or window.

In the open activities window procedure of FIGS. 66 and 67, step 1680 displays the activities window 1681 of FIGS. 68 and 69 which contains an open/close/display button 1682, a print button 1683 and a cancel button 1684. In FIG. 68 the button 1682 is an open button when a closed topic is highlighted, a close button when an open topic is highlighted and a display button when an activity is highlighted. In FIG. 69 the button is always a display button. It is determined then in step 1685 if the window was opened from the main menu, and if true, in step 1686 displays the activity contents window or page 1688, FIG. 68, with a contents index tab 1689 in the window 1682 and proceeds to user input control 1690. The window 1688 contains a list of activity topics which, for example, parallels the developmental areas for the selected class and developmental level. Double clicking on one of the displayed closed topics or clicking on the open button 1682 after a single click highlights a closed topic, such as "nature and science", is sensed in step 1692 to open that topic and to display in step 1694 a list of subtopics or activity titles classified under the topic. These subtopics can parallel the classified knowledge areas within a developmental area. The user may have to repeat the selection of a topic in step 1692 from one or more levels of subtopics in order to display a list of activities related to a specific knowledge area or subtopic. Single clicking on a topic/subtopic/activity results in that topic/subtopic/activity being highlighted and selected. Double clicking on an open topic/subtopic or clicking on the close button 1692 after highlighting an opened topic is sensed in step 1696 causing a branch to step 1698 where the opened topic/subtopic and any open subordinate subtopic is closed with removal from the display of the subordinate subtopics and/or activities. Clicking on the print button 1683 results in step 1700 proceeding to step 1702 where a selected activity or activities are printed.

In FIG. 68, there is displayed an index tab 1704 of a hidden find page or find window. Clicking on this find index tab is sensed in step 1706 to result in step 1708 displaying the activity find page 1710 in FIG. 69 and then proceeding to step 1712 where a find procedure, such as described below in connection with the procedure of FIG. 148, is performed. This procedure uses edit control box 1714 to enter one or more words to find, a word list box 1716 to display a list of matching words found in the activity database, a topic list box 1718 to display the list of topics containing the searched for words, a clear button 1720 to clear the edit control box 1714, an options button 1722 to call another window (not shown) for setting various options which are then displayed in the box 1724, find similar and find now buttons 1726 and 1728 to manually call for corresponding searches, and a rebuild button 1730 to form the word search base with corresponding topics in the activity database. While in the find procedure, clicking on the contents tab 1689 results in step returning to the step 1686 and the display of the contents window 1688.

Figure 70:
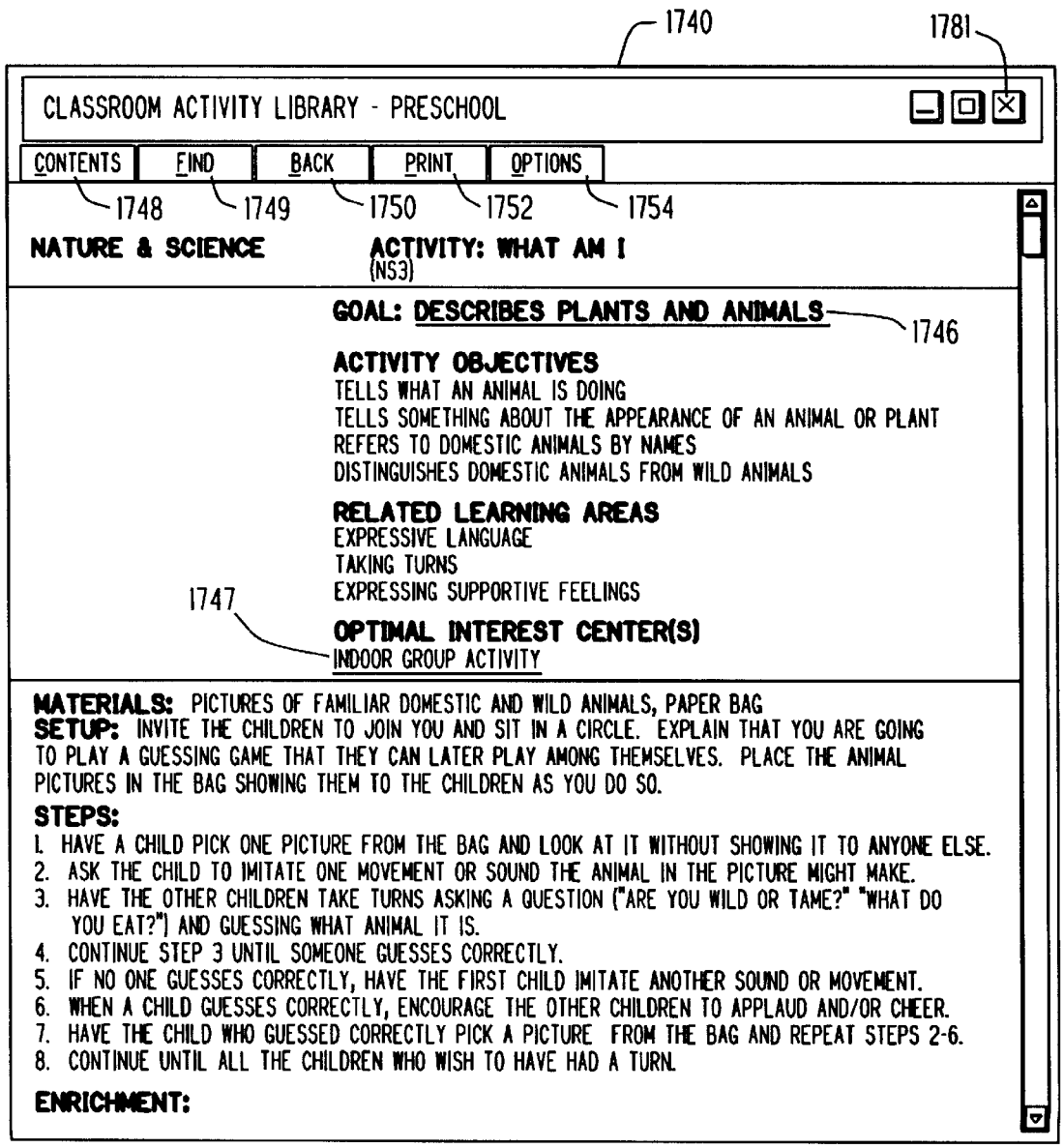
FIG. 70 is an illustration of the open activities window containing a superimposed topic displayed in the window.

Clicking on the display button 1682 while in either the contents procedure or the find procedure results in the respective step 1734 or 1736 branching to step 1738 where the activity display window 1740 of FIG. 70 is displayed. The window called from step 1738 displays the activity which was highlighted or selected in window 1688 or the box 1718. The activity window 1740 can also be called by step 1741 or step 1742. Step 1741 is called when the step 1685 finds that the open activities window 1681 was not opened from the main menu and step 1743 finds that the window 1681 was opened from step 1542 in the observations procedure of FIG. 57. Step 1744 automatically opens the activity library corresponding to the selected developmental level of the observations window and the step 1746 then displays the first activity classified within that library under the knowledge level (goal bar) selected in the observations window. If the open activities window 1681 was opened neither from the main menu nor from the observations window, then box 1745 indicates that the window 1681 was opened from the add activity procedure of FIG. 113.

An example of the display a typical activity record or file shown in FIG. 70 includes the developmental area, "Nature & Science", to which the activity relates; the title or topic, "What Am I", of the activity; the goal (learning capability), "Describes Plants and Animals", or alternatively the knowledge area to which the activity pertains; a list of activity objectives (sometimes called goals); a list of related learning areas (knowledge areas); an optimal interest center (suggested class area), "Indoor Group Activity"; the materials required for the activity; the initial setup to conduct the activity; the steps to perform the activity; and enrichment or other things to expand or enforce the lesson of the activity. The goal item 1746 (learning capability or knowledge area) and the interest center item 1747 (class area) are set up to respond clicking. Additionally the window includes a contents box or button 1748, a find box or button 1749, a back box or button 1750, a print box or button 1752, and an options box or button 1754.

With the window 1740 displayed, user input is permitted in step 1756. Step 1758 detects a double click on the goal (learning capability or knowledge area) 1746 to proceed to step 1760 where the next activity for that learning capability or knowledge area is displayed. Similarly, double clicking on the interest center (class area) 1747 results in step 1762 branching to step 1764 where the next activity with the same interest center (class area) is displayed. Steps 1758, 1760, 1762 and 1764 enable a teacher to readily look at other activities for teaching a particular learning capability or knowledge area or for occupying a particular class area. Clicking on the contents button 1746 is sensed by step 1766 to return to the step 1686 of FIG. 66 and display the activity contents window. Similarly clicking on the find button 1748 is sensed in step 1768 to return to the display activity find window procedure 1708 of FIG. 66. When step 1770 senses a click on the back button 1750 the program proceeds to step 1772 where the previously displayed activity is recalled for display in the window 1740. Clicking on the print button 1752 causes step 1774 to call the print procedure 1776 to print the displayed activity and clicking on the options button 1754 calls step 1780 where a standard options menu is displayed. If the user clicks on the close button 1781, the program at step 1782 proceeds to step 1784 where it is determined if the activities window 1740 was opened from the main menu. If true, step 1786 returns to the display main menu procedure of FIG. 13. Otherwise, the program in step 1788 determines if the activities window 1740 was opened from the observations procedure, and if true, proceeds to step 1790 to return to the observations window procedure of FIG. 56. As noted in box 1792 if the activities window was not called from either the main menu procedure or the observations procedure, the activities window was called by the add activities procedure and step 1794 returns the program to the add activities procedure of FIG. 113.

Figure 26:
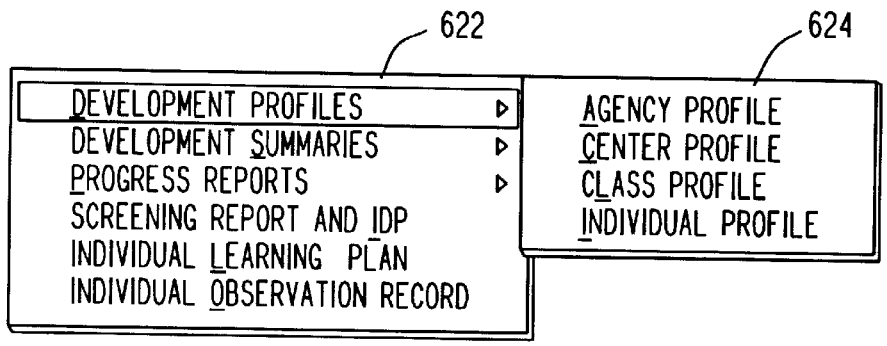
FIG. 26 is an illustration of a reports pop-up menu displayed in the main procedure window.
Figure 27:
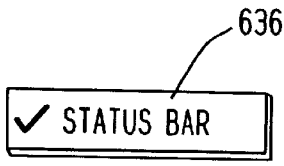
FIG. 27 is an illustration of a view pop-up menu displayed in the main procedure window.
Figure 71:
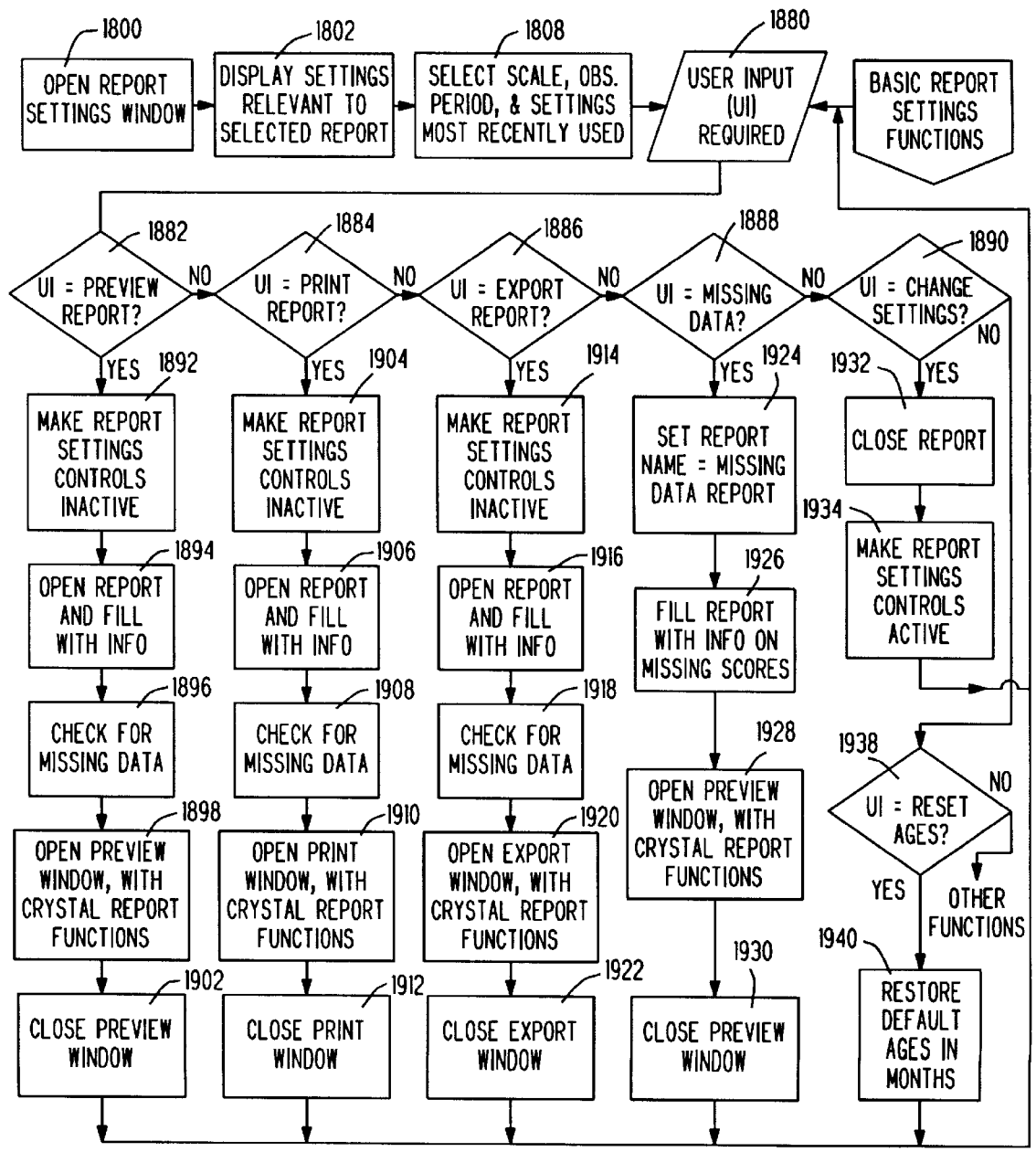
FIG. 71 is a flow diagram of an open report settings procedure in the instructional management system program.
Figure 72:
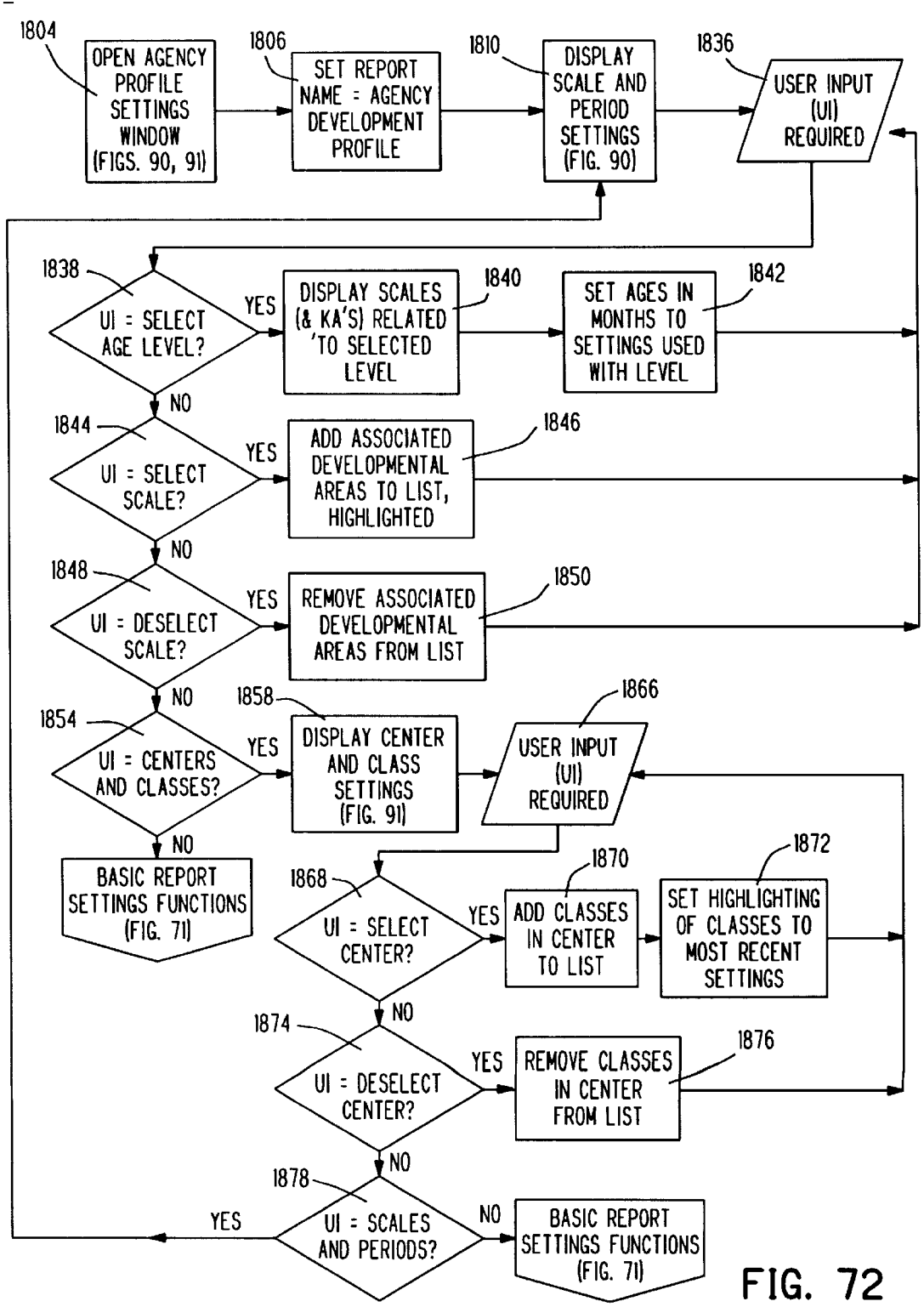
FIG. 72 is a flow diagram of an open agency profile settings procedure in the instructional management system program.

Selection of any of the reports from the menu 622, FIG. 26, or submenu 624 calls the procedure of FIG. 71 together with a corresponding one of the procedures of FIGS. 72–89. Generally, common functions are illustrated in FIG. 71 while more specific functions are illustrated in the FIGS. 72–89. In step 1800 of FIG. 71, the report settings window is opened, and in step 1802, the settings relevant to the selected report are displayed. For example, if "agency profile" under "development profiles" is selected, step 1804 in FIG. 72 opens the report settings window with the name agency profile settings (see FIGS. 90 and 91), and step 1806 sets the report name to agency development profile. In step 1808 of FIG. 71 the scale (developmental level+ developmental area), the observation period and other settings are set to the most recently used settings. Then in step 1810 of FIG. 72, the window 1812 of FIG. 90 with the scale and period settings is displayed. This window includes report options buttons such as preview button 1814, print button 1816, mail button 1818, change settings button 1820 and missing data button 1822 along with a close button 1824 and help button 1826. An list control box 1828 enables the user to select the age or developmental level while a select ages in months box 1830 enables the user to select a narrower range of ages upon which to produce a report. The user can select the observation period for the report using list selection box 1831. A scales list box 1832 enables the user to select one or more developmental areas to be reported while a knowledge area list box 1834 enables the user to select or deselect specific knowledge areas with each of the selected developmental areas upon which to report. In FIG. 72, user input is enabled in step 1836 to permit the user in step 1838 to use the age level list box 1828 to select one of the developmental levels within the agency. In step 1840 the scales (developmental areas) associated with the selected level are displayed in the scales list box 1832 with a first or previous selection being highlighted and the knowledge areas corresponding to the selected developmental area are displayed in the list box 1834. The ages in months in box 1830 are set in step 1842 to those ages assigned to the particular developmental level. The user can use the edit controls in the box 1830 to further narrow the range of ages to be included in the report. Step 1844 senses the clicking on a non-highlighted developmental area in the box 1832 to proceed to step 1846 where the selected area is highlighted and added to a list of developmental areas to be included in the report. Clicking on a highlighted developmental area in box 1832 is sensed by step 1848 to branch to step 1850 where the highlighting of the clicked area is removed and the clicked area is removed from the list of developmental areas to be included in the report. Upon selection of a developmental area, all the knowledge areas associated with that area are highlighted in the box 1834 and included in a list to be in the report. De-selection and re-selection of the knowledge areas in the box 1834 to be included in the report is made by clicking similar to that described above in connection with the developmental areas.

A select settings box 1852 including dot selections "scales and period" and "centers and classes" is included in the window 1812. Initially the "scales and period" item is selected. However the user can click on the "centers and classes" item which is sensed in step 1854 to cause the display of the class and settings window 1856 of FIG. 91 in step 1858. This window 1856 includes a select classes list box 1860 and a select centers list box 1862. User input is enabled at 1866 in FIG. 72 and clicking on one of the non-highlighted centers in the box 1862 is sensed in step 1868 to highlight the selected center and to add in step 1870 the selected center to the list of centers to be included in the report. In step 1872 the classes within that center are highlighted. Step 1874 responds to the clicking on a highlighted center in the box 1862 and proceeds to step 1876 where the clicked center is de-highlighted along with its associated classes in the box 1860. Classes in the box 1860 can be deselected and selected in a similar manner for inclusion in the report. Step 1878 senses the selection of the scales and period item in the select settings to view box 1852 while the centers and classes window 1856 is displayed to return to step 1810 to display the scales and period window 1812 of FIG. 90.

As noted above, the steps of FIG. 71 are included in each report procedure. After user input is enabled at 1880, clicking on one of the buttons 1814, 1816, 1818, 1820 and 1822 is sensed in the corresponding step 1882, 1884, 1886, 1888 or 1890. If print review is called in step 1882, the report settings controls are rendered inactive in step 1892, a report form is opened and the corresponding available data from the database is placed in the form in step 1894, any missing data is noted in step 1896 and a report preview window of a commercial report printing program is called in step 1898. The report setting controls which are rendered inactive are those controls which perform the functions of FIG. 72 while buttons 1814, 1816, 1818, 1820, 1822, 1824 and 1826 remain active. The development profile report 1900, shown in FIG. 170, includes the scale (developmental area+developmental level), the observation period, a list of learning capabilities (right hand column) categorized into their respective knowledge areas (the subtitles under "capabilities"), and columns labeled by readiness levels listing the number of children in the selected age limits and enrolled in the agency which are in the respective readiness levels "learned", "ready now", "ready soon" and "ready later" for each learning capability. The preview window (not shown) may include conventional buttons (not shown) for calling a conventional printing window to print the report, calling a conventional exporting window (not shown) to enter a file name to which the report is to be exported, and a zoom button to change the scale of the displayed report. Clicking on a system close button, printing the report or exporting the report closes the preview window in step 1902 and returns to the window 1812 or 1856.

When the print button 1816 is selected, step 1884 branches to steps 1904, 1906 and 1908 which are similar to steps 1892, 1894 and 1896 called by the preview function. Then in step 1910, a conventional print window (not shown) is opened enabling the user to make conventional print settings. Following a printing function or selecting a close button in the print window, the print window is closed in step 1912. Similarly when the export or mail button 1818 is selected, step 1886 branches to steps 1914, 1916 and 1918 which are similar to steps 1892, 1894 and 1896 called by the preview function. Then in step 1920 an conventional export window (not shown) is opened to enable the user to enter a file name, or other destination, to which the report is to be sent. The format of the report is a conventional text or graphic format. Following printing or selecting a close button, step 1922 closes the print window. When any of steps 1896, 1908 or 1918 finds that data called for by a report form is missing, the missing data button 1822 is enabled and step 1888 senses clicking of the missing data button to proceed to step 1924 where the report form for missing data is called. In step 1926 the missing data is listed in the appropriate report form and in step 1928 this report form is displayed in a conventional preview window (not shown). The missing data report can be printed or close button can be clicked to proceed to step 1930 where the preview window displaying the missing data report is closed to return to the previous report settings window.

When any of steps 1892, 1904 or 1914 inactivates the report settings controls, the change settings button 1820 is activated. Then clicking on the button 1820 is sensed in the step 1890, the open report is closed in step 1932 and the inactive settings controls are made active in step 1934 to enable the functions of FIG. 72. The select ages box 1830 in the windows 1812 and 1856 of FIGS. 90 and 91 contain a reset button 1936 which can be selected in step 1938 to cause step 1940 to reset the ages in months displayed in to the box 1830 to a default setting for the currently selected age or developmental level.

Figure 73:
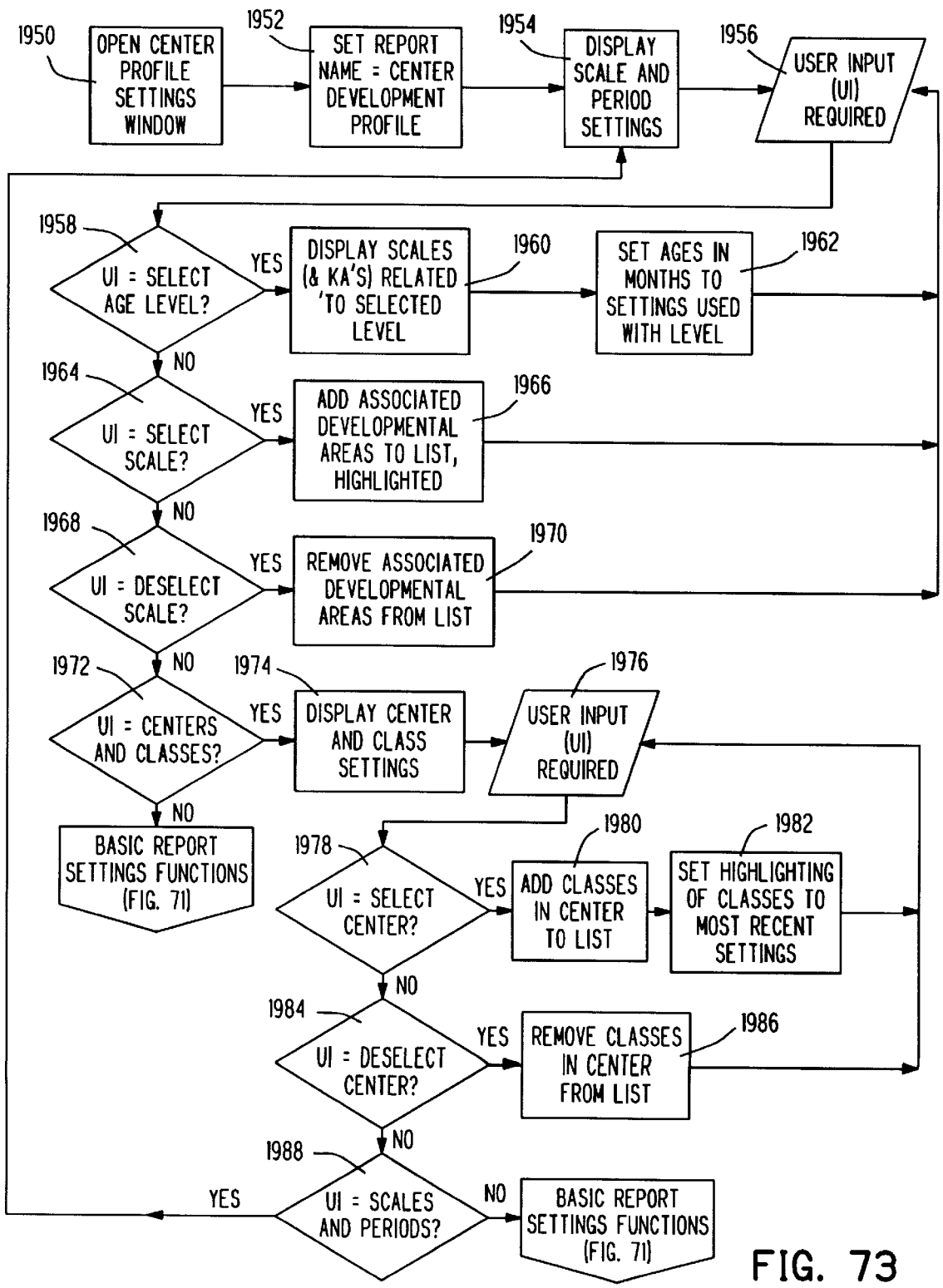
FIG. 73 is a flow diagram of an open center profile settings procedure in the instructional management system program.

A center profile settings window procedure is shown in FIG. 73 and includes step 1950 for opening a center profile settings window (not shown but similar to the agency profile window of FIGS. 90 and 91 except for the title) which is titled "Center Profile Settings". In step 1952 the report name is set to "center development profile". The remaining steps 1954, 1956, 1958, 1960, 1962, 1964, 1966, 1968, 1970, 1972, 1974, 1976, 1978, 1980, 1982, 1984, 1986 and 1988 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner except that selection of more than one center results in a report for each selected center instead of a single report on a single agency. That is, a report similar to report 1900 of FIG. 170 will be produced for each selected center having children within the selected age range.

Figure 74:
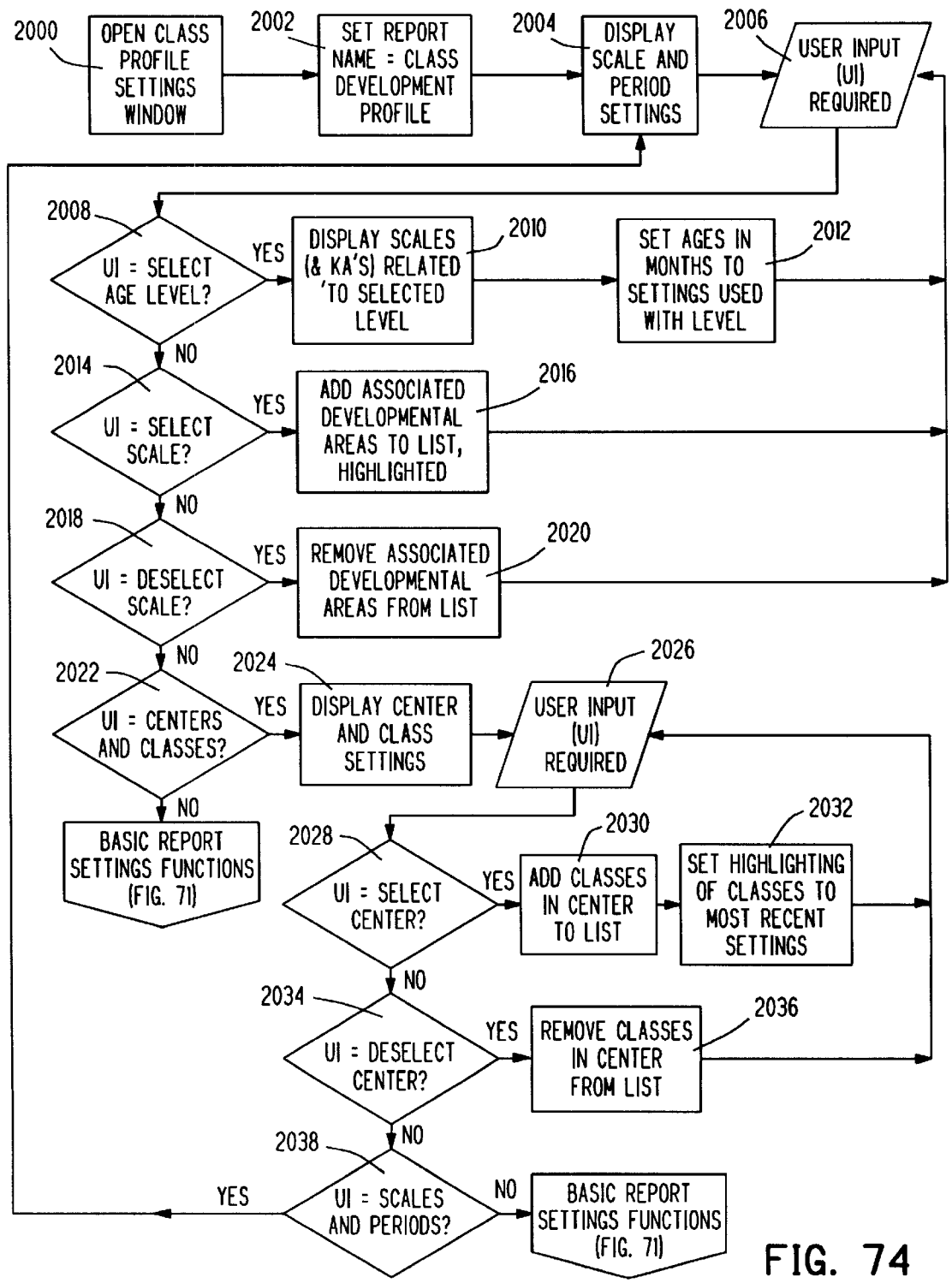
FIG. 74 is a flow diagram of an open class profile settings procedure in the instructional management system program.

A class profile settings window procedure is shown in FIG. 74 and includes step 2000 for opening a class profile settings window (not shown but similar to the agency profile window of FIGS. 90 and 91 except for the title) which is titled "Class Profile Settings". In step 2002 the report name is set to "class development profile". The remaining steps 2004, 2006, 2008, 2010, 2012, 2014, 2016, 2018, 2020, 2022, 2024, 2026, 2028, 2030, 2032, 2034, 2036 and 2038 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner except that selection of more than one class results in a report for each selected class instead of a single report on a single agency. That is, a report similar to report 1900 of FIG. 170 will be produced for each selected class having children within the selected age range.

Figure 75:
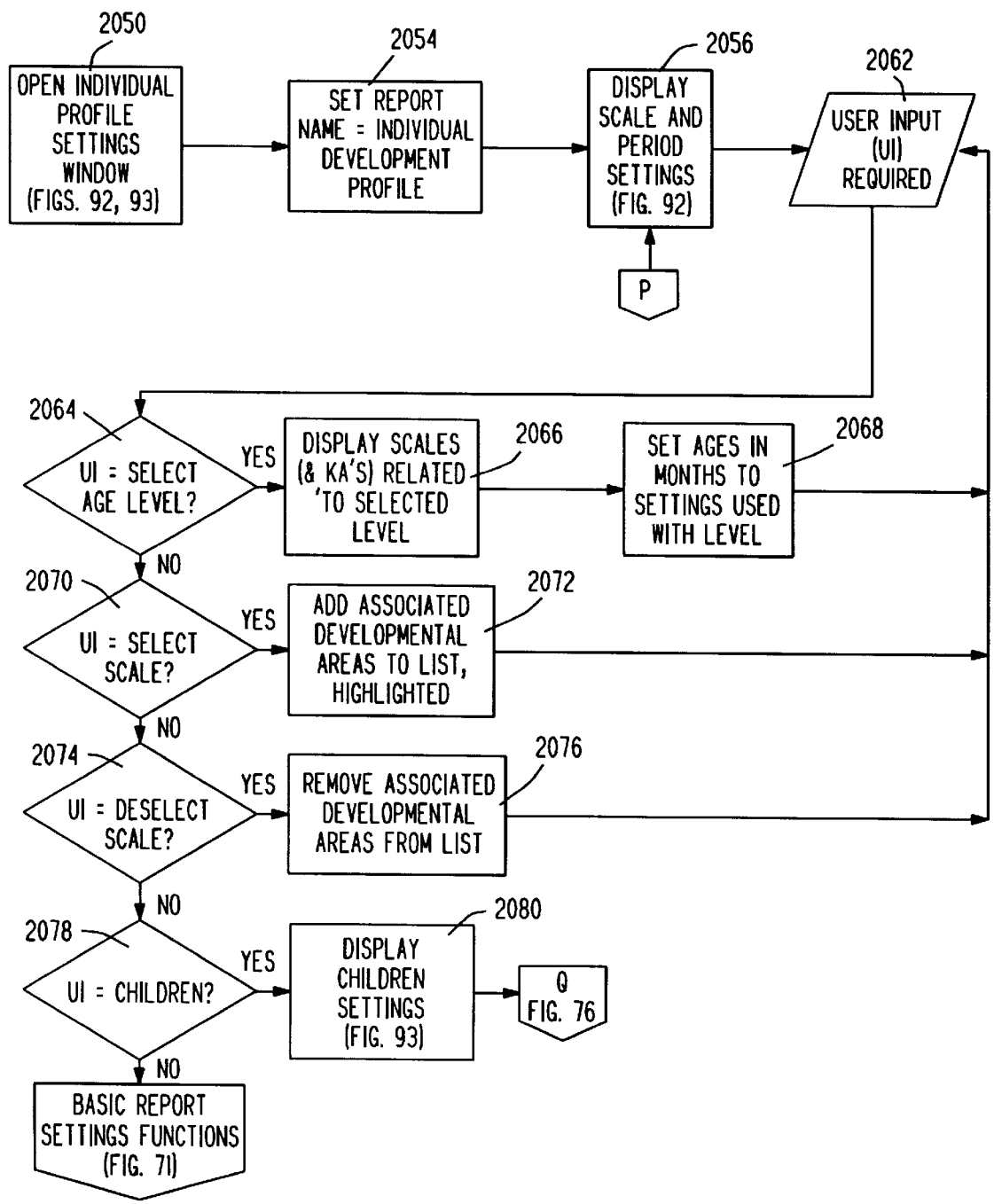
FIG. 75 is a flow diagram of a first portion of an open individual profile settings procedure in the instructional management system program.
Figure 76:
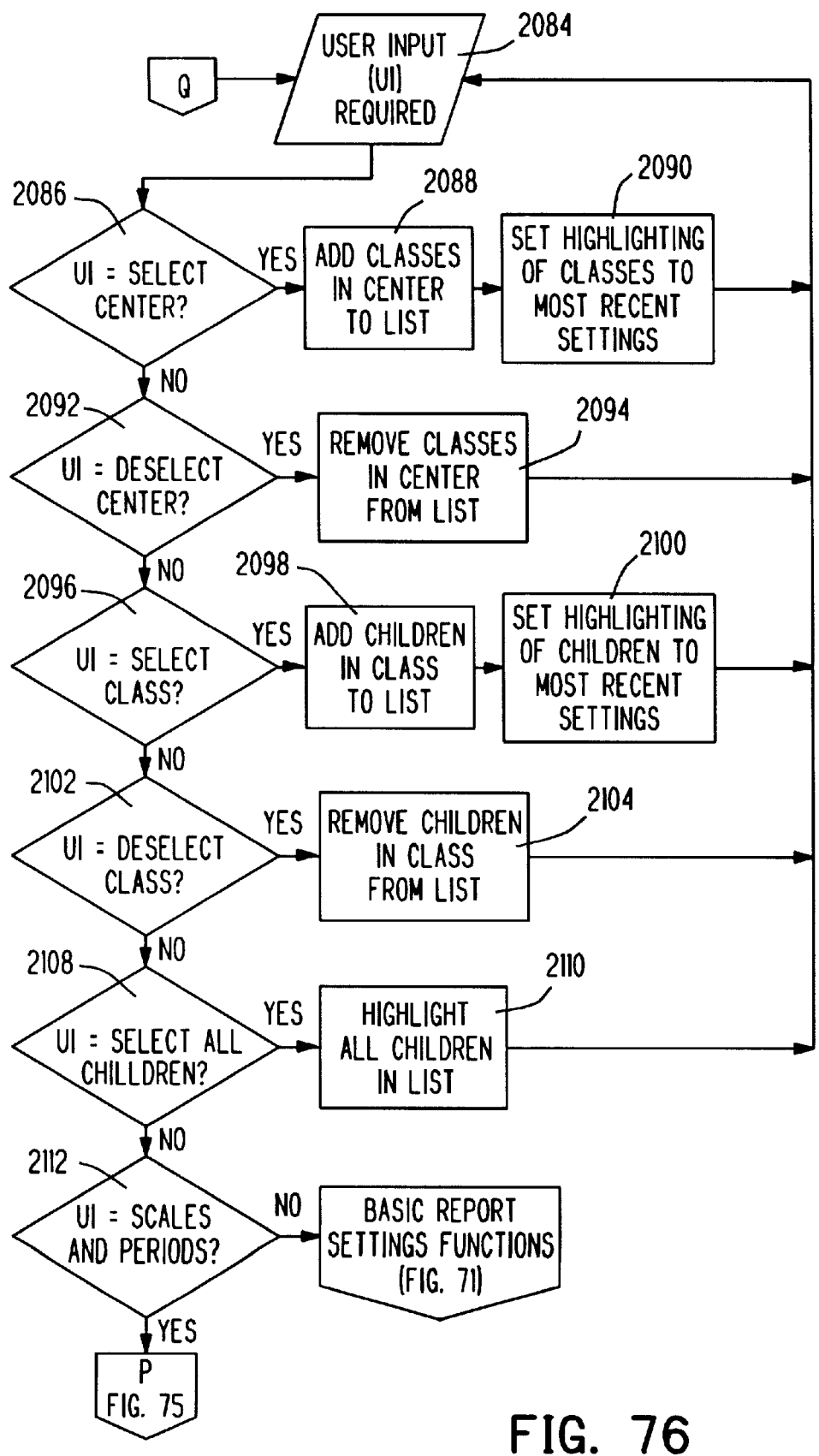
FIG. 76 is a flow diagram of a second portion of the open individual profile settings procedure.
Figure 92:
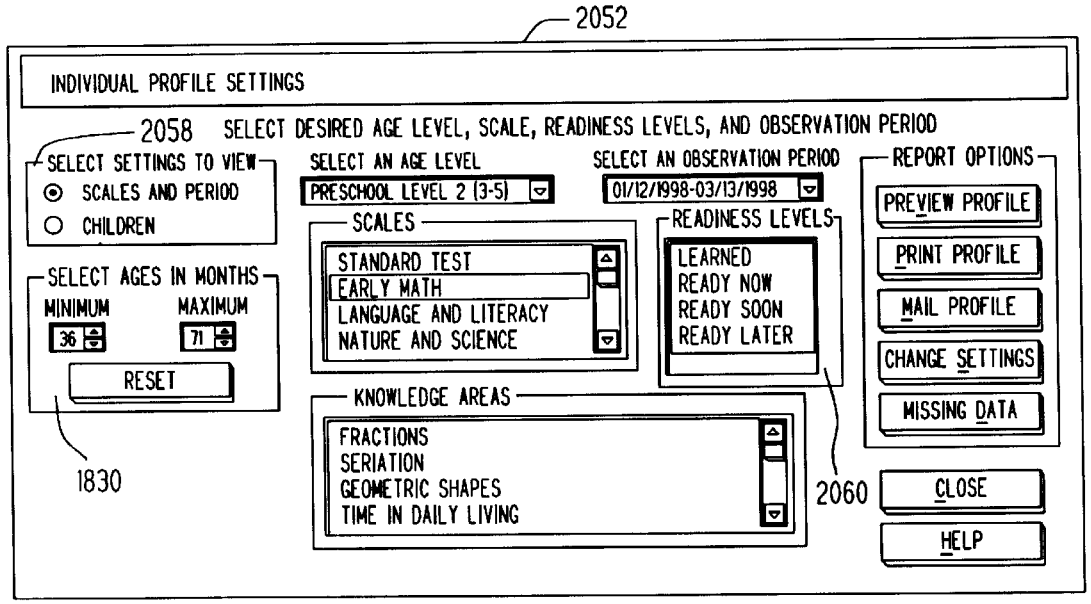
FIG. 92 is an illustration of a first window displayed in the individual profile settings procedure.
Figure 93:
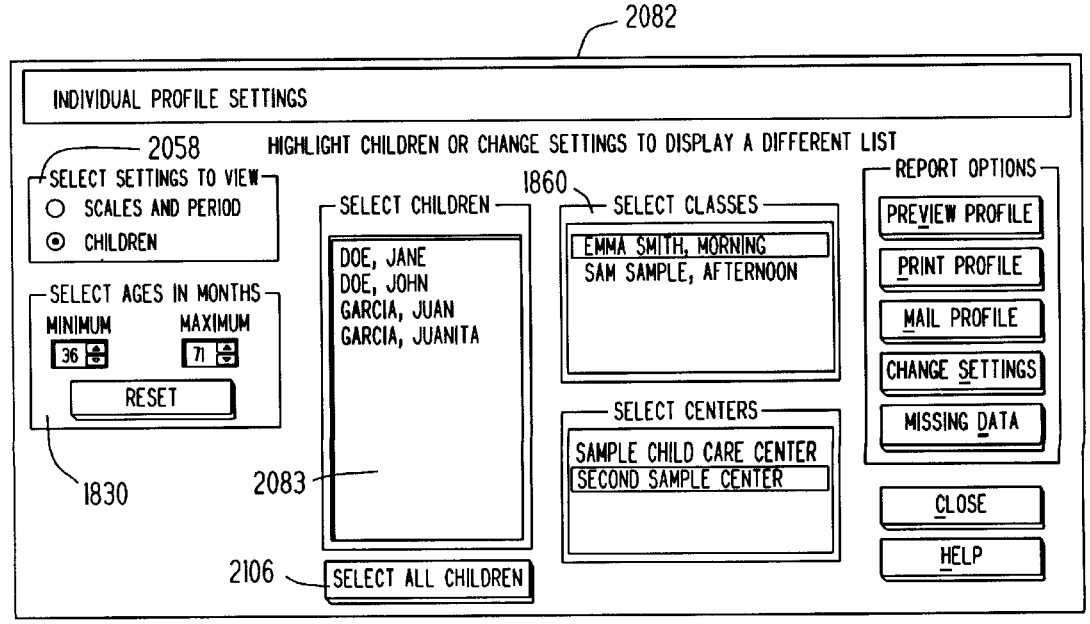
FIG. 93 is an illustration of a second window displayed in the individual profile settings procedure.

Steps employed in the individual profile report settings procedure along, in addition to the basic report settings functions of FIG. 71, are illustrated in FIGS. 75 and 76. In step 2050 the individual profile settings window 2052, FIG. 92, is opened. Next the report name is set to "individual development profile" in step 2054 and the scale and period settings, FIG. 92, are displayed in the window 2052 in step 2056. These scale and period settings are similar to those employed in the window of FIG. 90 except that the select settings to view box 2058, FIG. 92, (compared to box 1852 of FIG. 90) includes the alternate selections "scales and period" (calling for FIG. 92) and "children" (calling for FIG. 93) along with a readiness levels box 2060. User input is enabled at 2062 and steps 2064, 2066, 2068, 2070, 2072, 2074 and 2076 are similar to previously described steps 1838, 1840, 1842, 1844, 1846, 1848 and 1850 of FIG. 72. In step 2078 a click on "children" in box 2058 is sensed to branch to step 2080 where the children settings, FIG. 93, are displayed in the individual profile settings window 2082. The window 2082 is similar to the window 1856 of FIG. 91 except for the select settings to view box 2058 and a select children list box 2083. In FIG. 76, the steps 2084, 2086, 2090, 2092 and 2094 are similar to the steps 1866, 1868, 1870 1872, 1874 and 1876 of FIG. 72. Step 2096 detects a click on a non-highlighted class listed in the select classes box 1860 to highlight the selected class and to proceed to step 2098 where the children in that class are added to the list of children in the select children box 2083 with the highlighting of the children in this list being set in step 2100 to the most recent settings. Clicking on a highlighted class in the in the box 1860 is sensed in step 2102 which then results in de-highlighting the clicked class and in removal by step 2104 of the children of that class from the list of children in box 2083. Similarly a child listed in the box 2083 can be selected (highlighted) or deselected (de-highlighted) by clicking. A select all children button 2106 is associated with the box 2083 and clicking on this button is sensed in step 2108 to highlight or select in step 2110 all the children listed in the box 2083. If "scales and period" in box 2058 is clicked in the window 2082, step 2112 returns the procedure to step 2056 of FIG. 75.

FIG. 171 illustrates the individual development profile report 2114 which can be printed by step 1910 of FIG. 71 while in the individual profile settings procedure. The heading of the report contains the name of the child and the scale, observation period, class, center and agency are listed. The readiness, "learned", "ready now", "ready soon" and "ready later" are set forth in the left column for each of the capabilities in the selected developmental area (scale). If during the settings procedure one or more readiness levels in readiness levels box 2060 are deselected (de-highlighted), those capabilities having such deselected readiness level or levels are left out of the report 2114. Thus it is possible to print out an individual profile report listing only those capabilities with one or more readiness levels, such as "ready now" or "ready soon".

Figure 77:
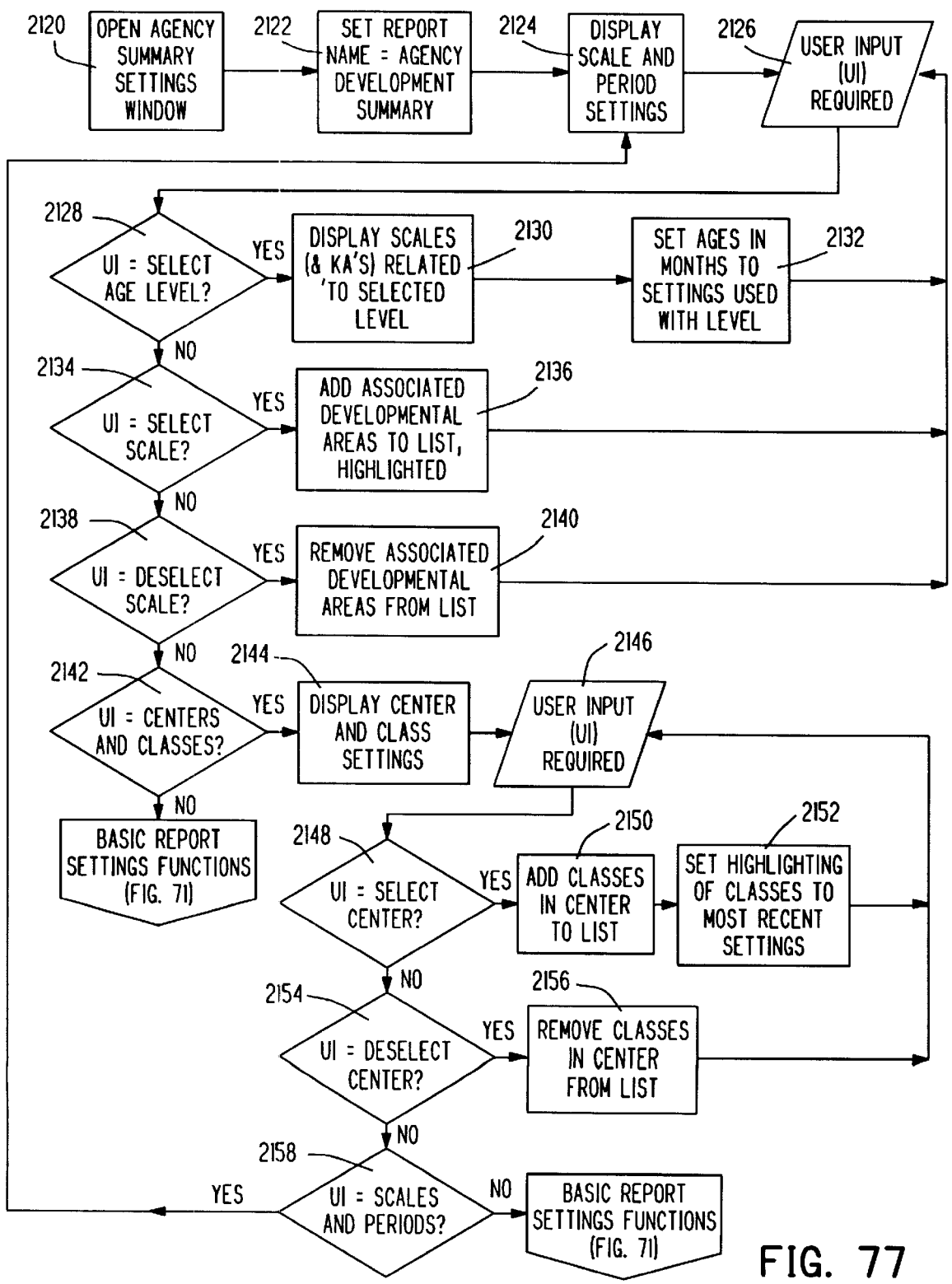
FIG. 77 is a flow diagram of an open agency summary settings procedure in the instructional management system program.

FIG. 77 includes several agency summary settings procedural steps performed, in addition to the common report settings steps of FIG. 71, when developmental summary is selected in the reports menu 622 in FIG. 26 along with selection of agency summary in the corresponding submenu (not shown but similar to agency profile in submenu 624). Step 2120 opens an agency summary settings window (not shown but similar to the agency profile window of FIGS. 90 and 91 except for the title and the absence of the knowledge area list box) which is titled "Agency Summary Settings". In step 2122 the report name is set to "agency development summary". The remaining steps 2124, 2126, 2128, 2130, 2132, 2134, 2136, 2138, 2140, 2142, 2144, 2146, 2148, 2150, 2152, 2154, 2156 and 2158 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner. An agency development summary report 2160 is shown in FIG. 172 and includes various average scores such as developmental level score, normal curve equivalent, percentile and standard score for the students of the selected agency in the selected developmental area and developmental level.

Figure 78:
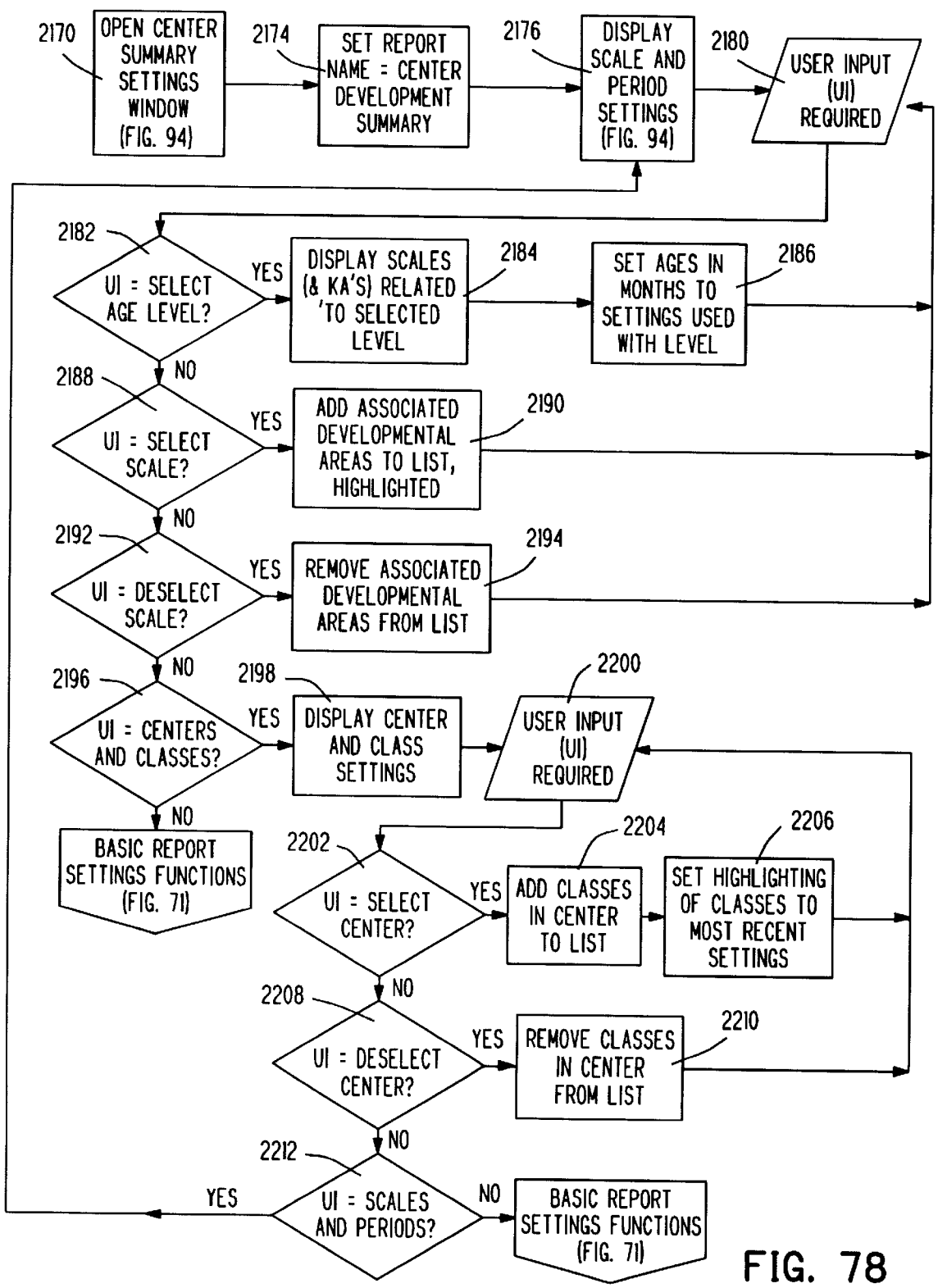
FIG. 78 is a flow diagram of an open center summary settings procedure in the instructional management system program.
Figure 94:
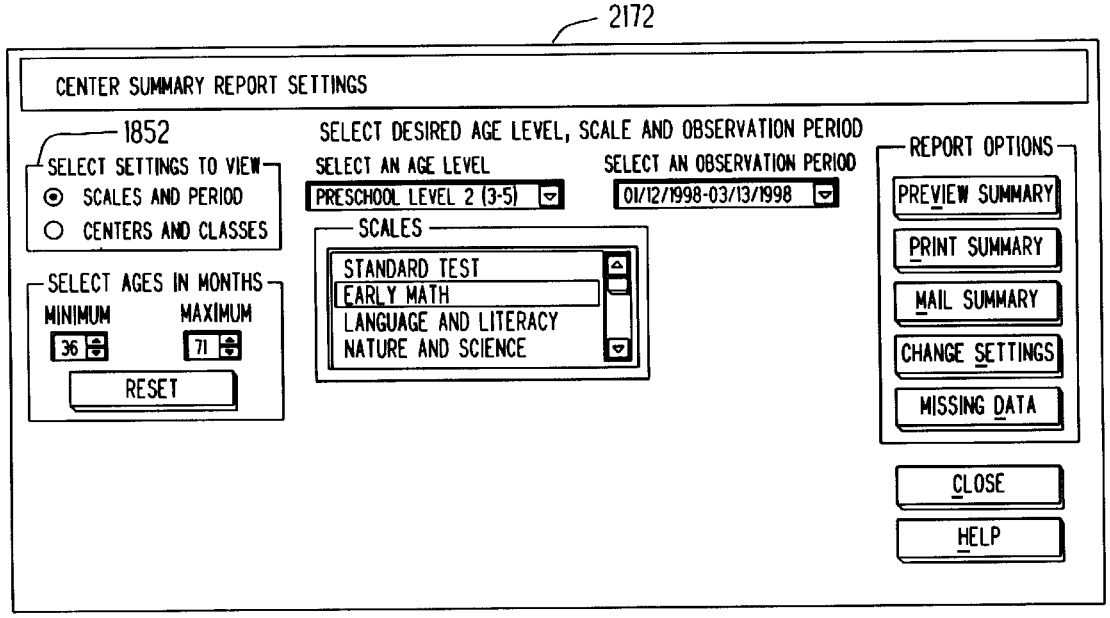
FIG. 94 is an illustration of a first window displayed in the center summary settings procedure.
Figure 95:
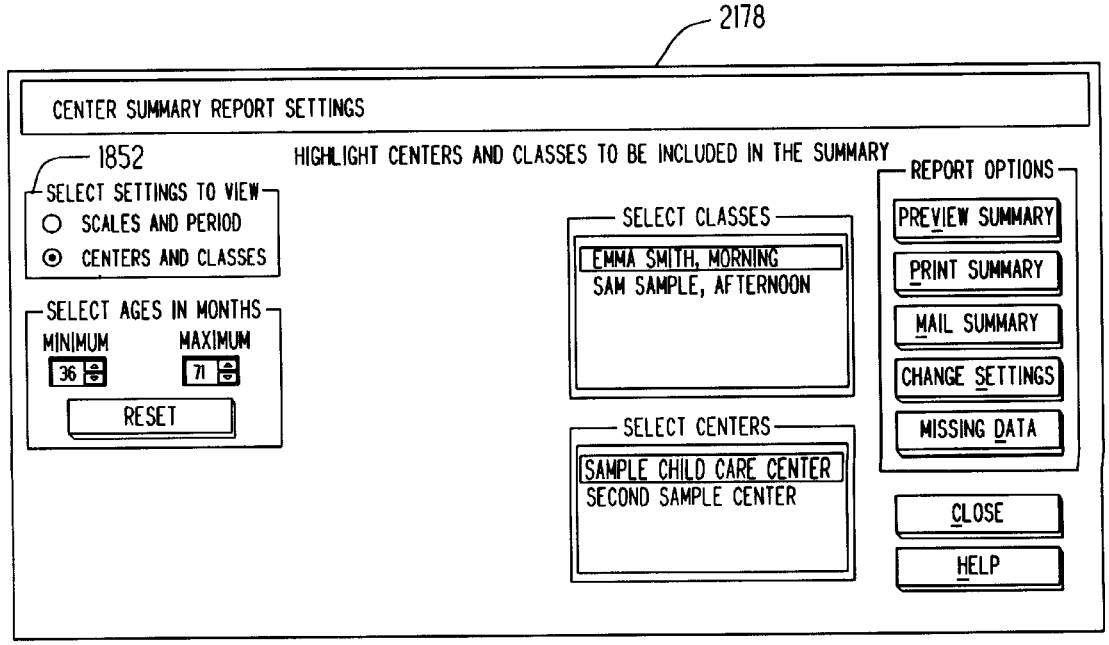
FIG. 95 is an illustration of a second window displayed in the center summary settings procedure.

When a center development summary report is requested from the reports menu of FIG. 26, the open center summary settings procedure of FIG. 78 along with the basic reports settings procedure of FIG. 71 is called. Step 2170 opens the center summary settings window 2172, FIG. 94, step 2174 sets the report name to center development summary, and step 2176 displays the scales and period settings within the window. The window 2172 and its associated window 2178 in FIG. 95 with the centers and class selection boxes are similar, except for their title and the absence of the knowledge areas list box, to the windows 1812 and 1856 of FIGS. 90 and 91. Additionally, steps 2180, 2182, 2184, 2186, 2188, 2190, 2192, 2194, 2196, 2198, 2200, 2202, 2204, 2206, 2208, 2210 and 2212 are similar to the corresponding steps 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner. The report produced by the center summary report procedure is similar to the agency summary report of FIG. 172 except for its title and the scores which are an average of the selected center and classes in the center.

Figure 79:
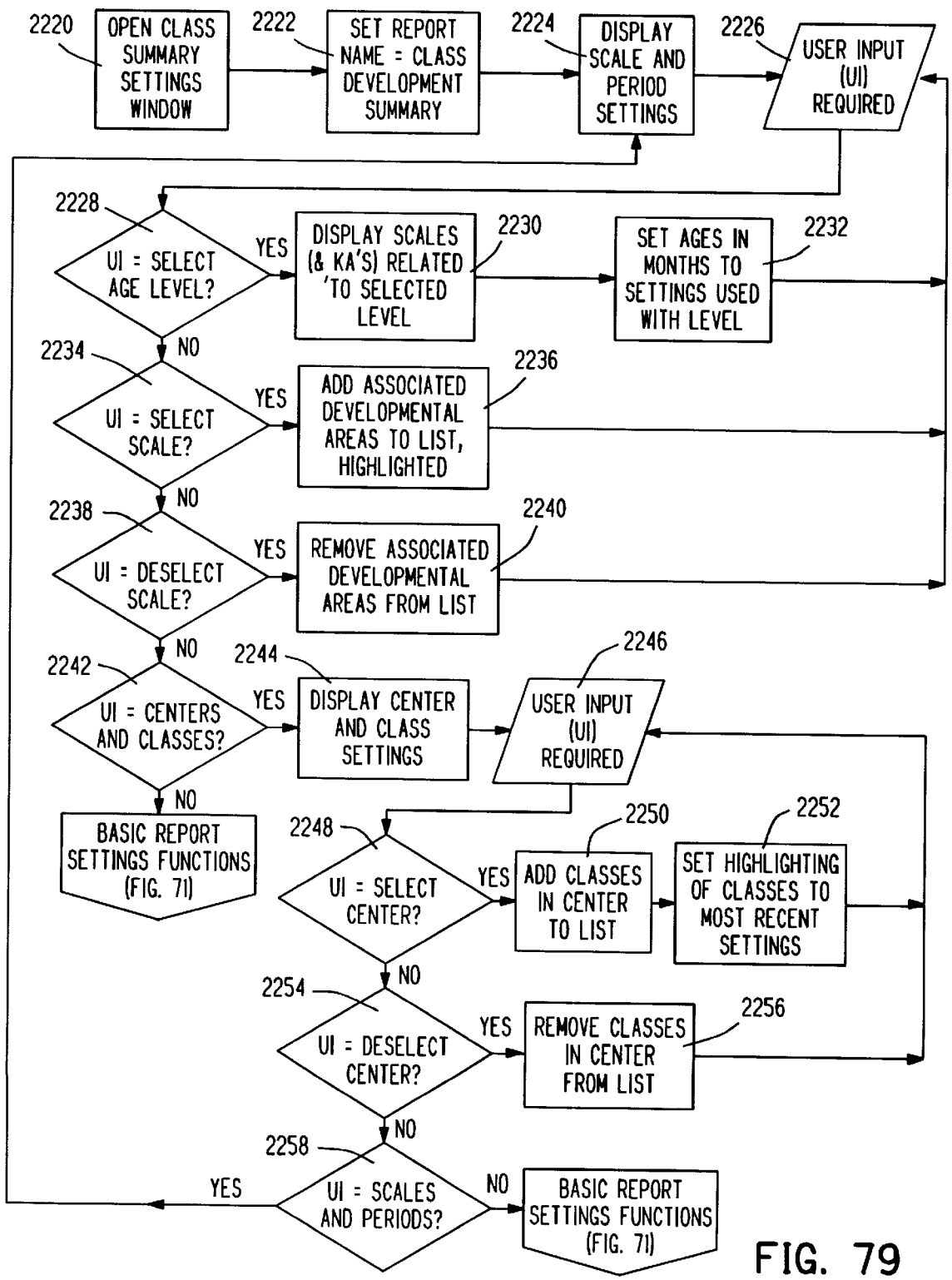
FIG. 79 is a flow diagram of an open class summary settings procedure in the instructional management system program.

A class summary settings window procedure is shown in FIG. 79 and includes step 2220 for opening a class summary settings window (not shown but similar to the agency profile window of FIGS. 90 and 91 except for the title and the absence of the knowledge areas list box) which is titled "Class Summary Settings". In step 2222 the report name is set to "class development summary". The remaining steps 2224, 2226, 2228, 2230, 2232, 2234, 2236, 2238, 2240, 2242, 2244, 2246, 2248, 2250, 2252, 2254, 2256 and 2258 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner except that selection of more than one class results in a report for each selected class instead of a single report on a single agency. That is, a report similar to report 2160 of FIG. 172 with average scores for each selected class having children within the selected age range is produced.

Figure 80:
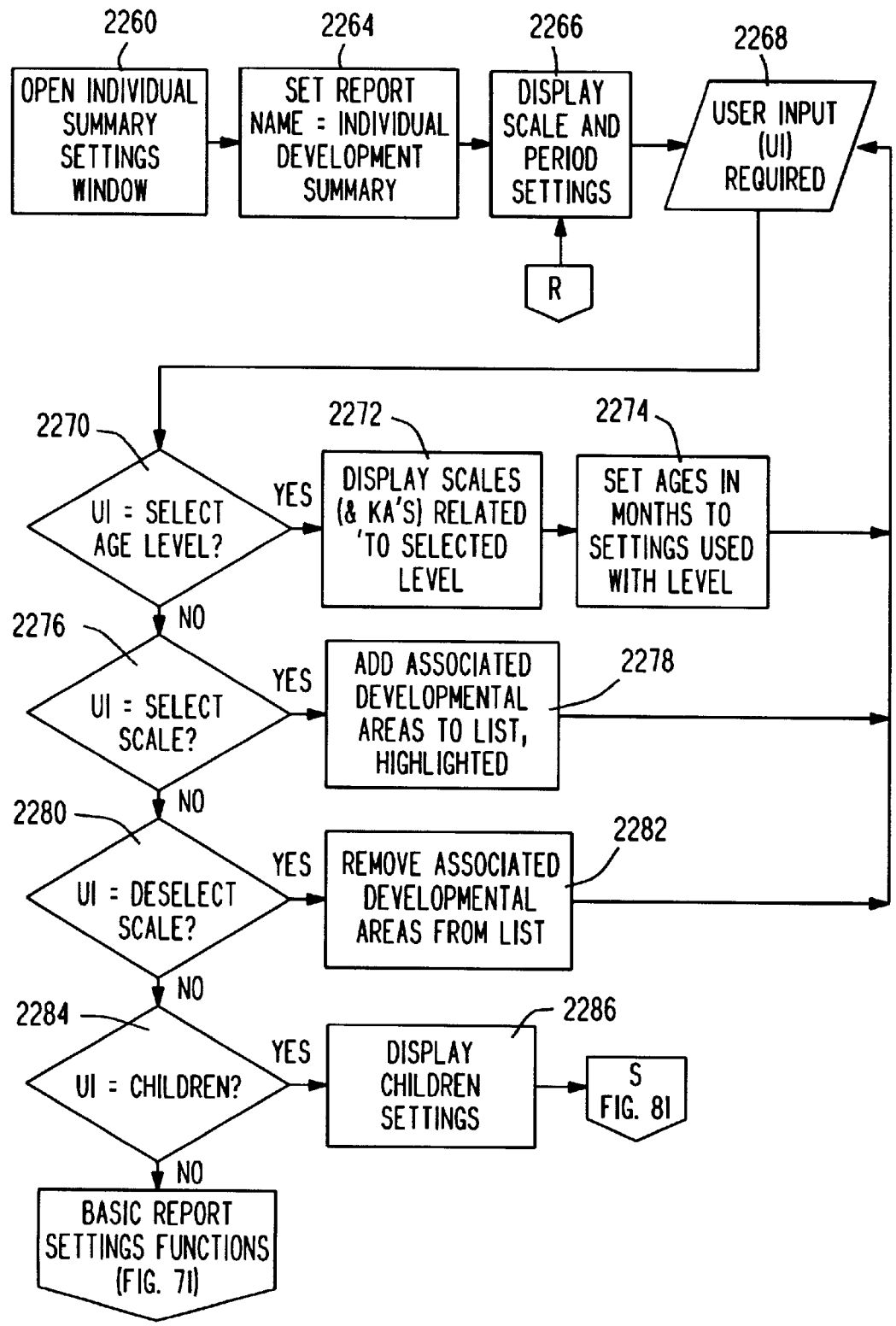
FIG. 80 is a flow diagram of a first portion of an open individual summary settings procedure in the instructional management system program.
Figure 81:
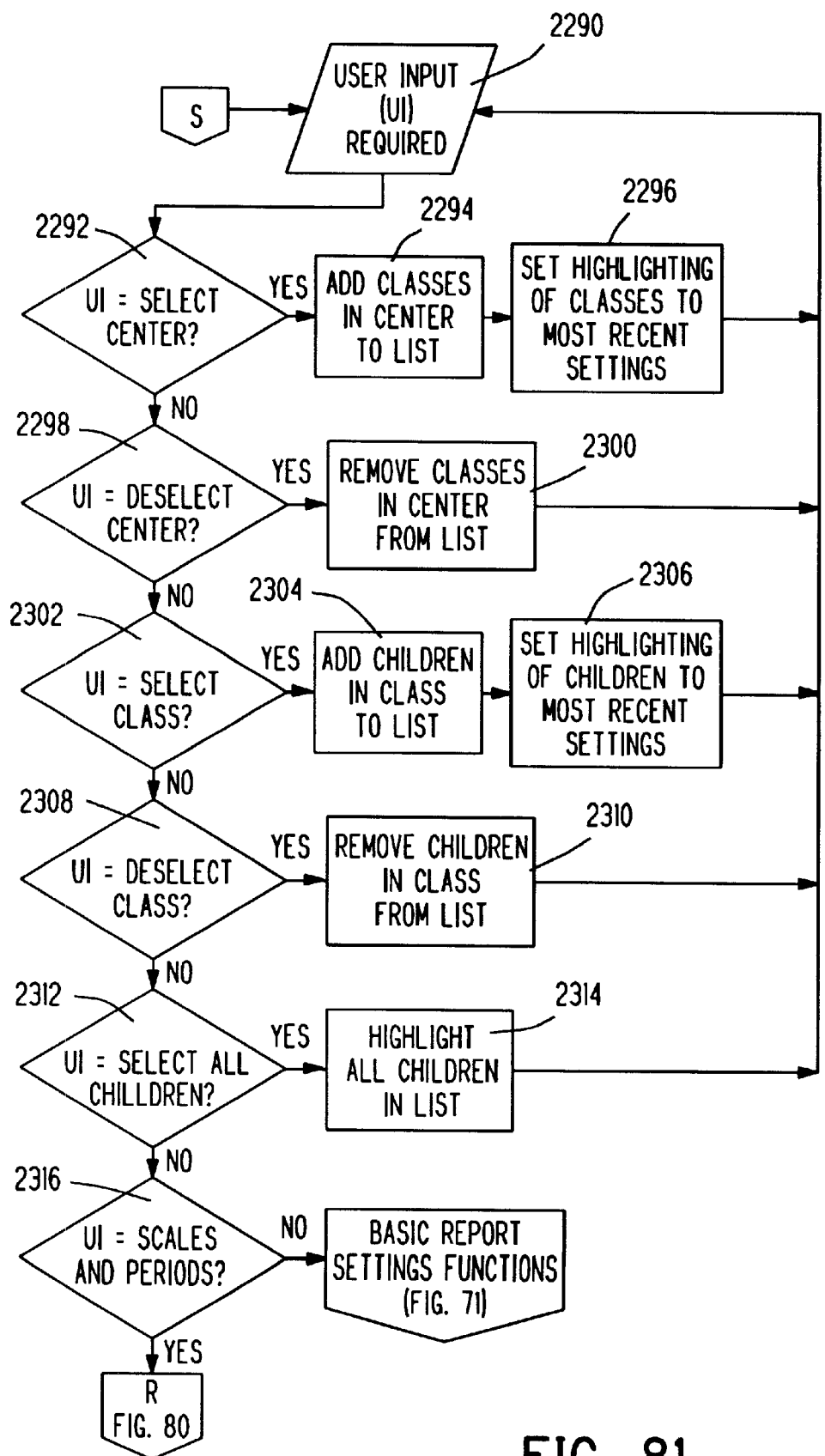
FIG. 81 is a flow diagram of a second portion of the open individual summary settings procedure.
Figure 96:
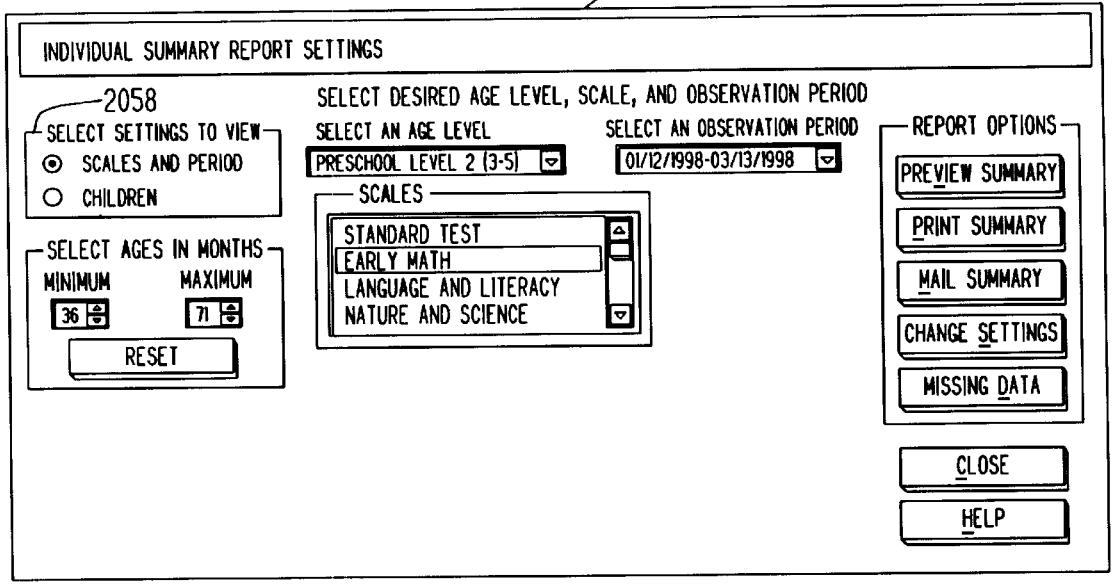
FIG. 96 is an illustration of a first window displayed in the individual summary settings procedure.
Figure 97:
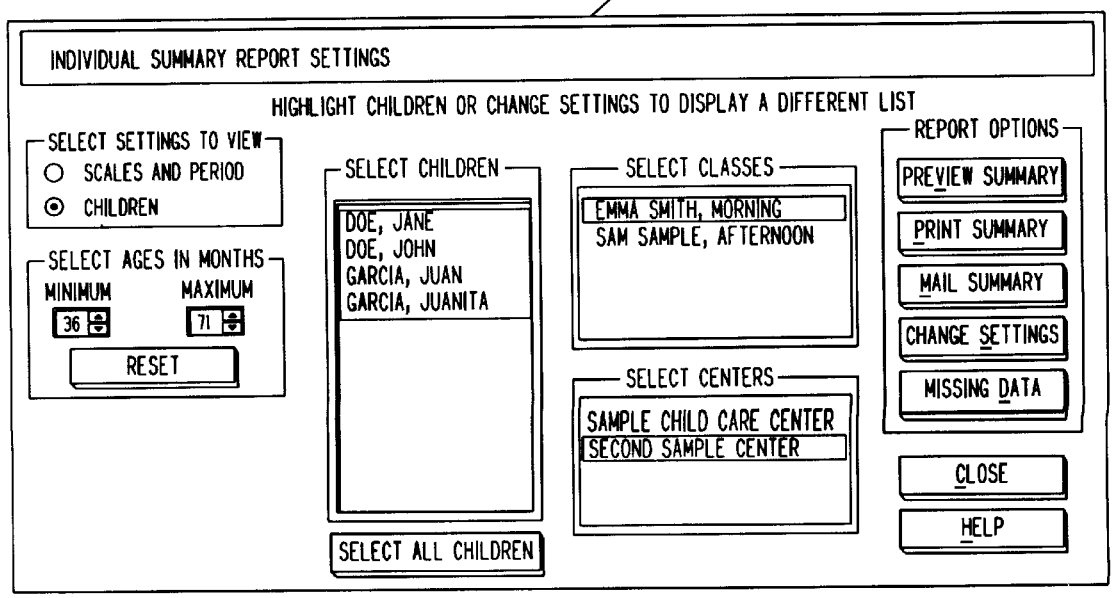
FIG. 97 is an illustration of a second window displayed in the individual summary settings procedure.

Steps employed in the individual summary report settings procedure along with the basic report settings functions of FIG. 71 are illustrated in FIGS. 80 and 81. In step 2260 the individual profile settings window 2262, FIG. 96, is opened. Next the report name is set to "individual development profile" in step 2264 and the scale and period settings, FIG. 96, are displayed in the window 2262 in step 2266. These scale and period settings are similar to those employed in the window of FIG. 94 except that the window 2262 includes the select settings to view box 2058 with the alternate selections "scales and period" (calling for FIG. 96) and "children" (calling for FIG. 97) instead of the view box 1852. User input is enabled at 2268 and steps 2270, 2272, 2274, 2276, 2278, 2280 and 2282 are similar to previously described steps 1838, 1840, 1842, 1844, 1846, 1848 and 1850 of FIG. 72. In step 2284 a click on "children" in box 2058 is sensed to branch to step 2286 where the children settings, FIG. 97, are displayed in the individual profile settings window 2288. The window 2288 is similar to the window 2082 of FIG. 93. In FIG. 81, the steps 2290, 2292, 2294, 2296, 2298, 2300, 2302, 2304, 2306, 2308, 2310, 2312, 2314 and 2316 are similar to the steps 2084, 2086, 2088, 2090, 2092, 2094, 2096, 2098, 2100, 2102, 2104, 2108, 2110 and 2112 of FIG. 76 and function in a similar manner. FIG. 173 illustrates the individual development summary report 2318 which can be printed by step 1910 of FIG. 71 while in the individual summary report procedure. The heading of the report contains observation period, center, agency, and class. A list of selected children in the selected class or classes is printed together with their developmental level score, normal curve equivalent, percentile and standard score for each of the selected scales (developmental areas).

Figure 82:
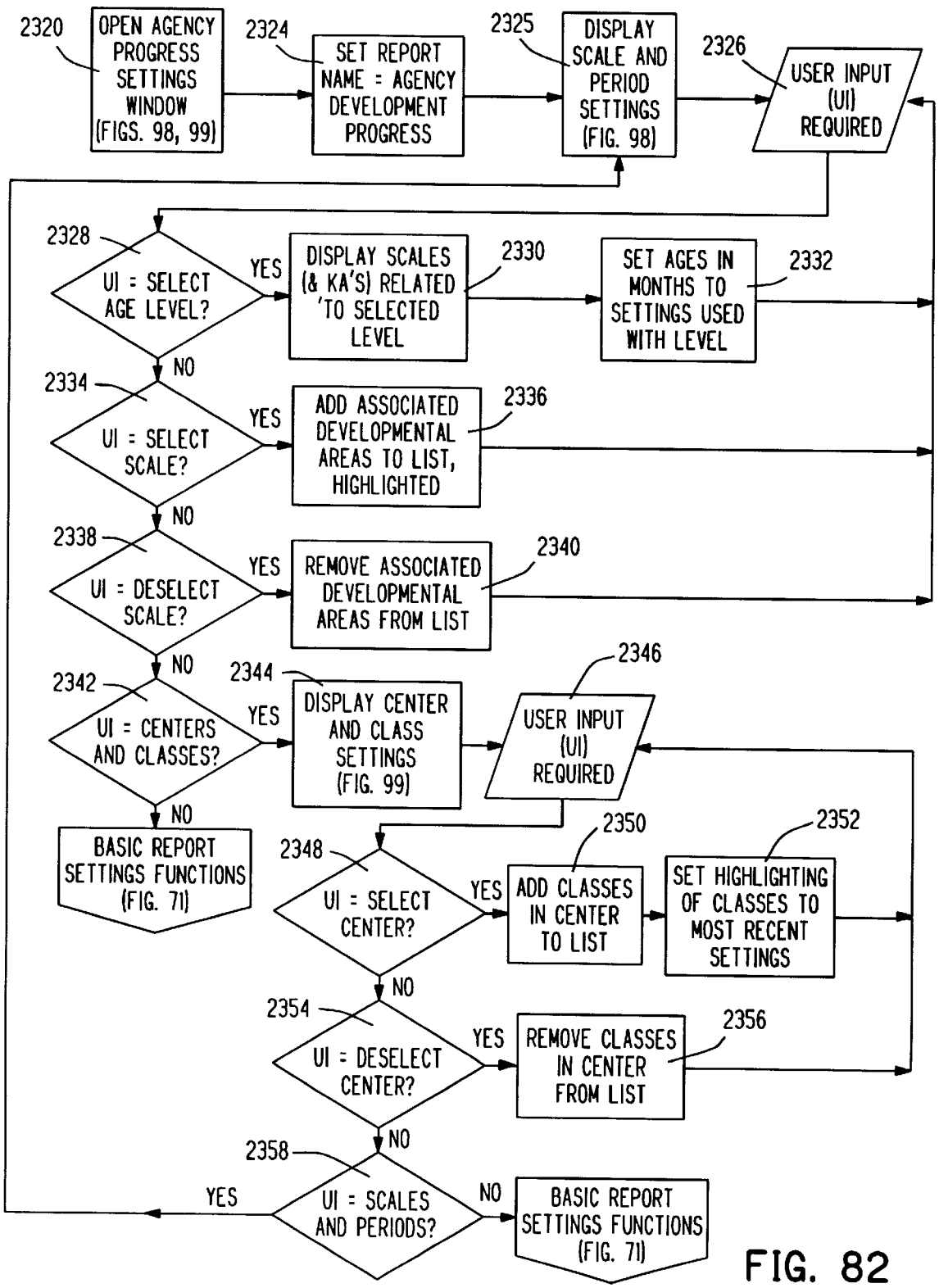
FIG. 82 is a flow diagram of an open agency progress settings procedure in the instructional management system program.

Selection of an agency progress report from the reports menu runs the procedure of FIG. 82 along with the basic report procedure of FIG. 71. In step 2320 the agency progress settings window 2321 in FIG. 98 with the title "Agency Progress Report Settings". Besides the title, this window differs from the previous report setting windows in that the window 2321 contains both a select first period selection box 2322 and a select second period selection box 2323. The agency scores in the selected developmental area during the first and second observation periods are compared in the agency progress report. In step 2324 the report name is set to agency development progress and in step 2325 the scale and period settings are placed in the window. The following steps 2326, 2328, 2330, 2332, 2334, 2336, 2338, 2340, 2342, 2344, 2346, 2348, 2350, 2352, 2354, 2356 and 2358 are similar to the corresponding steps 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner. The window 2360 of FIG. 99 shows the agency progress settings window with the select centers and select classes boxes displayed in step 2344. A report 2362 of FIG. 174 is produced with vertical bars illustrating the beginning, intermediate and advanced state average score of the students in the selected centers and classes of the agency for the selected first and second observational periods so that the progress of the development of the students in the agency is illustrated.

Figure 83:
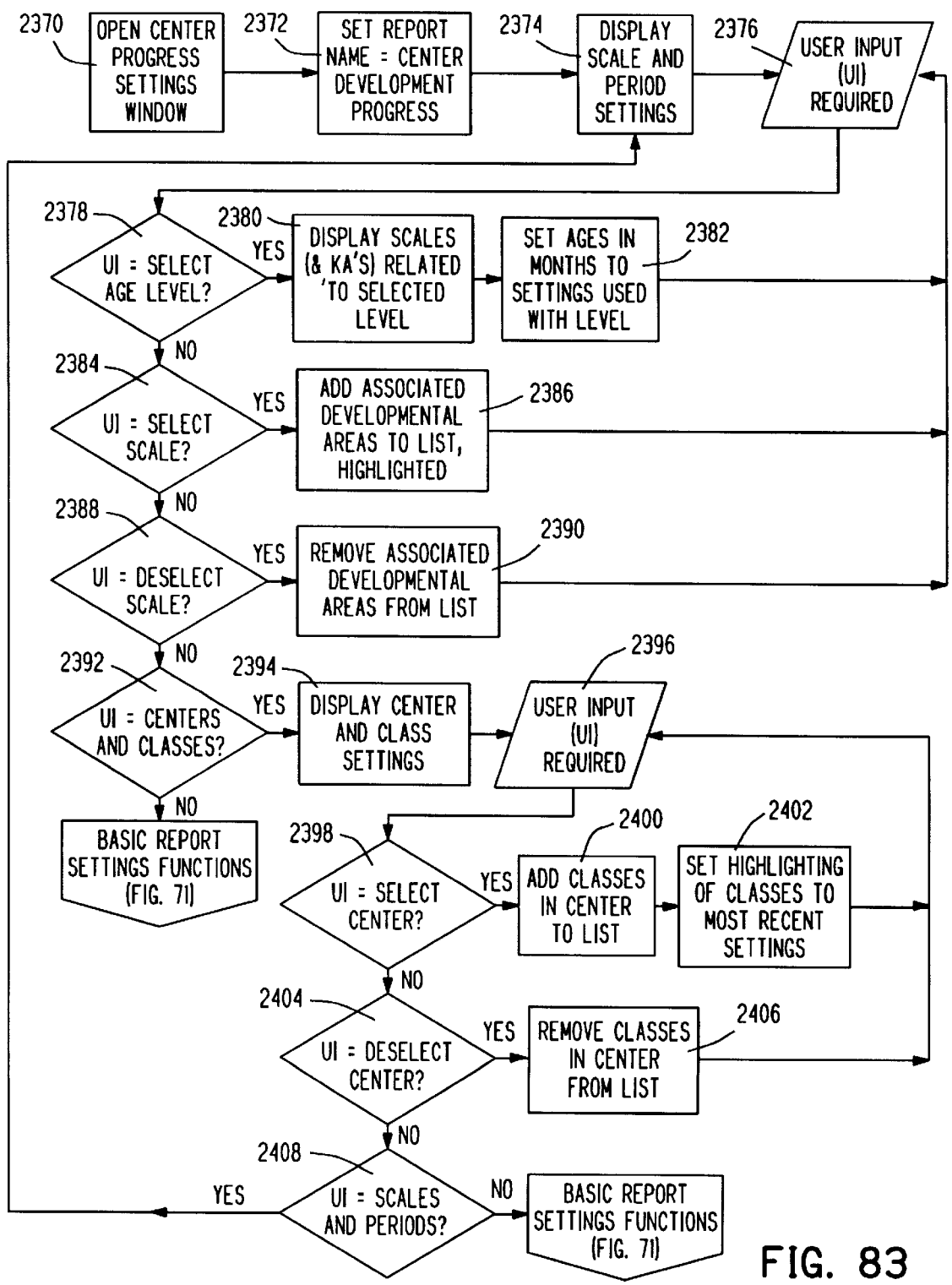
FIG. 83 is a flow diagram of an open center progress settings procedure in the instructional management system program.
Figure 84:
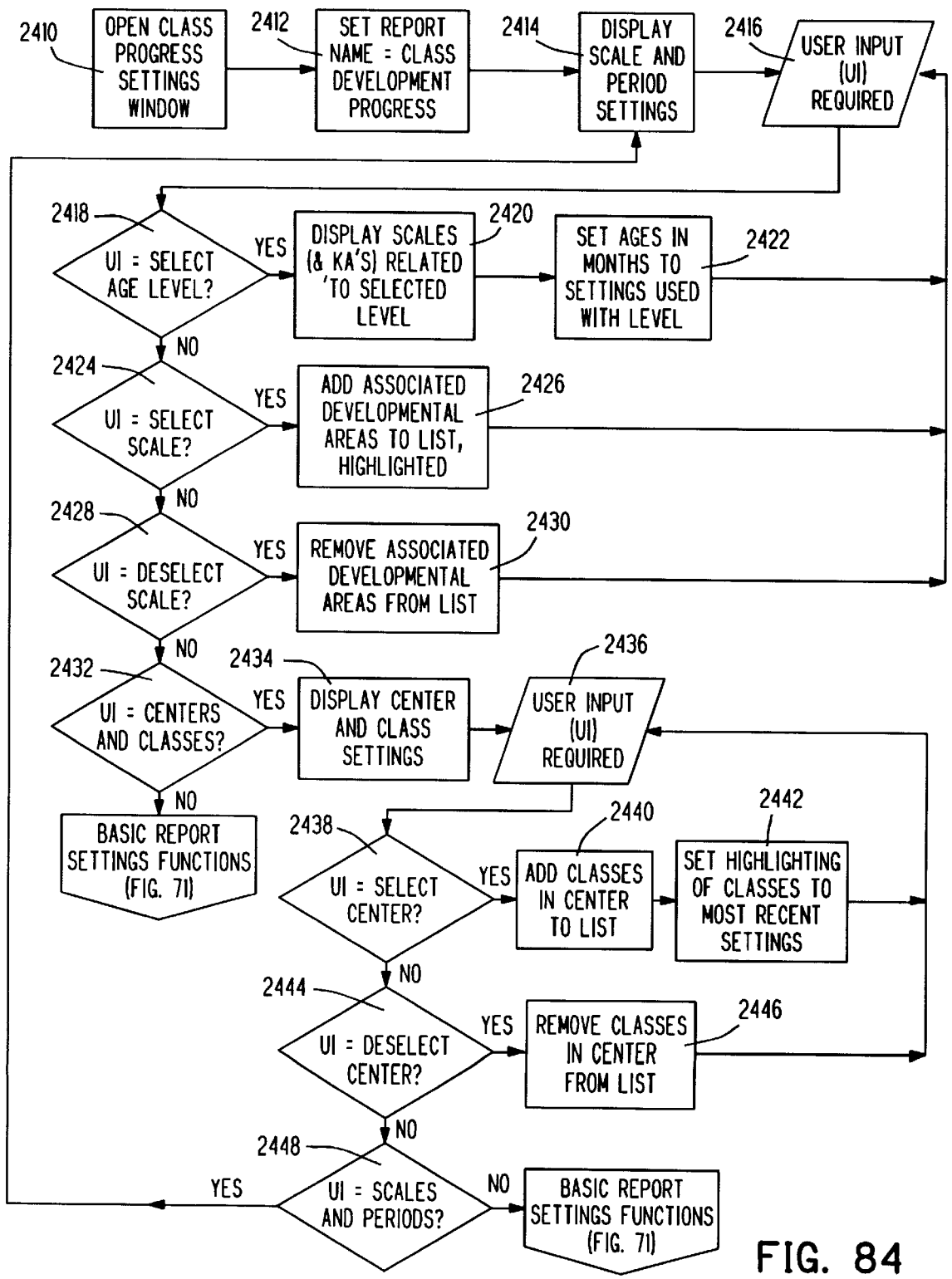
FIG. 84 is a flow diagram of an open class progress settings procedure in the instructional management system program.
Figure 85:
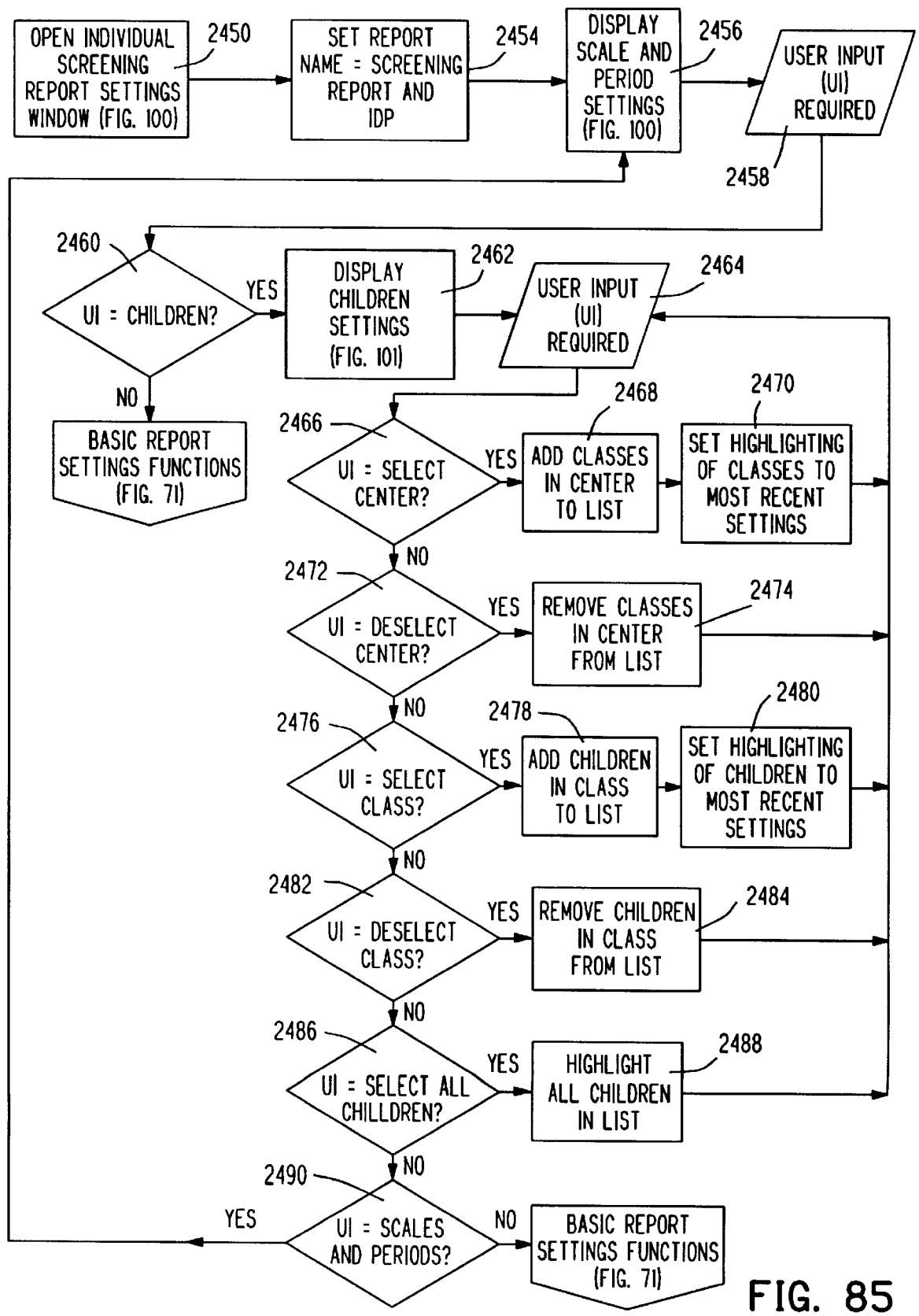
FIG. 85 is a flow diagram of an open individual screening report settings procedure in the instructional management system program.
Figure 98:
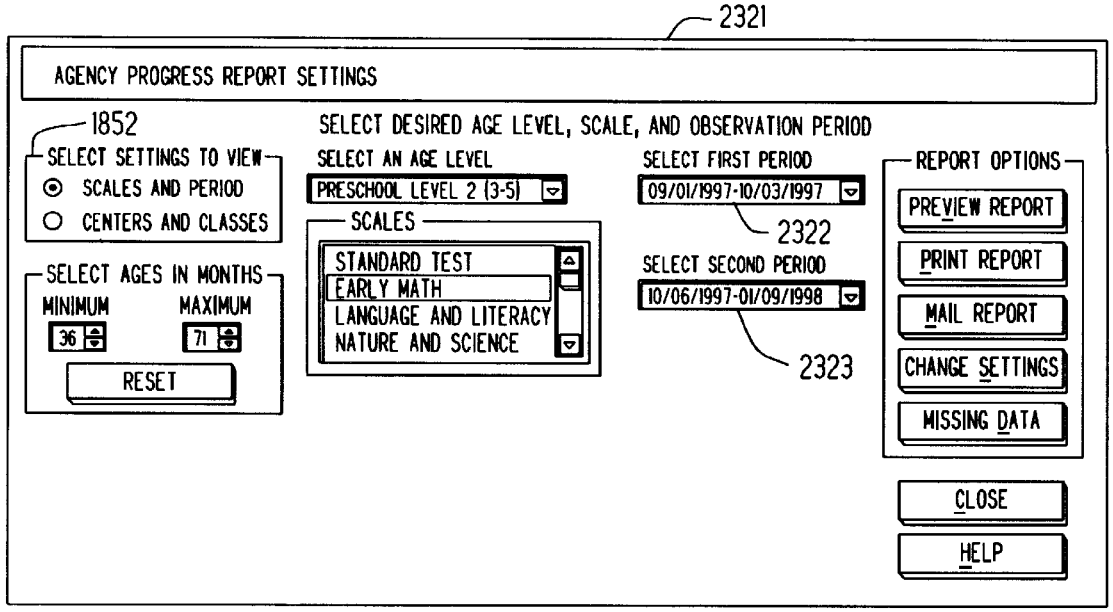
FIG. 98 is an illustration of a first window displayed in the class progress settings procedure.
Figure 99:
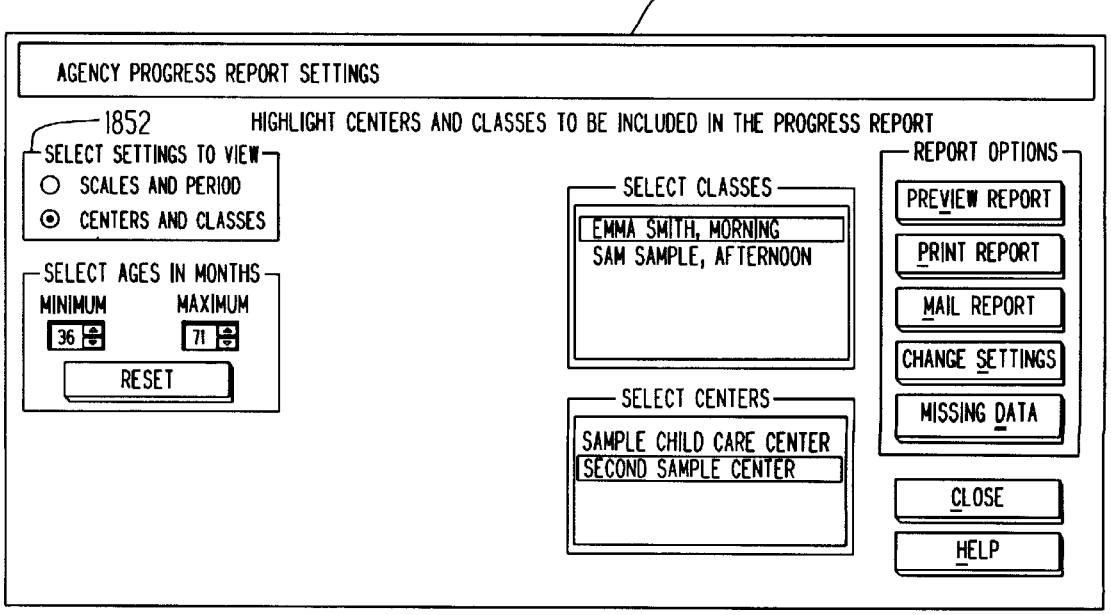
FIG. 99 is an illustration of a second window displayed in the class progress settings procedure.

When a progress report on a center is selected in the reports menu, step 2370 of FIG. 83 opens a center progress settings window (not shown but similar to the agency progress settings window of FIGS. 98 and 99 except for the title) and step 2372 sets the report name to center development progress report. The following steps 2374, 2376, 2378, 2380, 2382, 2384, 2386, 2388, 2390, 2392, 2394, 2396, 2398, 2400, 2402, 2404, 2406 and 2408 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner. Again a center progress report, similar to the agency progress report of FIG. 174 but with a different title and the name of the agency listed, is printed with bar charts comparing the development status of the children in the selected center for selected first and second observational periods.

A class progress report can be printed by selection in the reports menu. Step 2410 of FIG. 84 opens a class progress settings window (not shown but similar to the agency progress settings window of FIGS. 98 and 99 except for the title) and step 2412 sets the report name to class development progress report. The following steps 2414, 2416, 2418, 2420, 2422, 2424, 2426, 2428, 2430, 2432, 2434, 2436, 2438, 2440, 2442, 2444, 2446 and 2448 are similar to the corresponding steps 1810, 1836, 1838, 1840, 1842, 1844, 1846, 1848, 1850, 1854, 1858, 1866, 1868, 1870 1872, 1874, 1876 and 1878 in the agency settings window procedure of FIG. 72 and function in a similar manner. A class progress report, similar to the agency progress report of FIG. 174 but with a different title and the names of the agency and center listed, is printed with bar charts comparing the development status of the children in the selected class for the selected first and second observational periods.

Figure 100:
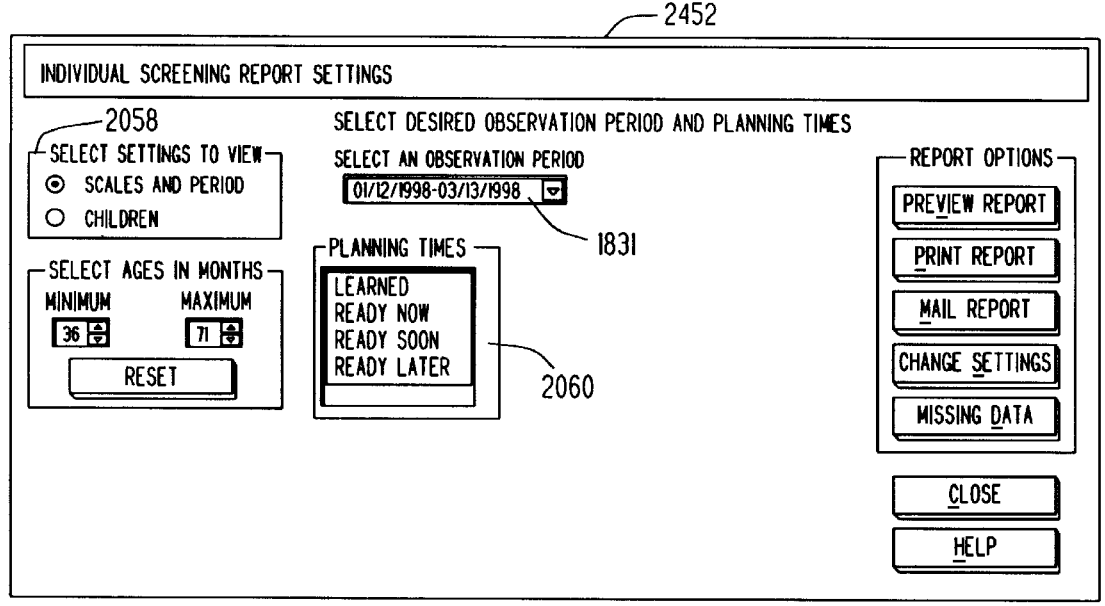
FIG. 100 is an illustration of a first window displayed in the individual screening settings procedure.
Figure 101:
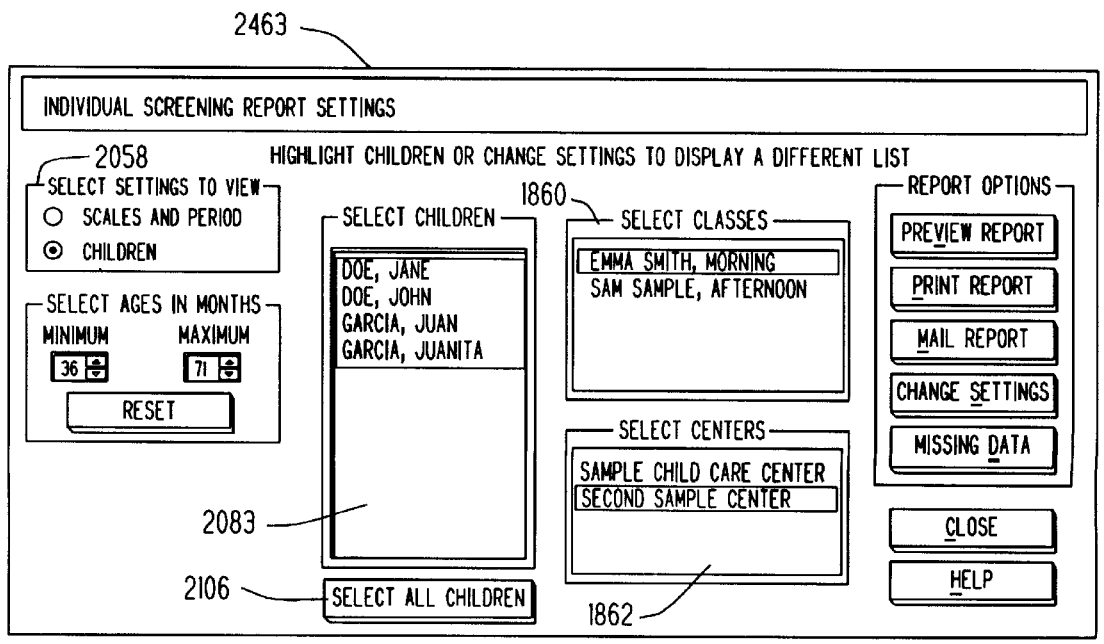
FIG. 101 is an illustration of a second window displayed in the individual screening settings procedure.

When the user selects a screening report and IDP from the reports menu, step 2450 opens the individual screening report settings window 2452 of FIG. 100, step 2454 sets the report name to screening report and IDP, and step 2456 displays the select period and planing times list boxes 1831 and 2060 in the window 2454. User input is enabled in step 2458 permitting the user to select an observation period from the period box 1831 and to select planning times in the planning times box 2060 for which learning capabilities are to be printed, that is, the report will list only the learning capabilities for which the child has the selected planning time or times. For example the user may wish to have a printed report listing learning capabilities for which the child or children are "ready now". Step 2460 senses the clicking on children in box 2058 and results in step 2462 displaying the window 2463 of FIG. 101 with the select children list box 2083, the select class list box 1860 and the select centers list box 1862. In step 2466, selection of a center (clicking on a non-highlighted center) in the center list box 1862 is detected to result in step 2468 adding the classes in the selected center to the class list box 1860 with the highlighting of those added classes in accordance with the most recent previous settings using such added classes. Clicking on a highlighted center in the center list box is sensed in step 2472 to remove the corresponding classes from the class list box in step 2474. Clicking on a non-highlighted class in the class list box is detected in step 2476 and causes the children in the selected class to be added to the children list box 2083 in step 2478 with the highlighted or selected children in the added names being in accordance with the most previous selection. When a highlighted class in the class list box is clicked, step 2482 responds to remove the children of that class from the class list box in step 2484. Clicking on the select all children button 2106 results in step 2488 highlighting or selecting all the children listed in the children list box 2083. When scales and period is clicked in the box 2058, the program returns to the step 2456 and the window 2452 of FIG. 100. Clicking on the print button returns back to the basic report settings functions of FIG. 71 to print out the report 2492 of FIG. 175 which includes the name of the student in the title, the various scores for the standard test under the heading "screening results", and the list of learning capabilities (objectives) with the students learning or planning status (planning goals) listed in their corresponding knowledge areas.

Figure 86:
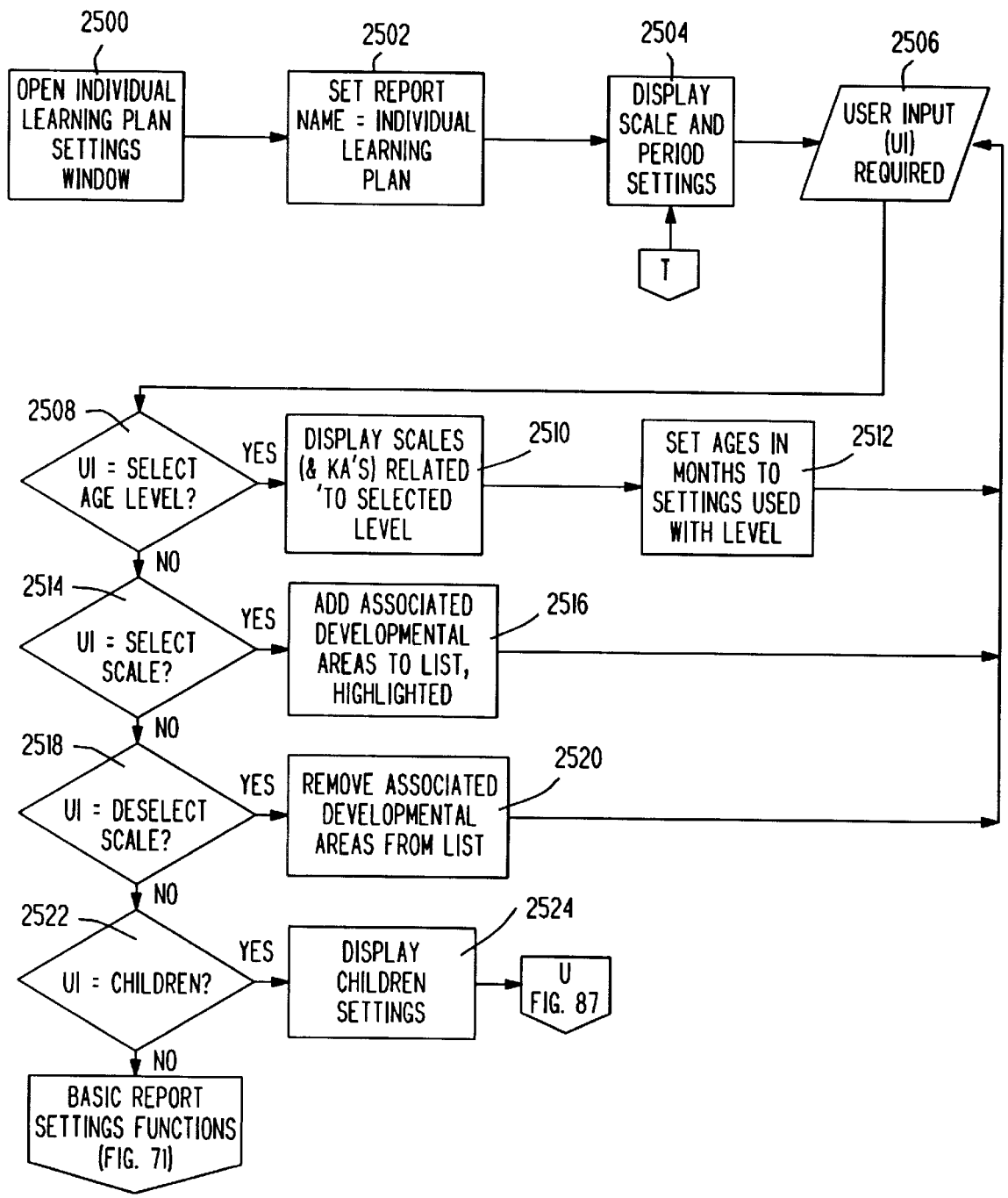
FIG. 86 is a flow diagram of a first portion of an open individual learning plan settings procedure in the instructional management system program.
Figure 87:
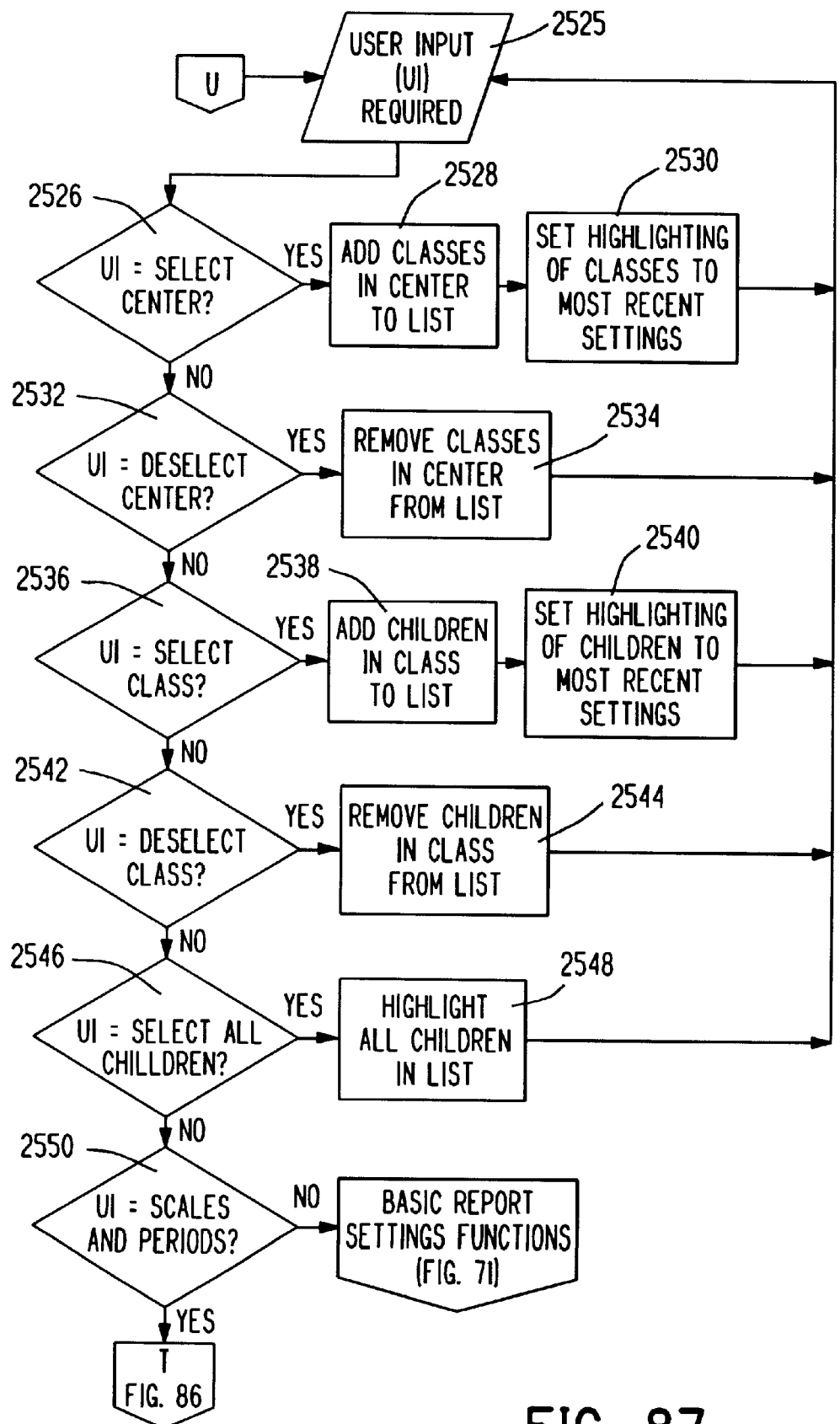
FIG. 87 is a flow diagram of a second portion of the open individual learning plan settings procedure.

Steps employed in the individual learning plan settings procedure along with the basic report settings functions of FIG. 71 are illustrated in FIGS. 86 and 87. In step 2500 the individual learning plan settings window (not shown but similar to FIGS. 92 and 93 except for the title and the conversion of "readiness levels" and "ready" to "planning times" and "plan") is opened. Next the report name is set to "individual learning plan" in step 2502 and the scale and period settings and the planning times are displayed in step 2504. User input is enabled at 2506 and steps 2508, 2510, 2512, 2514, 2516, 2518 and 2520 are similar to previously described steps 1838, 1840, 1842, 1844, 1846, 1848 and 1850 of FIG. 72. In step 2522 a click on "children" in the select settings to view box is sensed to branch to step 2524 where the children settings (similar to FIG. 93) are displayed in the individual learning plan settings window. In FIG. 87, the steps 2525, 2526, 2528, 2530, 2532 and 2534 are similar to the steps 1866, 1868, 1870 1872, 1874 and 1876 of FIG. 72. Steps 2536, 2538, 2540, 2542, 2544, 2546, 2548 and 2550 are similar to steps 2096, 2098, 2100, 2102, 2104, 2108, 2110 and 2112 in FIG. 76 and function in a similar manner. FIG. 176 illustrates the individual learning plan report 2552 which can be printed by step 1910 of FIG. 71 while in the individual learning plan settings procedure. The heading of the report contains the name of the child, and the scale, planning period, class, center and agency are listed. In the settings for the report 2552, the planning times, "plan now" and "plan soon" (same as "ready now" and "ready soon") were selected so that only the learning capabilities (objectives) having the readiness levels of "ready now" and "ready soon" are listed in the report as categorized first by the selected developmental level (scale) and further under each developmental level by the knowledge area.

Figure 88:
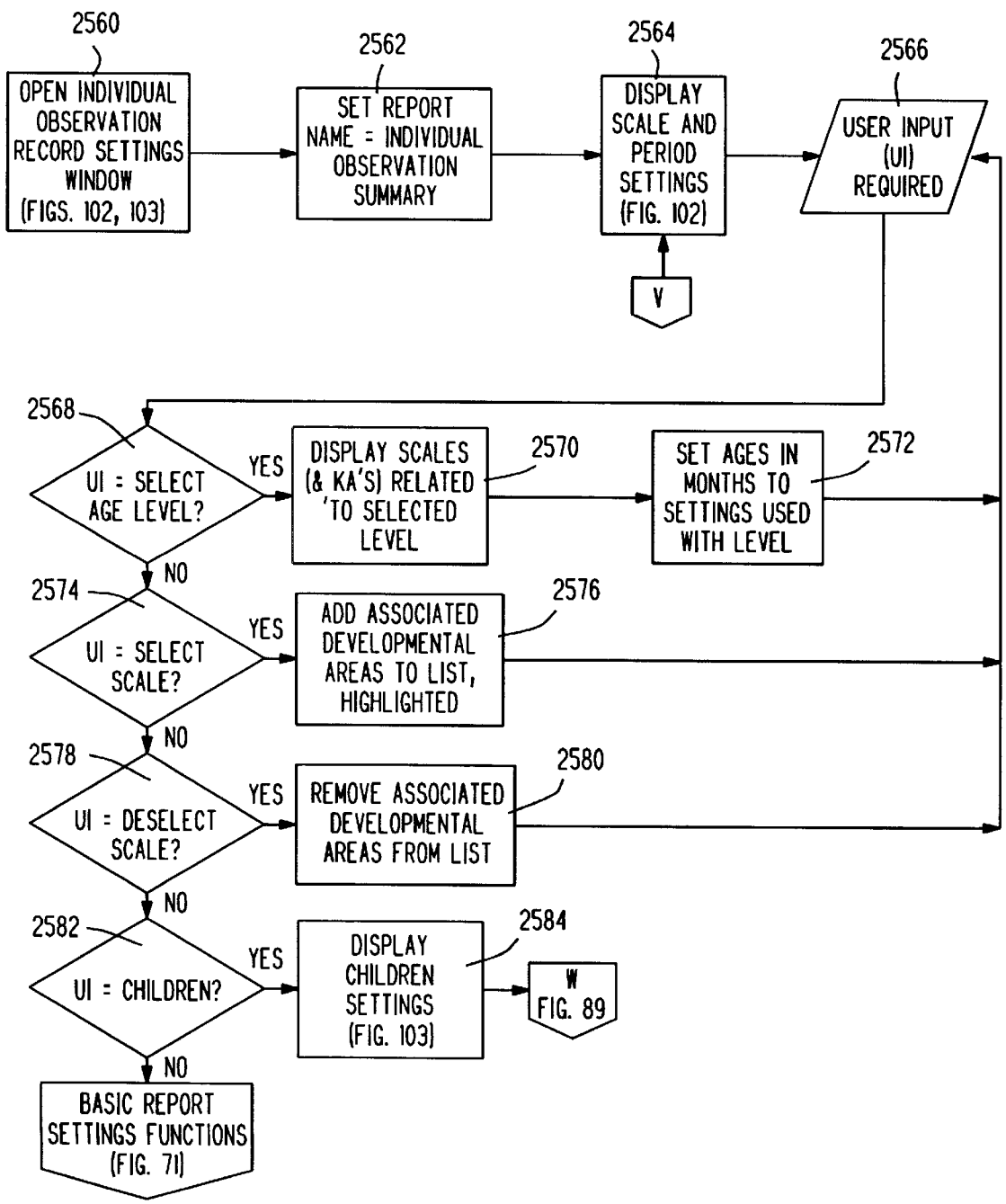
FIG. 88 is a flow diagram of a first portion of an open individual observation record settings procedure in the instructional management system program.
Figure 89:
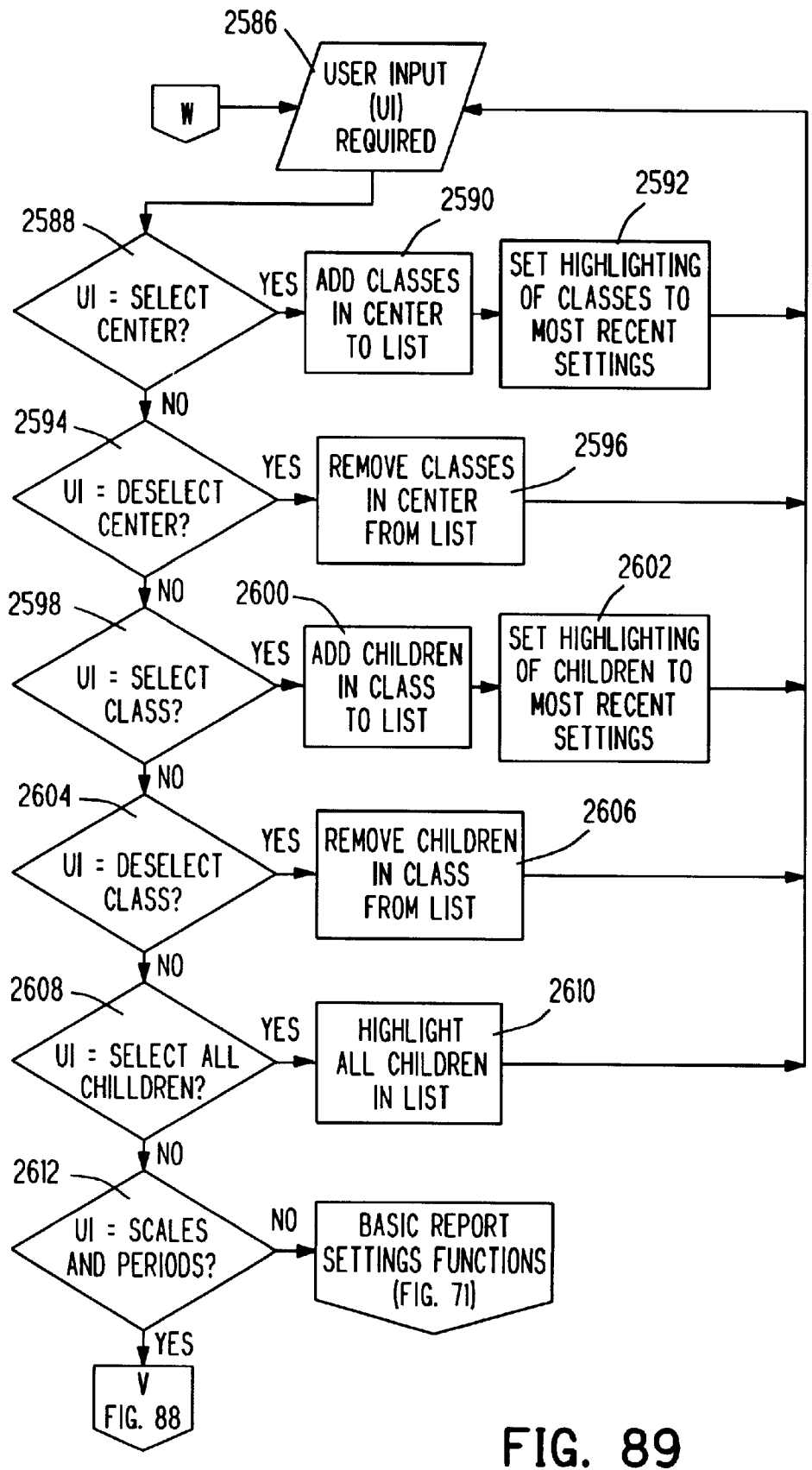
FIG. 89 is a flow diagram of a second portion of the open individual observation record settings procedure.
Figure 90:
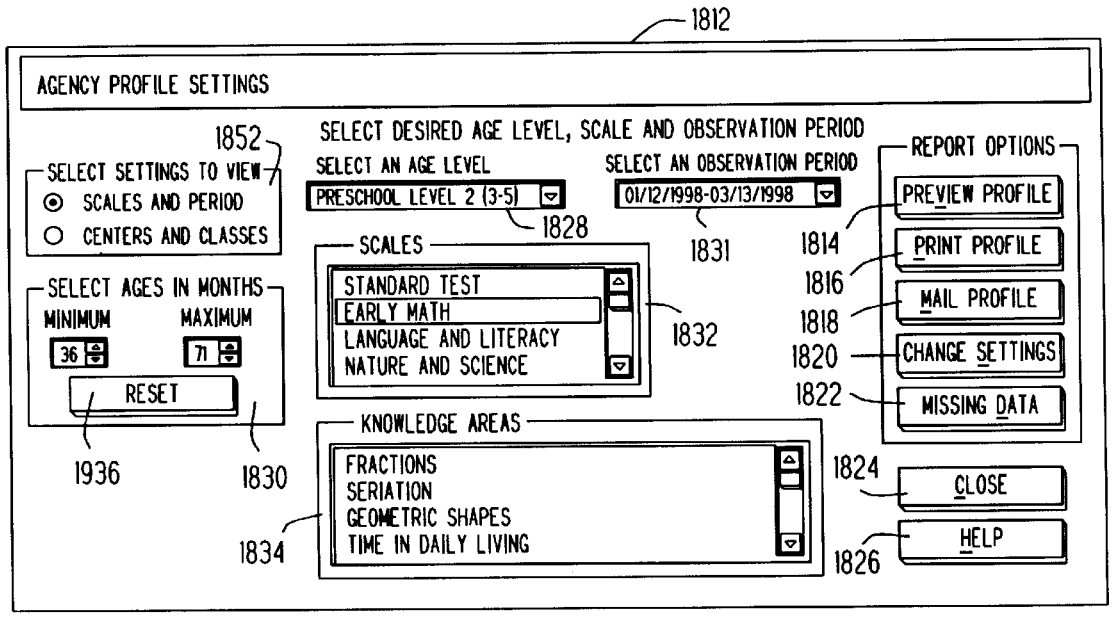
FIG. 90 is an illustration of a first window displayed in the agency profile settings procedure.
Figure 102:
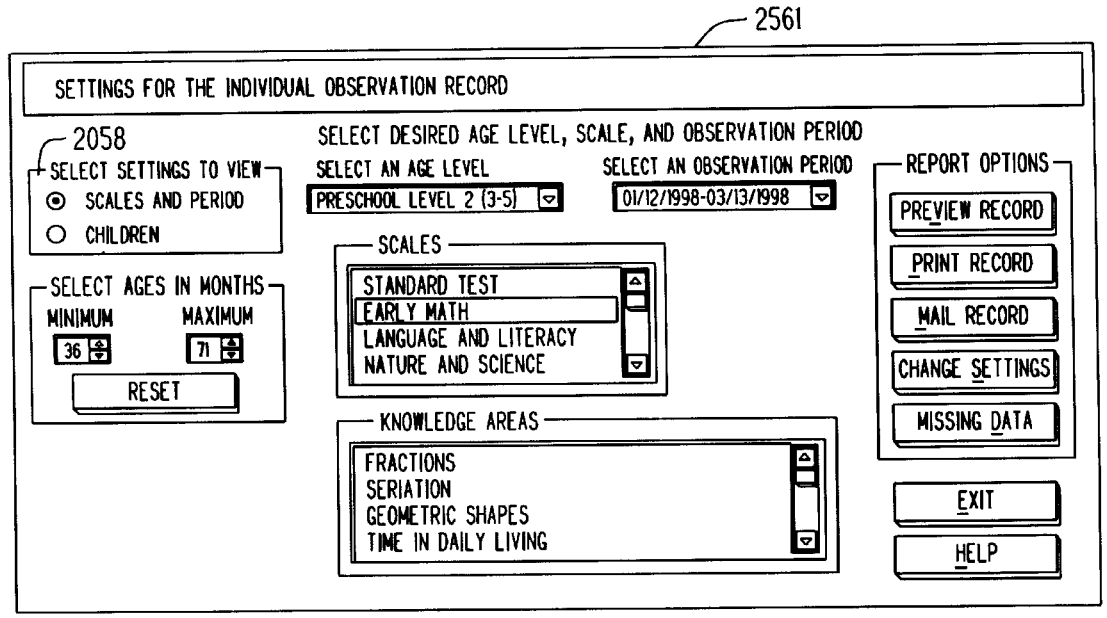
FIG. 102 is an illustration of a first window displayed in the individual observation settings procedure.
Figure 103:
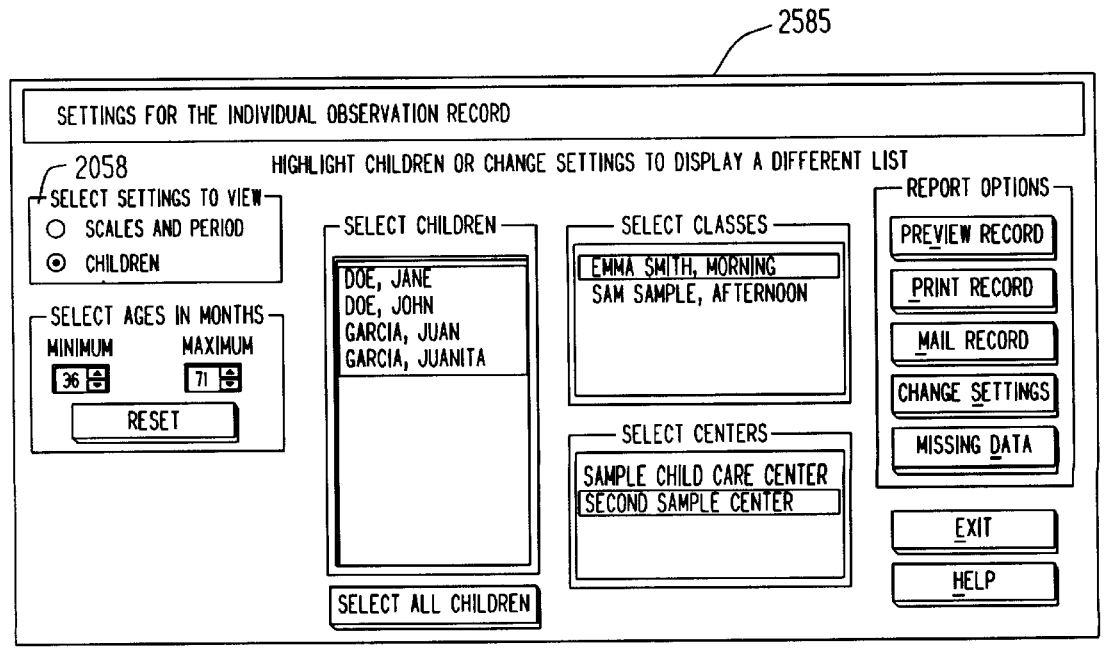
FIG. 103 is an illustration of a second window displayed in the individual observation settings procedure.

In the individual observations record settings procedure of FIGS. 88 and 89, step 2560 opens the individual observation record settings window 2561 of FIG. 102. The window 2561 is similar to the window of FIG. 90 except for the title and the select settings to view box 2058 in place of the box 1852. Next the report name is set to "individual observation summary" in step 2562 and the scale and period settings are displayed in step 2564. User input is enabled at 2566 and steps 2568, 2570, 2572, 2574, 2576, 2578 and 2580 are similar to previously described steps 1838, 1840, 1842, 1844, 1846, 1848 and 1850 of FIG. 72. In step 2582 a click on "children" in the select settings to view box 2058 is sensed to branch to step 2584 where the children settings in the window 2585 in FIG. 103 (similar to FIG. 93) are displayed in the individual observation record settings window. In FIG. 89, the steps 2586, 2588, 2590, 2592, 2594 and 2596 are similar to the steps 1866, 1868, 1870 1872, 1874 and 1876 of FIG. 72. Steps 2598, 2600, 2602, 2604, 2606, 2608, 2610 and 2612 are similar to steps 2096, 2098, 2100, 2102, 2104, 2108, 2110 and 2112 in FIG. 76 and function in a similar manner. FIG. 177 illustrates the individual observation record report 2614 which can be printed by step 1910 of FIG. 71 while in the individual observation record settings procedure. The heading of the report contains the name of the child, and the scale, class, center and agency are listed. The report 2614 lists the learning capabilities grouped by knowledge areas. Check boxes beside the capabilities are conveniently provided for an observer to check as learned. Boxes for the capabilities that have previously been learned are printed with a check mark.

Figure 104:
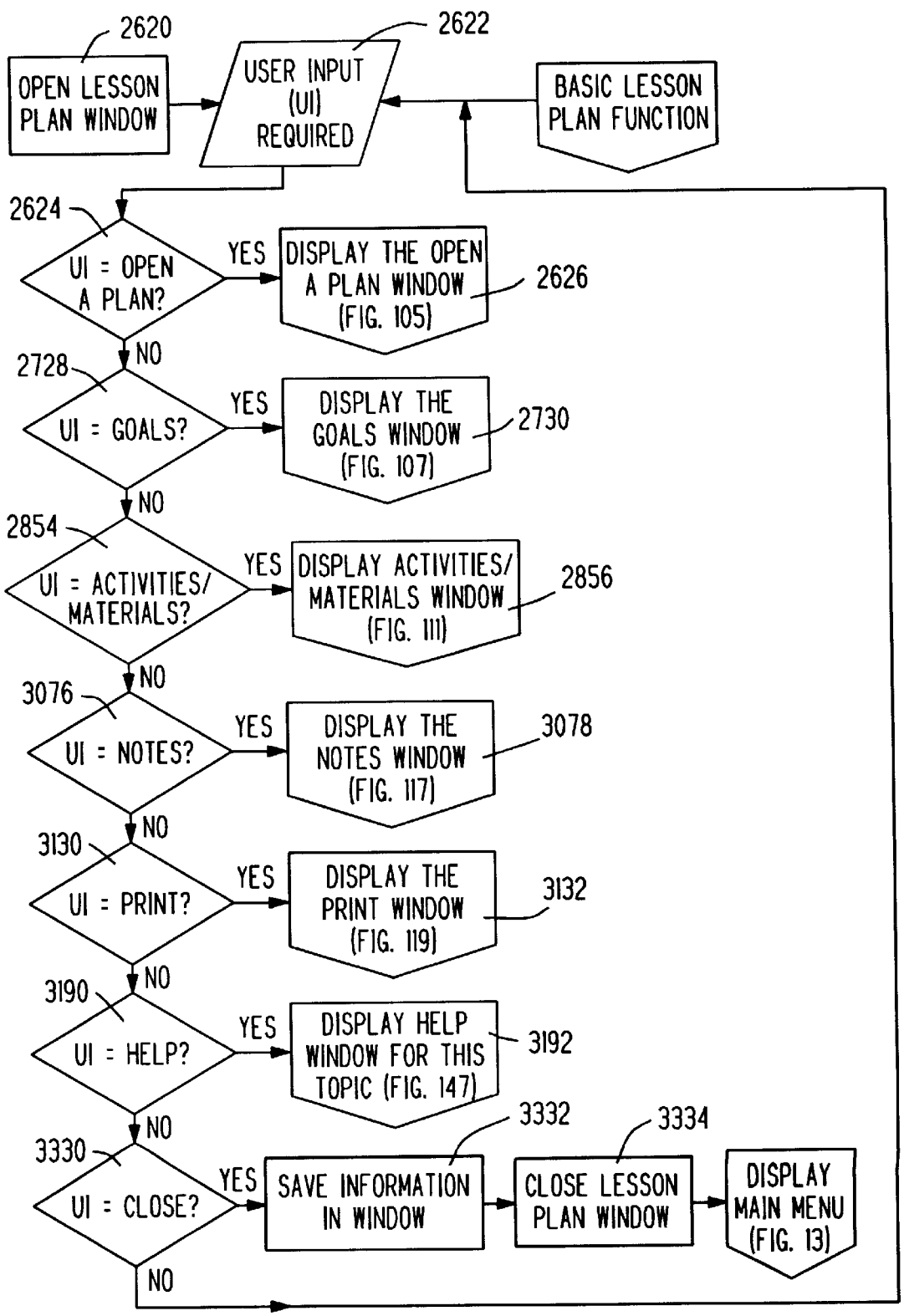
FIG. 104 is a flow diagram of an open lesson plan procedure in the instructional management system program.
Figure 105:
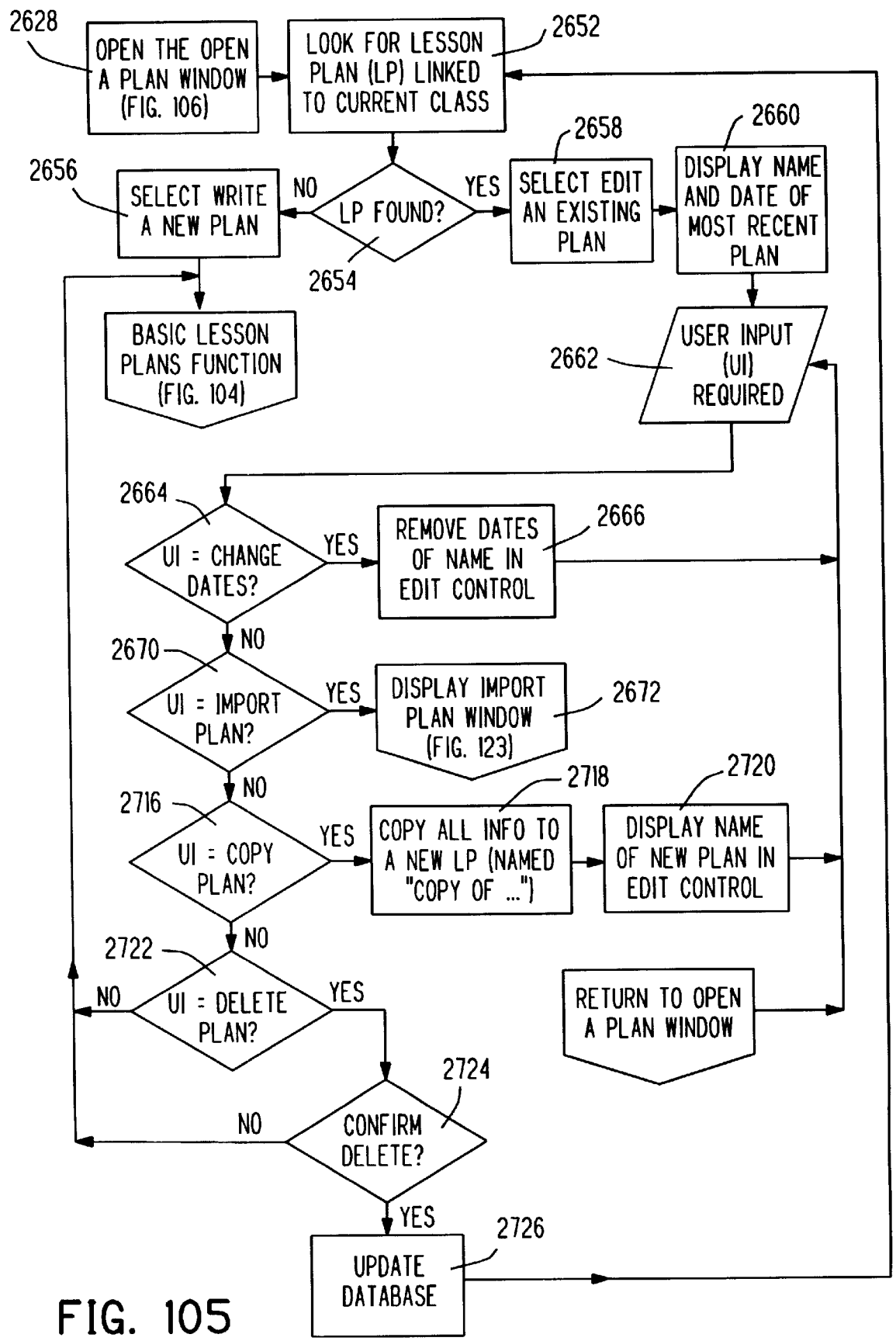
FIG. 105 is a flow diagram of an open the open a plan procedure in the instructional management system program.
Figure 106:
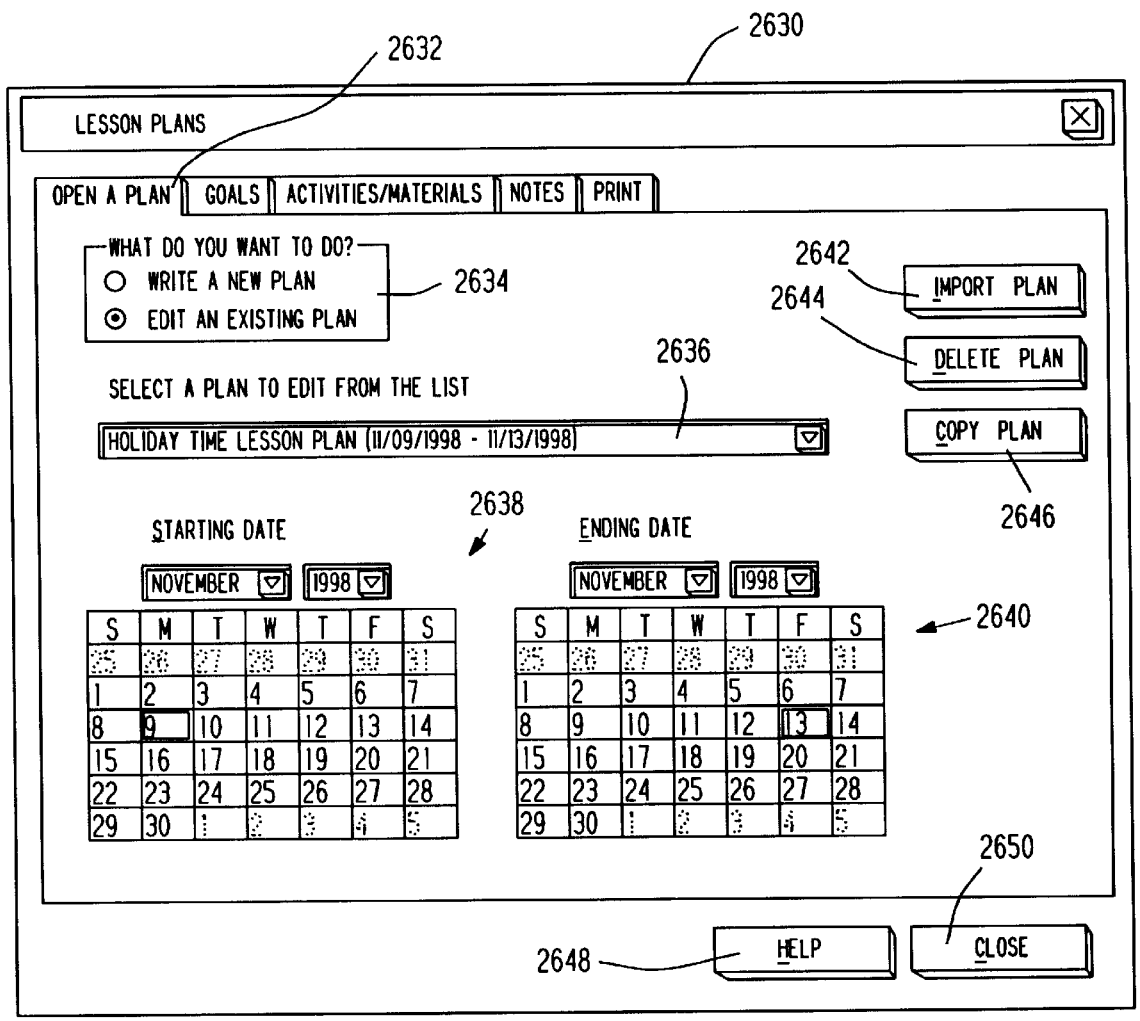
FIG. 106 is an illustration of a window displayed in the open the open a plan procedure.

Selection of lesson plans from the plans menu, FIG. 23, performs steps 2620 and 2622 in FIG. 104 whereupon step 2624 is found true to proceed to step 2626 where the display the open a plan window procedure of FIG. 105 is called. In the first step 2628, the open a plan window 2630 of FIG. 106 is displayed. The window 2630, initially opens up in the page 2632, "Open a Plan", which includes a what do you want to do selection box 2634 with the choices "write a new plan" and "edit an existing plan" and includes an edit control box 2636 which, for the selection of "write a new plan", enables entry of the new plan title and, for the selection of "edit an existing plan", is a list box for selecting a plan from a list of plans. The page 2632 also includes a starting date selection calendar 2638, an ending date selection calendar 2640, an import plan button 2642, a delete plan button 2644, a copy plan button 2646, a help button 2648 and a close button 2650. After initially opening the open a plan window, the program in step 2652 looks for a lesson plan linked to the current class. If no lesson plan linked to the current class is found, step 2654 branches to step 2656 where the "write a new plan" is automatically selected in the box 2634 and the procedure returns to FIG. 104. The write a new plan window is similar to FIG. 106 except that the buttons 2642, 2644 and 2646 are deleted and the edit control box 2636 is changed to an enter a new plan edit control. If a lesson plan is found in step 2654, the "edit an existing plan" is selected in step 2658 and the name and dates associated with the most recent plan are displayed in the selection box 2636 and the calendars 2638 and 2646 in step 2660. User input is enabled at 2662 to enable editing the plan including changing the starting and end dates by steps 2664 and 2666. Under write a new plan, the starting and end dates are initially set to the dates of the next Monday and following Friday, respectively.

Figure 123:
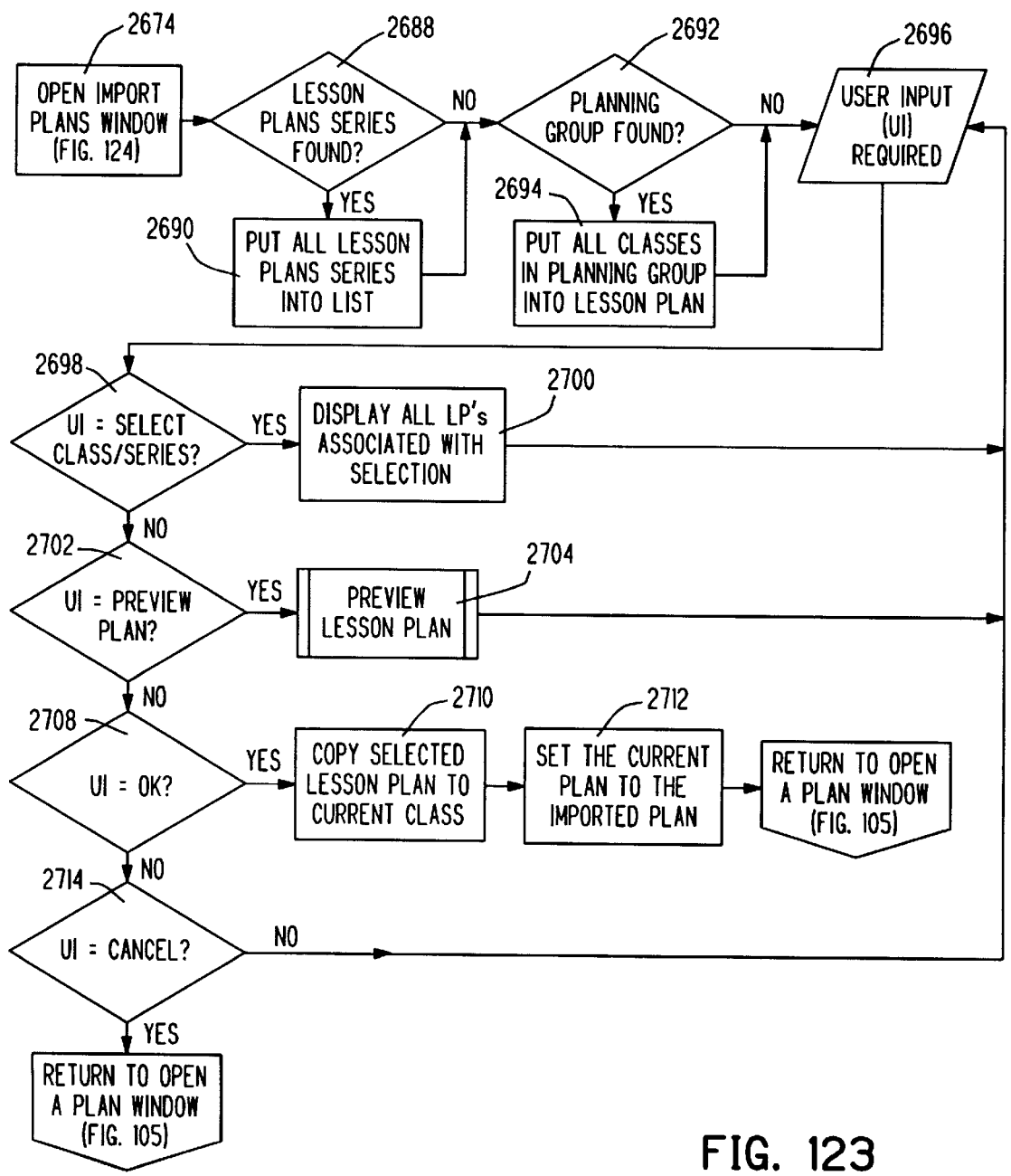
Figure 124:
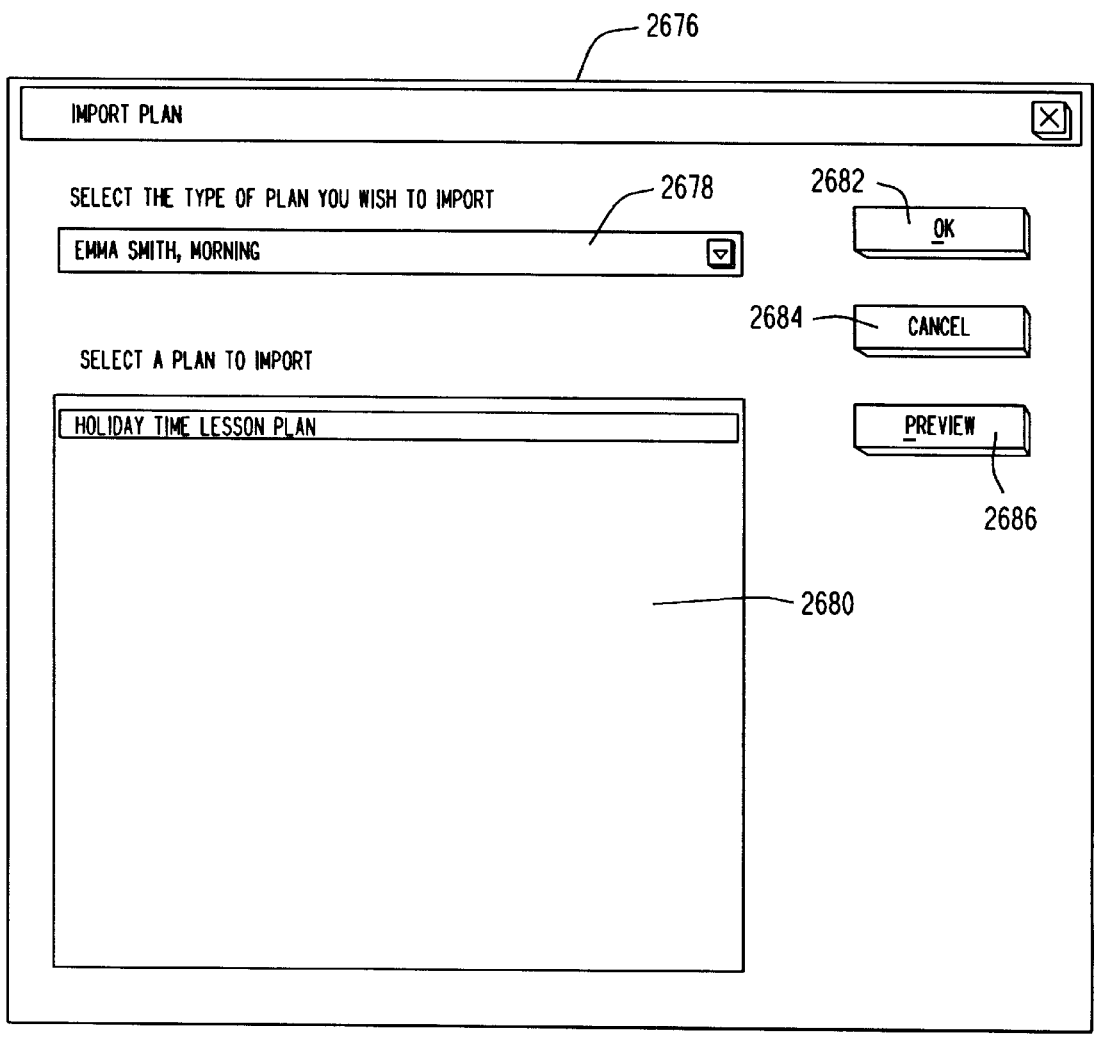

If the import plan button 2642 is selected, the program in step 2670 branches to step 2672 where the display import plan window procedure of FIG. 123 is called. In step 2674 of FIG. 123, the import plans window 2676 of FIG. 124 is opened. The window 2676 includes a select the type of plan selection list box 2678, a list box 2680 containing a list of plans having the plan type selected in box 2678, an ok button 2682, a cancel button 2684, and a preview button 2686. In step 2688, it is determined if the database contains any lesson plans series for the selected developmental level, and if true, step 2690 puts all such lesson plan series in the list for the type of plan selection list box 2678. In step 2692, it is determined if the selected class is a member of a planning group, and if true, step 2694 adds the classes of the planning group to the list for the type of plan selection list box 2678. Lesson plans series are universal lesson plans that are stored in the database while the classes (teachers) of a planning group develop and store lesson plans which are shared with other classes in the planning group. User input is enabled in step 2696. In step 2698, the user selects one of the lesson plans series or classes in the selection box 2678 resulting in step 2700 displaying the lesson plans in the box 2680 which are included in the selected series or class. The user can then select one of the lesson plans listed in the box 2680 to highlight that lesson plan.

Clicking on the preview button 2686 results in step 2702 calling a conventional preview lesson plan procedure in step 2704. For example, the lesson plan 2706 of FIG. 178 can be displayed. This display of the lesson plan includes the name of the lesson plan, the start and end dates, the goals of the lesson plan, and the plan activities for each of the days covered by the plan. Each days activities are classified by the class areas. Additionally notes may be added to the lesson plan as reminders. Referring back to FIG. 123, step 2708 is true when the user selects the ok button 2682 to cause the program to branch to step 2710 where the selected lesson plan is copied to the current class and to step 2712 where current plan is set as the imported plan. Following importation of the lesson plan or if the user selects the cancel button 2684 in step 2714, the program returns to step 2662 of FIG. 105.

If the user clicks on the copy button 2646, FIG. 106, step 2716 branches to step 2718 where the selected plan is copied to a new lesson plan with the name "Copy of . . . " In step 2720 the name of the new lesson plan is placed in the edit control box 2636 with the cursor enabled to edit or change the name. Clicking on the delete button 2644 is sensed in step 2722 which then branches to step 2724 asking to confirm the deletion of the selected lesson plan. If the user confirms the deletion, the program in step 2726 deletes the plan from the files and updates the database. When step 2722 is false the program returns to step 2622 of FIG. 104.

Figure 107:
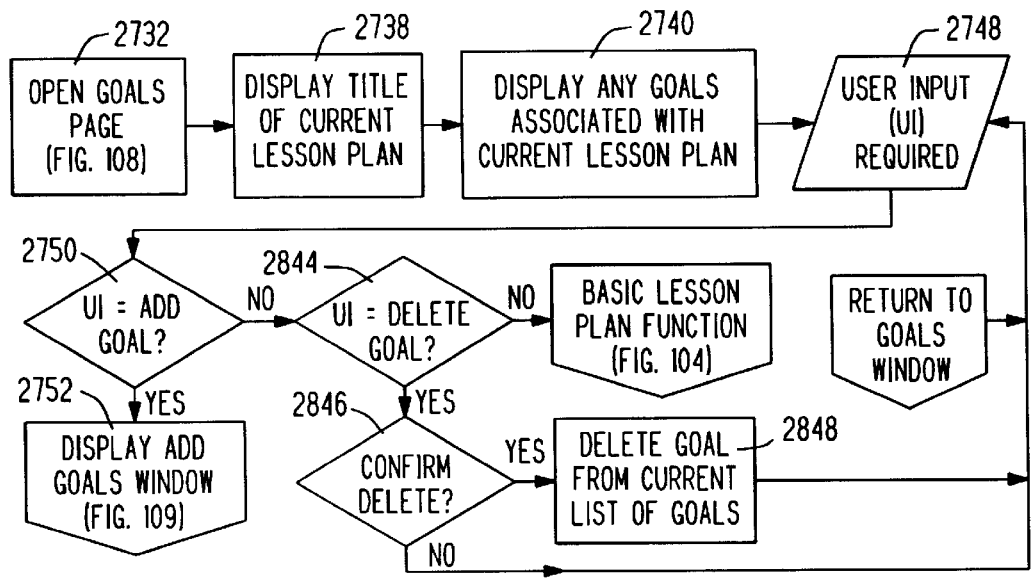
FIG. 107 is a flow diagram of an open goals procedure in the instructional management system program.
Figure 108:
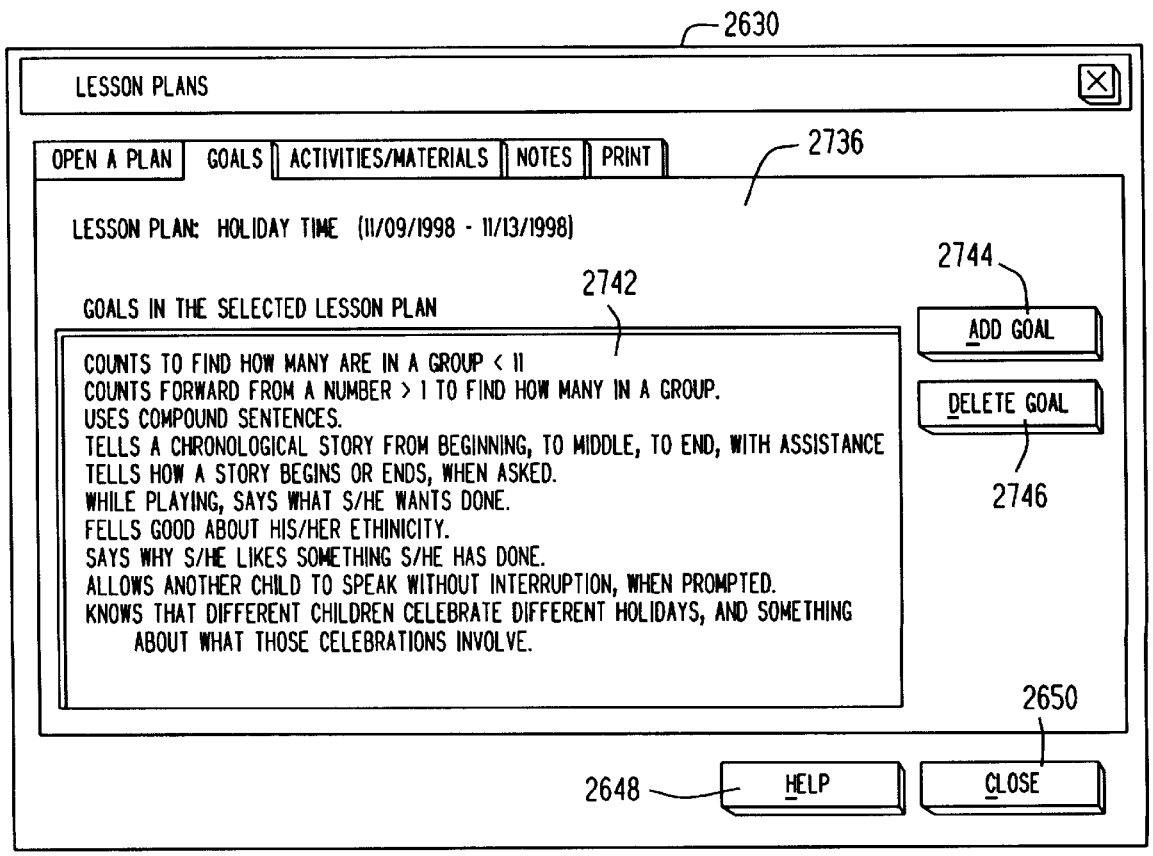
FIG. 108 is an illustration of a window displayed in the open goals procedure.
Figure 109:
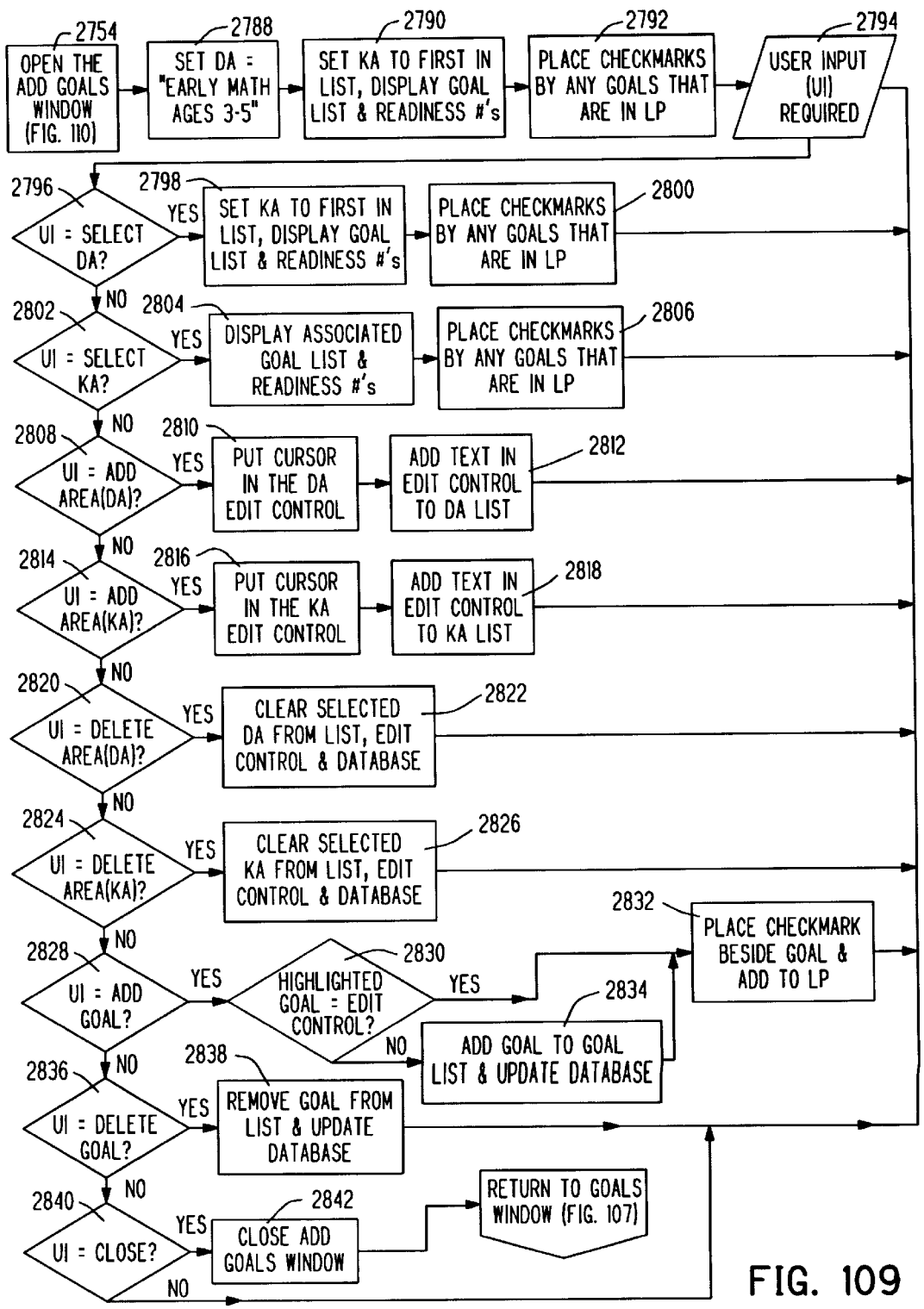
FIG. 109 is a flow diagram of an open the add goals procedure in the instructional management system program.

Selection of the index tab "goals" in the window 2630 of FIG. 106 is sensed by step 2728 of FIG. 104 to branch to step 2730 where the display the goals window procedure of FIG. 107 is called. In step 2732 of FIG. 107, the page 2736, FIG. 108, is displayed in the lesson plan window 2630. Step 2738 displays the title of the current lesson plan in the page 2736 and step 2740 displays a list of all goals, if any, associated with the current lesson plan in a selected lesson plan list and edit control box 2742. The page 2736 additionally includes an add goal button 2744 and a delete goal button 2746. User input is enabled in step 2748 and step 2750 detects selection of the add goals button 2744 to proceed to step 2752 where a display goals window procedure of FIG. 109 is called.

In step 2754 of the display goals window procedure, the add goals window 2756 of FIG. 10 is displayed. The window 2756 has a developmental area selection and edit box 2758 with associated add developmental area button 2760 and delete developmental area button 2762, a knowledge area selection and edit box 2764 with associated add knowledge area button 2766 and delete knowledge area button 2768, a goal edit control box 2770, a goal list box 2772 with associated learned list box 2774, ready now list box 2776, ready soon list box 2778 and ready later list box 2780, an add goal button 2782, a delete goal from list button 2784 and a close button 2786. In step 2788 the developmental area is set to "Early Math ages 3–5" and this selection is displayed in the select developmental area box 2758. The knowledge area and the select knowledge area box 2764 are set in step 2790 to the first knowledge area in the list of knowledge areas associated with the selected developmental area and the corresponding readiness levels in boxes 2774, 2776, 2778 and 2780 are set to the current class readiness levels. Also in step 2790, the goals (learning capabilities) associated with the selected knowledge area are displayed in the goal list box 2772. Step 2792 places checkmarks beside any goals in the box 2772 that are in the current lesson plan. User input is enabled in step 2794.

The developmental area selection box 2758 includes a developmental area list display button 2795 which can be clicked to call up a list (not shown) of the developmental areas (scales=developmental level or age grouping+ developmental area) which can be individually selected or highlighted by clicking to render step 2796 true and to branch to step 2798 where the first knowledge area in a list of knowledge areas associated with the newly selected developmental area is set in the knowledge area selection box 2764. Additionally step 2798 displays in the box 2772 the goals (learning capabilities) associated with the newly selected knowledge area and displays the readiness levels of the current class in the readiness boxes 2774, 2776, 2778 and 2780. In step 2800, checkmarks are placed beside goals in the box 2772 which are in the current lesson plan. The knowledge area selection box 2764 includes a knowledge area list display button 2801 which can be clicked to call up a list (not shown) of the knowledge areas associated with selected developmental area. Clicking on one of the display knowledge areas in the list is detected in step 2802 to highlight the newly selected knowledge area and set it in the selection box 2764. The program then in step 2804 displays the list of goals (learning capabilities) associated with the newly selected knowledge area in the goals list box 2772 and displays the corresponding current class readiness levels in the readiness boxes 2774, 2776, 2778 and 2780. Checkmarks are placed by step 2806 beside goals listed in the box 2772 which are in the current lesson plan.

Step 2808 senses a click on the add developmental area button 2760 to place a cursor in the edit control box 2758 by step 2810 enabling the user to type a new developmental area to be added to the current developmental level (age group). Once the user finishes typing the new developmental area, a second click on the add button 2760 adds the new developmental area to the list of developmental areas associated with the current developmental level in step 2812. Similarly a knowledge area is added to the list of knowledge areas associated with the currently selected developmental area by step 2814 sensing a click on the add knowledge area button 2766, step 2816 placing the cursor in the knowledge area edit control box 2764, and step 2818 adding a newly typed knowledge area to the corresponding list of knowledge areas. Step 2820 senses a click on the delete developmental area button 2762 to proceed to step 2822 where the highlighted or selected developmental area is deleted from the corresponding list, preferably after requiring confirmation (not shown). Similarly a highlighted or selected knowledge area can be deleted from a list of knowledge areas by clicking on the delete knowledge area button 2768 whereupon step 2824 is true to branch to step 2826 to delete the selected knowledge area.

Clicking on the add goal button 2782 is sensed in step 2828 to branch to step 2830 where it is determined if there is a highlighted goal in box 2772 which is the same as the goal in the edit control box 2770. The user can click on the box 2770 to place the cursor in the box and write a new goal or edit an existing goal. Also the user can click on a goal in the goal list box 2772 to highlight the selected goal and place that goal in the edit control box 2770. If the goal in the edit control box 2770 is the same as a highlighted goal in the goal list box 2772, step 2832 places a checkmark beside the highlighted goal and adds the goal to the current lesson plan. If the goal in the edit control box 2770 is not the same as a highlighted goal in the goal list box 2772, step 2834 add the goal from the edit control box 2770 to the in the goal list box 2772, highlights the newly added goal and updates the database before proceeding to step 2832 where the checkmark is placed by the newly added goal and the newly added goal is added to the current lesson plan. Clicking on the delete goal button 2780 is sensed in step 2836 to branch to step 2838 where the highlighted goal is deleted from the list of goals associated with the selected knowledge area in step 2838 if the highlighted goal is not in the current lesson plan or otherwise simply deletes the goal from the current lesson plan. Preferably confirmation (not shown) of the deletion is required.

When the close button 2786 is selected by the user, step 2840 proceeds to step 2842 where the goals window 2734 of FIG. 108 is restored and the program returns to step 2748 of the goals procedure of FIG. 107. In step 2844, the selection of the delete goal button 2746 is detected to branch to step 2846 where confirmation of the delete goal request is required before proceeding to step 2848 where the highlighted goal is deleted from the lesson plan. When the steps 2750 and 2844 are both false the program cycles through the basic lesson plan functions of FIG. 104.

Figure 111:
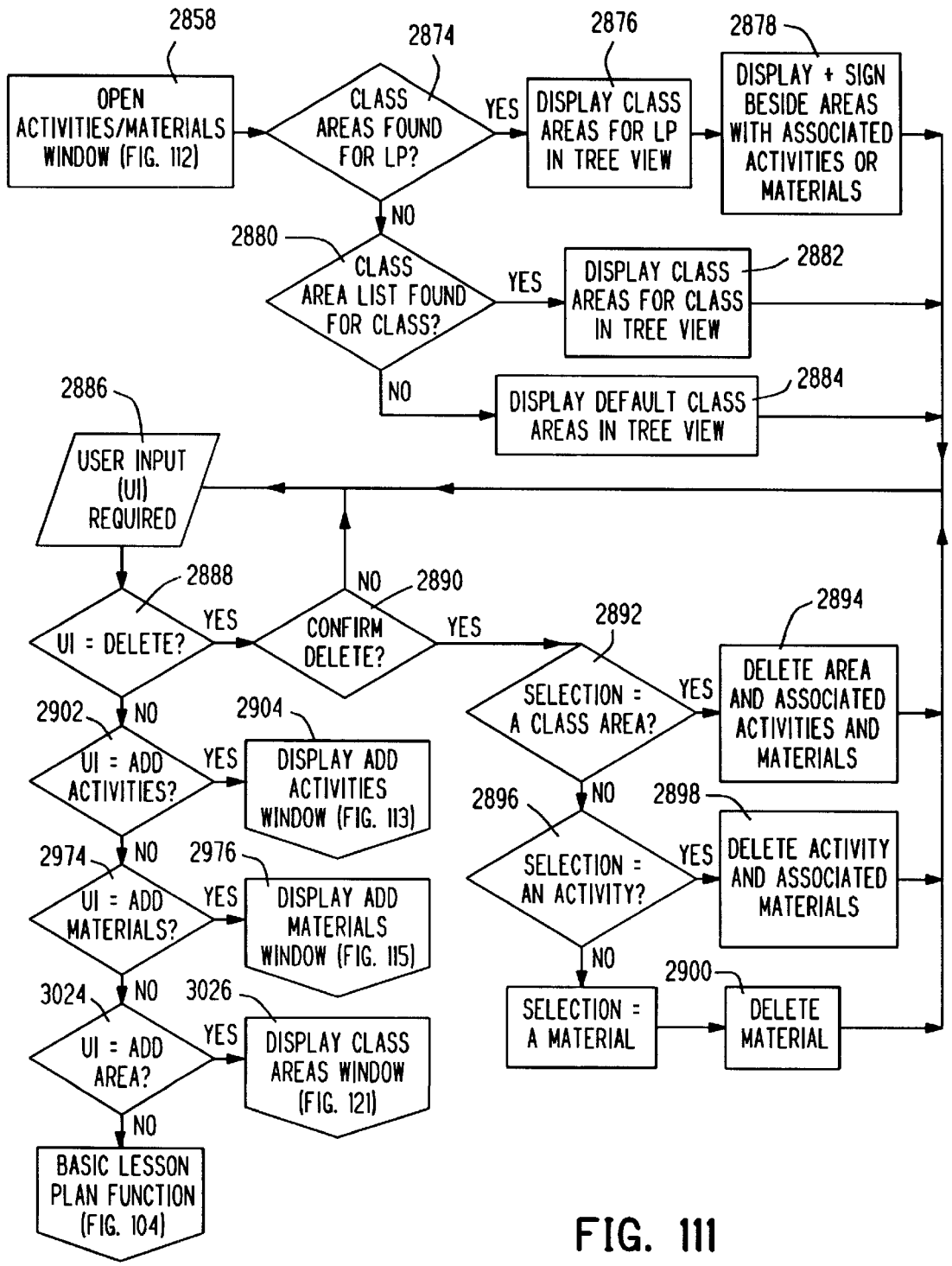
FIG. 111 is a flow diagram of an open activities/materials procedure in the instructional management system program.

Step 2854 senses clicking on the index tab "activities/ materials" to branch to step 2856 where the display activities/materials window procedure of FIG. 111 is called. Step 2858 in FIG. 111 opens the activities/materials page 2862, FIG. 112, in the lesson plans window 2630. The page 2862 includes a box 2864 displaying a tree view of the class areas with associated activities and materials in the current lesson plan, an add activities button 2866, an add materials button 2868, a delete button 2870 and an add area button 2872. In step 2874 it is determined if the current plan includes class areas and if so, these class areas are displayed by step 2876 in a tree view in the box 2864 with step 2878 placing a "+" indication beside each area with associated activities or materials. These associated activities can be displayed in the tree by clicking on the class area. If step 2874 is false, the program proceeds to step 2880 where it is determined if the current class has a class area list, and if so, step 2882 displays this class area list in the box 2864; otherwise step 2884 displays a default class area list in the tree view of box 2864. User input is enabled in step 2886.

Clicking on the delete button 2870 is sensed in step 2888 to proceed to step 2890 where deletion of a selected (highlighted) item in the tree view of box 2864 must be confirmed. Step 2892 determines if the selection for deletion is a class area, and if so, step 2894 deletes the highlighted class area and the associated activities and materials. If the highlighted selection is an activity, step 2896 is true to proceed to step 2898 where the highlighted activity and any associated materials are deleted. If the selection is a material step 2900 deletes the material from the displayed tree.

Figure 113:
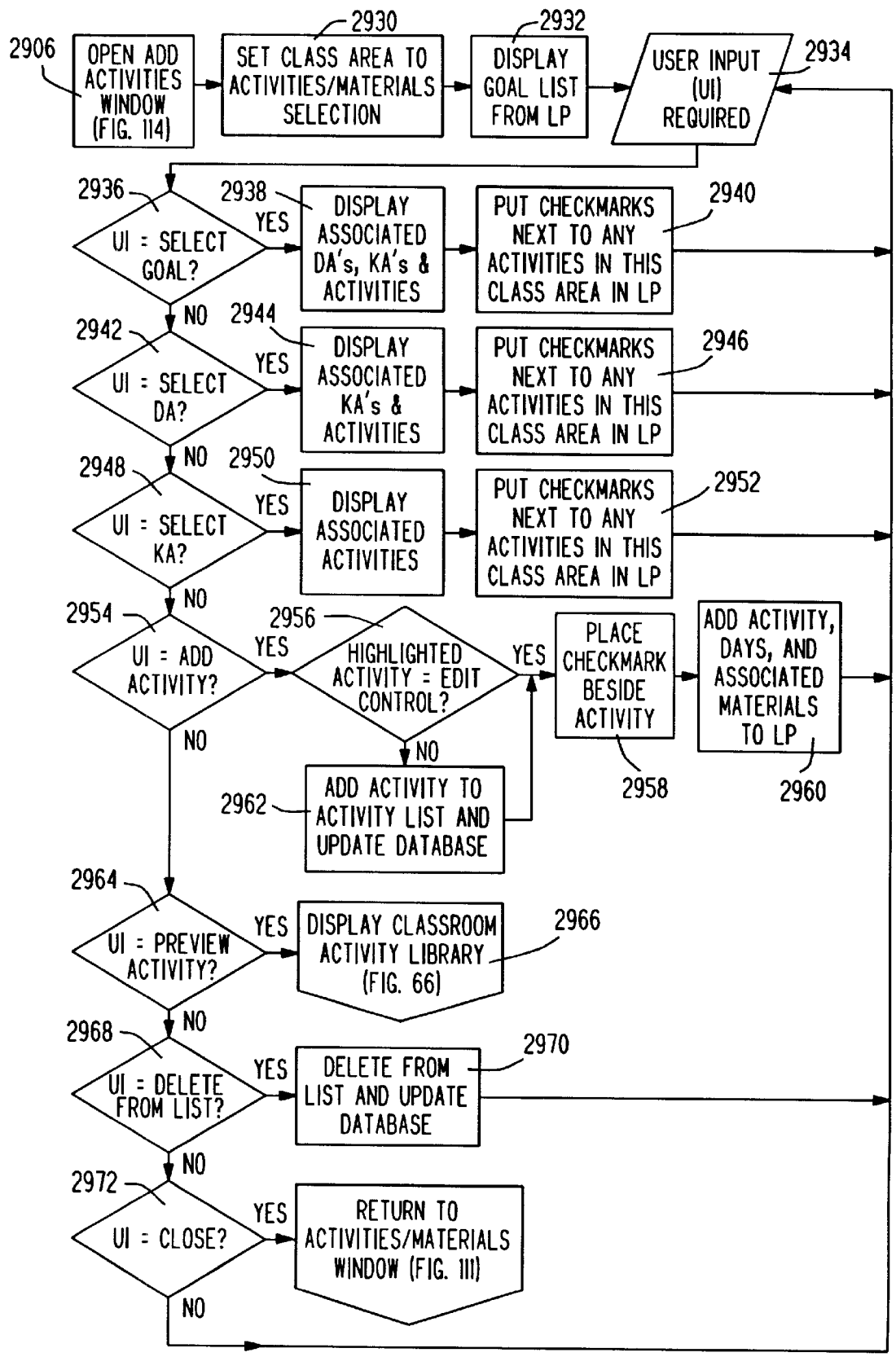
FIG. 113 is a flow diagram of an open add activities procedure in the instructional management system program.
Figure 114:
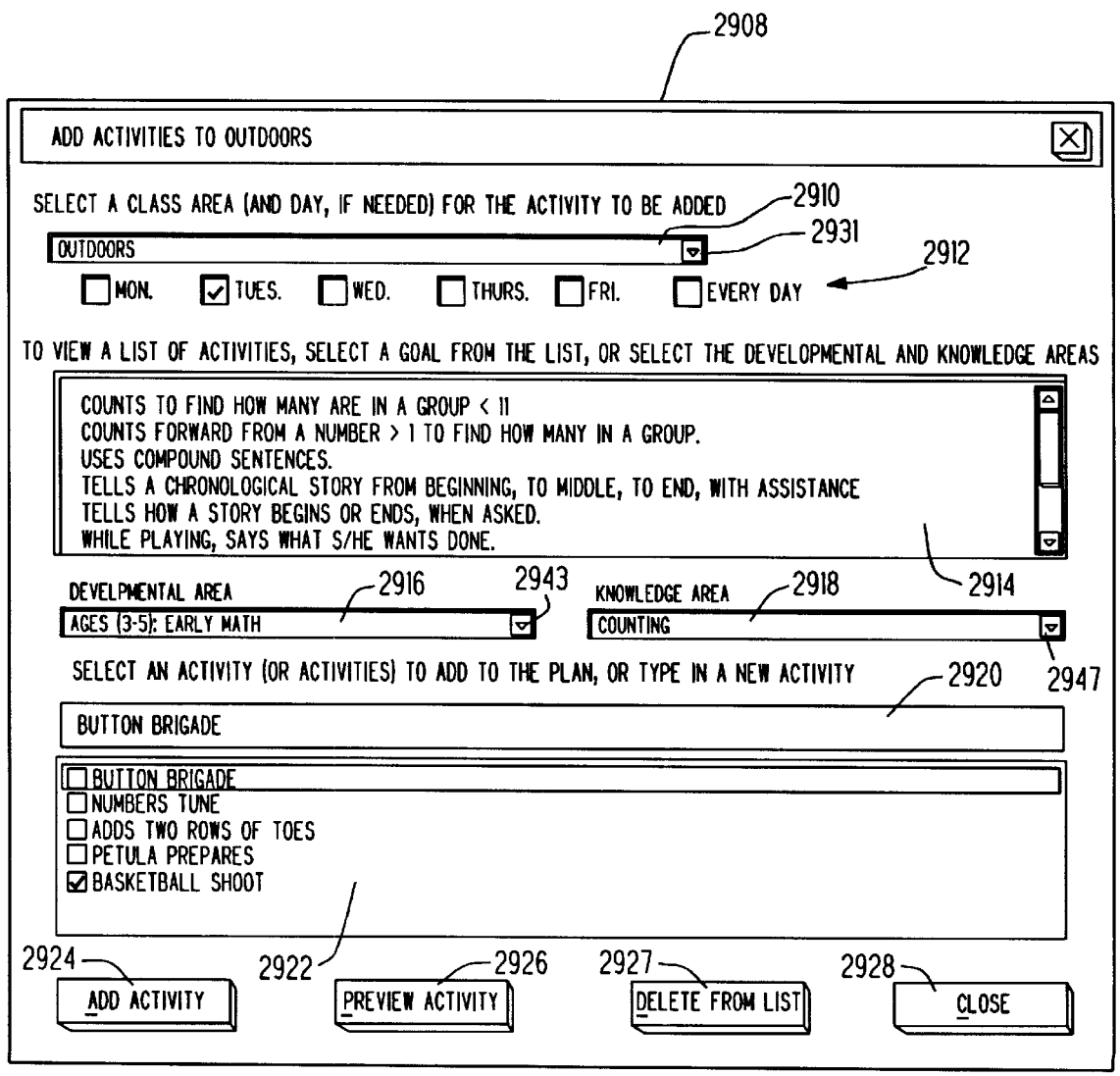
FIG. 114 is an illustration of a window displayed during the open add activities procedure.

If the add activities button 2866 is selected, the step 2902 branches to step 2904 where the display add activities window procedure of FIG. 113 is called. In step 2906 of FIG. 113, the activities window 2908 of FIG. 114 is opened. The window 2908 includes a class area selection list box 2910, day of the week boxes 2912 for selecting one or more days of the week for the activity, a goal (learning capability) list box 2914, a developmental area (scale=developmental level+developmental area) selection box 2916, a knowledge area selection box 2918, an activity edit control box 2920, an activity selection list box 2922, an add activity button 2924, a preview activity button 2926, a delete activity button 2927 and a close button 2928. The user in step 2930 sets the class area for the activities/material selection using the display list button 2931 to display a list of class areas from which the user can be set a class area in the selection box 2910 by clicking. In Step 2932 goals previously set in the lesson plan are displayed in the goal list box 2914. User input is enabled in step 2934. The user can search for activities by (1) selecting a goal to be achieved and find activities which can be performed to accomplish the goal, (2) selecting a developmental area to find a general list of activities relating to that developmental area and (3) selecting a knowledge area which finds a more specific list of activities pertaining to the particular knowledge area. Step 2936 senses when a goal in the goal list box 2914 is selected to proceed to step 2938 where the associated developmental area is displayed in box 2916, the associated knowledge area is displayed in box 2918, and the activities relating to the selected goal are display in the activity list box 2922. In the next step 2940, checkmarks are placed beside all activities which are in the current lesson plan. Step 2942 senses when a developmental area is selected in box 2916 which contains a list control button 2943 to display the list of developmental areas for selection. A first knowledge area associated with the selected developmental area is displayed in box 2918 and activities associated with the developmental area are display in the activity list box 2922 by step 2944. In step 2946 checkmarks are placed next to any activities that are already in the current lesson plan. If the user operates the knowledge area selection box 2918 with its list control button 2947 to select a knowledge area, step 2948 is true to proceed to step 2950 where the activities associated with the selected knowledge area are displayed in the activity list box 2922 and then to step 2952 where checkmarks are placed beside any activities listed in box 2922 and which are already in the lesson plan.

Selecting the add activity button 2924 renders step 2954 true to proceed to step 2956 where it is determined if a highlighted activity in the box 2922 is the same as the activity displayed in the edit control box 2920. The user can select an activity from the list in the list box 2922 which highlights that activity and transfers the selected activity to the edit control 2920. When step 2956 is true, the program in step 2958 places a checkmark beside the highlighted activity in the list box 2922 and then in step 2960 adds the highlighted activity, days in boxes 2912, and associated materials to the current lesson plan. The user can change or write a new activity into the edit control. Then step 2956 would be false and the program proceeds to step 2962 where the new activity is added to the activity list and the database is updated with the new activity before proceeding to step 2958 and 2960 where the new activity is checkmarked and added to the lesson plan.

When the preview activity button 2926 is selected, step 2964 branches to step 2966 where the procedure of FIG. 66 is called to display the highlighted activity. In step 2968, selection of the delete from list button 2927 is detected to proceed to step 2970, preferably after confirmation (not shown), where the highlighted activity is deleted from the list and the database is update. Selection of the close button 2928 returns the program to the open activities/materials window procedure of FIG. 111 at step 2858.

Figure 115:
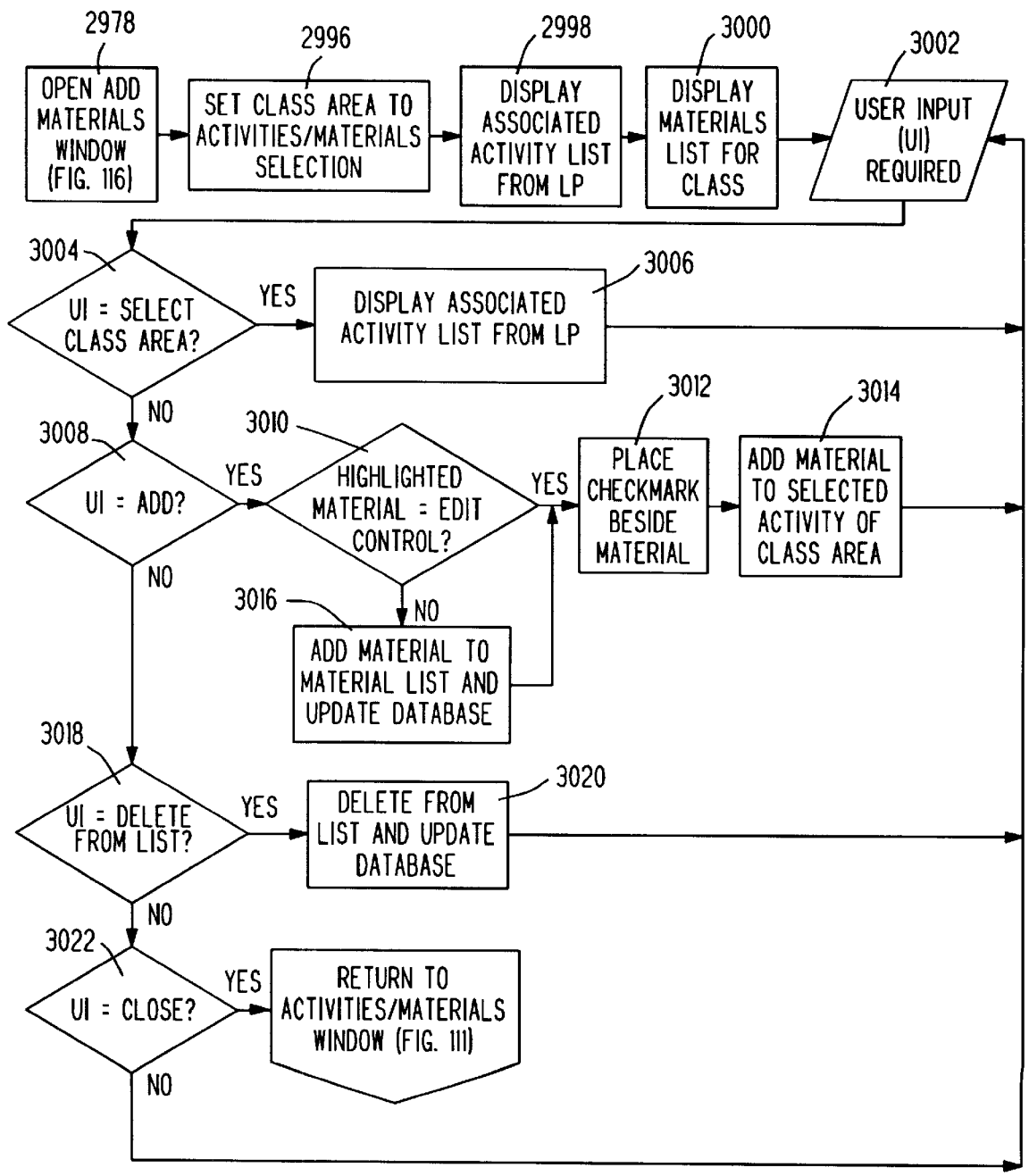
FIG. 115 is a flow diagram of an open add materials procedure in the instructional management system program.
Figure 116:
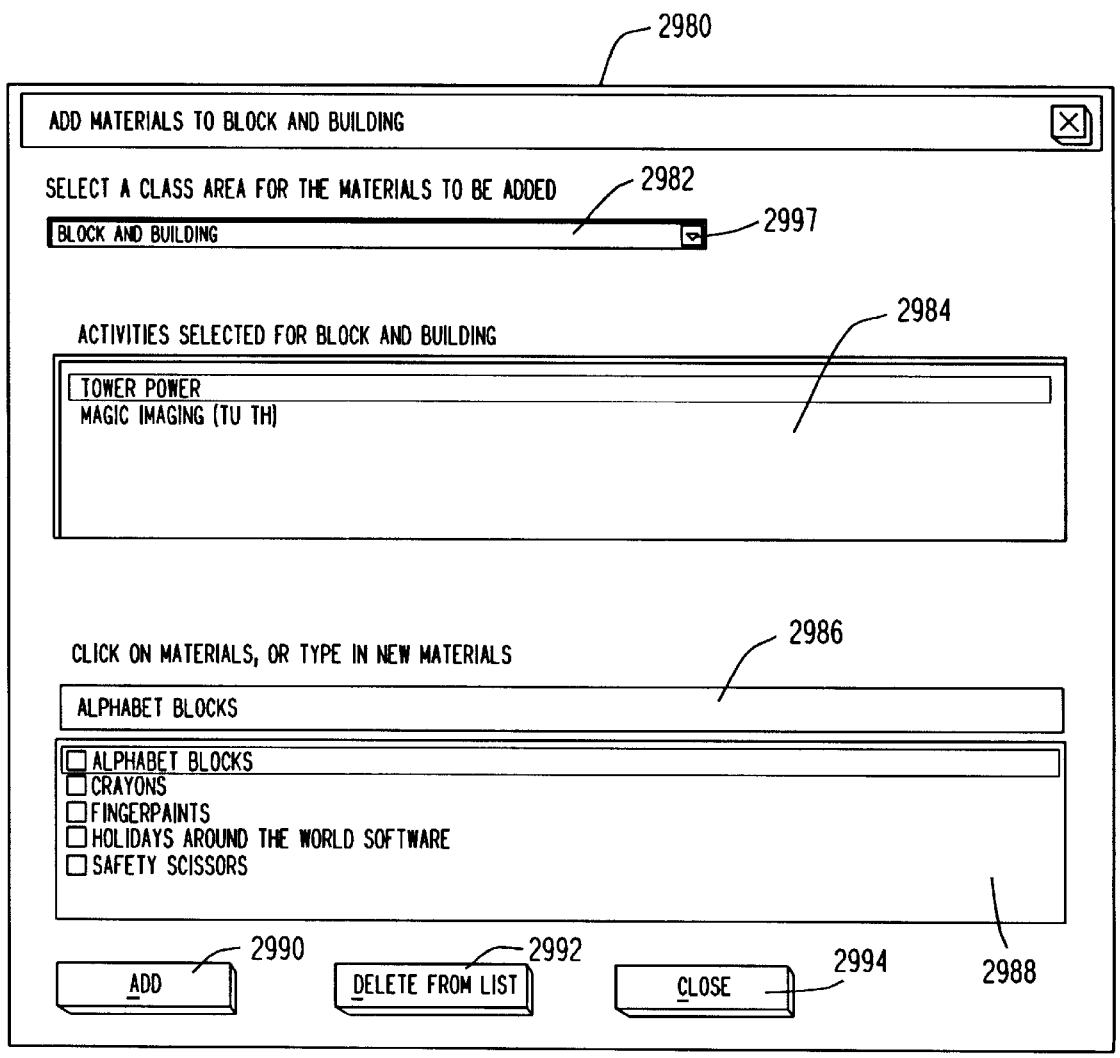
FIG. 116 is an illustration of a window displayed during the open add materials procedure.

In the FIG. 111, selection of the add materials button 2868, FIG. 12, is detected by step 2974 to proceed to step 2976 where the display add materials window procedure of FIG. 115 is called. In the initial step 2978 of FIG. 115, an add materials window 2980 of FIG. 116 is opened. The window 2980 includes a class area selection box 2982, an activities list box 2984, a material edit control box 2986, a materials list box 2988, an add button 2990, a delete from list button 2992 and a close button 2994. The user in step 2996 can select a class area in the selection box 2982, using the display list button 2997, in which the materials are to be used. In step 2998 the activity list in the current lesson plan is displayed in box 2984, and in step 3000 the list of materials for the current class are displayed in the box 2988. User input is enabled in step 3002. If the user selects a class area in the box 2982, step 3004 becomes true to proceed to step 3006 where the activities in the lesson plan associated with the selected class area are displayed in the activities list display box 2984. Selection of the add button 2990 is detected in step 3008 to branch to step 3010 where it is determined if the highlighted material in the box 2988 is the same as the material set in the edit control box 2986. If the user clicks on a material item in the list of box 2988, the item is highlighted and also copied to the edit control box 2986. If step 3010 is true, the program in step 3012 places a checkmark beside the material item in the box 2988, and in step 3014, adds the material to the selected activity. The user can change or write a new material in the edit control box 2986. Then in step 3016, the material in the edit control 2986 is added to the class material list and the database is updated before proceeding to step 3012 and step 3014. If the delete from list button 2992 is selected, step 3018 branches to step 3020 where the highlighted material is deleted from the class list, preferably after confirmation (not shown). Selection of the close button 2994 results in step 3022 returning the program to the activities/window procedure of FIG. 111.

Figure 112:
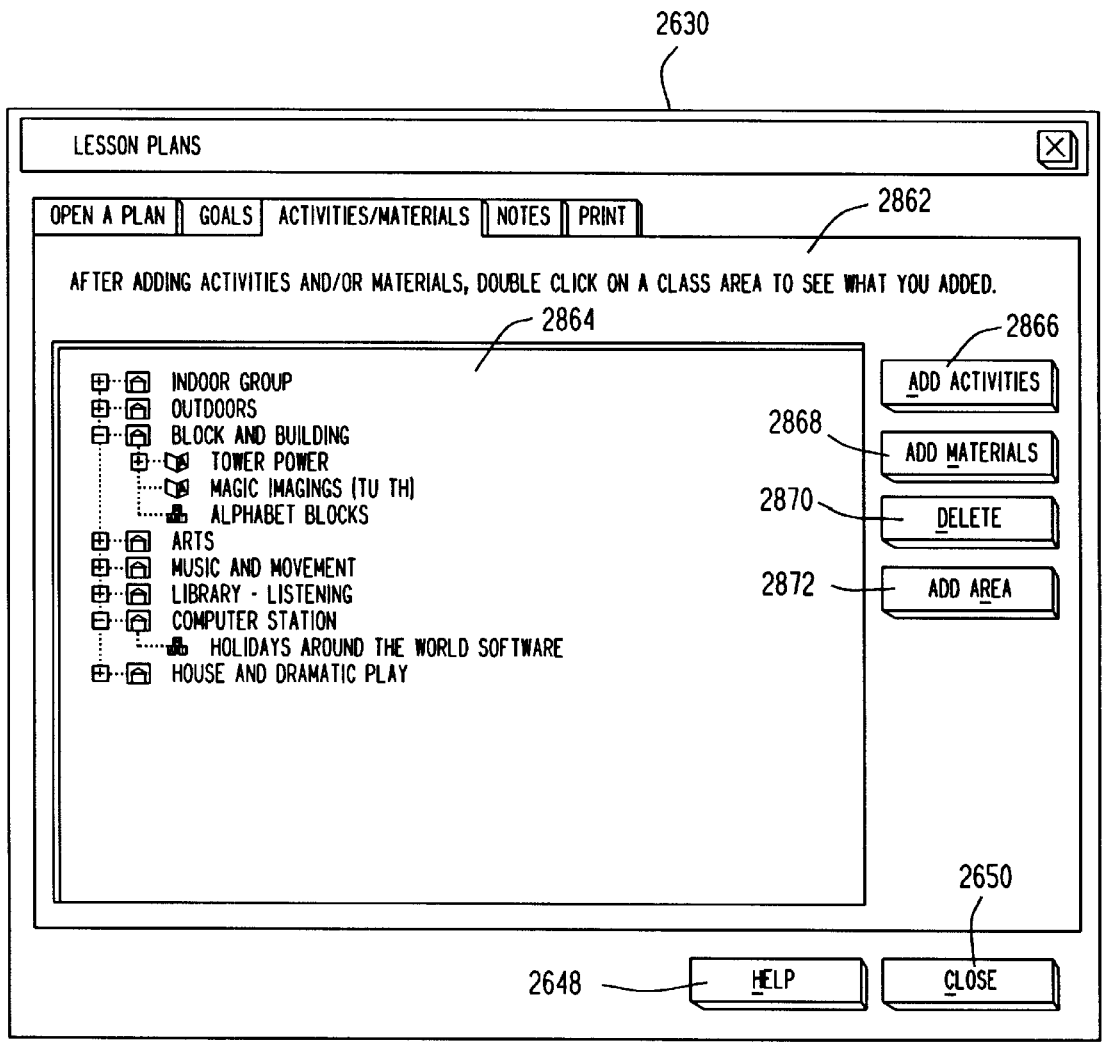
FIG. 112 is an illustration of a window displayed during the open activities/materials procedure.
Figure 121:
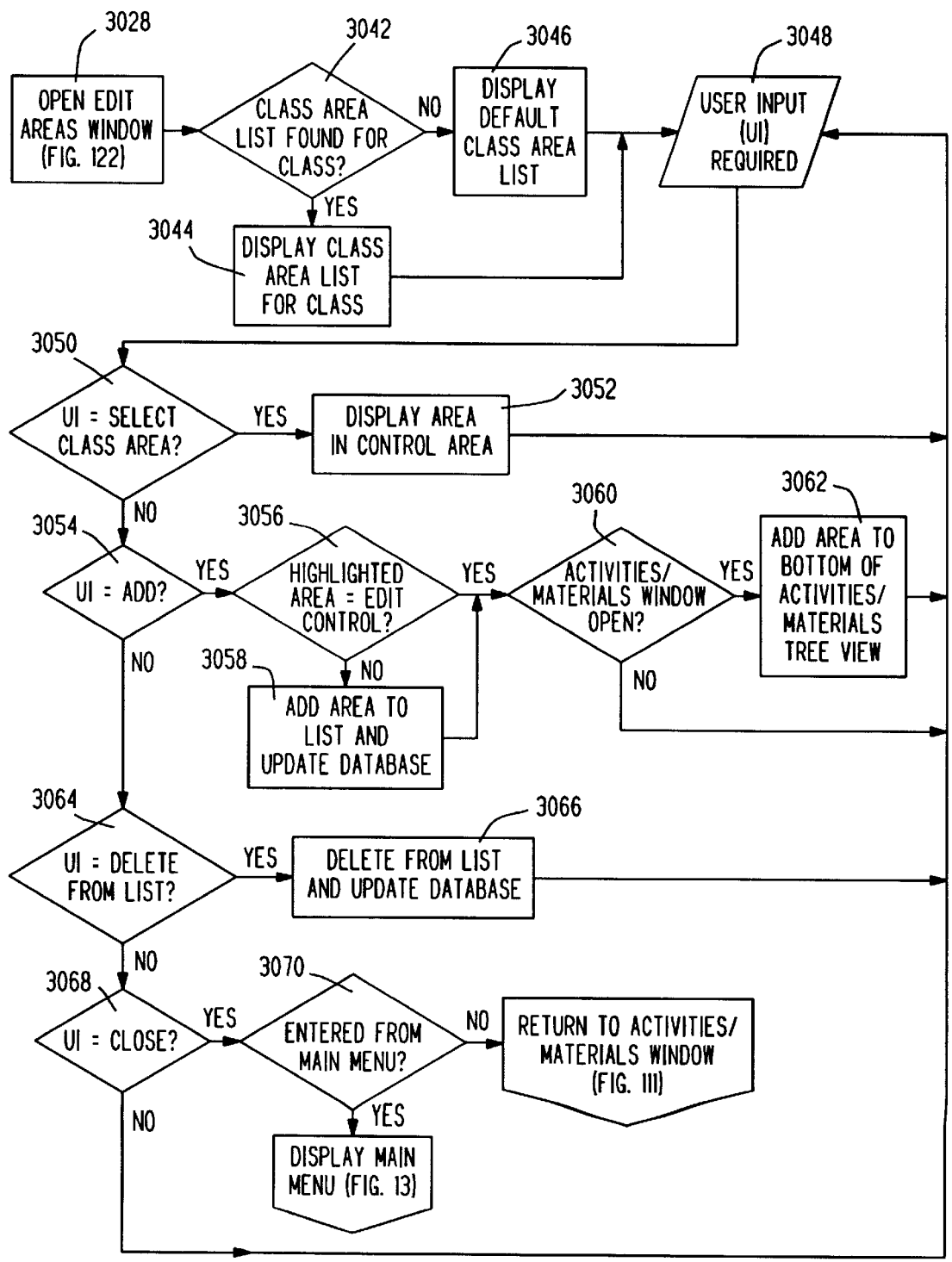
Figure 122:
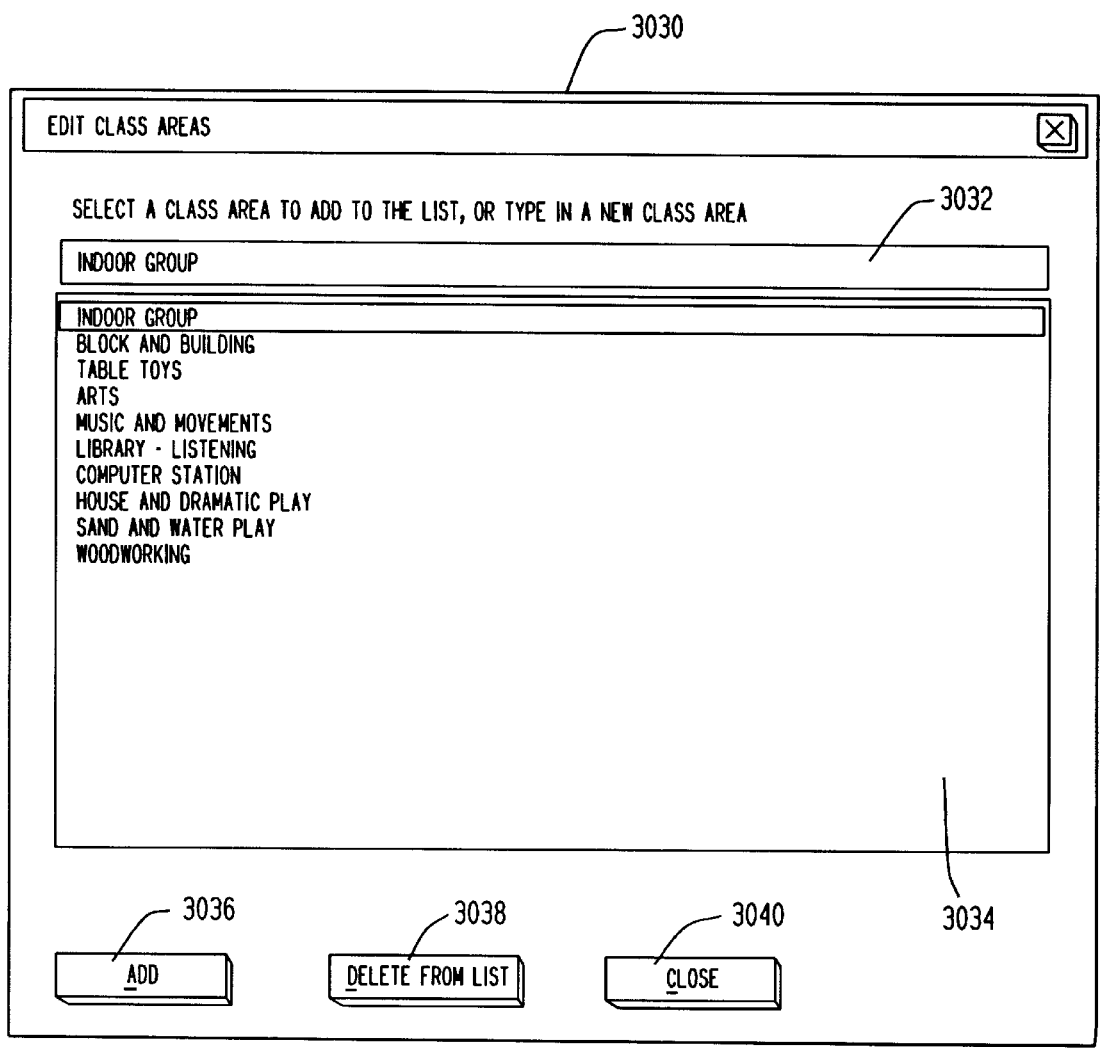

When the add area button 2872 of FIG. 112 is selected, step 3024 of FIG. 111 branches to step 3026 where the display class areas window procedure of FIG. 121 is called. In step 3028 of FIG. 121, the edit class areas window 3030 of FIG. 122 is opened. The window 3030 includes a class area edit control box 3032, an areas list box 3034, an add button 3036, a delete from list button 3038 and a close button 3040. In step 3042 it is determined if there is a class area list for the current class, and if true, the class area list for the current class is displayed step 3044 in the area list box 3034. If step 3042 is false, step 3046 displays a default class area list in the area list box 3034. User input is enabled in step 3048. Step 3050 detects selection of an area in the list of box 3034 to proceed to step 3052 where the selected area is displayed in the edit control 3032. The user can change or type a new area in the edit control box. Step 3054 detects selection of the add button 3036 to proceed to step 3056 where it is determined if the highlighted area item in the box 3034 is the same as the class area display in the edit control 3032. If step 3056 is false, the area in the edit control 3032 is added to the class area list in the box 3034 and the database is updated to include the new class area. If step 3056 is true or after step 3058, step 3060 determines if the activities/materials page 2862 of FIG. 112 is open, and if true, step 3062 adds the new class area to the bottom of the activities/materials tree in the box 2864 of FIG. 112. Selection of the delete from list button 3038 is sensed by step 3064 to advance to step 3066 where the highlighted area in the box 3034 is deleted from the list and the database is updated to remove the deleted area from the class list of areas. Selection of the close button 3040 results in step 3068 branching to step 3070 where it is determined if the present procedure was entered from the main menu (class areas—menu 558 of FIG. 23), and if true, the program returns to the display main menu procedure of FIG. 13; otherwise, the program returns to the activities/materials window procedure of FIG. 111.

Figure 117:
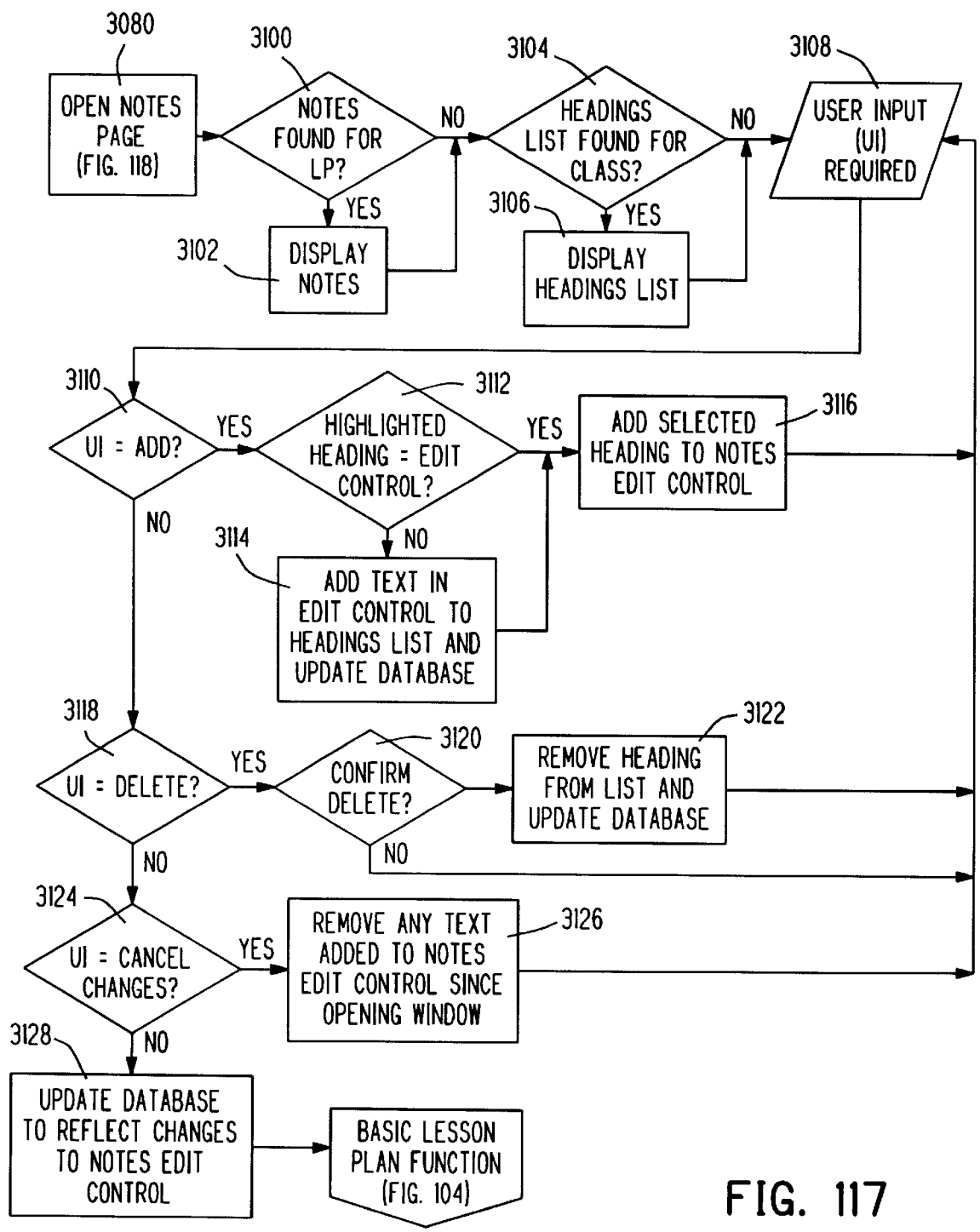
FIG. 117 is a flow diagram of an open notes procedure in the instructional management system program.
Figure 118:
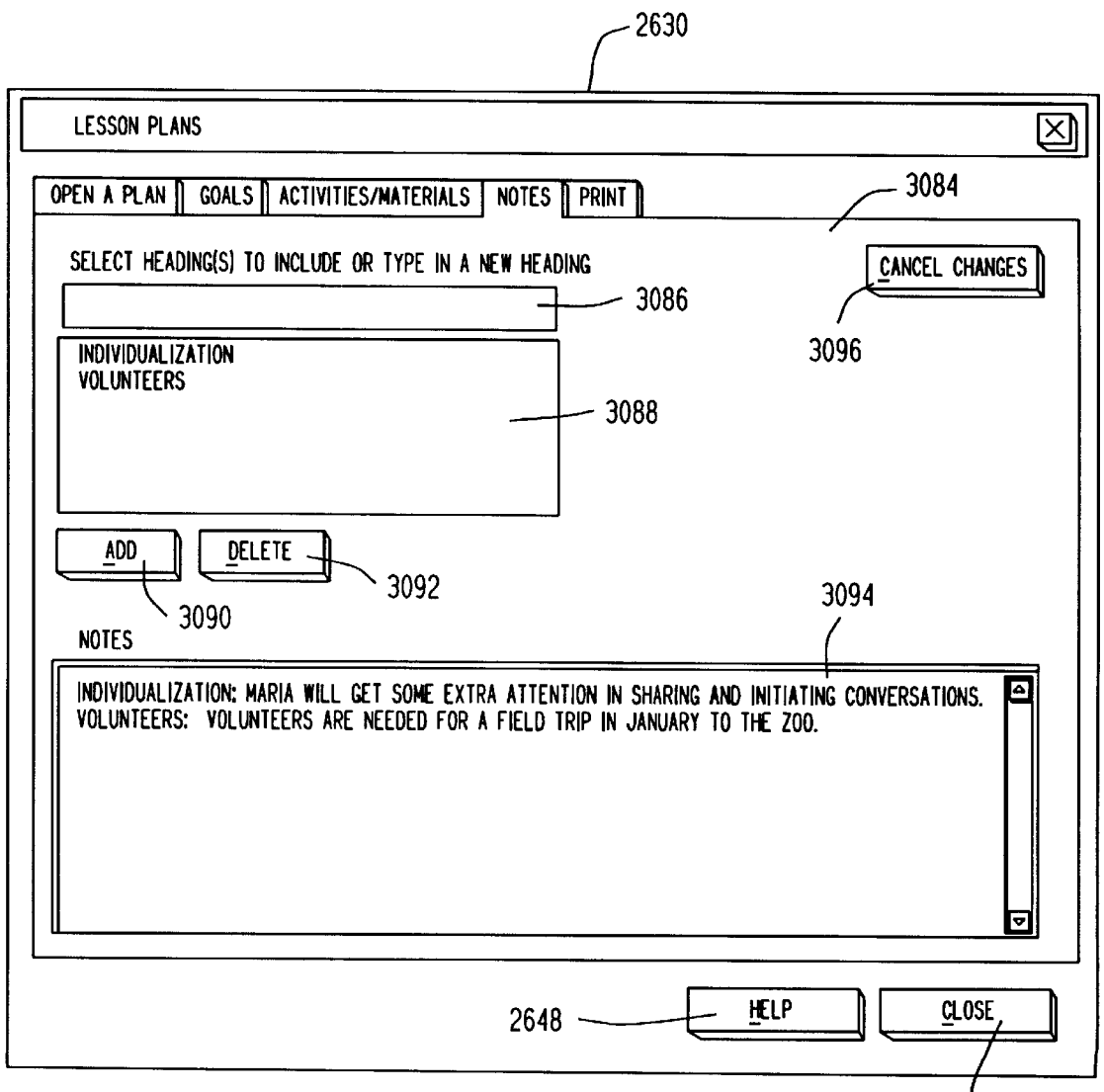
FIG. 118 is an illustration of a window displayed during the open notes procedure.

Referring back to FIG. 111 when all the steps 2888, 2902, 2974 and 3024 are false, the program cycles through the basic lesson plan functions of FIG. 104. Step 3076 in FIG. 104 detects selection of the "notes" index tab in a lesson plan window 2630 to branch to step 3078 where the display the notes window procedure of FIG. 117 is called. In step 3080 of FIG. 117, the notes page 3084 of FIG. 118 is opened in the lesson plan window 2630. The page 3084 includes a notes heading edit control box 3086, a headings list box 3088 with associated add button 3090 and delete button 3092, a note edit control box 3094 and a cancel changes button 3096. In step 3100 it is determined if there are any notes associated with the current lesson plan, and if true, the notes are inserted into the notes edit control box 3094 by step 3106. Step 3104 determines if there is a note headings list for the current class, and if true, displays this class list of headings in the headings list box 3088. User input is enabled in step 3108. If the user clicks on a heading in the heading list box 3088, the selected heading is highlighted and inserted in the heading edit control box 3086. The user can change a heading or write a new heading in the edit control box 3086. Clicking on the add button 3090 is detected in step 3110 to branch to step 3112 where it is determined if a highlighted heading in the heading list box 3088 is the same as a heading written in the edit control box 3086. If step 3112 is false, step 3114 adds the text in the edit control box 3086 to the list of headings in the class heading list box 3088 and updates the class list of headings in the program database. In step 3116 the selected heading is added to the text in the notes edit control box 3094. Step 3118 detects selection of the delete button 3092 and proceeds to step 3120 where deletion must be confirmed prior to proceeding to step 3122 where a highlighted heading in the list box 3088 is removed from the list and the database is updated. The user can edit and write new text in the note edit control box 3094, such as adding a note after insertion of a heading by the add button 3090. Selection of the cancel changes button 3096 is sensed by step 3124 to branch to step 3126 where any text added to the text edit control box 3094 since opening the page 3084 is removed. Step 3124 updates the database to reflect changes in the notes edit control box 3094 prior to cycling through the basic lesson plan functions of FIG. 104.

Figure 119:
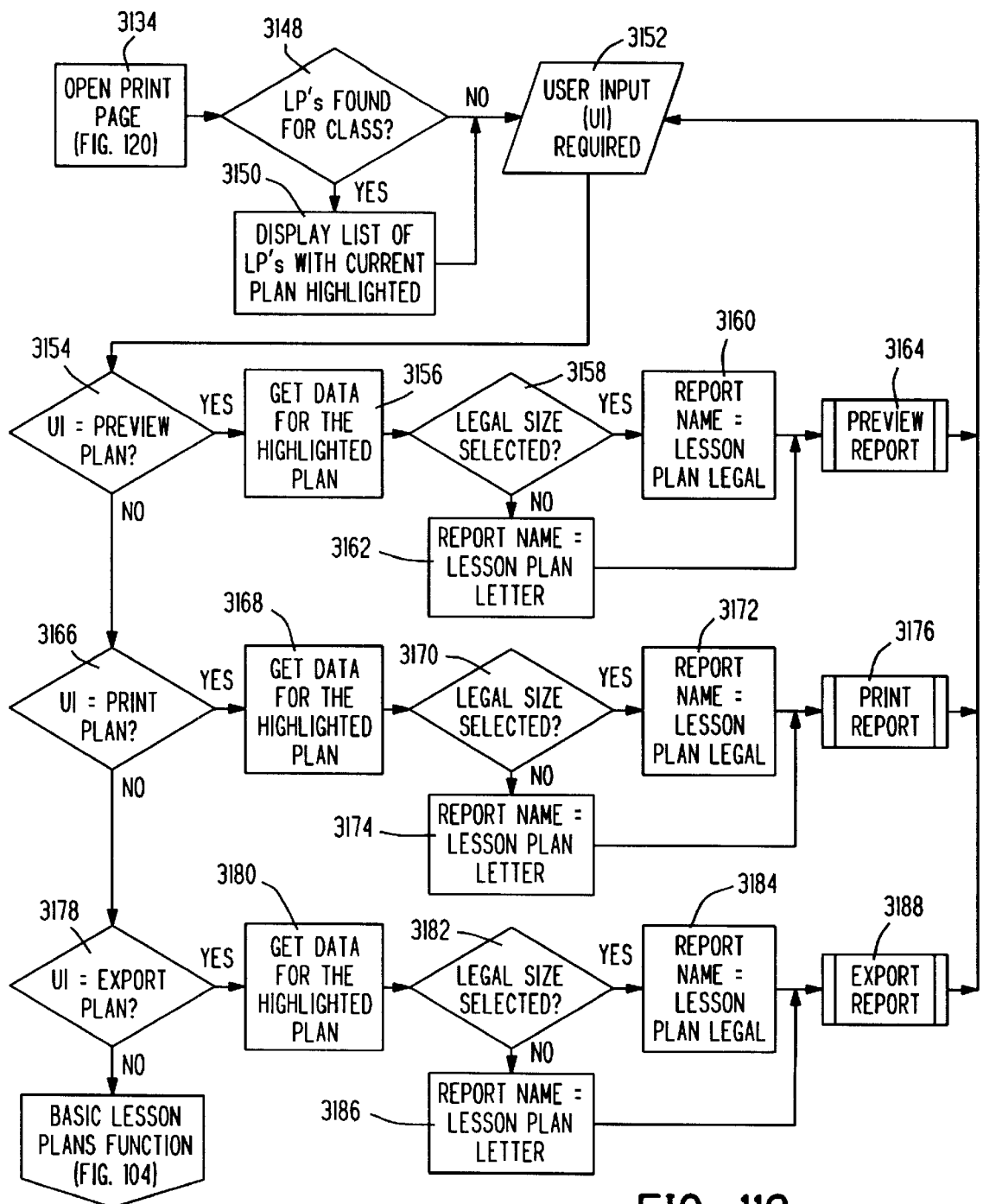
FIG. 119 is a flow diagram of an open print procedure in the instructional management system program.
Figure 120:
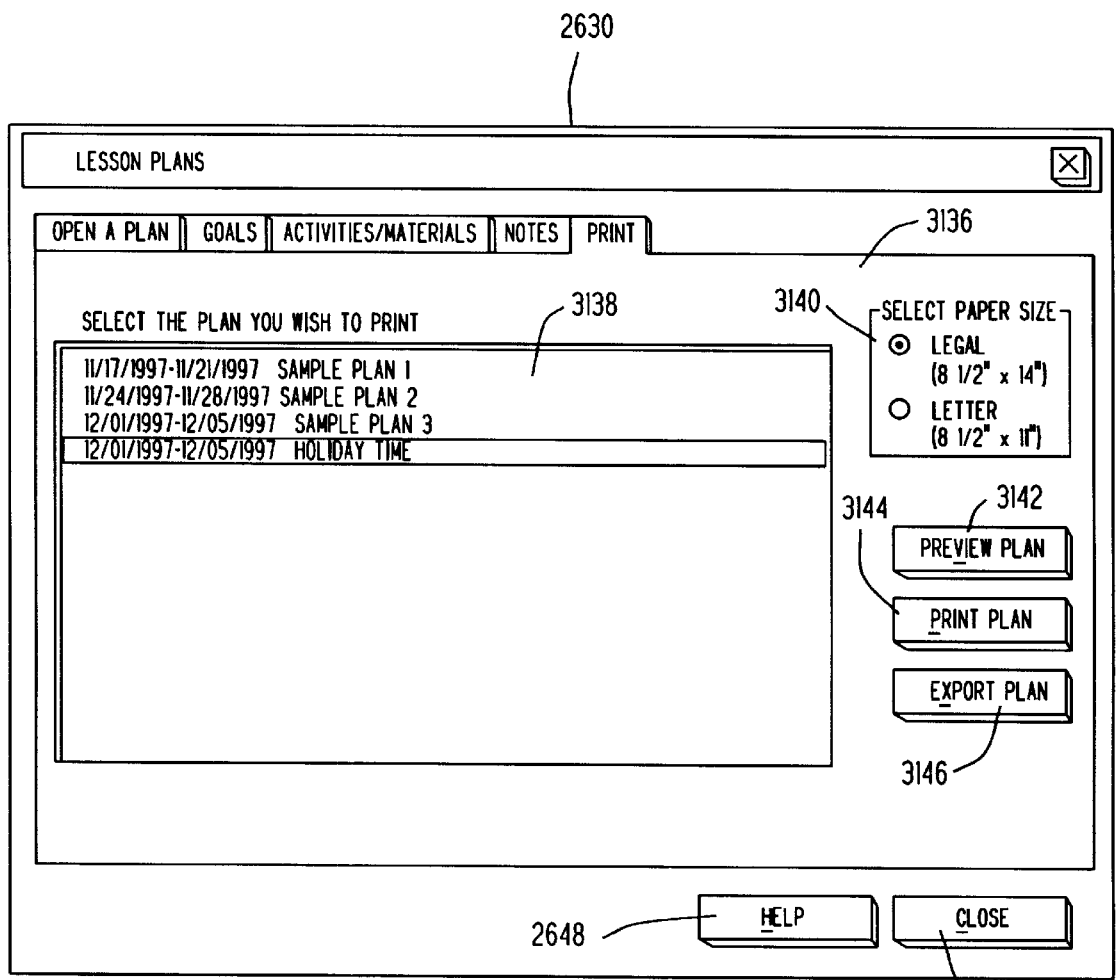

Clicking on the index tab "print" in window 2630 is sensed by step 3130 of FIG. 104 to branch to step 3132 where the display the print window procedure of FIG. 119 is called. In step 3134 of FIG. 119, the print page 3136, FIG. 120, is displayed in the lesson plan window 2630. The page 3136 includes a lesson plan list and selection box 3138, a paper size selection box 3140, a preview print button 3142, a print plan button 3144 and an export plan button 3146. In step 3148 it is determined if the database includes any lesson plans for the current class, and if true, step 3150 displays the list of lesson plans for the current class in the lesson plan selection box 3138 with the current lesson plan highlighted. User input is required in step 3152. The user can select (highlight) any of the plans listed in the box 3138. Selection of the preview plan button 3142 is detected in step 3154 to branch to step 3150 where the data for the selected plan is retrieved. In step 3158 it is determined if legal size paper is selected in the select paper size box 3140. If legal size is true, step 3160 sets the report name to lesson plan legal, and if false, step 3162 sets the report name to lesson plan letter. Subsequently step 3164 calls a conventional preview print procedure to display the lesson plan. Selection of the print plan button 3144 is detected in step 3166 to branch to step 3168 where the data for the selected plan is retrieved. In step 3170 it is determined if legal size paper is selected in the select paper size box 3140. If legal size is true, step 3172 sets the report name to lesson plan legal, and if false, step 3174 sets the report name to lesson plan letter. Subsequently step 3176 calls a conventional print procedure to print the lesson plan. Selection of the export plan button 3146 is detected in step 3178 to branch to step 3180 where the data for the selected plan is retrieved. In step 3182 it is determined if legal size paper is selected in the select paper size box 3140. If legal size is true, step 3184 sets the report name to lesson plan legal, and if false, step 3186 sets the report name to lesson plan letter. Subsequently step 3188 calls a conventional export print procedure to write the lesson plan to a file. In the absence of a current selection of one of the buttons 3142, 3144 and 3146, the program continues to cycle through the basic lesson plans functions of FIG. 104.

If the help button 2648 in the window 2630 is selected, the program at step 3190 branches to step 3192 where the display help window procedure of FIG. 147 is called. Step 3194 in FIG. 147 opens the program help window 3196 of FIGS. 149 and 150. In step 3198, it is determined if the help procedure was called from the main menu of FIG. 18. If not as in the present case of being called from the lesson plans window, the program proceeds to step 3200 where the help title is set to the window from which help was called (in the present case—lesson plans). Then in step 3202 the selected or set title is displayed, such as the lesson plans window help window 3204 of FIG. 179 and in step 3205 user input is enabled. The window 3204 includes instructions on what to do in the lesson plan window along with a copy 3206 of the lesson plan window. Clicking on any of the items in the display copy of the lesson plan window produces a pop-up display of an explanation of that item. For example, clicking on the copy 2636', of the plan edit control box brings the pop-up message: "THEME: The theme of the lesson plan is displayed here. To view a previously saved plan, click on the down arrow in the right side of the box, then click on the name of the plan you wish to review. If you do not wish to enter a theme, enter a title such as 'Week 1'." The window 3204 also includes a contents button 3208, a find button 3210, a back button 3212, a print button 3214 and an options button 3216 which are sensed in the respective steps 3218, 3220, 3222, 3224 and 3226. It is noted these function buttons are similar to the similarly named function buttons of FIG. 70 and that the steps 3218, 3220, 3222, 3224 and 3226 perform similar functions to the steps 1766, 1768, 1770, 1774 and 1778 of FIG. 67.

The window 3196 of FIGS. 149 and 150 contains either a contents page 3230, FIG. 149, or a find page 3232, FIG. 150. The window 3196 includes an open, close or display button 3234, a print button 3236 and a cancel button 3238. If the open program help window procedure is found, in step 3198, to have been called from the main menu, step 3240 determines if the contents page was last displayed, and if true, proceeds to step 3242 where the contents page 3230 is displayed and then to step 3244 where user input is enabled. Step 3242 and the steps following step 3242 are also called by step 3218 when the contents button of a topic display window, such as button 3208 of FIG. 179, is selected. The contents page 3230 includes a selection box 3246 containing a listing of the general topics such as "How do I . . . ", "Program Windows", etc. When the contents page 3230 is first displayed, the first general topic is highlighted and the button 3234 is an open button. Any other listed general topic can be highlighted by clicking. Clicking on the open button 3234 is sensed in step 3248 to proceed to step 3250 where the listing in the box 3246 is expanded to include the subtopics under the highlighted general topic. When the subtopics of a highlighted general topic are listed, the button 3234 turns into a close button and clicking on the close button is sensed in step 3252 to branch to step 3254 which causes the subtopics of the highlighted general topic to be removed from the box 3246 and the listing in the box to shrink along with converting the button 3234 back into an open button. If subtopics include sub-subtopics, then highlighting such a subtopic cause the button 3234 to be an open button and clicking on the open button causes such sub-subtopics to also be listed. Clicking on the print button 3236 is detected in step 3256 to branch to step 3258 where a highlighted subtopic, or the subtopics associated with a highlighted topic, are printed. When a subtopic having no further breakdown or sub-subtopics is highlighted, the button 3234 becomes a display button and clicking on the display button is sensed in step 3260 which branches to step 3202 where the highlighted help title is displayed and the program proceeds to steps 3205, 3218, 3220, 3222, 3224 and 3226. For example, clicking on the button 3234 when a subtopic "Enter new students" is highlighted results in display of the window 3262 of FIG. 151 explaining how to enter a new student into the database.

Step 3264 of FIG. 148 is called from FIG. 147 by step 3220 being true, step 3240 being false, or step 3266 detecting a click on the "find" index tab in the window 3196 of FIG. 149. The step 3264 displays the find page 3232, FIG. 150, in the help window 3196. This find page 3232 includes an edit control box 3268, a matching words selection box 3270, a topic display and selection box 3272, a topics found number display box 3274, an options display box 3276, a clear button 3278, an options button 3280, a find similar button 3282, a find now button 3284, and a rebuild button 3286. Step 3288 enables user input. Clicking on the "contents" index tab of FIG. 150 is sensed in step which causes the program to branch to step 3240 of FIG. 147 and the contents page procedure described above. The user can type in a key word or words in the edit control box 3268 which the user believes may be in a topic or help window. Clicking on the down button in the box 3268 displays a list of the most recent previous terms used to conduct a search and the user can click on one of the listed previous search terms to transfer that term to the edit control box 3268. Clicking on the clear button 3278 is detected in step 3292 to branch to step 3294 which clears the edit control box 3268. When the user clicks on the options button 3280, step 3296 branches to step 3298 which calls a conventional options menu (not shown) enabling the user set various parameters of the search, such as whether the search is to limited to all words in any order, at least one of the words, exact order of words, matching phrases, showing words that end, begin or contain characters typed in the edit control, or begin search immediately after each keystroke or after a pause or only after the find now button. The find similar button is enabled when matching phrases are a selected option and enable the user in step 3300 to call step 3302 to find and display topics associated with selected matching phrases. The find now button 3284 is enabled by the corresponding option and step 3304 detects the user clicking on the find now button to conduct the search in step 3306. The options allow the searching to be done automatically as a search term is typed and such option disables steps 3304 and 3306. The rebuild button 3286 is selected after the help topics have been changed to call the rebuild procedure of step 3310 which constructs an index of search terms. After a search has been conducted, the topics which contain subject matter found by the search are displayed in the topic selection window 3272. The user can scroll through the displayed topics and select a topic to be displayed. Step 3312 detects selection of the display button 3234 to call the step 3302 where the help window, such as window 3262 of FIG. 151 or window 3204 of FIG. 179 is displayed. The selected topic can be printed by selecting the print button 3236 which is sensed by step 3316 to call a conventional print procedure 3318. Selection of the cancel button 3238 is detected by step 3320 in the find window procedure, FIG. 148, or by step 3322 in the contents window procedure, FIG. 147, to proceed to the corresponding step 3324 or 3326 where it is determined if help was called from the main window, and if true, the program returns to the main menu procedure of FIG. 13; otherwise the program returns to the displayed help topic of the calling procedure, for example FIG. 179 from which exit back to the calling procedure is made by the conventional close "X" button.

Referring back to FIG. 104, when the user selects the close button 2650, FIG. 108, step 3330 branches to step 3332 where the information in the lesson plan window is saved, and then to step 3334 where the lesson plan window is closed and the program returns to the main menu procedure of FIG. 13.

Figure 125:
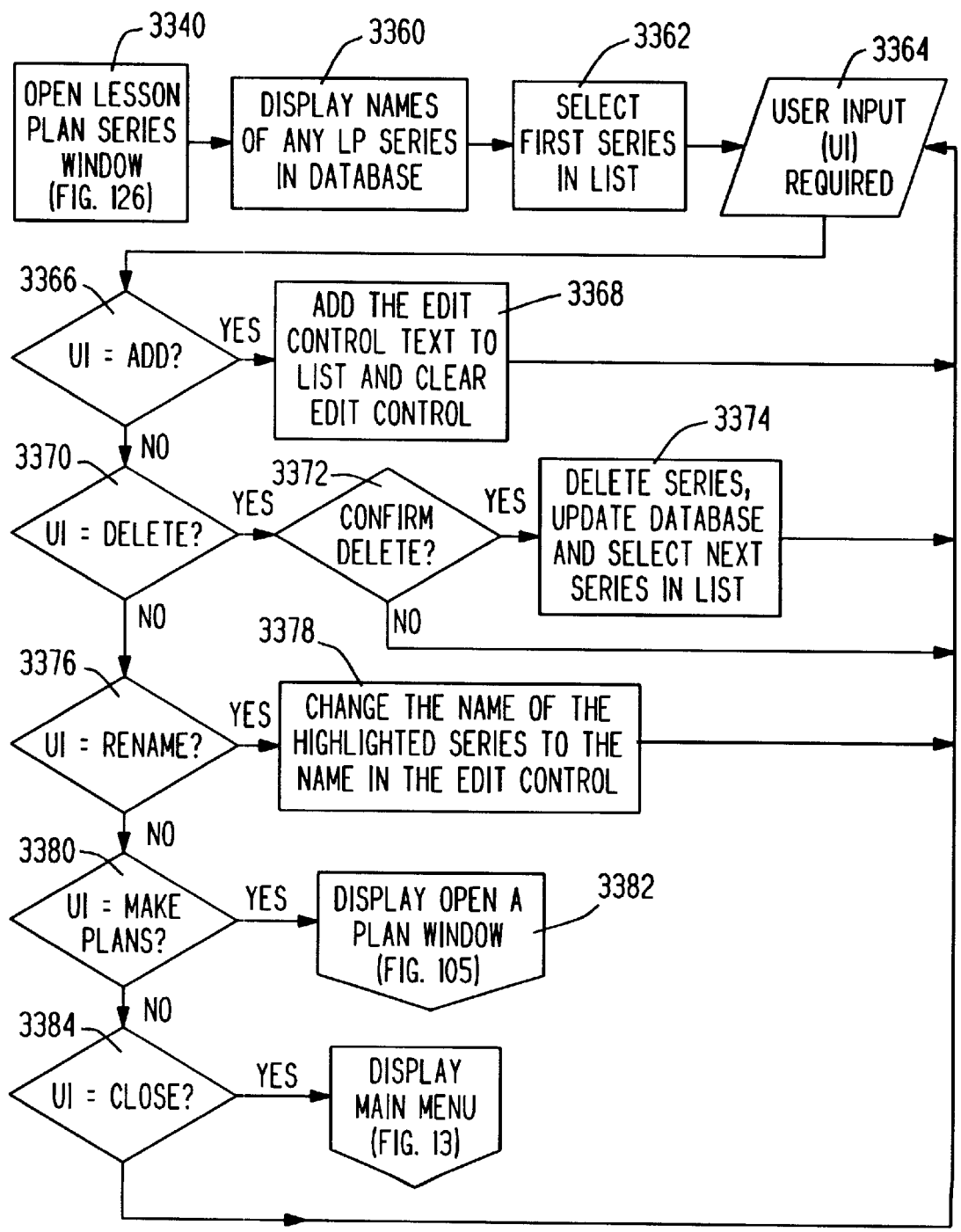
Figure 126:
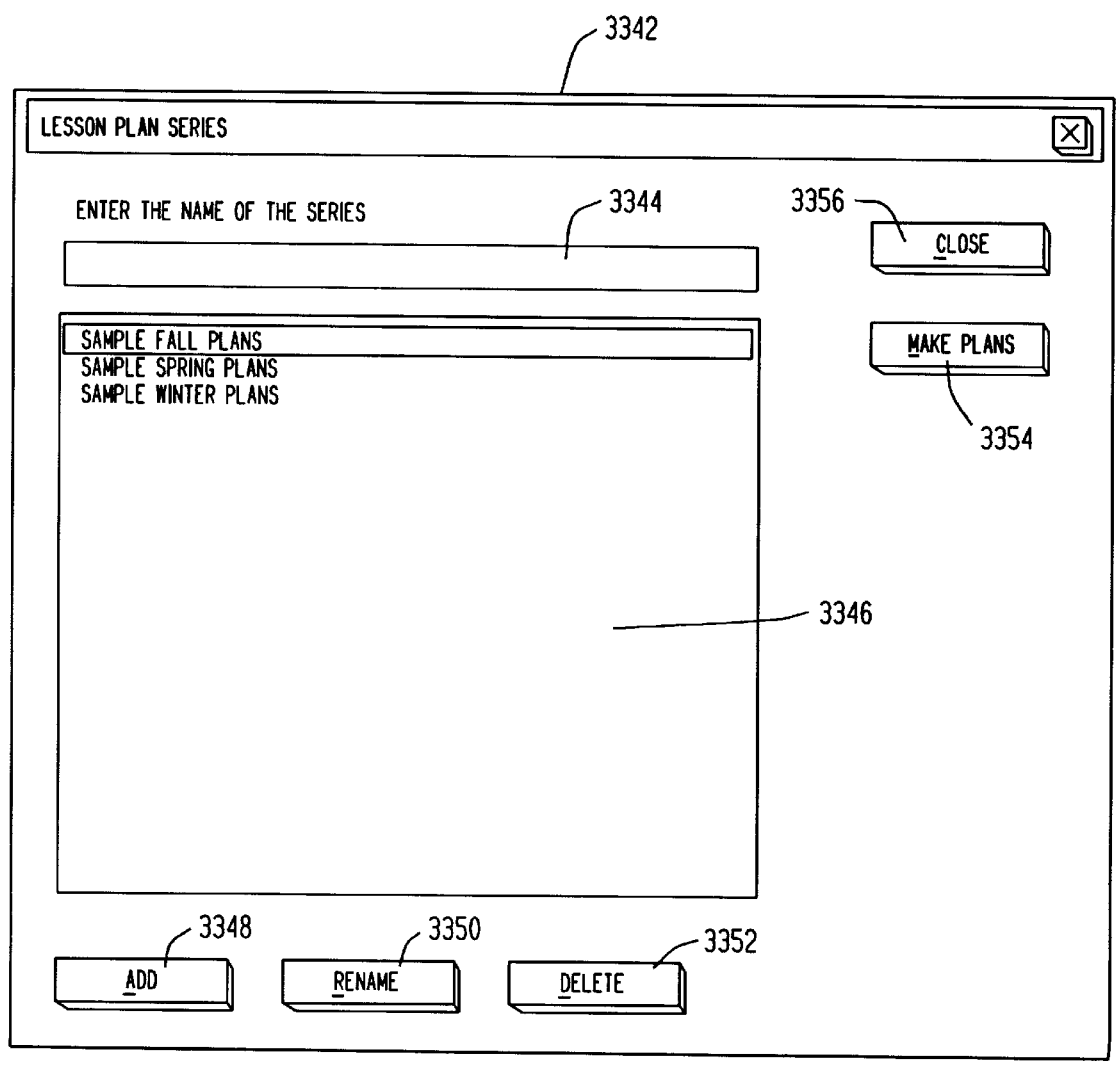

Referring now to the open lesson plan series window procedure of FIG. 125 called by the step 578 of FIG. 15, step 3340 opens a lesson plan series window 3342 of FIG. 126 which includes an edit control box for entering the name of a series of lesson plans, a lesson plan series list box 3346 which lists the all of the series of lesson plans associated with the current class, an add button 3348, a rename button 3350, a delete button 3352, a make plans button 3354 and a close button 3356. In step 3360, the names of the all lesson plan series for the current class are displayed in the list box 3346, and in step 3362, the first series in the list of box 3346 is selected or highlighted. User control is enabled in step 3364. The user can type in a name of new lesson plan series in the edit control box or transfer the name of a series in the box 3346 to the edit control 3344 by double clicking. Step 3366 senses selection of the add button 3348 to branch to step 3368 where any name of a new series in the edit control 3344 is added to the list in the box 3346. Selection of the delete button 3352 is detected in step 3370 to proceed to step 3372 where confirmation of the deletion of the highlighted series of lesson plans is required before proceeding to step 3374 where the highlighted series in the box 3346 is deleted with updating of the database and selection of the next series. Step 3376 responds to the selection of the rename button 3350 to branch to step 3378 where the user is permitted to rename a highlighted series in the box 3346 through use of the edit control 3344. The user can select the make plans button 3354 to cause step 3380 to call step 3382 which, in turn, calls the open a plan window procedure of FIG. 105 enabling the user to add and edit lesson plans in the selected series. Step 3384 detects selection of the close button 3356 to return to the main menu procedure of FIG. 13.

Figure 127:
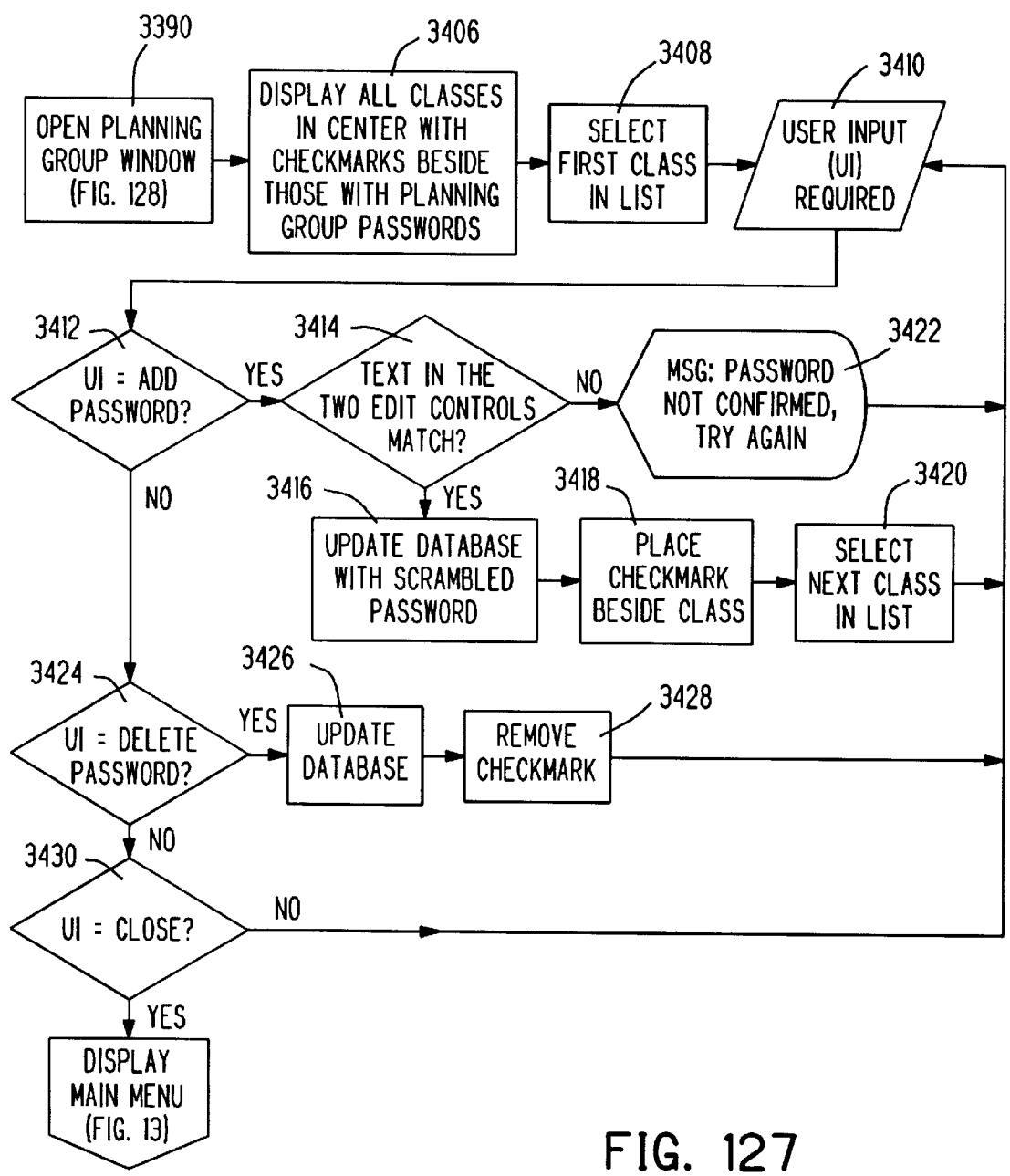
Figure 128:
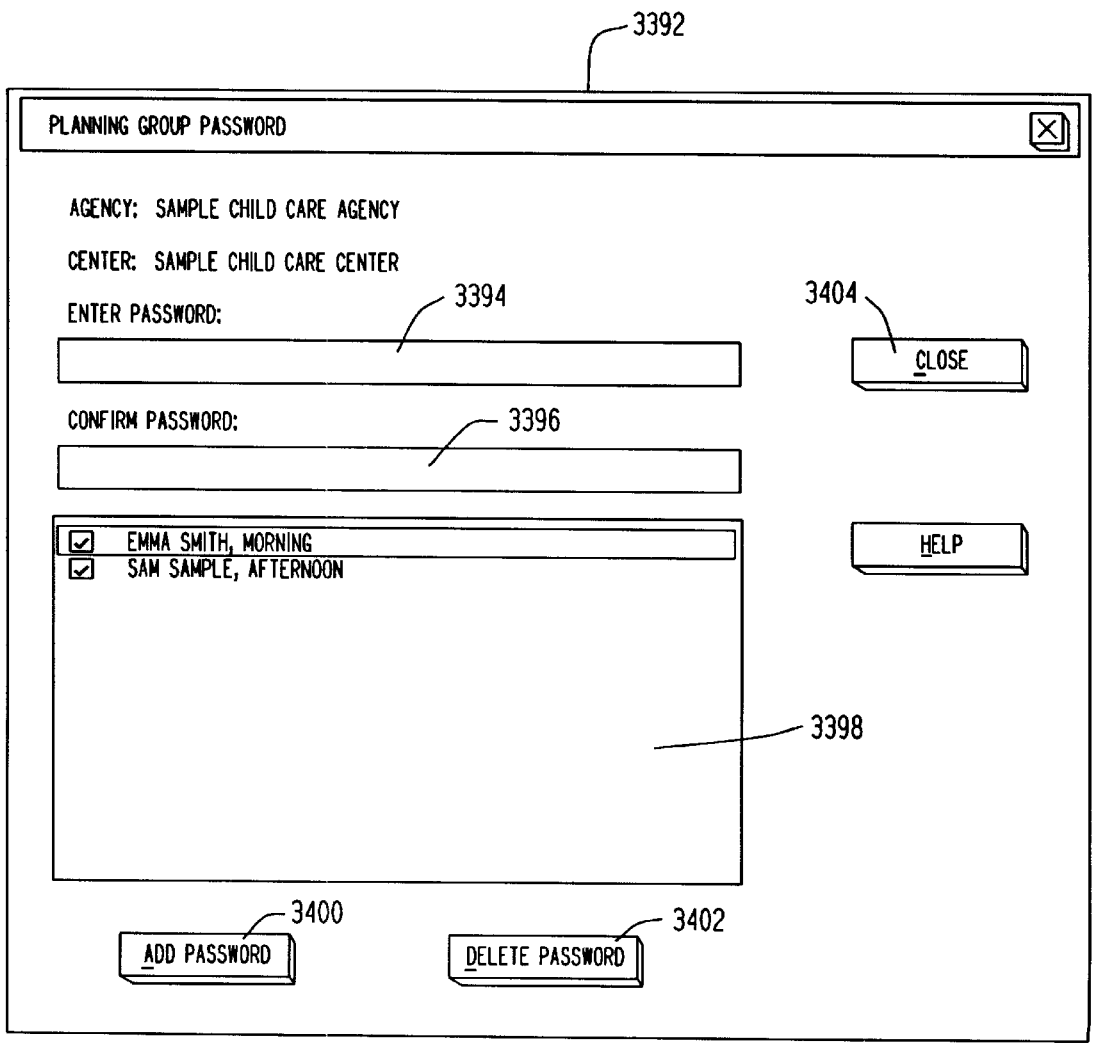

The planning group procedure of FIG. 127 is called from the plans menu at step 576 of FIG. 15 which enables a teacher access to lesson plans of other classes. In step 3390 the planning group window 3392 of FIG. 128 is opened. This window 3392 includes edit controls 3394 and 3396 for entry of a planning group password twice, a class list box 3398 of classes of the center in planning groups, an add password button 3400, delete password button 3402 and a close button 3404. In step 3406, the classes of the current developmental level in center are displayed in the list box 128 and checkmarks are placed beside those classes having planning group passwords. Step 3408 selects or highlights the first class in the list and step 3410 enables user input. When the add password button 3400 is selected, step 3412 is true to branch to step 3414 where text (hidden behind xxx) typed in the password boxes 3394 and 3396 is compared with each other. If there is a match, step 3416 adds the password to the class and updates the database with an encrypted password. Step 3418 places a checkmark beside the class and step 3420 selects the next class in the list. If step 3414 is false, step 3422 issues a message that the passwords are not confirmed. Step 3424 detects the selection of the delete password button 3402 and to proceed to step 3426 where the database is updated to reflect deletion of the password and then to step 3428 where the checkmark is removed from beside the highlighted class. Selection of the close button 3404 results in the program at step 3430 returning to the main menu procedure of FIG. 13.

Figure 129:
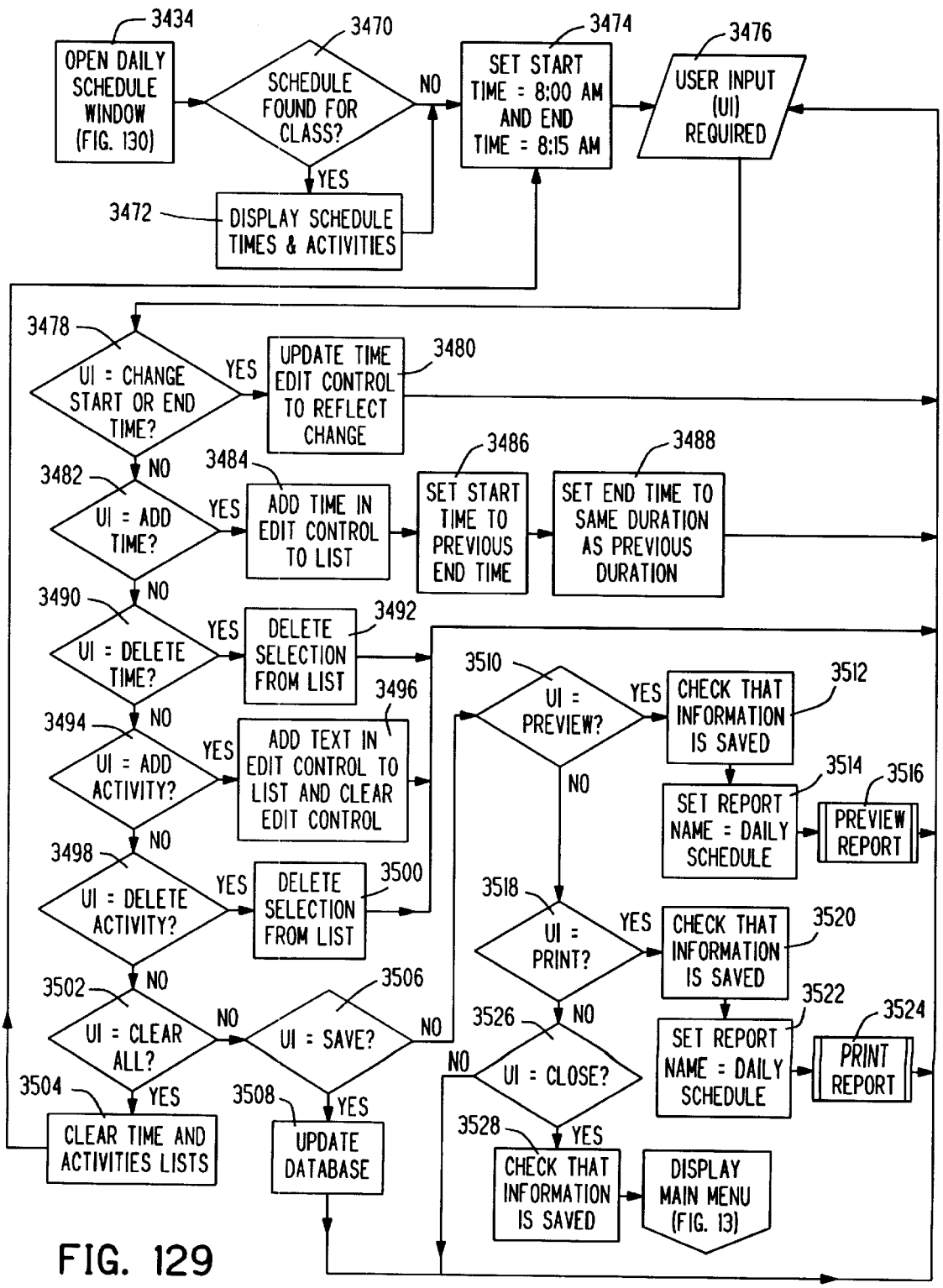
Figure 130:
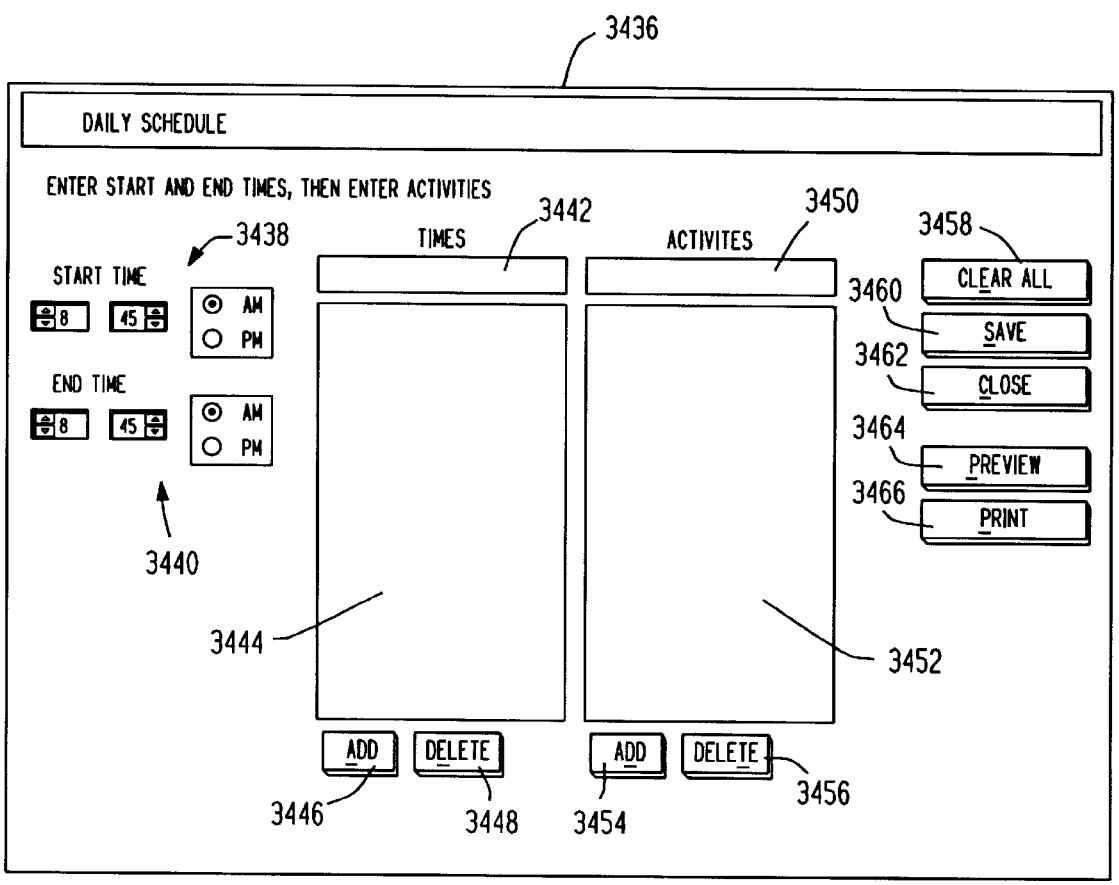

When the user selects "schedule" in the plans menu 558 of FIG. 23, the daily schedule procedure of FIG. 129 is called via steps 564 and 574 of FIG. 15. Step 3434 opens the daily schedule window 3436 of FIG. 130 which includes start time edit controls 3438, end time edit controls 3440, times selected box 3442, times list box 3444, add button 3446, delete button 3448, activities select and edit control box 3450, activities list box 3452, add button 3454, delete button 3456, clear all button 3458, save button 3460, close button 3462, preview button 3464 and print button 3466. In step 3470 it is determined if there is a current schedule for the current class. If true, step 3472 displays the schedule times and activities in the respective list boxes 3444 and 3452. Step 3474 sets the times in the time edit controls 3438, 3440 and 3442 to predetermined times or the first times in the list box 3444, and step 3476 enables user input. If the user changes the start or end time in controls 3438 or 3440, step 3478 is true to proceed to step 3480 where the time edit control 3442 is updated to reflect the changed time. If the add button 3446 is selected, step 3482 branches to step 3484 where the time in the edit control 3442 is added to the list in the box 3444. Step 3486 sets a new start time in the edit controls 3438 and 3442 to the end of the newly added time and step 3488 sets the end time in the edit controls 3440 and 3442 to a time after the start time equal to the duration of the previous period of time. Step 3490 detects selection of the delete button 3448 and proceeds to step 3492 where the highlighted or selected time is deleted from the list in the box 3444. When the add activities button 3454 is selected, step 3494 branches to step 3496 to add text in the edit control 3450 to the list in the box 3452 and then clears the edit control 3450 for entry of another activity. Step 3498 senses clicking on the delete button 3456 to branch to step 3500 where a highlighted activity in the box 3452 is deleted. Selection of the clear all button 3458 is detected by step 3502 to proceed to step 3504 where the time and activity list boxes 3444 and 3452 are cleared and the program then proceeds back to step 3474. When the save button 3460 is clicked, the program in step 3506 branches to step 3508 where the database is updated with the new or modified schedule. Clicking on the preview button 3464 results in step 3510 branching to step 3512 where it is checked that the time and activity information is saved, to step 3514 where the report name is set to "daily schedule", and then to step 3516 where the report is displayed for preview by the user. Selection of the print button 3466 is sensed by step 3518 to branch to step 3520 where any unsaved information is saved, to step 3522 where the report name is set to "daily schedule" and to step 3524 which prints the daily schedule. When the close button 3460 is selected, step 3526 branches to step 3528 to save any information that has not previously been saved and the program then proceeds back to the main menu procedure of FIG. 13.

Figure 131:
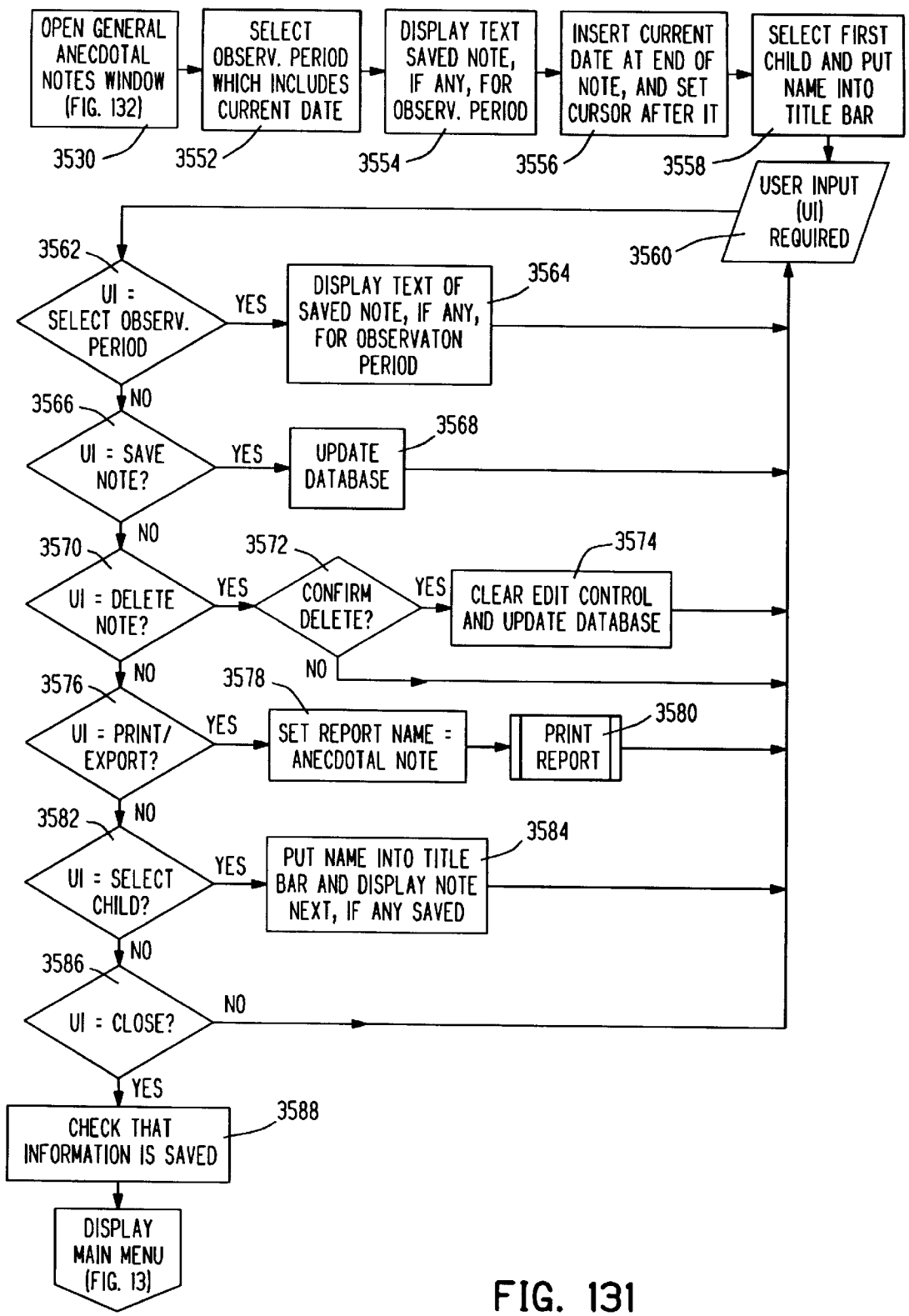
Figure 132:
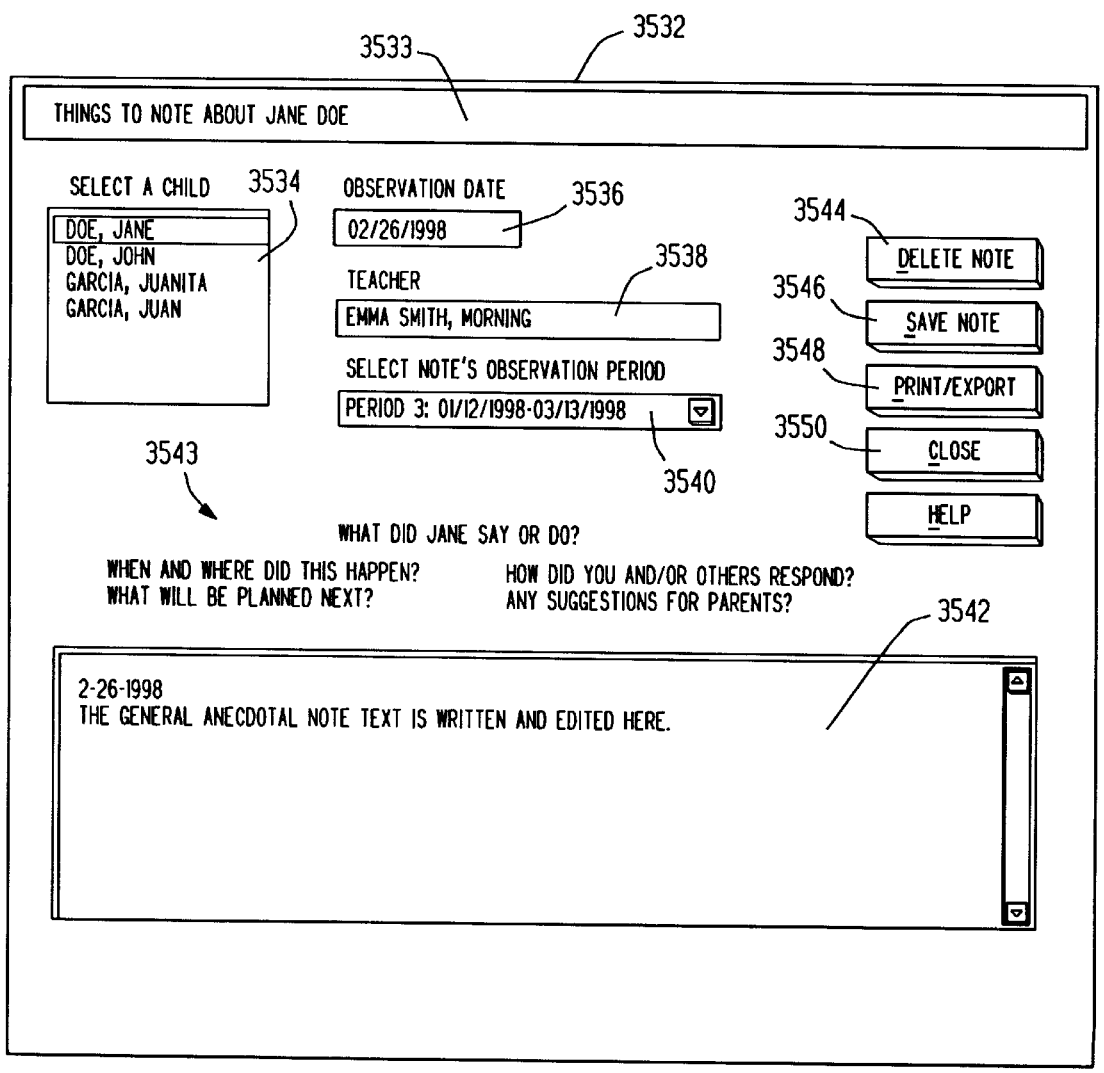

The general anecdotal note procedure called by step 614 in FIG. 16 is shown in FIG. 131 where step 3530 opens the general anecdotal notes window 3532 of FIG. 132. This window includes a title bar 3533 with the name of the selected child, a select child box 3534, and observation date edit control 3536, a teacher edit control box 3538, an observation period select box 3540, a note text edit box 3542, suggestions 3543 for possible notes to include in the box 3542, a delete note button 3544, a save note button 3546, a print/export button 3548, and a close button 3550. In step 3552, the observation period which includes the current date is selected and displayed in the box 3540. In step 3554, the text of any saved note, if any, for the first child in the current class list and for the current observation period is displayed. Step 3556 inserts the current date at the end of any note in the text box 3542 and sets the cursor for adding text in the box 3542. Step 3558 highlights the first child listed in the current class list in the child list box 3534 and adds the selected child's name to the title bar 3533. User input is enabled in step 3560. If the user changes the observation period in the select box 3540, step 3562 branches to step 3564 where the text in the notes box 3542 is changed to the text of saved notes, if any, for the selected observation period. Selection of the save note button 3546 is detected by step 3566 to branch to step 3568 where the database is updated to include any changed or added notes. Step 3570 detects the selection of the delete note button 3544 to proceed to step 3572 where confirmation of the deletion is required prior to proceeding to step 3574 where the highlighted note in the box 3542 is cleared and the database is updated. When the print/export button 3548 is selected, step 3576 branches to step 3578 where the report name is set to "anecdotal note" and then to step 3580 where the report is printed or saved to a file. The user can select any child listed in the child list box 3534 to cause step 3582 to branch to step 3584 where the selected child's name is placed in the title bar 3533 and the note box is changed to include notes, if any, concerning the selected child. Clicking on the close button 3550 renders step 3586 true to branch to proceed to step 3588 where any unsaved note information is saved followed by return to the main menu procedure of FIG. 13.

When the user selects "notes on the child's day" from menu 602 of FIG. 25, step 616 of FIG. 16 calls the child's daily note procedure of FIGS. 133 and 134. In step 3490 the child's daily note window 3600 of FIG. 135 is opened. The window 3600 includes a title bar 3602 for receiving the name of the child, a child selection and list box 3604, a date box 3606, a class name box 3608, a nap time box 3610, a class areas enjoyed box 3612 with associated insert button 3614, a what I did box 3616, a what I ate box 3618, a comments text box 3620, a needs edit control box 3621, a needs list box 3622 with an associated add button 3624 and delete button 3626, a open note button 3628, a delete note button 3630, a save note button 3632, a print/export button 3634 and a close button 3636. In step 3640, the children in the current class are listed in the box 3604 and the first child in the list is selected. Step 3642 places the name of the selected child into the title bar 3602. User input is enabled in step 3644. When the user selects the open notes button 3628, the step 3646 branches to step 3648 where the pop-up window 3650 of FIG. 136 is displayed. The window 3650 includes a list box 3652 containing a list of previously saved notes for the selected child, along with an ok button 3654 and a cancel button 3656. User input is enabled in step 3658 for the window 3650 so that the user can select one of the notes listed in the box 3652. Step 3660 detects selection of the ok button 3656 to branch to step 3662 where the window 3650 is closed and to step 3664 where the information of the selected note is placed in the appropriate boxes of the window 3600. When the cancel button 3656 is selected in window 3650, the program at step 3666 proceeds to step 3668 where the window 3650 is closed without further transfer of any information.

Clicking on the delete note button 3630 results in step 3670 branching to step 3672 where the delete note pop-up window 3674 of FIG. 137 is displayed. The window 3674 includes a list box 3676 containing a list of previously saved notes for the selected child, along with a delete note button 3678 and a close button 3680. User input is enabled in step 3682 for the window 3674 so that the user can select one of the notes listed in the box 3676. Step 3684 detects selection of the delete note button 3678 to branch to step 3686 where the selected or highlighted note is deleted from the note list box 3676 and the database is updated to reflect the deletion of the note. When the close button 3680 is selected in window 3674, the program at step 3688 proceeds to step 3690 where the window 3674 is closed.

Step 3692 responds to selection of the add button 3624 to proceed to step 3694 where a need typed in the edit control box 2621 is added to the list of class needs in the box 3622. Step 3696 responds to selection of the delete button 3626 to proceed to step 3698 where one or more highlighted needs listed in the class needs list box 3622 are deleted. When the user clicks on a class area in the box 3612, a checkmark is placed, or removed, next to the class area. Selection of the insert button 3614 is detected by step 3200 to branch to step 3702 where any checked class areas in the box 3612 are added to the comments box 3620. Step 3704 displays prompts 3706 for assisting the user to type in further comments in the comments box 3620. Double clicking on one of the class areas in the box 3612, sensed in step 3708, has a similar effect of selecting a class area and then adding, step 3710, that selected class area to the comment box 3620 with display of the prompts 3706, step 3712.

When the user selects the save note button 3632, step 3714 proceeds to step 3716 where it is determined if the current information is from a note retrieved by the open note window 3650 or if the current information is from writing a new note. If it is a new note, the note name is set to the date in the box 3606 in step 3718 and added to the database in step 3720. Step 3722 clears the edit controls in the window 3600. If step 3716 finds an edited version of a previously saved note, a pop-up menu with the selections of "save as a new note" and "save changes to the current note" are presented in step 3724 requiring user selection. If "save as a new note" is selected, step 3726 branches to step 3718 to create the new note, otherwise, the current note is saved in step 3720 with the changes.

Selection of the print/export button 3634 is detected by step 3728 to branch to step 3730 where a pop-up menu having the selections of "all children" and "currently selected child" are presented. If the user selects "currently selected child" the program proceeds through step 3734 to step 3736 where a print saved note window (not shown) having a list box similar to boxes 3652 and 2676 containing a current highlighted note with ok and cancel buttons is displayed. The user in step 3738 can select information from a different note in the list box and/or can select the ok button in step 3740 to proceed to step 3742 where the report name is set to the child's daily note. Then in step 3744 a conventional report options window (not shown) presenting options of preview, print, export and cancel enable the user to proceed accordingly. A sample report 3746 is shown in FIG. 180 and includes corresponding titled areas with printed information entered into the respective boxes of the window 3600. If the user selects the cancel button in step 3748, the print/ export procedure is terminated. If "all children" is selected in step 3732, step 3750 is called to retrieve information for all the children in the class with saved notes for the current date. The daily note information for each child is set in the report in turn by step 3742 and printed out in step 3744.

Step 3752 senses selection of the close button 3636 to call step 3754 where any unsaved information saved and the program returns to the main menu procedure of FIG. 13.

When step 460 of FIG. 13 calls the backup procedure of FIG. 138, step 3760 opens the backup the active database window 3762 of FIG. 139. The window 3762 includes an edit control 3764 for displaying the path and name of the current database, an edit control 3766 for displaying the path and name of a backup, a browse button 3768, an ok button 3770 and a cancel button 3772. Step 3774 displays the name of the active database in the box 3764. It is determined in step 3776 if a backup name has been previously set, and if true, step 3778 displays the path and name of the previous backup in the box 3766. User input is enabled in step 3780. Clicking on the browse button 3768 is detected by step 3782 to branch to step 3784 which displays the backup pop-up window 3786 as shown in FIG. 140. The window 3786 includes a folder or path name select box 3788 with associated conventional display back one level button 3789, display desktop files and folders button 3790, list files and folders button 3791 and show file and folder details button 3792, a file/folder selection list box 3793, a file name edit control box 3794, a file type edit control box 3795, a backup button 3796 and a cancel button 3798. User input is enabled by step 3800. If the cancel button 3798 is selected, step 3802 removes the window 3786 and returns the program to the backup procedure using window 3762 of FIG. 139. Step 3804 senses selection of the backup button 3796 to proceed to step 3806 where the name in the file edit control 3794 with its corresponding folder path is set as the backup path and file name before removing the window 3762 and returning to the backup window of FIG. 139 where step 3778 then displays the set backup path and filename in the box 3766. Selection of cancel button 3772 is sensed at step 3808 to return to the main menu procedure of FIG. 13. If the ok button 3770 is selected, step 3810 proceeds to step 3812 where it is determined if the active database path and file name is the same as the backup path and filename. If true step 3814 displays a message that the backup cannot be made over the current database. Otherwise it is determined in step 3816 if a backup file or files of the same path and name exists, and it true, step 3818 copies the current active database over the prior backup file or files. If step 3816 is false, step 3820 makes a new file or files with the backup name and copies the active database to the new file or files before returning to the main menu procedure of FIG. 138.

Step 3822 in the active database procedure of FIG. 141, called from step 462 of the main menu procedure, opens the set active database window 3824 of FIG. 142. The window 3824 includes an edit control 3826 for displaying the path and name of the current database, an edit control 3828 for displaying the path and name of a new active database, a browse button 3830, an ok button 3832 and a cancel button 3834. Step 3836 displays the name of the active database in the box 3826. It is determined in step 3838 if a new active database name has been previously set, and if true, step 3840 displays the path and name of the new active database in the box 3828. User input is enabled in step 3842. Clicking on the browse button 3830 is detected by step 3844 to branch to step 3846 which displays the backup pop-up window 3848 as shown in FIG. 143. The window 3848 includes a folder or path name select box 3850, a file/folder selection list box 3852, a file name edit control box 3854, a file type edit control box 3856, an activate button 3858 and a cancel button 3860. User input is enabled by step 3862. If the cancel button 3860 is selected, step 3864 removes the window 3848 and returns the program to the set active database procedure using window 3824 of FIG. 142. Step 3866 senses selection of the activate button 3858 to proceed to step 3868 where the name in the file edit control 3854 with its corresponding folder path is set as the new path and file name before removing the window 3848 and returning to the set new database window of FIG. 142 where step 3840 then displays the set new database path and filename in the box 3828. If the ok button 3832 is selected, step 3872 proceeds to step 3874 where the message "must make new agency, center and class selections". Step 3876 calls the display selection window procedure of FIG. 37.

The program mail procedure of FIG. 144 is called by step 464 and begins with step 3880 which opens the program mail window 3882 of FIG. 145 including a text editing box 3883 where the user types in a new report. A pop-up "file" menu 3884 of FIG. 146 is called when "file" is selected in the menu bar of window 3882. User input is enabled in step 3886. When the user selects "preview new e-mail report" in the file menu 3884, step 3888 branches to step 3890 where a convention folder and file selection window (not shown) including "cancel" and "open" buttons is displayed. User input for the file selection window is enabled at step 3892 for the selection of a previously saved report file. If the user selects "cancel" the program returns to the program mail window 3882. If the user selects "open" the program proceeds to step 3898 where the selected report file is displayed. Selection of "preview current report" in the file menu 3884 is sensed at step 3900 to proceed to step 3902 where a report name is set for the report in the box 3883 and then to the step 3898. Selection of "print current report" in the file menu 3884 is sensed at step 3904 to proceed to step 3906 where a report name is set for the report displayed in the box 3883 and then to step 3908 where the report is printed. Selection of "export current report" in the file menu 3884 is sensed at step 3910 to proceed to step 3912 where a report name is set for the report displayed in the box 3883 and then to step 3914 where the current report is saved to a file. Step 3916 detects selection of exit to return to the main menu procedure of FIG. 13.

Selection of program guide in the help menu 650 of FIG. 28 results in step 660 of FIG. 17 calling the procedure of FIG. 152 beginning with step 3920 where the program guide window 3922 of FIGS. 154 and 155 is displayed. This window 3922 contains either a contents page 3924, FIG. 154, or a find page 3926, FIG. 155. The window 3922 includes an open/close/display button 3928, a print button 3930 and a cancel button 3932. Step 3934 determines if the contents page was last displayed, and if true, proceeds to step 3936 where the contents page 3924 is displayed and then to step 3938 where user input is enabled. The contents page 3924 includes a selection box 3940 containing a listing of the general topics such as "Introduction", "Agency, Center, and Class Information", etc. When the contents page 3924 is first displayed, the first general topic is highlighted and the button 3928 is an open button. Any other listed general topic can be highlighted by clicking. Clicking on the open button 3928 is sensed in step 3942 to proceed to step 3944 where the listing in the box 3940 is expanded to include the subtopics under the highlighted general topic. When the subtopics of a highlighted general topic are listed, the button 3928 turns into a close button and clicking on the close button is sensed in step 3946 to branch to step 3948 which causes the subtopics of the highlighted general topic to be removed from the box 3940 and the listing in the box to shrink along with converting the button 3928 back into an open button. If subtopics include sub-subtopics, then highlighting such a subtopic causes the button 3928 to be an open button and clicking on the open button causes such sub-subtopics to also be listed. The button 3928 becomes a display button when a subtopic with no further hierarchal lower topics is selected or highlighted. Clicking on the print button 3930 is detected in step 3950 to branch to step 3952 where a highlighted subtopic, or the subtopics associated with a highlighted topic, are printed.

Clicking on the "find" index tab is detected by step 3954 to proceed to step 3956 of FIG. 153 where the find page 3926 of FIG. 155 is displayed in the help window 3922. This find page 3926 includes an edit control box 3958, a matching words selection box 3960, a topic display and selection box 3962, a topics found number display box 3964, an options display box 3966, a clear button 3968, an options button 3970, a find similar button 3972, a find now button 3974, and a rebuild button 3976. Step 3978 enables user input. Clicking on the "contents" index tab of FIG. 155 is sensed in step 3980 which causes the program to branch to step 3936 of FIG. 152 and the contents page procedure described above. The user can type in a key word or words in the edit control box 3958 which the user believes may be in a topic or help window. Clicking on the down button in the box 3958 displays a list of the most recent previous terms used to conduct a search and the user can click on one of the listed previous search terms to transfer that term to the edit control box 3958. Clicking on the clear button 3968 is detected in step 3982 to branch to step 3984 which clears the edit control box 3958. When the user clicks on the options button 3970, step 3986 branches to step 3988 which calls a conventional options menu (not shown) enabling the user set various parameters of the search, such as whether the search is to limited to all words in any order, at least one of the words, exact order of words, matching phrases, showing words that end, begin or contain characters typed in the edit control, or begin search immediately after each keystroke or after a pause or only after the find now button. The find similar button 3972 is enabled when matching phrases are a selected option and enable the user in step 3990 to call step 3992 to find and display topics associated with selected matching phrases. The find now button 3974 is enabled by the corresponding option and step 3994 detects the user clicking on the find now button to conduct the search in step 3996; the options allow the searching to be done automatically as a search term is typed and such option disables steps 3994 and 3996. The rebuild button 3976 is selected after the guide topics have been changed to call the rebuild procedure of step 4000 which constructs an index from the word base and topic associations. After a search has been conducted, the topics which contain subject matter found by the search are displayed in the topic selection window 3962. The user can scroll through the displayed topics and select a topic to be printed or displayed. Step 4002 detects selection of the print button 3930 in FIG. 155 to branch to step 4004 where the selected topic is printed.

Step 4006 of FIG. 152 and step 4008 of FIG. 153 both detect selection of the display button 3928 to branch to step 4010 of FIG. 152. In step 4010 the selected or set guide topic is displayed, such as the window 4012 of FIG. 156. User input is enabled in step 4013. The window 4012 includes the text 4014 of the selected topic along with a contents button 4016, a find button 4018, a back button 4020, a print button 4022 and an options button 4024 which are sensed in the respective steps 4026, 4028, 4030, 4032 and 4034. Step 4026 branches to the step 3936 to call the contents page; step 4028 branches to the step 3956 of FIG. 153 to call the find page; step 4030 branches to step 4036 to return to the previously displayed topic; step 4032 branches to step 4038 which prints the displayed topic; and step 4034 branches to step 4040 to display the options menu (not shown) where a standard options menu is displayed.

Selection of the cancel button 3932 in FIG. 154 or 155 is sensed by the respective step 4042 of FIG. 152 or 4044 of FIG. 153 to return to the main menu procedure of FIG. 13.

In the open report options window of FIG. 157 which is called by step 3744 in FIG. 134, step 4050 opens the pop-up window 4052 of FIG. 158. The window 4052 includes a preview button 4054, a print button 4056, an export button 4058 and a close button 4060. User input is enabled in step 4062. When the preview button 4054 is selected, step 4064 branches to step 4066 which opens the previously named report. Information is then placed in the report at step 4068 in accordance with the report settings and the previously selected note or record. Then in step 4070 the report is displayed in a conventional preview window with buttons to print, export, change the view of the report or close. Selection of one of the options results in the corresponding action and closes the report in step 4072. Selection of the print button 4056 is sensed in step 4074 to proceed to step 4076 where the previously named report is opened and then to step 4078 where the information is placed in the report. Step 4080 opens a conventional print window enabling the printing of the report after which the print window is closed in step 4082. Selection of the export button 4058 is sensed by step 4084 to call steps 4086, 4088 and 4090 which are similar to the printing steps 4076, 4078 and 4080 except that the report is written into a file selected or created in step 4090. Step 4092 closes the print window. Clicking on the close button 4060 is detected in step 4094 and results in closing the report in step 4096, closing the report options window 4052 in step 4098 and returning to the previously open window in step 4100.

The open password protection procedure of FIG. 159 is called from the program menu 474 at step 494 of FIG. 13 to set up passwords for the system. In step 4104 the password protection window 4106 of FIG. 160 is opened. This window 4106 includes edit controls 4108 and 4110 for entry of a password twice, a list box 4112, an add password button 4114, a delete password button 4116 and a close button 4118. In step 4120, the administrator and classes of center are displayed in the list box 4112 and checkmarks are placed beside those listed requiring passwords. Step 4122 selects or highlights the first name in the list and step 4124 enables user input. When the add password button 4114 is selected, step 4126 is true to branch to step 4128 where text (hidden behind xxx) typed in the password boxes 4108 and 4110 are compared with each other. If the two typed entries do not match, step 4130 displays a message that passwords are not confirmed and the user must try again. If there is a match, step 4132 determines if the password is unique or differs from all the other passwords. When the password is not unique, a message that the password must be unique is displayed by step 4134. If step 4132 is true, step 4136 updates the database with the encrypted password. Step 4138 places a checkmark beside the name in the list and step 4140 selects the next name in the list. Step 4144 detects the selection of the delete password button 4116 causing the program to proceed to step 4146 where the database is updated to reflect deletion of the password and then to step 4148 where the checkmark is removed from beside the highlighted class. Selection of the close button 4118 results in the program at step 4150 returning to the main menu procedure of FIG. 13.

A modification of the observations procedure (steps 530, 532, 534, 536, 538, 540, 542, 544, 546 and 548 of FIG. 14) is illustrated in FIG. 161. When "observations" is selected in the main menu, step 530 branches to step 532' where the modified observations menu 4160 of FIG. 162 is displayed. Selection of "set observation periods" is the same as in previously described steps 536 and 538. Selection of "maps observation scales" in the menu 4160 is sensed by step 4162 to proceed to step 4164 where the modified observations window 4166 is displayed. This observations window 4166 differs from the observations window 1432 of FIG. 61 by including a data source selection control box 4168 and a scale (developmental level +developmental area) selection control box 4170 as well as removing the notes box which can be called from the file menu 1511, FIG. 164, of a notes button on the tool bar. A modification of the procedure of FIG. 57 is shown in FIG. 190 wherein step 4169 is included in the procedure to sense use of the data selection control box 4168 to change the data source in step 4171 which is associated with each learning capability subsequently changed by the user. A modified update menu 4172, FIG. 165, can be popped up by selection of "update" in the menu bar of window 4166 and replaces the selection "estimate" of the menu 1474 of FIG. 60 with "establish baseline capabilities", and "update planning level". The "establish baseline capabilities" operates the same as the previously described "estimate" in that checkmarks in the boxes 1450 (indications of learned capabilities) and the planning indications in the buttons 1452 are set in accordance with the previously described mathematical computation based on the position of the slider 1466 in the estimate box 1436; learned capabilities noted by direct observations can be changed. The "update planning level" also uses the previously described mathematical computation but only to change planning indications in accordance with the checked boxes, i.e., in accordance with the score computed from the number of learned goals or learning capabilities. The menu 4172 also contains the selection "automatically update planning levels" which toggles automatically updating the planning indications in the buttons 1452 when a box 1450 is clicked to place or remove a checkmark.

The menu 4160 also includes the item "set data source categories" which when selected causes step 4178 to branch to step 4180 where the set data source categories window 4182 of FIG. 167 is displayed. The window 4184 includes a data source edit control box 4184, a source list box 4186, an add button 4188, a delete button 4190 and a close button 4192. The user can click on a category listed in the box 4186 to highlight the category and to copy that category to the edit control box 4184. Also the user can type a new category in the edit control or edit an existing category in the edit control. Selecting the add button 4188 adds any new or edited category to the list in the list box. Selection of the delete button 4190 deletes a highlighted category in the list box 4186. The close button 4192 closes the window 4182 and sets the selected data source category in the data source box 4168. Additionally the data source category can be selected from a pop-up list displayed by clicking on the down button in the selection control 4168. The view menu 4193 of FIG. 166 includes an item "view data source information" which can be selected to view and print a listing of the learning capabilities in the current scale with the data source listed next to each learning capability.

Selection of the item "set scale selection options" in the observations menu 4160 is sensed by step 4194 to branch to step 4196 where the scale selection window 4198 of FIG. 168 is displayed. The window 4198 includes a list box for displaying a list of all the scales in the database, a deselect all button 4202, a select all button 4204 and a close button 4206. Scales selected to be used have a check mark beside the title. The user can select additional scales or deselect selected scales by clicking on listed scales. Clicking on the deselect button 4202 deselects all of the listed scales while clicking on the select all button 4204 selects all of the listed scales. After closing the window 4198 by clicking on the close button 4206, the user can only select a scale in the selection box 4170 from those which were selected in the window 4198.

Step 4208 senses when "copy a scale" is selected in the menu 4160 to branch to step 4210 where the copy a scale window 4212 of FIG. 169 is displayed. The window 4212 includes an edit control box 4214, a scale list box 4216, a copy button 4218, a delete button 4220 and a close button 4222. Any of the listed scales in the box 4216 can be copied to the edit control 4214 where the title of the copy can be changed. Clicking on the copy button 4218 completes the copying by inserting the title of the copy into the list in box 4216. The delete button 4270 is used to delete any highlighted copy in the list box. The original scales cannot be deleted. When the close button 4222 is selected, the window 4182 is removed and any last copied scale is placed in the box 4170.

In a modified child information window 1012' of FIG. 181, there is added to the window 1012 of FIG. 45 a special needs edit control box 4230, a special needs list box 4232 with associated add button 4234 and delete button 4236, an enrollment date edit control 4237 and a drop date control 4238. Special needs, or none, of a child can be noted by clicking on the corresponding item or items listed in the special needs list box 4232 to place a checkmark beside the item. New items can be typed and existing items can changed in the edit control box 4230 and then added to the list in the list box 4232 by clicking on the add button 4234. Highlighted items in the list box 4232 can be deleted by selecting the delete button 4236. Additionally the enrollment date and the drop date of a child can be entered and saved in the database using the edit controls 4237 and 4238.

In a modified scales and periods window 1812' of FIG. 182 employed in the agency profile settings procedure, a modified scales selection and list box 1832' contains a list of items each of which combine the developmental level (age level) and the developmental area. This eliminates the need for the separate developmental (age level) selection box 1828 of FIG. 90. Similar combining of the listing of developmental levels and developmental areas can be made in other windows providing for selection of developmental level and developmental area such as in the windows of FIGS. 92, 94, 96, 98 and 102.

Figure 91:
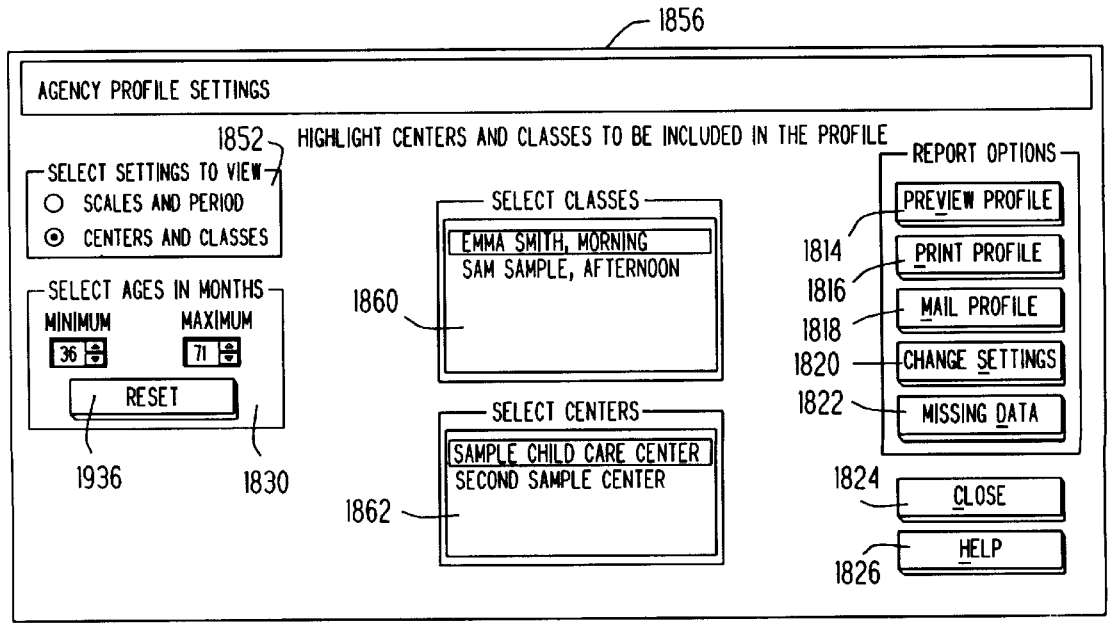
FIG. 91 is an illustration of a second window displayed in the agency profile settings procedure.

A modified centers and classes window 1856' in FIG. 183 includes a special needs list selection box 4240 in addition to the boxes of FIG. 91. The special needs selection box 4240 enables the user to select (highlight) special needs to provide a report similar to FIG. 170 but of children having the selected special need or needs. By default, all the items in the box 4240 are selected so a report produced when the user makes no selection in the box 4240 covers all the children in the corresponding group, i.e., agency, center, class, etc. This special needs selection box can be included in other windows which provide for selection of classes and children such as FIGS. 95 and 99. The modified window 2082' of FIG. 184 illustrates that the special needs box 4240 can also be included in the children's windows such as FIGS. 93, 97 and 101. Additionally the children's windows can include a deselect all button 4242 as illustrated in FIG. 184 for enabling the user to deselect all the children in the list box 2083 with a single click rather than clicking on each child.

Figure 110:
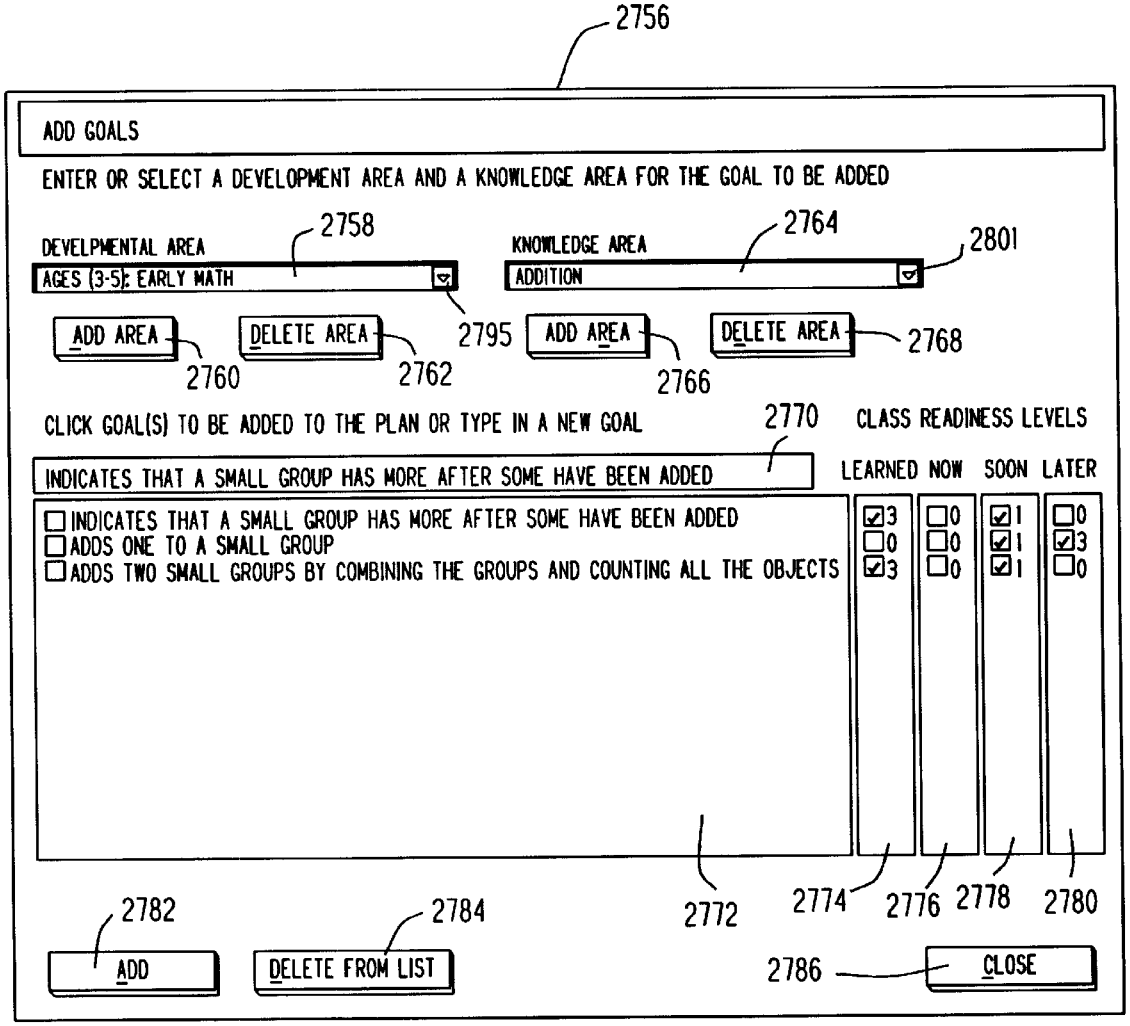
FIG. 110 is an illustration of a window displayed in the add goals procedure.

A modified open lesson plan window procedure, modified from FIG. 104, is shown in FIG. 192. Modified step 2730' calls a procedure (not shown but similar to previously described procedures) to display a modified goals page 2736', FIG. 185, in the lesson plans window 2630 wherein the add goals window of 2756 of FIG. 110 is combined with the goal page 2736 of FIG. 108. The modified page 2736' includes all the items and functions of both page 2736 and window 2756 except that the add goal button 2744 of FIG. 108 is deleted because the adding of goals to the lesson plan in the modified page 2736' is performed by the add goals procedure of clicking on a goal item in the goal list box 2772.

The activities/materials page of FIG. 112 and its associated add activities window of FIG. 114 and add materials window of FIG. 116 are replaced by an activities page 4250 as illustrated in FIGS. 186 and 187. The activities page 4250 combines and rearranges features of the activity/materials page 2862 of FIG. 112, the add activities window 2908 of FIG. 114 and the add materials window 2980 of FIG. 116 as indicated by the items in FIGS. 186 and 187 identified by the same numerals in FIGS. 112, 114 and 116. The activity/materials tree box 2864 of FIG. 112 is made a pop-up window 2864', FIG. 187, and includes the delete key 2870 to enable highlighting and deleting items from the tree displayed in the window 2864'. A close button 4252 is added so that the pop-up window 2864' can be closed. When the window 2864 is closed, a show tree button 4254, FIG. 186, is exposed so that the user can call back the activity/materials tree window 2864'.

Additionally, the page 4250 includes a create activity button 4256 and an edit activity button 4258 which when selected call an open activity maker window procedure of FIG. 191. In step 4259, the procedure displays an activity maker window 4260 shown in FIG. 188. The activity maker window 4260 includes an activity edit control box 4262, a library selection and edit control box 4264, a developmental area (scales) selection box 4266, a knowledge area selection box 4268, a class area selection box 4270, a goals list box 4272, an add goals button 4274, a related developmental area selection box 4276, a related knowledge area selection box 4280, a related knowledge area list box with associated add area button 4282 and delete area button 4284, a procedure text edit box 4286, an add materials button 4288, an ok button 4290 and a cancel button 4292. In step 4261 it is determined if the procedure was called from the edit button, and if so, step 4263 places the data of the current activity into the edit control boxes 42262, 4264, 4266, 4268, 4270, 4272, 4276, 4278, 4280 and 4286. If step 4261 is false, step 4265 places the current developmental area into boxes 4266 and 4276, the current knowledge area into boxes 4268 and 4278, and the goals of the current knowledge area into the goal list box 4272. User input is enabled in step 4267. The user types the name of a new activity in the box 4262 when creating a new activity, or edits the name in the box 4262 when editing a activity. Edit control box 4264 is used to select or create a library in which the database stores the activity. The primary developmental area, the primary knowledge area and the class area for the activity are selected or changed using the selection boxes 4266, 4268 and 4270. Selection of the add goals button 4274 is detected in step 4269 to branch to step 4271 where goals in the selected knowledge area are added to the list of goals in the goal list box 4272. The user uses the related developmental area selection box 4276 and select knowledge area box 4278 to select any related knowledge areas to be associated with the activity. Clicking on the add area button 4282 is sensed in step 4273 to branch to step 4275 where the selected related knowledge areas is added to the listed related knowledge areas in the list box 4280. Selection of the delete area button 4284 is detected by step 4277 to delete a highlighted item in the box 4280 from the box in step 4279. The user types in or edits the procedure for the activity in the text edit box 4286. Selection of the add materials button 4288 is sensed in step 4281 to proceed to step 4283 where a pop-up window with a material edit control box, a material list box, an add button, a delete button and a close button similar to boxes 2986 and 2988 and buttons 2990, 2992 and 2994 of FIG. 116 is displayed and a procedure similar to FIG. 115 is performed to add materials to the current activity.

When the ok button 4290 is selected, step 4294 branches to step 4295 where the newly created or edited activity is saved in the database and added to the list in the list box 2922 of FIG. 186. Selection of the cancel button closes the activity maker window without saving the information in the window. The activities window of FIG. 187 is then displayed and its procedure performed.

Returning to FIG. 192, step 4298 detects clicking on an index tab of an individualization page 4300, FIG. 189, added to the lessons plan window. Step 4299 calls the individualization procedure of FIG. 193 which then opens the individualization page 4300 in step 4301. This page 4300 includes a lesson plan selection box 4302, a copy button 4304, a lesson plan goals list box 4306, a lesson plan activities list box 4308, a children list box 4310, a readiness levels list box 4311 and an individualization note text edit box 4312 with associated add button 4314, cancel changes button 4316, and clear button 4318. In step 4320 the goals and activities of the current lesson plan are displayed in the lesson plan goal box 4306 and lesson plan activities box 4308, respectively. In step 4322, the children in the current class are displayed in the children box 4310. Readiness levels are displayed by step 4324 in the readiness levels box 4311. User input is enabled in step 4326. The user can use the box 4302 to display and select a lesson plan having a previously created individualization note. Clicking on the button 4304 is sensed in step 4328 to branch to step 4330 where the individualization note of the selected lesson plan is copied from the previous plan to the edit box 4312. The user can edit or create text in the edit box 4312 to create an individualization note added to the current lesson plan. The user can select one of more goals in the goals list box 4306, activities in the activities list box 4308, children in the children list box 4310 and readiness levels in the readiness level list box 4311 to select (or deselect) items. Clicking on the add button 4314 is sensed in step 4332 to proceed to step 4334 where the text of the selected items in boxes 4306, 4308, 4311 and 4310 is added to the text box 4312. When less than all the readiness levels are selected, the children in box 4310 having the selected readiness level or levels are automatically selected. Clicking on children in the box 4310 can select non-highlighted children or deselect highlighted children. When the user clicks on the cancel changes button 4316, step 4336 branches to step 4338 where current changes made to text in the box 4312 are erased. Selection of the clear button 4318 results in step 4340 branching to step 4342 which clears the text box 4312.

Various other modifications, changes in detail and variations can be made to the above described embodiment of an instructional management system without departing from the scope and spirit of the invention. The illustrated system with its hardware and software as described above is only illustrative of one or more embodiments of the invention, and various other systems with differing hardware and differing software can be devised to provide similar structure, functions and/or results. The number of screens, the items and their arrangement in the screens, the procedures and their content and arrangement, the procedure steps and their order and arrangement, and the number of functions provided in the system are matters of choice; so it is intended that the present disclosure be interpreted as disclosing general concepts relating to instructional management systems and that the present invention can be incorporated into many different applications in many different forms.

What is claimed is:

1. An instructional management system for use in a computer having user input, a display and data storage; the system comprising:

a database for being stored in said data storage and including a list of learning capabilities with associated corresponding varying difficulty factors and a file for setting up a list of students with associated corresponding ability scores; and a computer program for computing a probability of a student in the list of students performing each of the learning capabilities on the list based upon the corresponding difficulty factor and the corresponding ability score of the student, and for determining a present learning suitability of the student for each of the learning capabilities based upon said computed probabilities.

2. An instructional management system according to claim 1 wherein said computer program classifies present learning suitabilities into suitability to begin learning now and suitability to begin learning later.

3. An instructional management system according to claim 2 wherein said computer program also classifies present learning suitabilities into suitability to begin learning soon.

4. An instructional management system according to claim 1 wherein the computer program includes means for a teacher entering an estimate of a student's ability score by the computer input, and computes the probability of performance of the learning capabilities based upon the estimate of the student's ability score.

5. An instructional management system according to claim 2 wherein the database includes a plurality of learning activities, and each learning capability is linked to one or more learning activities in the data storage for enabling a teacher to select a learning activity.

6. An instructional management system as claimed in claim 5 wherein the computer program includes a procedure for displaying for a plurality of the learning capabilities within a selected developmental area and for displaying numbers of students of a selected class having each suitability status for each corresponding learning capability.

7. An instructional management system according to claim 1 wherein the database also includes varying discrimination factors associated with the corresponding learning capabilities, and the computer program computes the probability of a student in the list of students performing each of the learning capabilities on the list based upon the corresponding difficulty factor, the corresponding discrimination factor and the corresponding ability score of the student.

8. An instructional management system according to claim 1 wherein the computer program computes the probability $P_i$ of performance of each learning capability i by the equation $$P_{i=1}|^\theta = \frac{1}{1 + e^{-a_i(\theta - b_i)}}$$

wherein e is the natural or Naperian logarithm base, $a_i$ is a discrimination factor of the learning capability i, $b_i$ is the difficulty factor of the learning capability i and θ is the ability score of the student.

9. An instructional management system according to claim 8 wherein the ability score of the student is based upon the number of learning capabilities which have been learned in the list of learning capabilities.

10. An instructional management system according to claim 9 wherein the database includes an indication of a data source of an assessment of each learned capability.

11. An instructional management system according to claim 10 wherein possible data sources include estimate, work sample and direct observation.

12. An instructional management system according to claim 8 wherein the ability score of the student is an item response theory score derived from a table based upon the learning capabilities which have been learned in the list of learning capabilities.

13. An instructional management system according to claim 9 wherein the ability score of the student is an item response theory score derived from a table based upon the number of learning capabilities which have been learned in the list of learning capabilities.

14. An instructional management system for use in a computer having a display, an input and data storage; the system comprising:
 a database for being stored in said data storage including a plurality of learning capabilities with associated corresponding varying difficulty factors; and
 a computer program for receiving from the input an estimate of general ability of a student to accomplish the list of learning capabilities, and for computing a learned indication for each of the learning capabilities based upon the difficulty factors and the estimate of general ability.

15. An instructional management system according to claim 14 wherein the computer program converts the entered estimate of general ability into an item response theory score derived from a table based upon the estimate of general ability, computes a probability of performance by the student for each of the learning capabilities in the list based upon the corresponding difficulty factors and the item response theory score, and assigns a learned indication to each learning capability having a computed probability greater than a predetermined probability.

16. An instructional management system according to claim 15 wherein the computer program computes the probability $P_i$ of performance of each learning capability i by the equation $$P_{i=1}|^\theta = \frac{1}{1 + e^{-a_i(\theta - b_i)}}$$

wherein e is the natural or Naperian logarithm base, $a_i$ is a discrimination factor of the learning capability i, $b_i$ is the difficulty factor of the learning capability i and θ is the item response theory score of the student.

17. An instructional management system according to claim 16 wherein the computer program assigns the learned indication to each learning capability having a probability P of performance greater than 0.5.

18. An instructional management system according to claim 17 wherein the computer program indicates each learning capability having its probability P of performance in the range from 0.25 to 0.5 as being suitable for being learned now, indicates each learning capability having its probability P of performance in the range from 0.15 to 0.25 as being suitable for being learned soon, and indicates each learning capability having its probability P of performance less than 0.15 as being suitable for being learned later.

19. An instructional management system according to claim 14 wherein the computed learned indications are stored in the data storage and the computer program has a further input for enabling manually changing the computed learned indication of each learning capability based upon actual observed performance.

20. An instructional management system according to claim 14 wherein the database includes a plurality of learning activities, and each learning capability is linked to one or more learning activities in the data storage for enabling a teacher to select a learning activity.

21. An instructional management system for use in a computer having a display, an input and data storage; the system comprising:
 a database for being stored in said data storage including a file for storing indications of suitabilities of a student in a plurality of learning capabilities; and a computer program for receiving from the input indications of suitabilities of the student to update the file and for further receiving anecdotal notes input by a teacher and storing such anecdotal notes in said database as records associated with said stored indications of suitabilities for the student.

22. An instructional management system as claimed in claim 21 wherein the computer program generates a suggested anecdotal note in response to input of an updated suitability and which can be manually accepted, modified and/or supplemented for being stored in said database.

23. An instructional management system for use in a computer having a display, an input and data storage; the system comprising:

a database for being stored in said data storage including a plurality of learning capabilities, a file for setting up a list of successive time periods, and a file for storing a plurality of records of student accomplishment of the learning capabilities along with an indication of one of the time periods; and a computer program for computing an indication of progress of student accomplishments over the plurality of successive time periods.

24. An instructional management system for use in a computer having a display, an input and data storage; the system comprising:

a database for being stored in said data storage including a plurality of learning capabilities, a file for setting up a list of successive time periods, and a file for storing a plurality of records of student accomplishment of the learning capabilities along with an indication of one of the time periods;

a computer program for computing an indication of progress of student accomplishments over the plurality of successive time periods;

each of the records of student accomplishment including a class to which each student is assigned, and the computed indication of student accomplishments including an indication of progress of the class as a whole in accomplishment in the different time periods.

25. An instructional management system as claimed in claim 24 wherein each of the plurality of learning capabilities is assigned a difficulty factor and the indication of progress is based upon difficulty factors of the learning capabilities.

26. An instructional management system for use in a computer having a display, an input and data storage; the system comprising:

a database for being stored in said data storage including records of students each including a first field designating a class selected from a plurality of classes and a second field designating a suitability status for each of a plurality of learning capabilities; and a computer program for operating the computer and for displaying for a plurality of the learning capabilities within a selected developmental area and for displaying numbers of students of a selected class having each suitability status for each corresponding learning capability.

27. An instructional management system according to claim 26 wherein computer program includes means for manually assembling a lesson plan based upon selected learning capabilities selected from the displayed plurality of learning capabilities.

28. An instructional management system according to claim 27 wherein said computer program classifies present learning suitabilities into suitability to begin learning now and suitability to begin learning later.

29. An instructional management system for use in a computer having a display, an input and data storage; the system comprising:

a database for being stored in said data storage including a listing of a plurality of goals to be achieved by students, a computer program for indicating and storing indications of achievement of each goal in the plurality of goals by each student in said database, and means for computing a developmental score based upon the number of achieved goals of the plurality of goals for each student.

30. An instructional management system according to claim 29 wherein the database includes instructional activities each assigned with one or more of said plurality of goals, and each of the plurality of goals is assigned a difficulty factor; and the computer program includes a procedure for assigning readiness levels to each goal for each student based upon the number of achieved goals of each student and the difficulty factor of each goal, and a procedure responsive to selection of a goal for displaying activities assigned with the selected goal to enable achievement based instruction.

31. An instructional management system according to claim 29 wherein the computer program includes a procedure for indicating and storing a data source for each stored indication of achievement.

32. An instructional management system according to claim 31 wherein possible data sources include estimate, work sample and direct observation.

33. An instructional management system according to claim 29 wherein the database includes instructional activities each assigned with one or more of said plurality of goals, and each of the plurality of goals is assigned a difficulty factor; and the computer program includes a procedure responsive to selection of a goal for displaying activities assigned with the selected goal to enable achievement based instruction.

34. An instructional management system according to claim 29 wherein the developmental score is further based upon item response theory.

* * * * *